United States Patent
Tuck et al.

(10) Patent No.: US 7,592,910 B2
(45) Date of Patent: *Sep. 22, 2009

(54) MATCHING SYSTEM

(75) Inventors: Edward F. Tuck, West Covina, CA (US); Martie G. Haselton, Culver City, CA (US); Mark A. Sturza, Encino, CA (US); Rebecca B. Weeks, Santa Monica, CA (US); Robert G. Quinn, Irvine, CA (US)

(73) Assignee: Social Fabric Corporation, West Covina, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/514,285

(22) Filed: Aug. 30, 2006

(65) Prior Publication Data

US 2007/0069901 A1 Mar. 29, 2007

Related U.S. Application Data

(63) Continuation-in-part of application No. 11/405,001, filed on Apr. 14, 2006, and a continuation-in-part of application No. 11/360,025, filed on Feb. 21, 2006, now abandoned, and a continuation-in-part of application No. 11/286,143, filed on Nov. 23, 2005, and a continuation-in-part of application No. 11/239,603, filed on Sep. 28, 2005.

(60) Provisional application No. 60/834,025, filed on Jul. 28, 2006.

(51) Int. Cl.
G08B 1/08 (2006.01)

(52) U.S. Cl. .................. 340/539.13; 340/328; 340/326

(58) Field of Classification Search ............ 340/539.13, 340/328, 326; 379/93.17, 93.25; 707/2, 707/3, 104; 709/253
See application file for complete search history.

(56) References Cited

U.S. PATENT DOCUMENTS

| | | | | |
|---|---|---|---|---|
| 6,020,810 | A * | 2/2000 | Har-Even | 340/328 |
| 6,143,506 | A * | 11/2000 | Golub et al. | 435/7.1 |
| 2003/0191047 | A1* | 10/2003 | Hallahan | 512/13 |
| 2005/0112684 | A1* | 5/2005 | Holzle | 435/7.1 |
| 2006/0034865 | A1* | 2/2006 | Hildebrand et al. | 424/192.1 |
| 2008/0133716 | A1* | 6/2008 | Rao et al. | 709/220 |

FOREIGN PATENT DOCUMENTS

EP 1 358 869 11/2003

* cited by examiner

*Primary Examiner*—Daryl Pope
(74) *Attorney, Agent, or Firm*—Thomas N. Giaccherini

(57) ABSTRACT

Methods and apparatus for finding a match between or among persons (17a, 17b), characteristics and/or objects are disclosed. In one embodiment of the invention, an electronic device (10a, 10b), such as a handheld radio, is used to find a person who meets criteria specified by a user. In another embodiment, this electronic device (10a, 10b) is programmed with information regarding the genetic attributes (33) of individuals. These individuals are matched by computing a correlation of the genetic attributes of two individuals (33a, 33b). The information regarding these genetic attributes are determined by testing a tissue or fluid sample. In yet another embodiment of the invention, once biological or genetic attributes (33) are determined, a perfume (544) may be manufactured which is based on a unique set of genetic attributes, and which may either fortify the sexual self-confidence and broadcast the attributes of the person who wears the perfume, or may be used to enhance the attractiveness of another person.

81 Claims, 138 Drawing Sheets

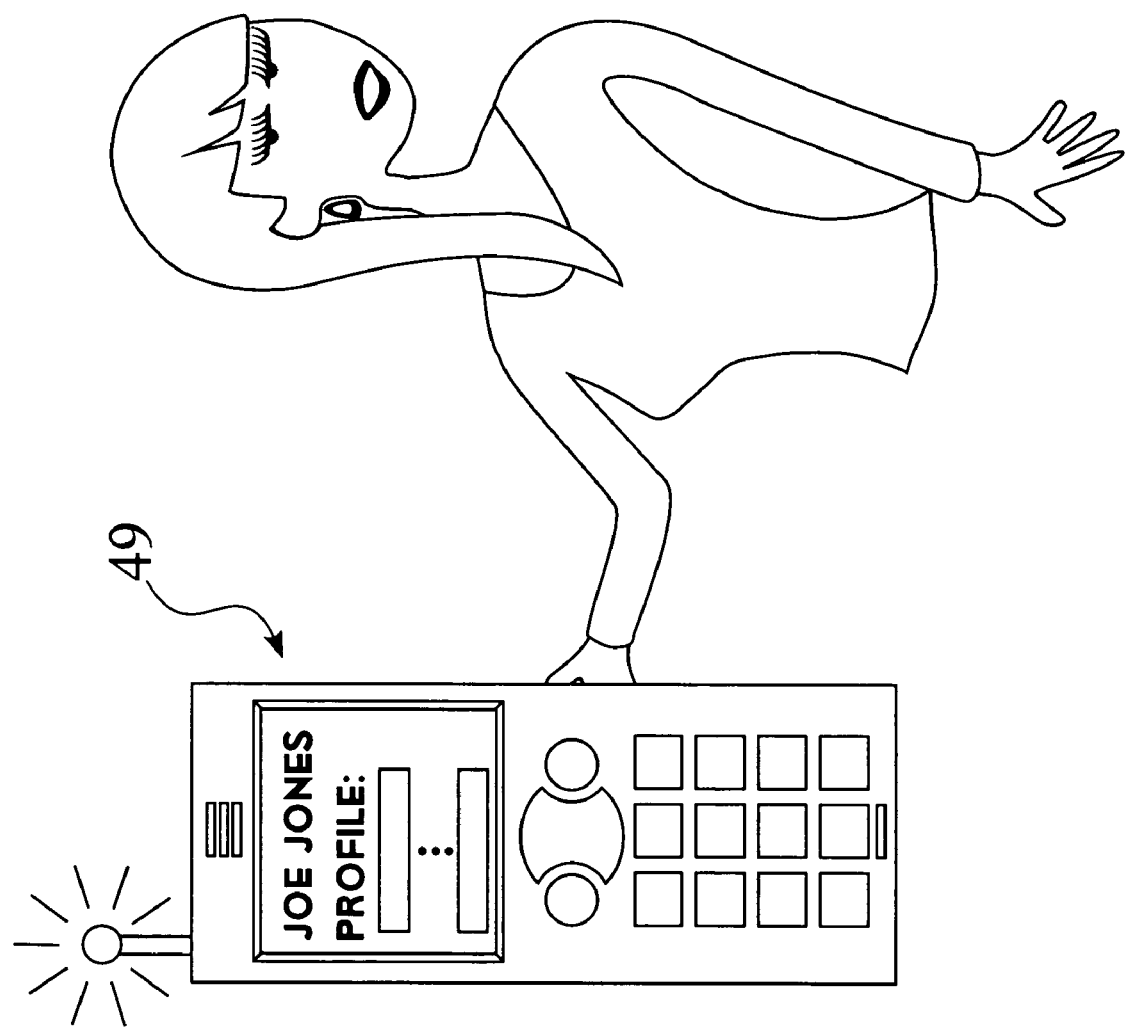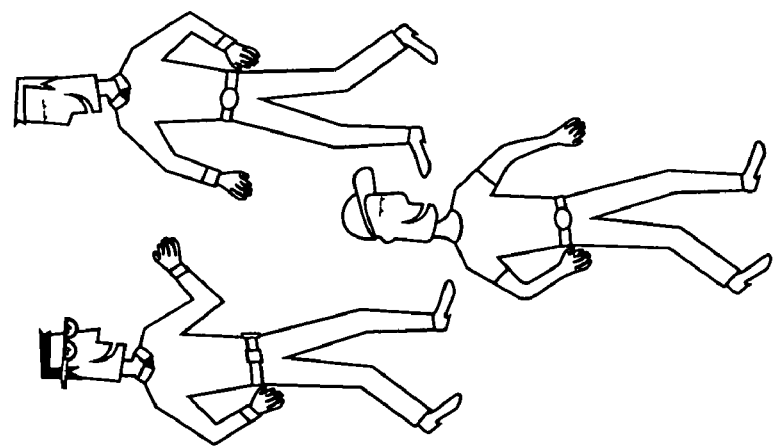
Fig. 29

Teleflirting

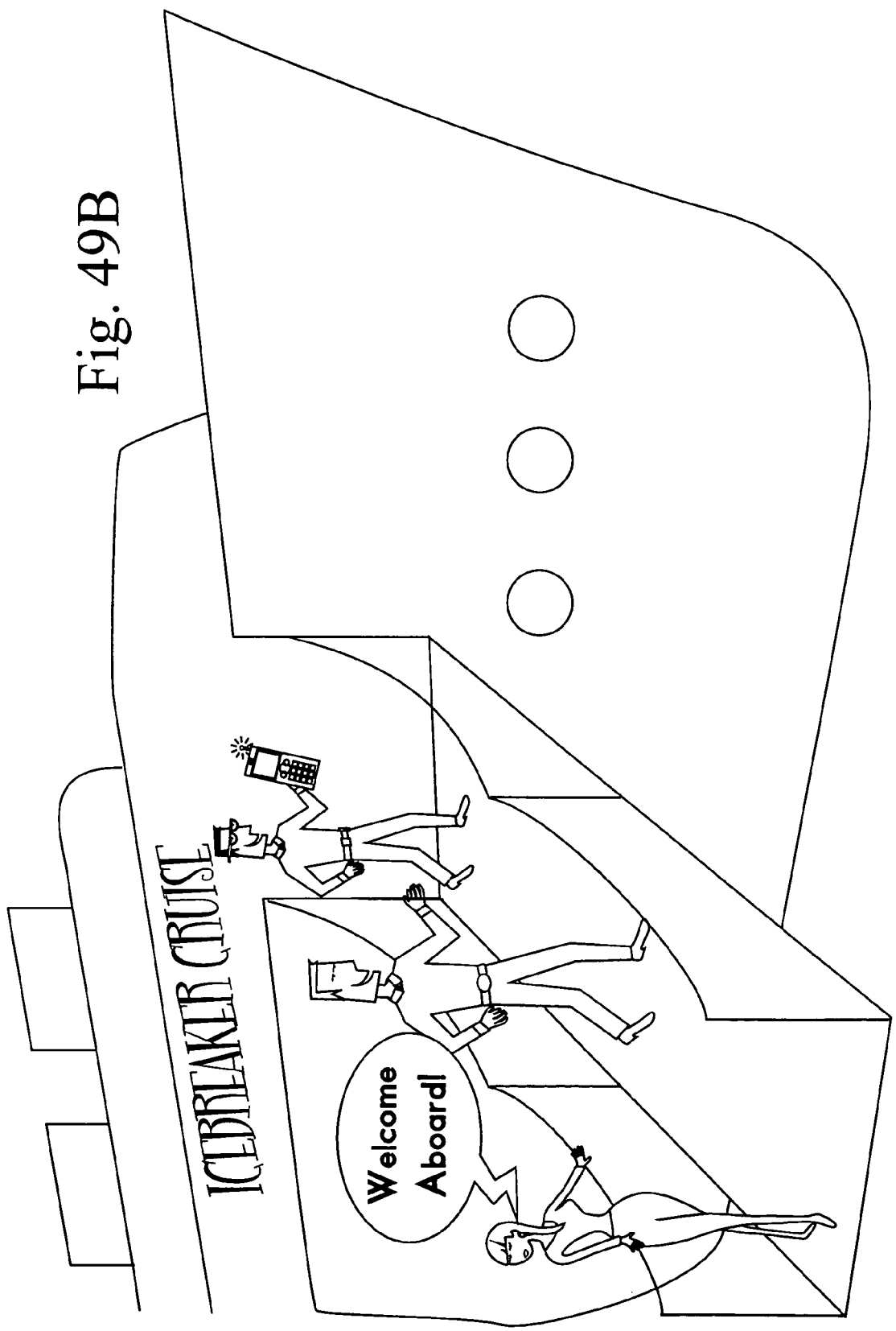

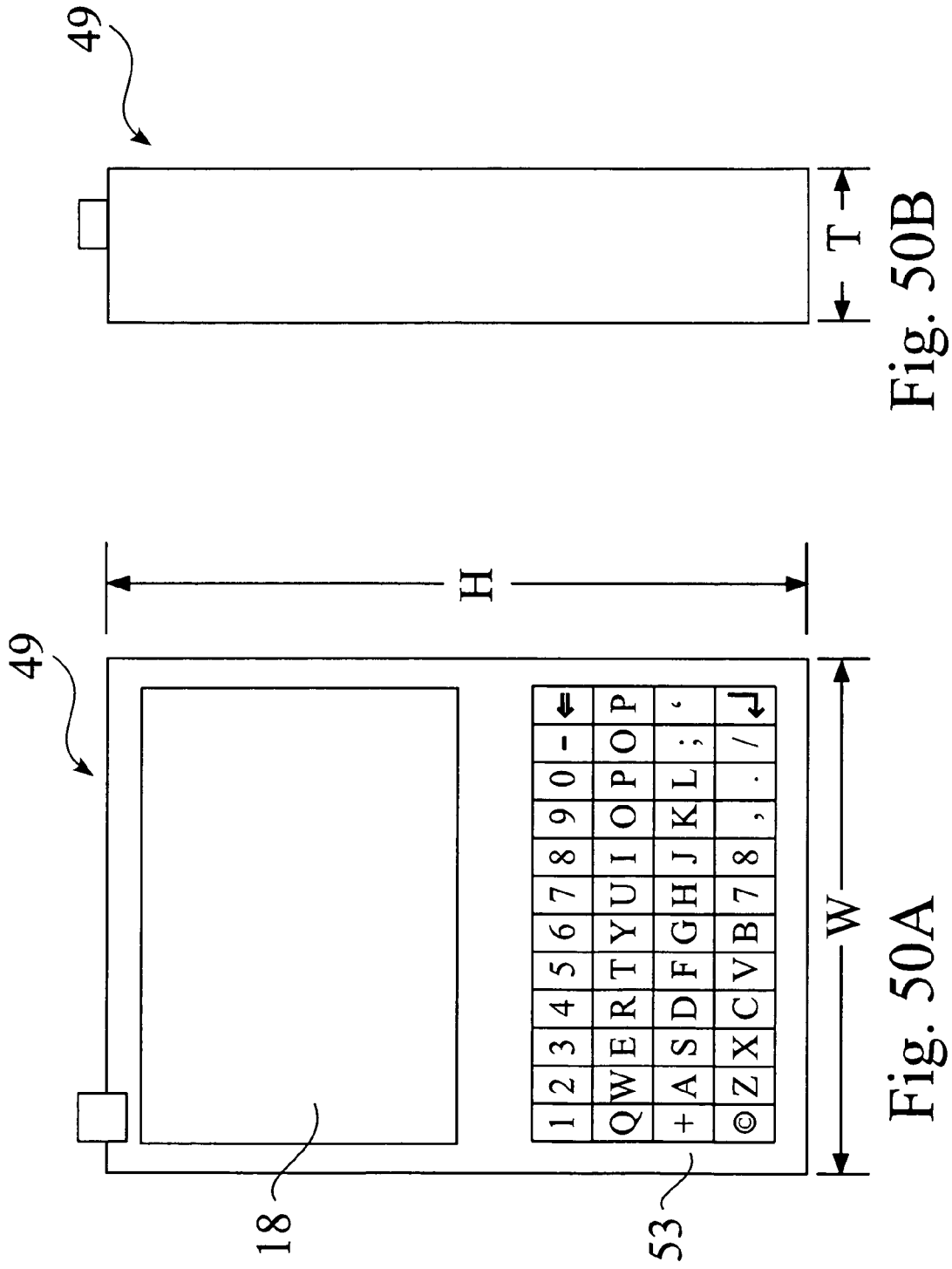

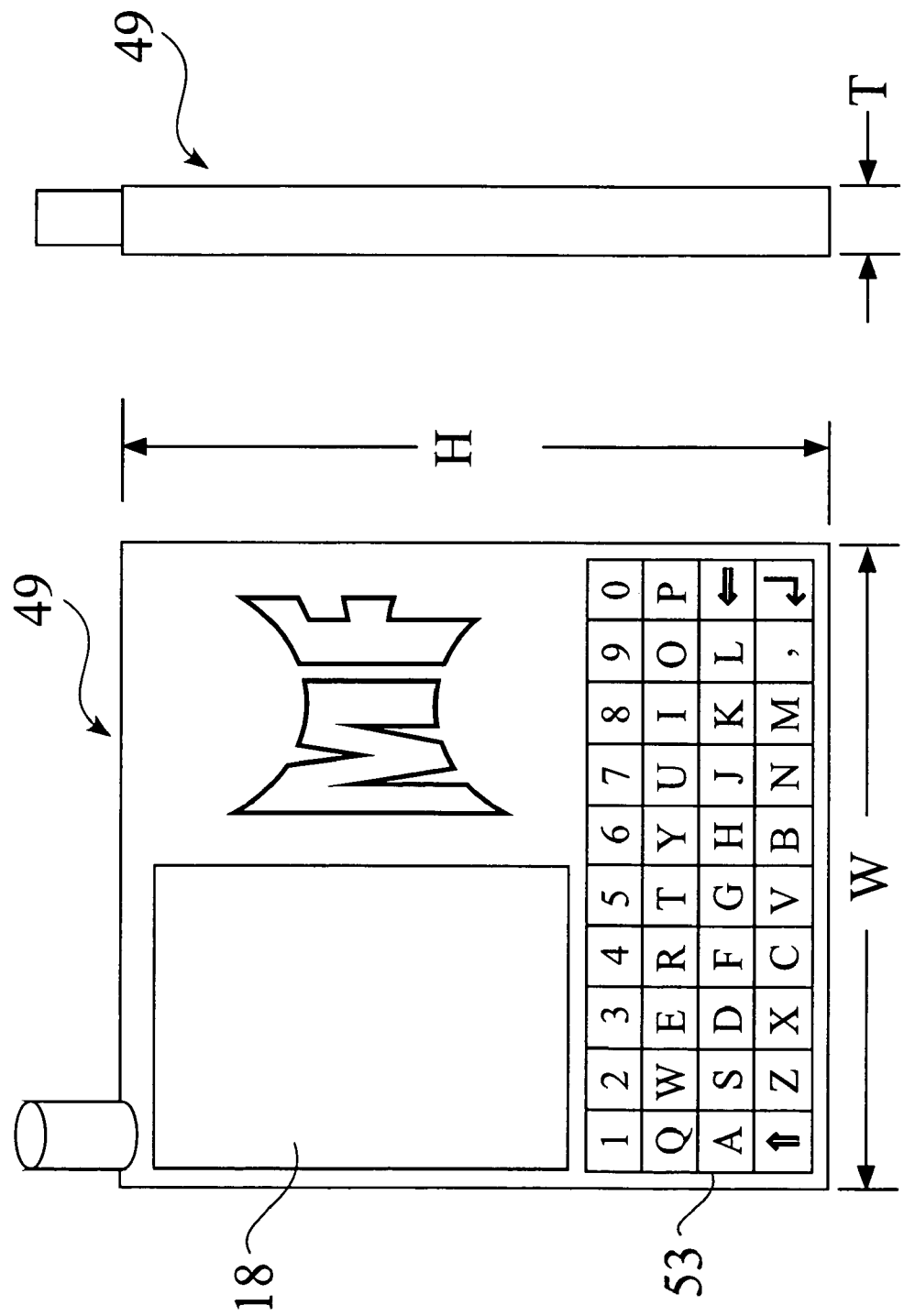

| | @ 1-Mbps | @ 11-Mbps |
|---|---|---|
| Max Theoretical (20 dBm EIRP) | 1,375 m | 614 m |
| Outdoors / Open Space with Standard Antenna | 225 - 300 m | 45 - 105 m |
| Office /Light Industrial Setting | 75 - 105 m | 30-45 m |
| Residential Setting | 38 - 60 m | 18 - 24 m |

Wi-Fi (802.11b) Range

Fig. 55

|  | Sub to Hub |  | Hub to Sub |  |
|---|---|---|---|---|
| Peak Transmit Power (dBW) | -27.0 |  | -13.0 |  |
| Peak Transmit Power (mW) |  | 2 |  | 50 |
| Feed Loss (dB) | 1.0 |  | 1.0 |  |
| Transmit Antenna Peak Gain (dB) | 37.9 |  | 24.0 |  |
| Half-Power Beamwidth (deg) |  | 2.3 |  |  |
| Efficiency |  | 0.70 |  |  |
| Effective Diameter (m) |  | 0.15 |  |  |
| Pointing Loss (dB) | 3.0 |  | 3.0 |  |
| EIRP (dBW) | 6.9 |  | 7.0 |  |
| Free Space Loss (dB) | 127.6 |  | 127.6 |  |
| Frequency (GHz) |  | 60 |  | 60 |
| Path Length (Km) |  | 0.96 |  | 0.96 |
| Polarization Loss (dB) | 0.00 |  | 0.00 |  |
| Gaseous Loss (dB) | 14.3 |  | 14.3 |  |
| Rain Loss@99.7% Rain Availability | 1.8 |  | 1.8 |  |
| Total Transmission Loss (dB) | 143.8 |  | 143.8 |  |
| Receive Antenna Peak Gain (dB) | 24.0 |  | 37.9 |  |
| Half-Power Beamwidth (deg) |  |  |  | 2.3 |
| Efficiency |  |  |  | 0.70 |
| Effective Diameter (m) |  |  |  | 0.15 |
| Polarization Mismatch Loss (db) | 0.2 |  | 0.2 |  |
| Transmit Ant Axial Ratio (dB) |  | 2.0 |  | 2.0 |
| Receive Ant Axial Ratio (dB) |  | 2.0 |  | 2.0 |
| Pointing Loss (dB) | 3.0 |  | 3.0 |  |
| Systems Noise Temp @ Antenna (dB-°K) | 30.5 |  | 30.5 |  |
| Feed Loss (dB) |  | 1.0 |  | 1.0 |
| Receiver Noise Figure (dB) |  | 5.0 |  | 5.0 |
| Antenna Temperature (°K) |  | 268 |  | 268 |
| Receiver/Feed Noise Temp (°K) |  | 865 |  | 865 |
| System Noise Temp @ Ant (°K) |  | 1133 |  | 1133 |
| G/T (dB/°K) | -9.8 |  | 4.2 |  |
| Information Rate (dB-Mbps) | 73.0 |  | 86.0 |  |
| Information Rate (Mbps) |  | 20 |  | 400 |
| Required Eb/No (dB) | 4.0 |  | 4.0 |  |
| Implementation Loss (dB) | 2.0 |  | 2.0 |  |
| Required C/No (dB-Hz) | 79.0 |  | 92.0 |  |
| Unallocated Margin (dB) | 3.0 |  | 4.0 |  |

Fig. 78

Human Leukocyte Antigen (HLA)

- Glyoprotein molecules
- Class 1 consist of 2 polypeptide chains
  * Long one (heavy chain), 346 amino acids
    ○ 5 main regions (domains)
      - 3 extracellular (N, C1, C2)
      - 1 transmembrane
      - 1 cytoplasmic (C)
    ○ Differentiates HLA-A, HLA-B, and HLA-C
  * Short one, 99 amino acids
    ○ Beta-2 microglobulin ($\beta_2 M$)
    ○ Same for HLA-A, HLA-B, and HLA-C
- Class 2 (HLA-D) consists of 2 trans membrane polypeptides
- All cells can present antigens with class 1 molecules, only certain types with class 2

Fig. 128

Diploid Haplotypes

- Contains one member of the pair of alleles for one, or more, locus
- HLA-A/HLA-B/HLA-DRβ1 haplotype
  * Also A/B/DRβ1 haplotype
  * 165 million possible with full reads (complete allele)
  * 9,620 possible with short reads (allele groups)
- Each person has 2 A/B/DRβ1 haplotypes
  * One from mother
  * One from father

Fig. 129

MHC Allele Groups (short reads)

| | |
|---|---|
| HLA-A (429 alleles in 20 groups) | A*01, A*02, A*03, A*11, A*23, A*25, A*26, A*29, A*30, A*31, A*32, A*33, A*34, A*36, A*43, A*66, A*68, A*69, A*74, A*80 |
| HLA-B (751 alleles in 37 groups) | B*07, B*08, B*13, B*14, B*15, B*18, B*27, B*35, B*37, B*38, B*39, B*40, B*41, B*42, B*44, B*45, B*46, B*47, B*48, B*49, B*50, B*51, B*52, B*53, B*54, B*55, B*56, B*57, B*58, B*59, B*67, B*73, B*78, B*81, B*82, B*83, B*95 |
| HLA-DRβ1 (511 alleles in 13 groups) | DRβ1*01, DRβ1*03, DRβ1*04, DRβ1*07, DRβ1*08, DRβ1*09, DRβ1*10, DRβ1*11, DRβ1*12, DRβ1*13, DRβ1*14, DRβ1*15, DRβ1*16 |

Fig. 130

Similarity Metric

- 7 discrete values
  * 0, 1, 2, 3, 4, 5, and 6
- Matches allele groups (X*NM)
- Compares HLA-A, HLA-B, and HLA-DRβ1 allele group pairs from 2 individuals
  * Starting from 0
  * For each loci, add 2 if allele group pair from 1st individual matches allele group pair from 2nd individual, add 1 if only 1 allele group in each pair matches
  * Does not distinguish between haplotypes, i.e. order is not important

Fig. 131

MATCHING SYSTEM

CROSS-REFERENCE TO RELATED U.S. PATENT APPLICATIONS & CLAIMS FOR PRIORITY

The Present Application is a Continuation-in-Part Application, and is related to the following Pending U.S. Patent Applications:
U.S. Ser. No. 11/239,603, which was filed on 28 Sep. 2005;
U.S. Ser. No. 11/286,143, which was filed on 23 Nov. 2005;
U.S. Ser. No. 11/360,025, which was filed on 21 Feb. 2006;
U.S. Ser. No. 11/405,001, which was filed on 14 Apr. 2006; and
U.S. Ser. No. 60/834,025, which was filed on 28 Jul. 2006.

The Applicants claim the benefit of priority in accordance with Sections 119 and/or 120 of Title 35 of the United States Code of Laws for any subject matter which is commonly disclosed in the five Pending Patent Applications cited above, and in the Present Application.

FEDERALLY SPONSORED RESEARCH OR DEVELOPMENT

None.

FIELD OF THE INVENTION

The present invention pertains to methods and apparatus for finding a match between or among persons, characteristics, systems and/or objects, items or parts. In one embodiment of the invention, an electronic device, such as a hand-held radio, is used to find a person who meets criteria specified by a user. In another embodiment, this electronic device is programmed with information regarding the genetic attributes of individuals. These individuals are matched by computing a correlation of the genetic attributes of two individuals. The information regarding these genetic attributes is determined by testing a tissue or fluid sample. In yet another embodiment of the invention, once the genetic attributes are determined, a perfume may be manufactured which is based on a unique set of genetic attributes, and which may either fortify the sexual self-confidence and broadcast the attributes of the person who wears the perfume, or may be used to enhance the attractiveness of another person.

BACKGROUND OF THE INVENTION

For almost all of their existence as a separate species, humans have lived in relatively isolated groups ("hunting-gathering camps") of ten to forty people. See Tuck, Edward F. and Earle, Timothy "Why CEOs Succeed and Why They Fail," published in *Strategy and Business*, Issue 5 (Fourth Quarter 1996). The group behaviors of humans, and their bodies and senses, have evolved to fit this manner of living.

All animals, including insects and bacteria, and many plants, have some means of communicating with others of their species. The most common means use the chemical senses: taste and smell. Some of the substances that activate these senses for information transfer are called "pheromones." A pheromone is defined in the *Merriam-Webster Office Dictionary* as "a chemical substance that is produced by an animal and serves especially as a stimulus to other individuals of the same species for one or more behavioral responses."

Some pheromones are sexual attractants. However, mammals, including humans, use odors other than pheromones to provide far more detailed information. Researchers found in 1982 that some mammals select their mates on the basis of a complementary Major Histocompatibility Complex (MHC) defined in the *Merriam-Webster Office Dictionary* as: "A group of genes in mammals that function especially in determining the Histocompatibility antigens found on cell surfaces." The MHC contributes to the mammal's personal smell and uniquely identifies it, as well as carrying information on the mammal's immune system. Mate selection based on complementary MHC maximizes a mated pair's offspring's number of immune system responses, making for more disease-resistant, thus fitter, offspring; and, because mammals with different MHCs are not closely related, selection based on these criteria also avoids the hazards of consanguinity, which amplifies genetic defects. This is analogous to the human taboo against marrying one's close relatives.

For the original work on MHC mate selection among mammals, see Boyse EA et al., "Chemosensory Communication—A New Aspect of the Major Histocompatibility Complex and Other Genes in the Mouse," *Journal of Oncodevelopmental Biology and Medicine*, Vol. 4 No 1-2: pages 101-116, 1982. Later work, in 1995, showed that women also select their preferred mates on this basis, but because of humans' relatively poor sense of smell, this selection must be done at very close range. See Wedekind C., et al., "MHC-Dependent Mate Preferences in Humans," *Proceedings of the Royal Society B*, 260, pages 245-249, 1995.

Odors carrying information on MHC are produced in the skin or passed along in breath or urine. The sense of smell in free-ranging mammals is exquisitely sensitive and complex: it can identify a range of odors far greater than that needed to avoid danger and seek food. The major use of this enhanced sense is to detect and understand pheromones and to analyze the MHCs of others of its own species. To understand the profound importance of smell one must know that the first organ to evolve after the spinal cord was the olfactory bulb at its end. The rest of a chordate's brain evolved from this base (vertebrates, including mammals, are among the members of the phylum Chordata).

Unlike most mammals, humans and some apes have poor senses of smell. They have retained their ability to detect and analyze MHC; however, these odors can be detected and analyzed only at very close range. Our impaired sense of smell may be the result of the natural selection that took place in three million years of living in small camps (as discussed above), because it was no longer needed (women do not have a pronounced estrus cycle like most mammals. They are always receptive, and thus have no need to signal their receptiveness. Degrees of consanguinity are public information in a small group. Camp dwellers usually find their mates in neighboring camps, which provides genetic separation. Because they are usually in sight of one another, camp dwellers have no need for odors to advertise their gender, pregnancy, age, state of health and other visible features; humans in committed relationships often adorn themselves with special marks, such as wedding rings, tattoos, hair length and special clothing; information on mood, such as fear, is easy to gain from the context of a person's actions.)

In addition, pheromones in particular may have been detrimental to the fitness of the camp (constant reminders of sex are distracting and lead to jealousy and strife, which is deadly in a confined group; animals with strong odors are at more risk of predation.)

Between 10,000 and 100,000 years ago, depending on the society, most hunting-gathering camps combined into either pastoral or agricultural tribes. Tribes are much larger groups, and bring two new metrics: social rank and wealth. In human society, which by then relied almost entirely on visual cues, clothes, posture, jewelry, tattoos and scarification were used as markers for these metrics. There was still no need for "long-distance" pheromones or long-range MHC analysis, because in a typical tribe of a few hundred people, everyone was seen by everyone else over a reasonable period of time.

In summary, identifying odors generated by the MHC, and behavior-modifying odors such as pheromones evolved and became of vital importance in mammals that were solitary or which lived in closely-related family groups. Pheromones became less important, and finally counterproductive, in species that tended to aggregate themselves in clumps of up to a few hundred individuals. In human societies the ability to detect and discriminate among those odors at a distance was essentially lost (and in some cultures the odors themselves are often intentionally suppressed, as with perfume and frequent bathing) and were replaced by their visual equivalents, some or which were eventually suppressed by clothing.

Modern urban society is radically different from life in a tribe or hunting-gathering camp, especially for singles. In 2005, over 30% of the households in the United States were inhabited by "single" people: unmarried people, married people living apart from their spouses, and single-parent households with small children. Specifically, in the year 2000, the United States had a population of 281 million, of which 224 million, or about 80%, lived in cities or metropolitan area of 100,000 or more people. These people lived in 105 million households, of which 33 million, or 31%, were non-family households (up from 26% in 1980), and 27 million, or 26%, were one-person households (up from 23% in 1980). See U.S. Census Bureau, *Statistical Abstract of the United States:* 2001, (121st edition) Washington, D.C. 2001.

Unlike their ancestors in a tribe or camp, most people in the United States are now members of a free-ranging species, and, because they are ill-equipped for that role, have a very poor chance of meeting a compatible stranger, either for friendship or matrimony, without exposure to embarrassment or danger. The traditional mechanisms for singles to meet are attendance at churches and bars; in the first case, it is considered bad form to "go shopping" from church to church, and in the second, there is very little protection against predators and chemically impaired judgment, and no mechanism to filter the compatible from the incompatible.

Note that while this analysis is, for simplicity's sake, cast in terms of singles seeking singles, it is recognized that in urban areas, families which would like to establish social contact with other families suffer an even greater disadvantage because of their lower mobility and more complex selection criteria. In addition, purely inanimate objects, such as cranes and containers in a shipyard, can benefit from a mechanism that establishes mutual compatibility on a peer-to-peer level, without intervention of clerks or computers.

Many individuals have difficulty finding a mate. According to www.eHarmony.com, 21 million Americans spent $313 million dollars last year on Internet dating services. There are many other services similar to eHarmony.com, such as Match.com in the United States and Soulmates in the United Kingdom.

These are popular and profitable services. They not only find and filter acquaintance candidates, but also provide a sanctioned (though virtual) arena, like a church or small private party, in which strangers can meet without danger or embarrassment. They have the disadvantage of being cumbersome, time-consuming, and involving an elaborate contact ritual designed to avoid disappointment, embarrassment and danger; and the element of spontaneity, in which the best decisions are often made, is missing. See Gladwell, Malcolm, *Blink: The Power of Thinking Without Thinking*, Little, Brown & Co., 2005. They have the further disadvantage that the probability that couples they have matched will experience mutual attraction is quite low. See Gottlieb, Lori, "How do I Love Thee," *The Atlantic Monthly*, Vol. 297, No. 2, pp 58-70 (March 2006) and Gamerman, Ellen, "Mism@tched.com." *The Wall Street Journal*, Apr. 1, 2006, p 1.

There is also the disadvantage that online selection does not correspond well to the selection process that takes place in real-life acquaintance scenarios. Recent studies involving "Instant Dating" tests have shown that physical appearance is by far the most important consideration in the early stages of acquaintance. This is true for both genders (though more so for men). Therefore, an acquaintance process that does not quickly include face-to-face contact is somewhat artificial. Recent studies have also shown that individuals who select potential mates using static photographs have a greater-than-average chance of choosing a person to whom he or she will not be attracted. See Rubenstein, Adams J., "Variation in Perceived Attractiveness," *Psychological Science*, Vol. 16, No. 10, pp 759-762 (2005) in which static images are shown to produce erroneous results, and Jones, B. C., et al., "Menstrual cycle, pregnancy and oral contraceptive use alter attraction to apparent health in faces," *Proceedings of the Royal Society B* 273, pp 247-254 (2005).

Since it does not appear that natural pheromones and odors are greatly effective in helping men and women find each other, it would be extremely helpful if some type of man-made device could help enable people to find friends or mates based on specific criteria, retaining some of the precision and safety of the online dating sites, while maintaining the efficiency and naturalness of the church and the bar. It would also help to avoid some of the abusive and demeaning behavior now invading the dating process. See Netburn, Deborah, "Danger: Pickup Artists Ahead," *Los Angeles Times*, Wednesday, Aug. 10, 2005, p. E1.

The development of such a device or system would constitute a major technological advance, and would satisfy long-felt needs and aspirations of the Internet dating industry and of Humanity in general.

SUMMARY OF THE INVENTION

One embodiment of the present invention provides a miniaturized electronic device that enables individuals to find a friend, a mate or someone with a specific interest, ability, talent, skill, quality, appearance, faculty, feature, personality, temperament, description, characteristic, aspect, disposition, nature or attribute. In one embodiment of the invention, a man or a woman may program a MateFinder™ (MF) to help find an ideal match. The Trade & Service Mark "MateFinder" is owned by the Applicants' Assignee. In general, the present invention provides apparatus and methods for matching any two persons, systems and/or objects using sensory devices, testing and correlation methods which are generally beyond the sensitivity and realm of our five native senses.

In one particular embodiment, the MateFinder™ comprises a radio and a microprocessor with a non-volatile memory, such as a static random-access memory (RAM). Information that describes both the user and the ideal match can be written to the non-volatile memory. The radio automatically and periodically broadcasts a "seeking signal" over a short range. When the seeking signal is received by another MateFinderm™, it is analyzed to determine the degree of correlation with the receiver's preferences. If the degree of correlation exceeds a preset minimum, the sender, the receiver, or both are alerted.

Another embodiment combines the MateFinder with a network radio or device, such as a cellular or Voice over Internet Protocol (VoIP) telephone or some other suitable device to provide communications over a wireless network. This combination enables voice calls, text-messaging, instant messaging, e-mails and Internet browsing. The user may also arrange to transfer gifts of music, photographs, video clips and other matter purchased from a third party. The MateFinder may be connected to a network using Wi-Fi, Wi-MAX, UltraWide Band (UWB) radio or any other suitable wireless system. The MateFinder may also communicate over a wired network such as the conventional telephone network, the Internet or may use VoIP.

In another embodiment of the invention, the MateFinder is programmed with information concerning the genetic attributes of a number of individuals. Romantic matches are suggested by correlating the genetic attributes of different individuals. These genetic attributes are first determined by testing tissue or fluid samples.

After these genetic attributes are determined, a perfume based on the genetic attributes may be manufactured which enhances the sexual responsivity of the person wearing the perfume, or of another individual.

In another embodiment, the genetic attributes may be used to design a custom perfume which is a good esthetic "fit" to the wearer's natural body scent.

An appreciation of the other aims and objectives of the present invention, and a more complete and comprehensive understanding of this invention, may be obtained by studying the following description of preferred and alternative embodiments, and by referring to the accompanying drawings.

A BRIEF DESCRIPTION OF THE DRAWINGS

FIG. 1 offers a view of men and women attending a party. The man has a MateFinder™ clipped to his belt. Some of the women at the party have a MateFinder™ clipped to a purse or belt, or concealed in their clothing. The man's MateFinder™ produces a short-range radio signal that interrogates other MateFinders™ that are nearby. The interrogation signal may broadcast a description of the man and seeks another MateFinde™ that stores a list of qualities, characteristics or criteria that describe the gentleman's aspirations, preferences or requirements in a mate. When the interrogation signal finds a good match, the man is alerted by a visual or audible alert. If the man's own attributes match those sought by one of the women, the MateFinder™ may alert her to the presence of the man.

FIG. 2 supplies a perspective view of one particular embodiment of the invention, which may be clipped to a man's belt or to a woman's purse, or which may be concealed in the clothing of either. The MateFinder may also be incorporated into a bracelet, watch, necklace, tietack, shoe, hat or some other fashionable item or article.

FIG. 3 illustrates a woman who has visited a website using her personal computer. In this example, the website is located at www.e-pheromone.com. She has connected her MateFinder™ device to the Universal Serial Bus (USB) port of her computer, and is programming her MateFinder™ with her own attributes, as well as with her preferences in a mate.

Figure 6:
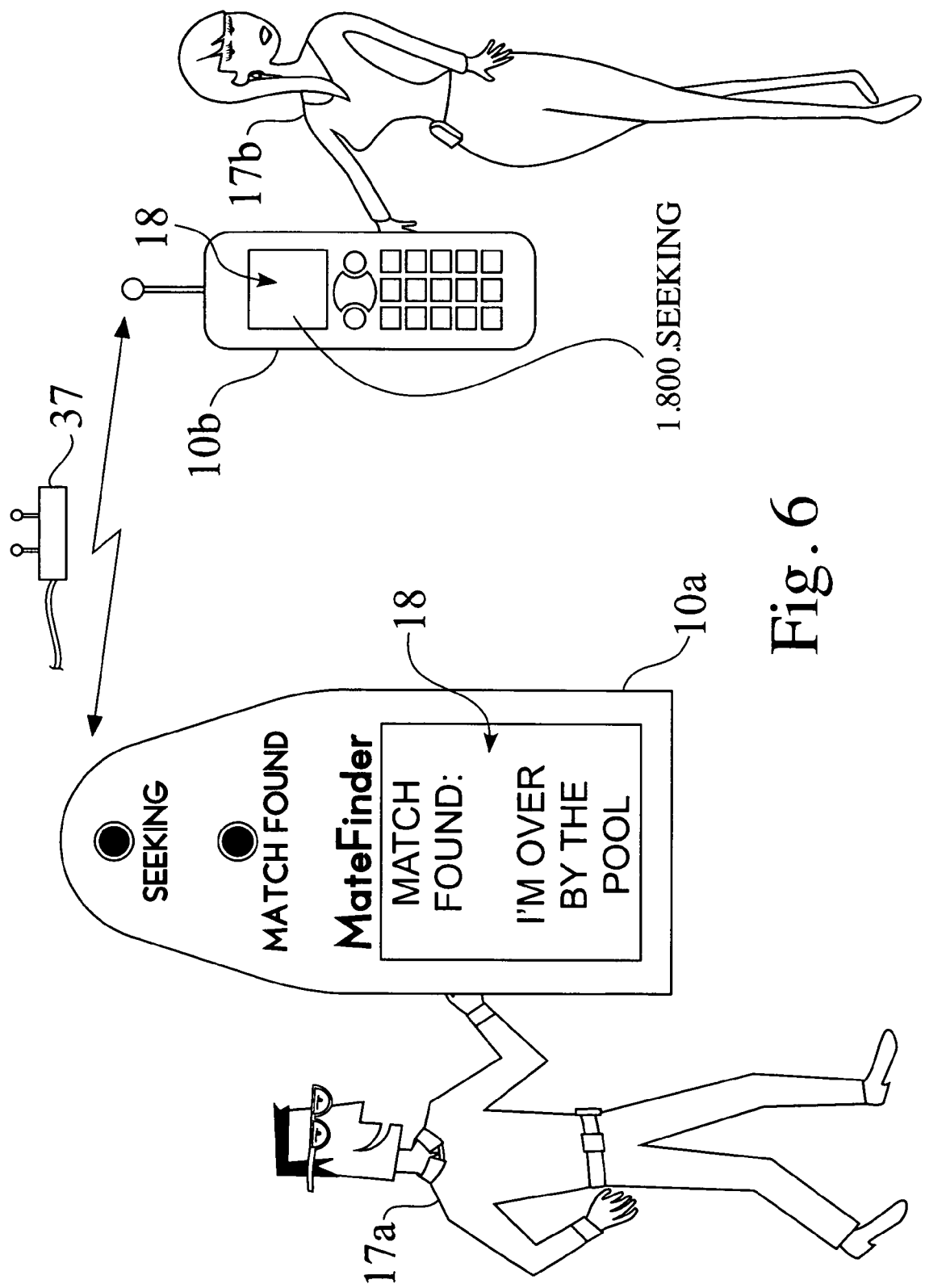

FIG. 6 exhibits the operation of a pair of MateFinders™. When the man's device finds a woman's MateFinder™ that presents a good match, his device alerts him. In an alternative embodiment, the woman may respond by using her cellular or VoIP telephone to send a message back to her prospective match, or by using a text-message feature of her MateFinder™.

Figure 7:
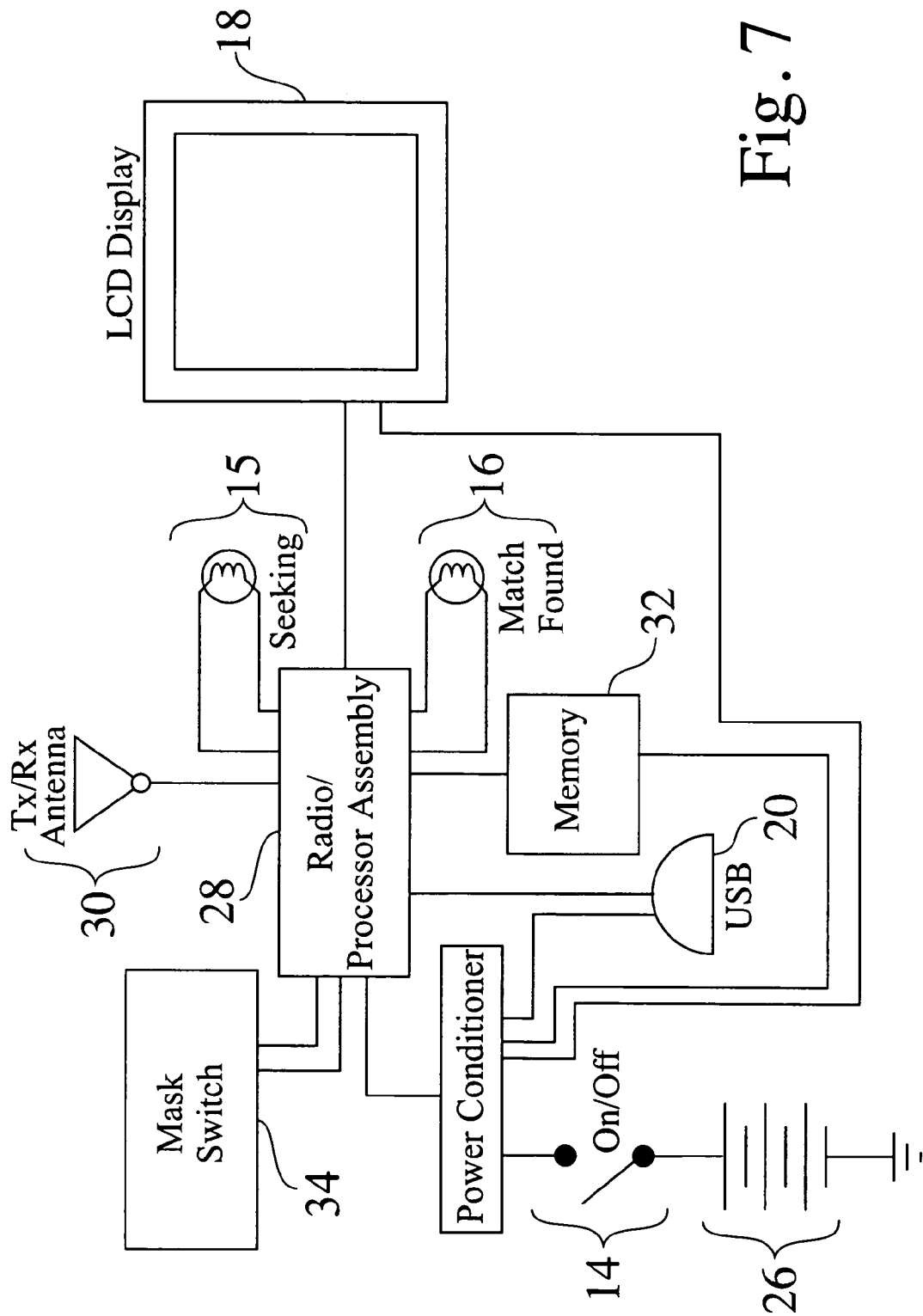

FIG. 7 is a simplified schematic diagram of one embodiment of the present invention.

Figure 8:
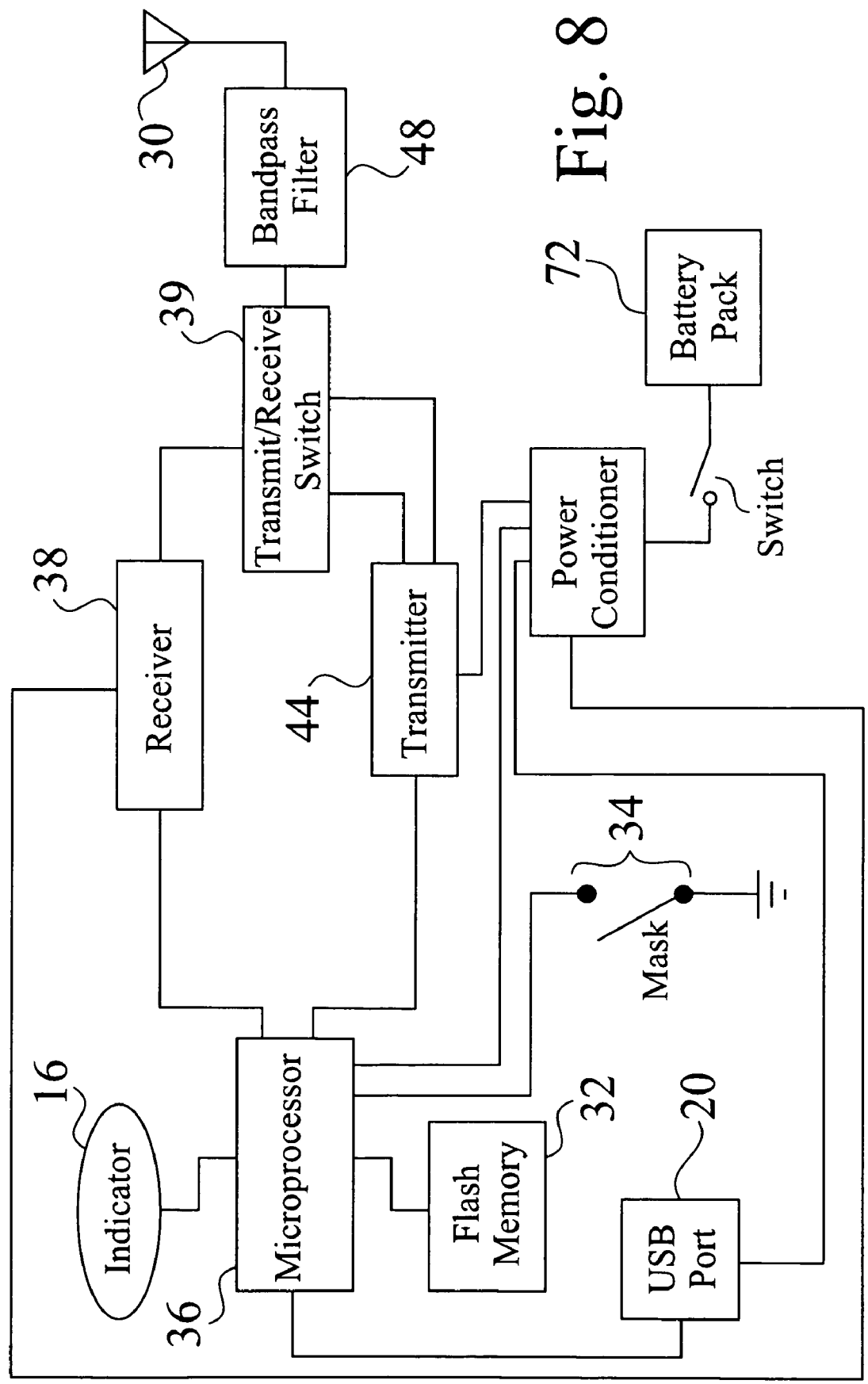

FIG. 8 provides another schematic diagram which exhibits a particular implementation of the present invention.

Figure 9:
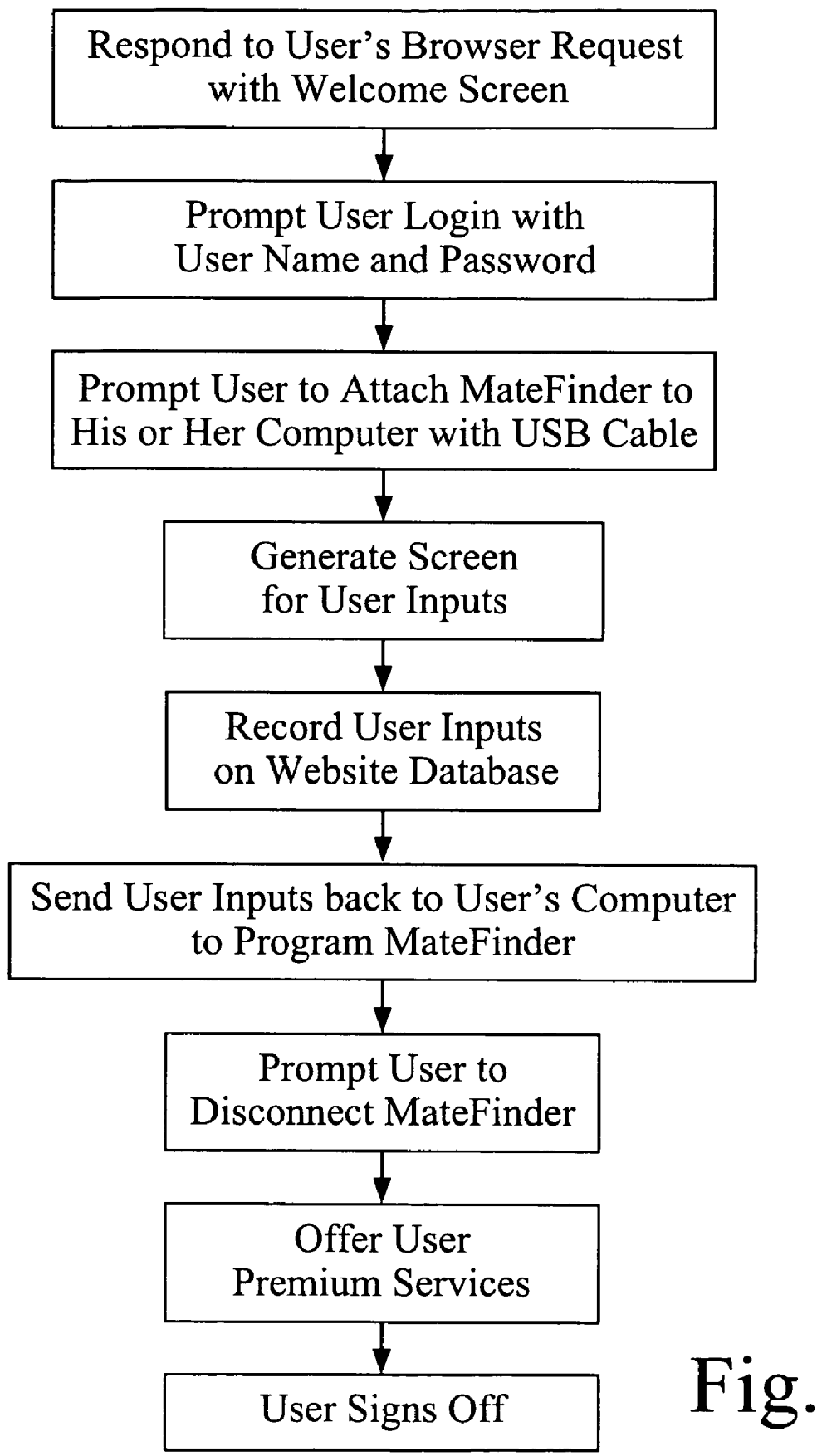

FIG. 9 is a flow-chart that outlines a basic design for a software program that may be utilized in one embodiment of the invention.

FIGS. 10, 11, 12, 13, 14, 15, 16, 17, 18 and 19 summarize several implementations and applications of the basic embodiments of the present invention.

Figure 20:
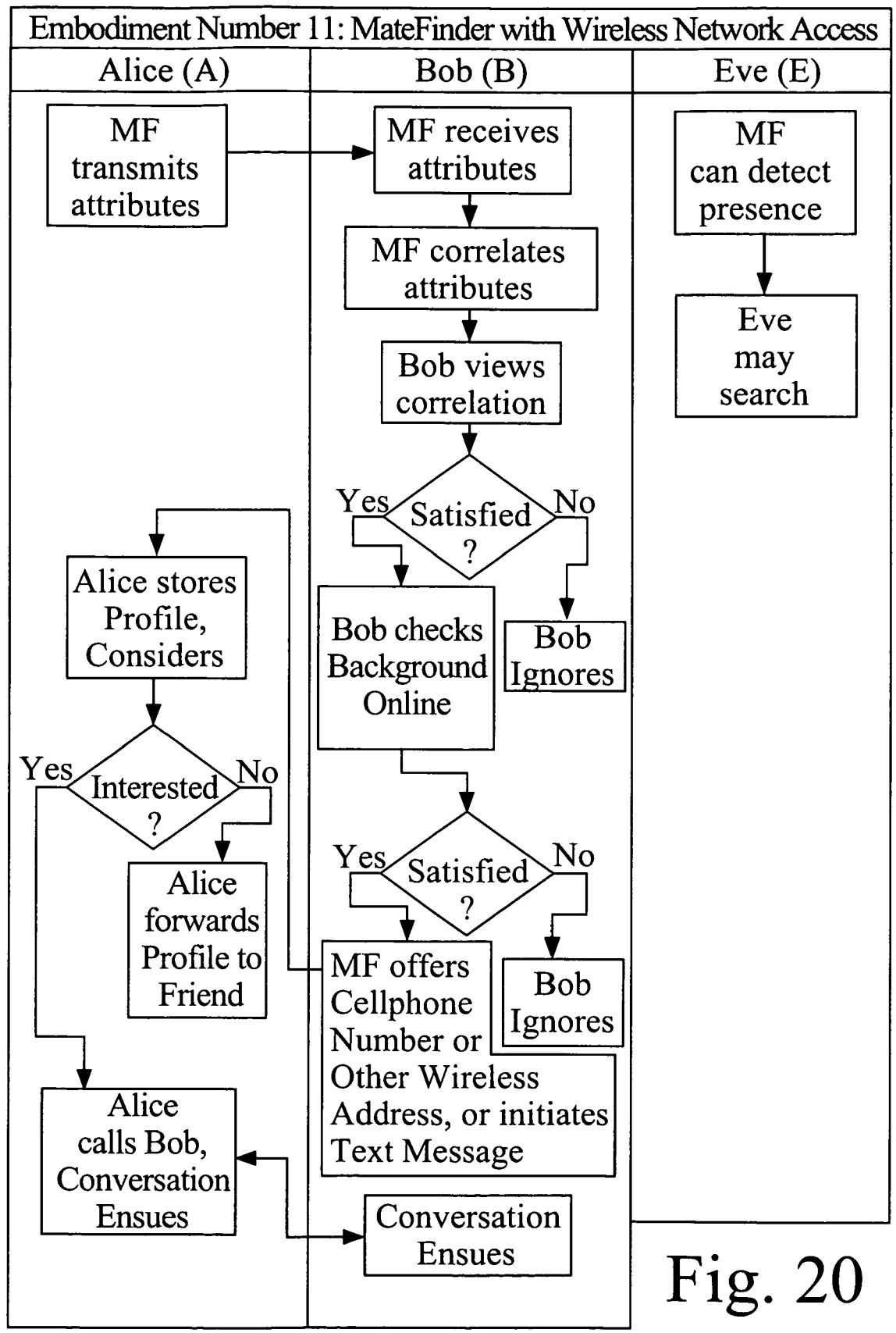
Figure 21:
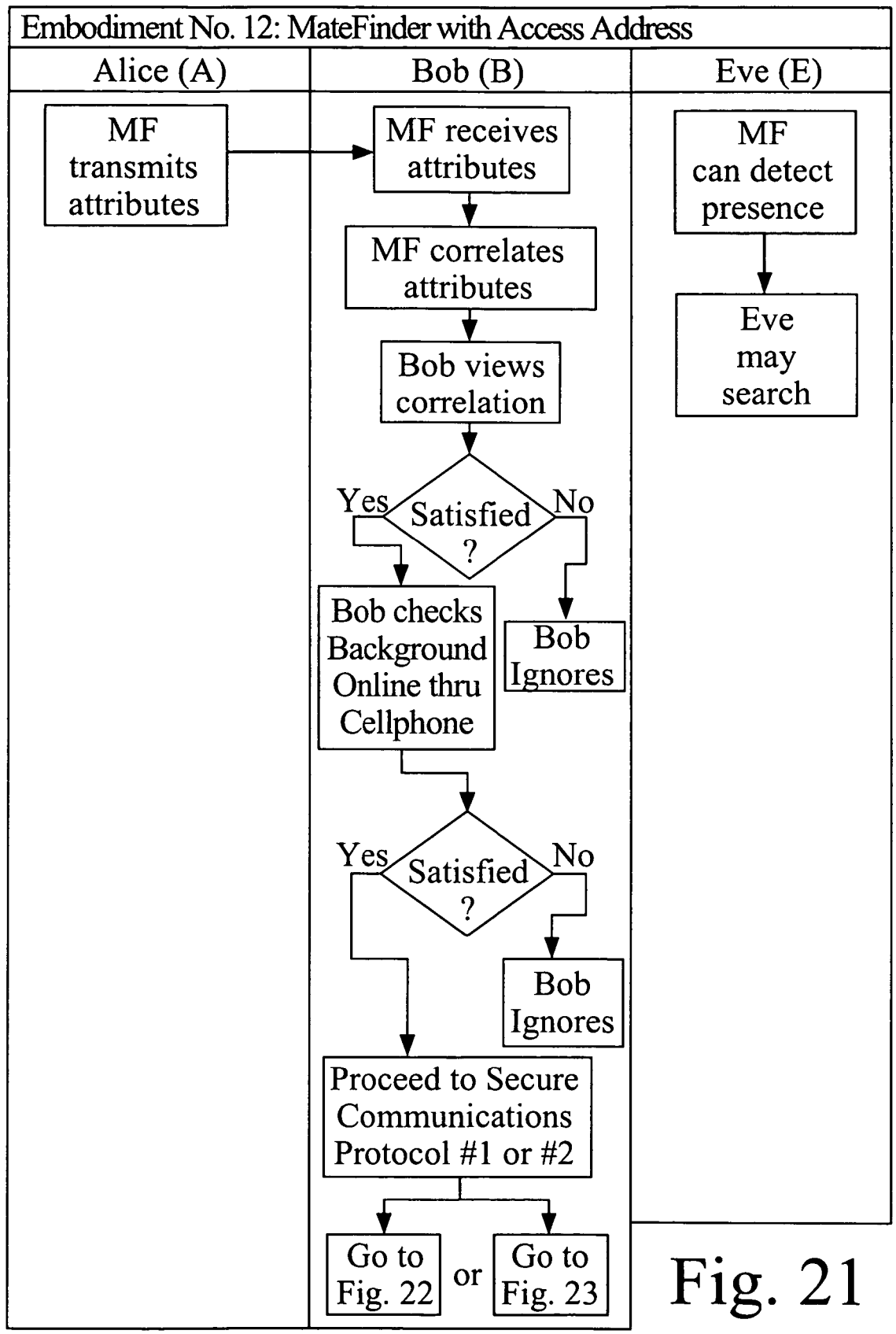

FIGS. 20 and 21 summarize various implementations of the MateFinder when it is combined with a network radio to communicate over a wireless network.

Figure 22:
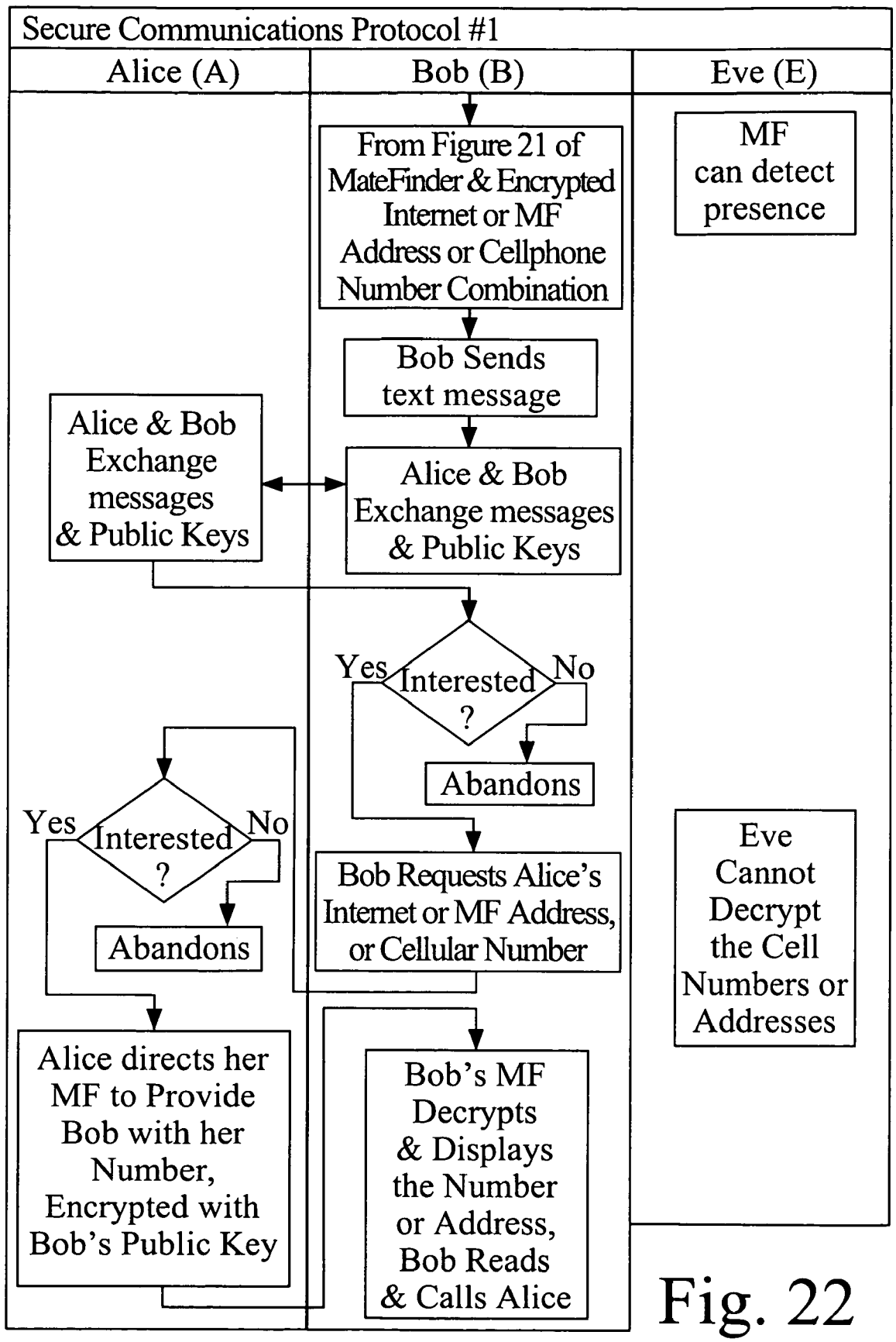
Figure 23:
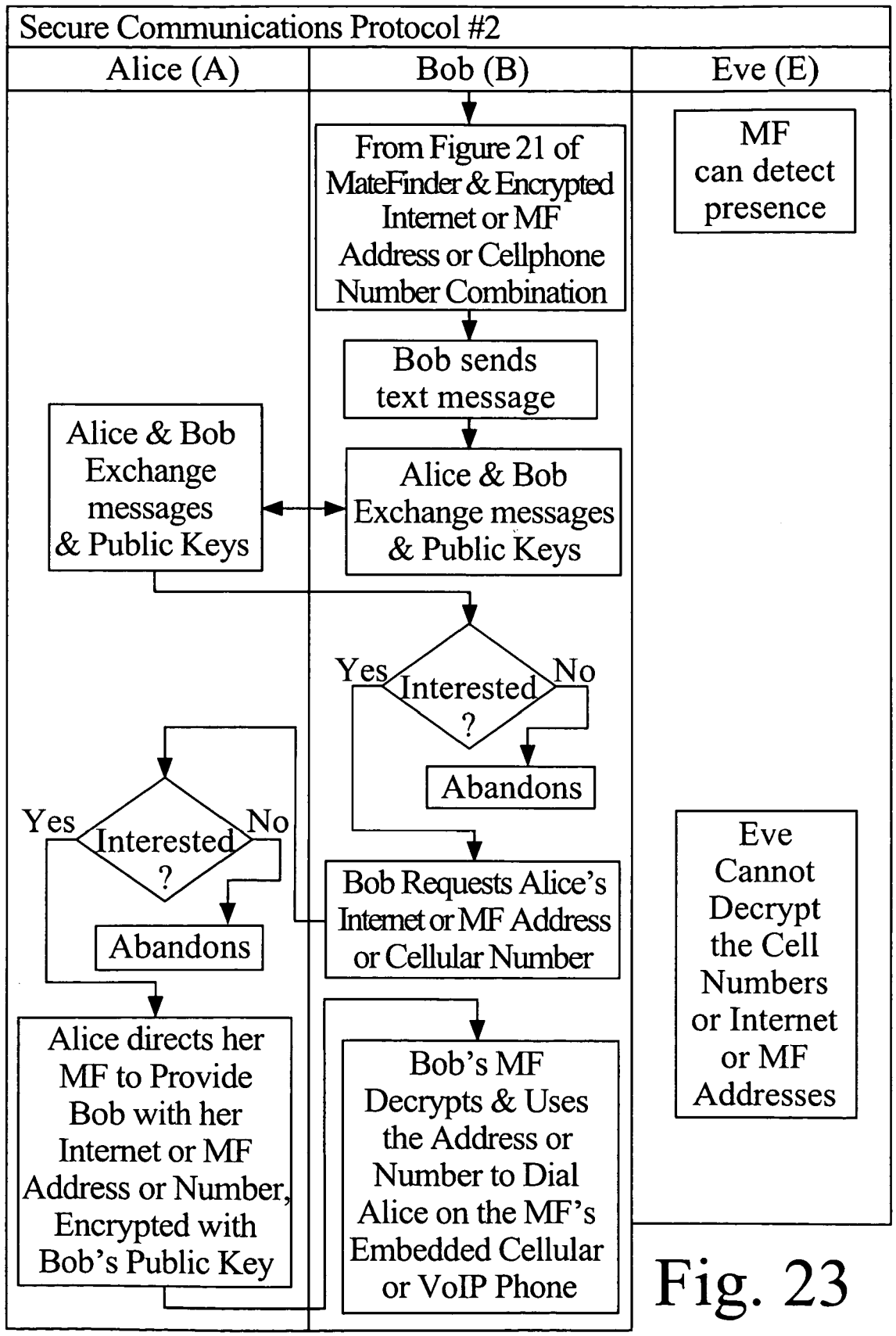

FIGS. 22 and 23 depict secure communications protocol embodiments for the MateFinder Cell Phone shown in FIG. 21.

Figure 24:
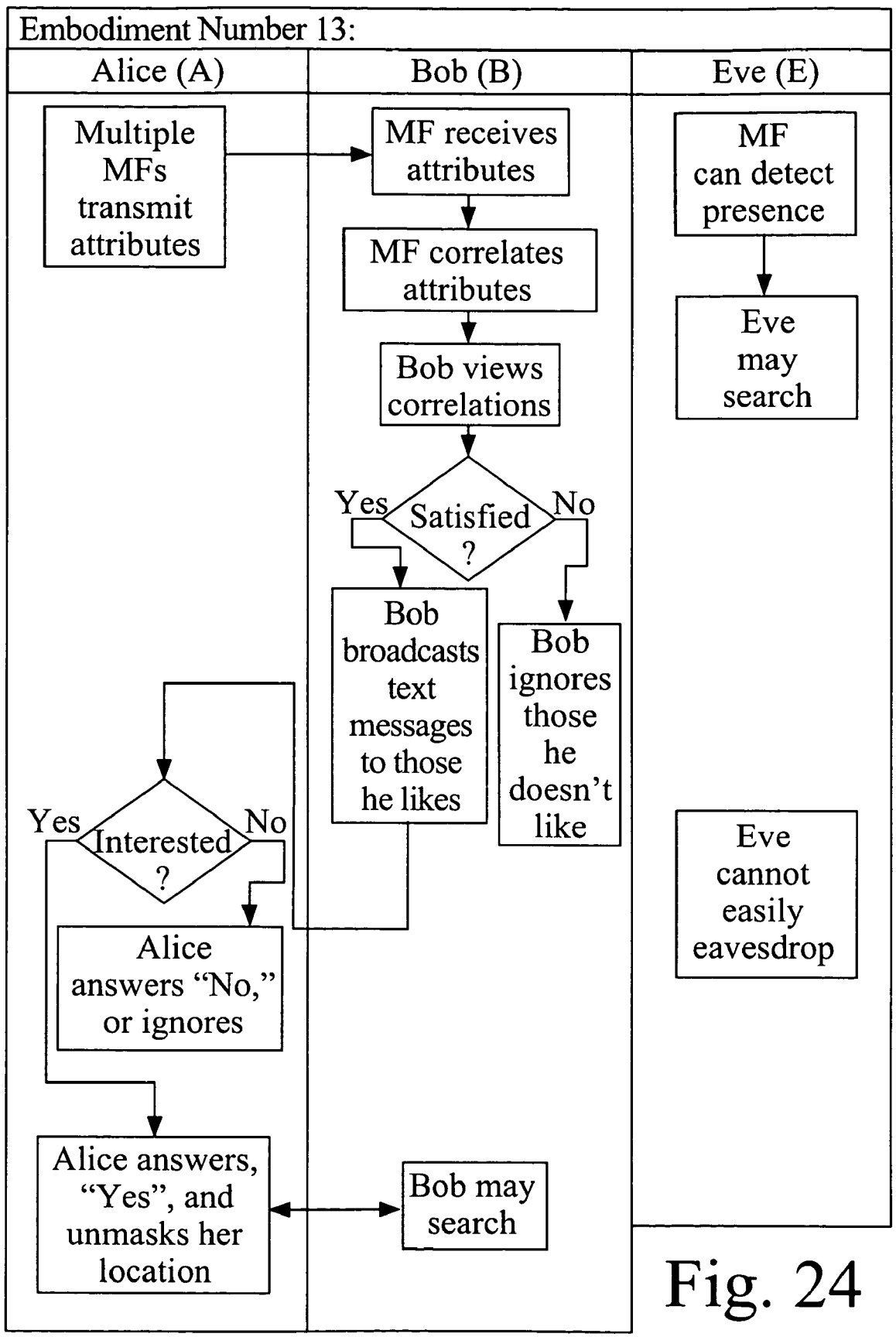
Figure 25:
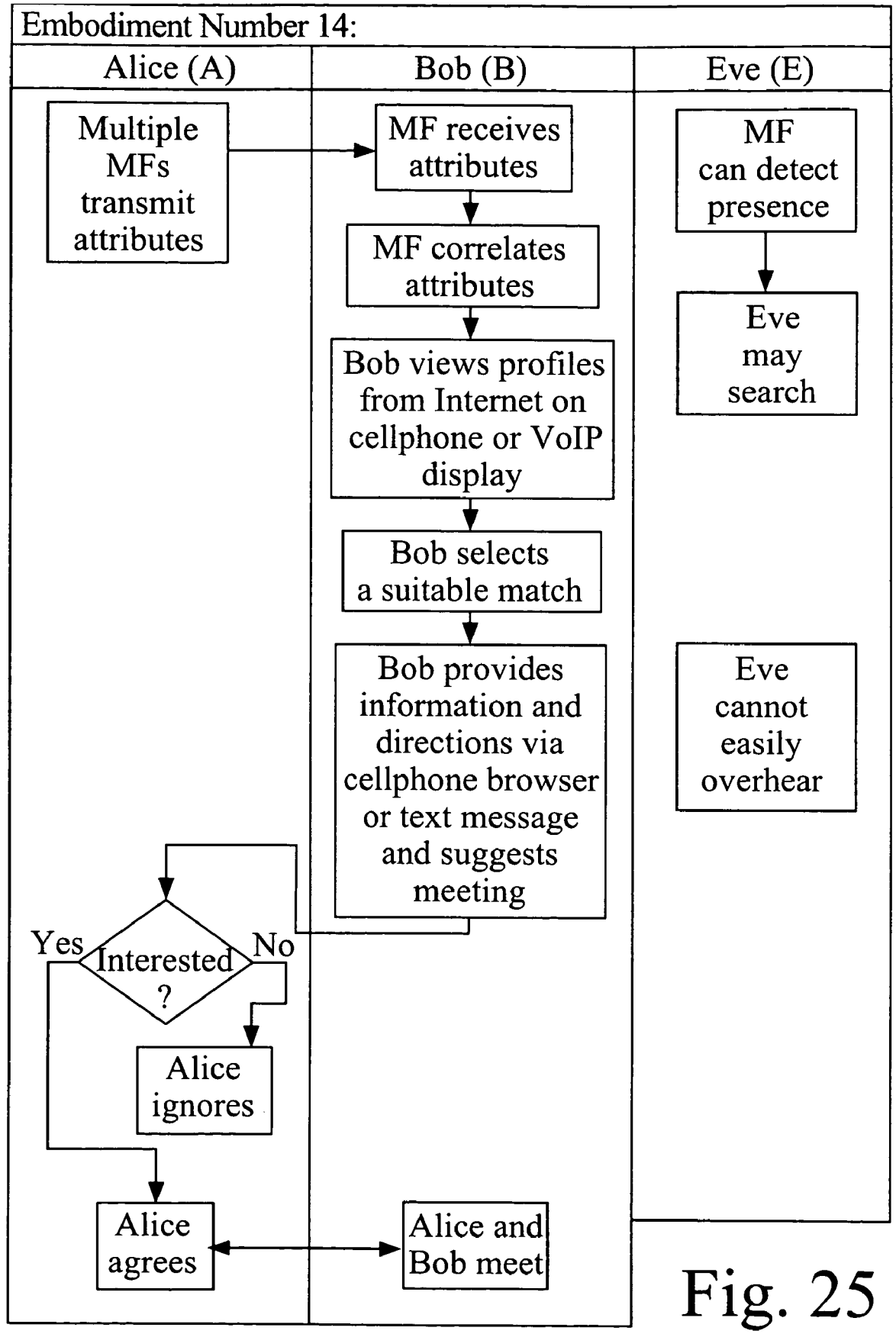

FIGS. 24 and 25 show alternate implementations of a MateFinder combined with a network radio.

Figure 26:
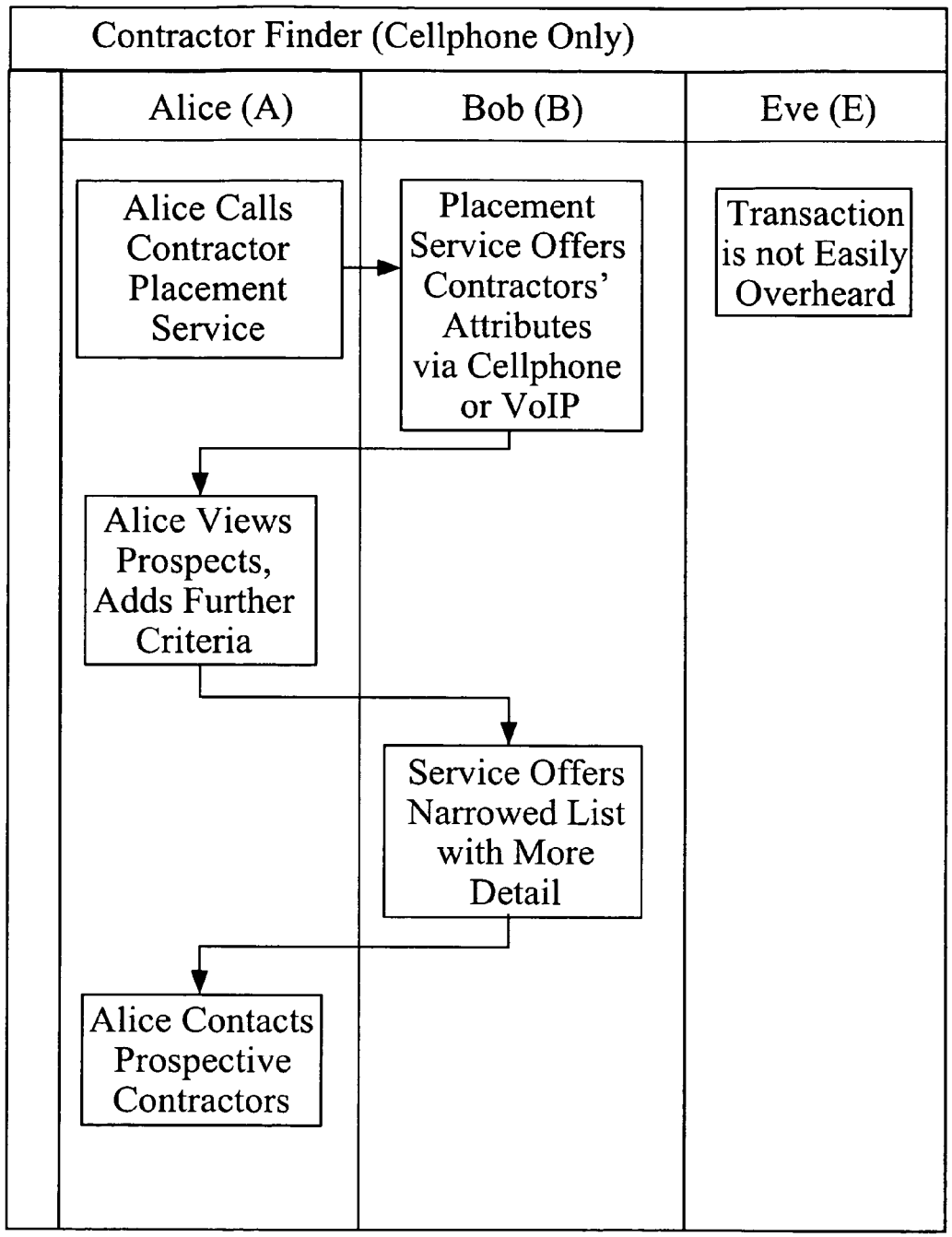
Figure 27:
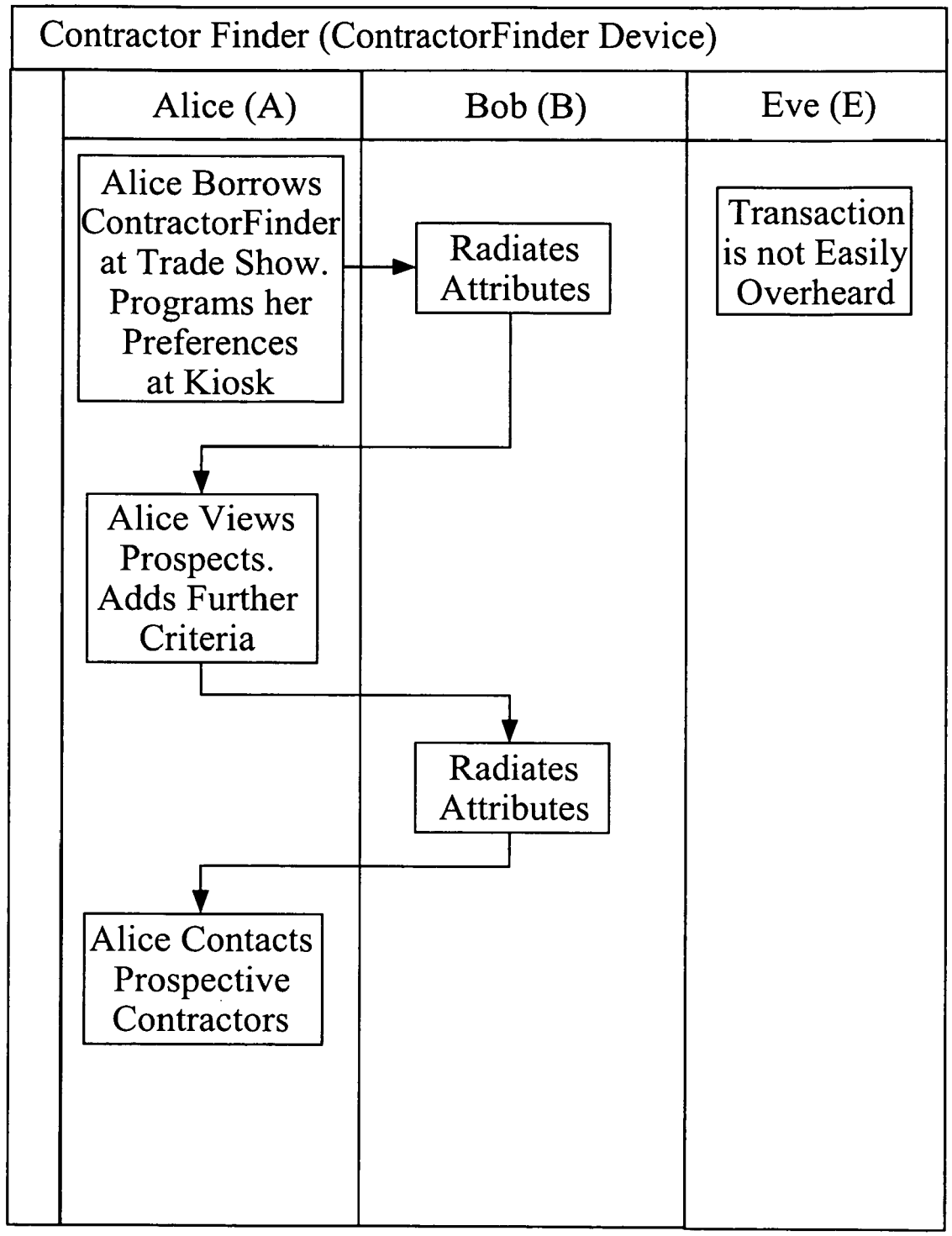

FIGS. 26 and 27 illustrate the uses and functions of an alternative embodiment of the invention—the ContractorFinder™.

Figure 28:
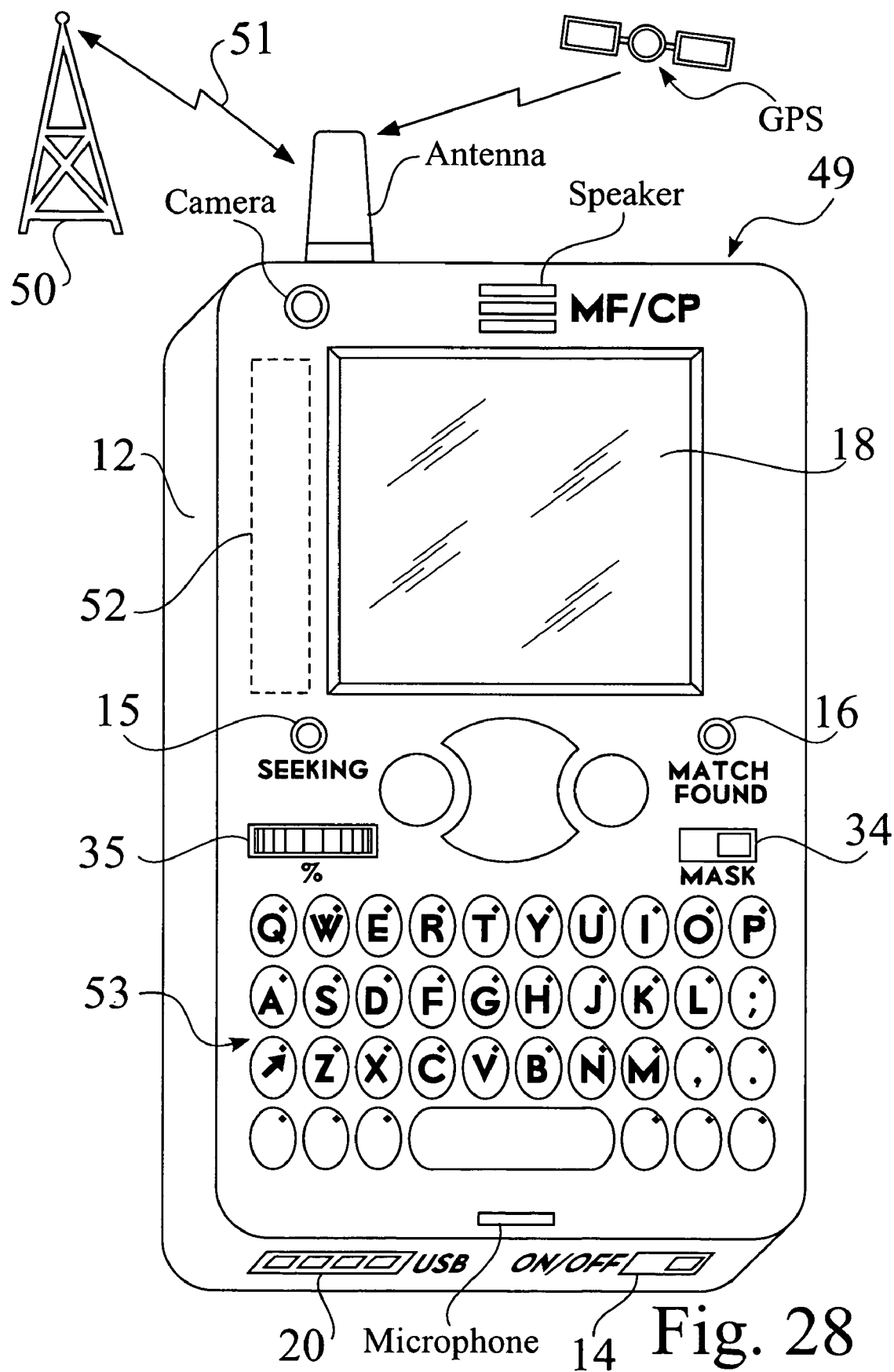

FIG. 28 is a close-up view of one embodiment of a MateFinder with Cellular Telephone combination.

FIGS. 29, 30, 31, 32, 33 and 34 illustrate the process of finding a match using a MateFinder/Cellular Phone or MateFinder/VoIP device.

FIGS. 35, 36, 37 and 38 illustrate an application for the ContractorFinder™.

FIGS. 39, 40, 41, 42 and 43 portray the use of another embodiment of the invention—the MateFinder with Direction & Range Finder™.

FIGS. 44, 45, 46, 47 and 48 depict the use of yet another embodiment of the invention—the MateFinder with Network-Pushed Attributes™.

Figure 49:
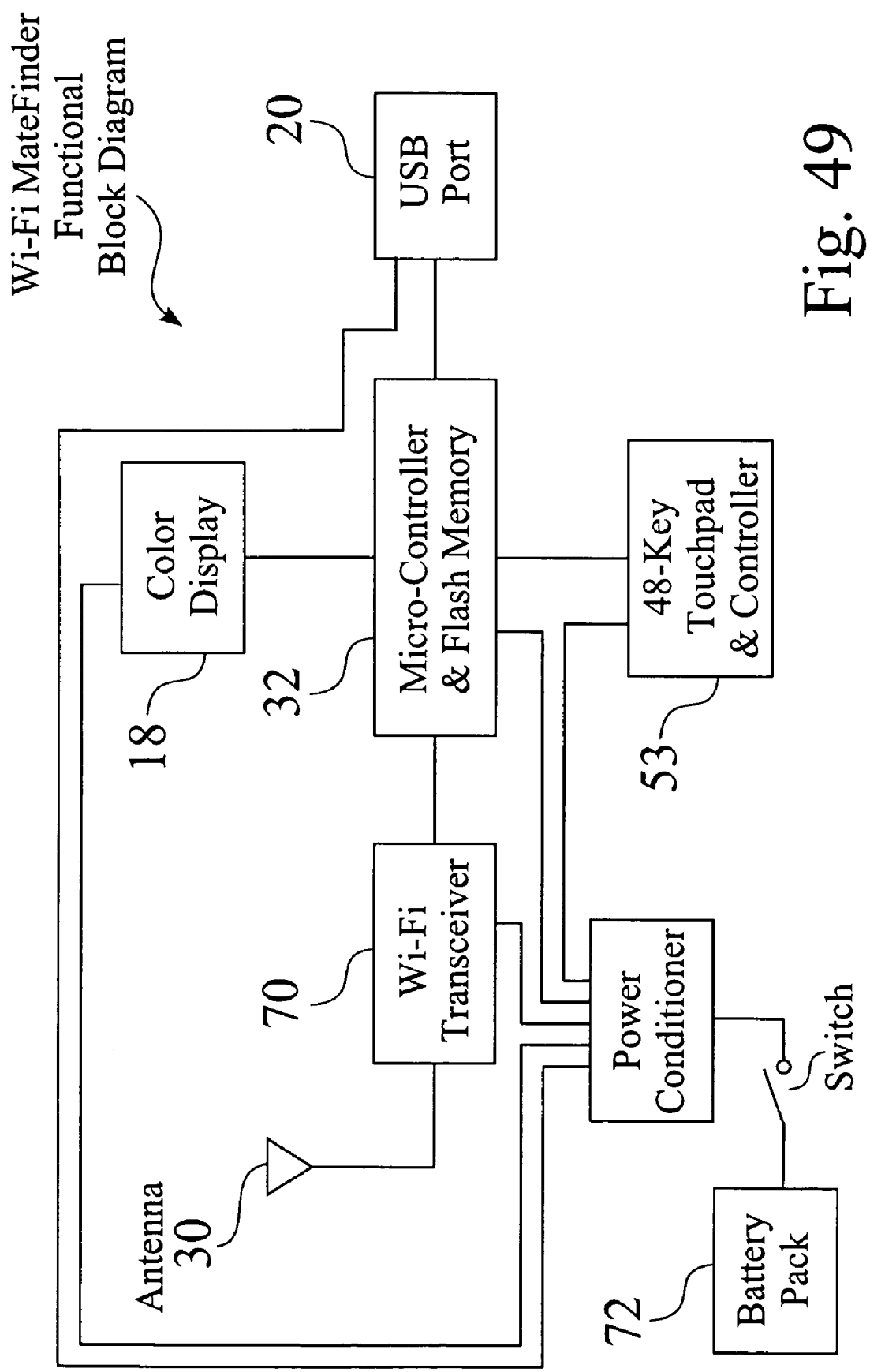

FIG. 49 is a basic schematic diagram for an exemplary Wi-Fi MateFinder.

Figure 49A:
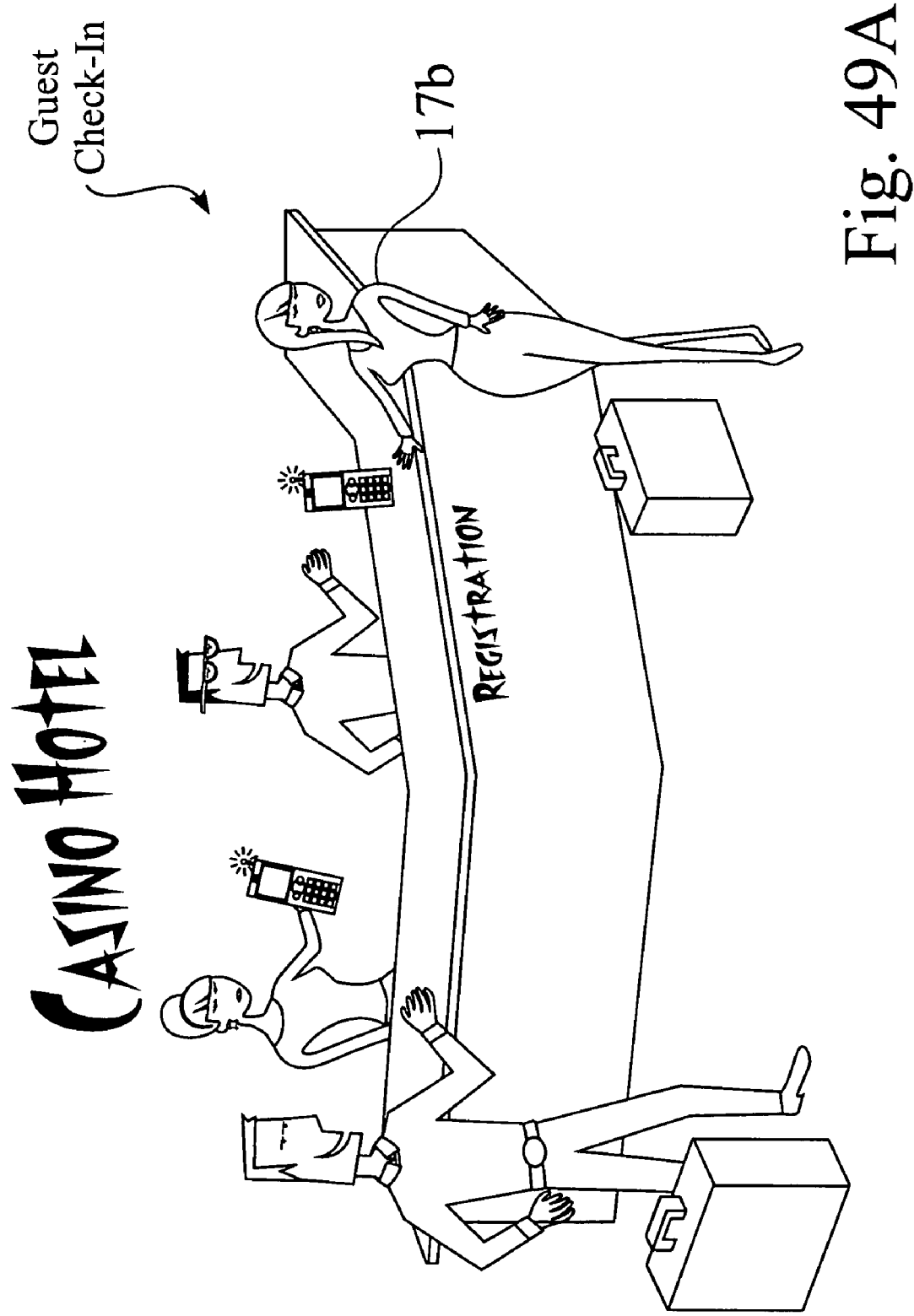

FIG. 49A shows a hotel guest receiving a MateFinder™ at the hotel's registration desk.

FIG. 49B shows a cruise-ship passenger receiving a MateFinder™ upon boarding the vessel.

FIGS. 50A and 50B present front and side views of a Wi-Fi MateFinder having a keyboard and display.

FIGS. 51A and 51B offer front and side views of another version of a Wi-Fi MateFinder having a keyboard and display.

Figure 51C:
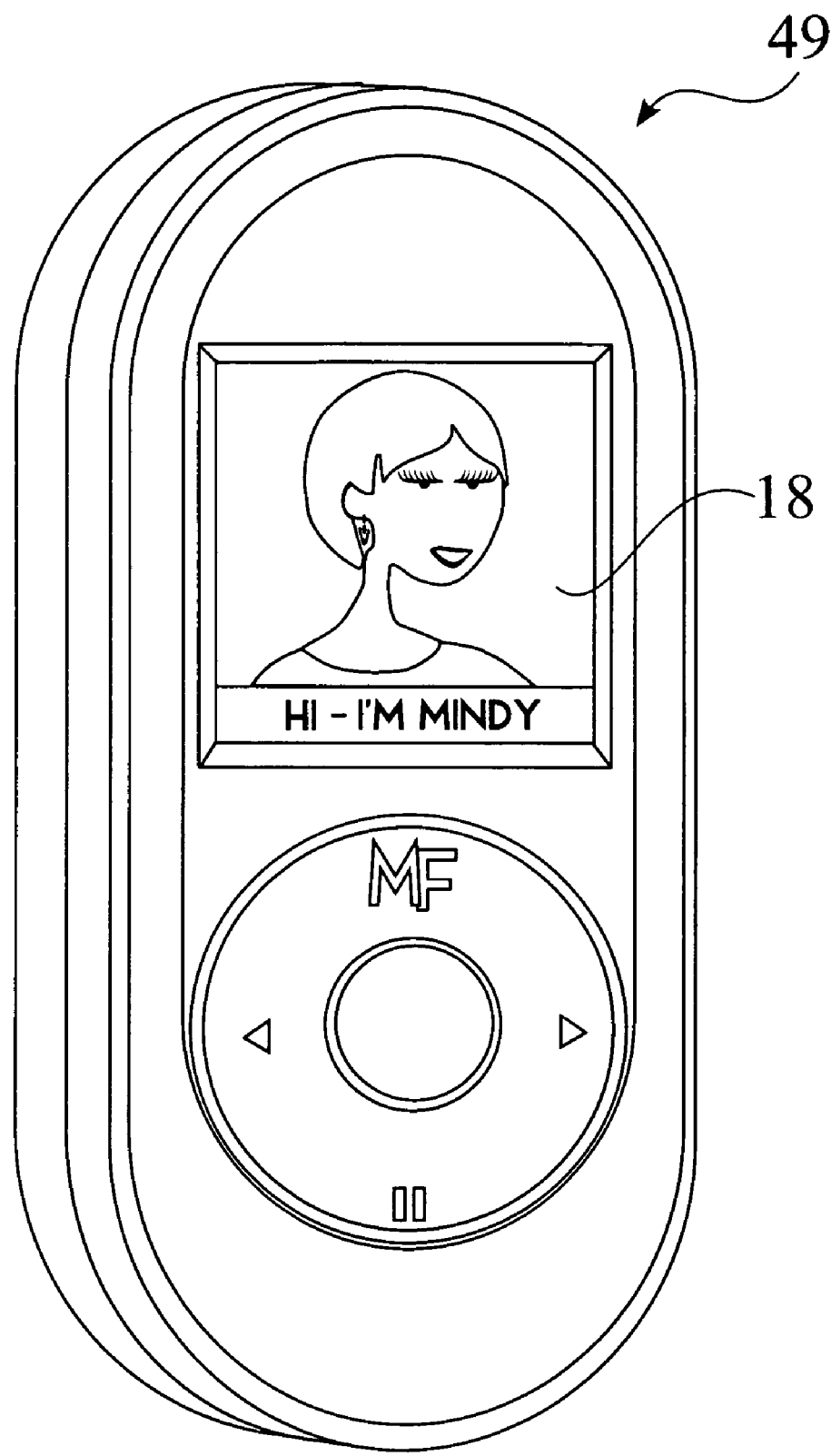

FIG. 51C shows another version of the MateFinder using an alternative data entry mechanism.

Figure 52:
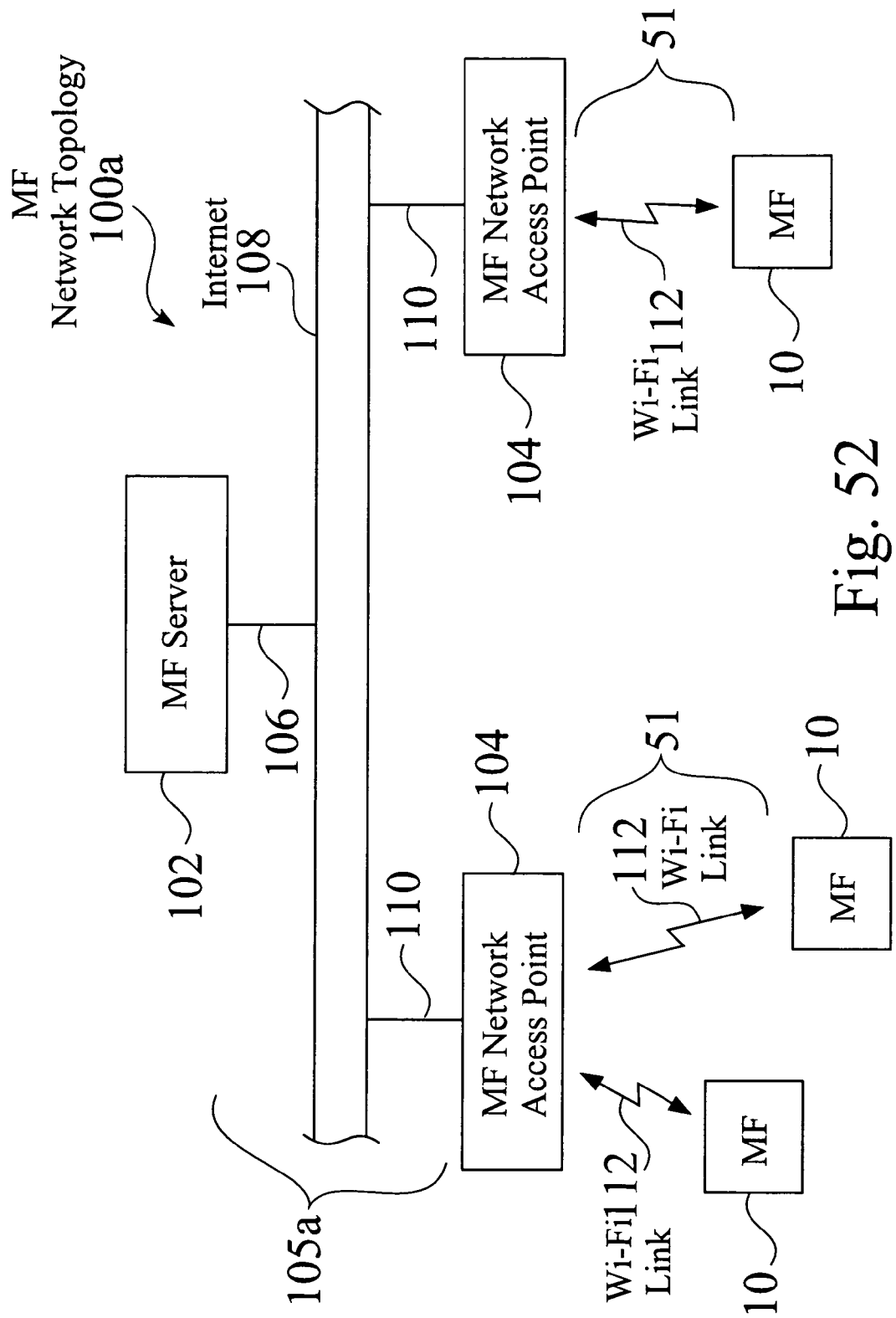

FIG. 52 shows network topology for one or more network access points serving Matefinders and linked to a MateFinder system server.

Figure 53:
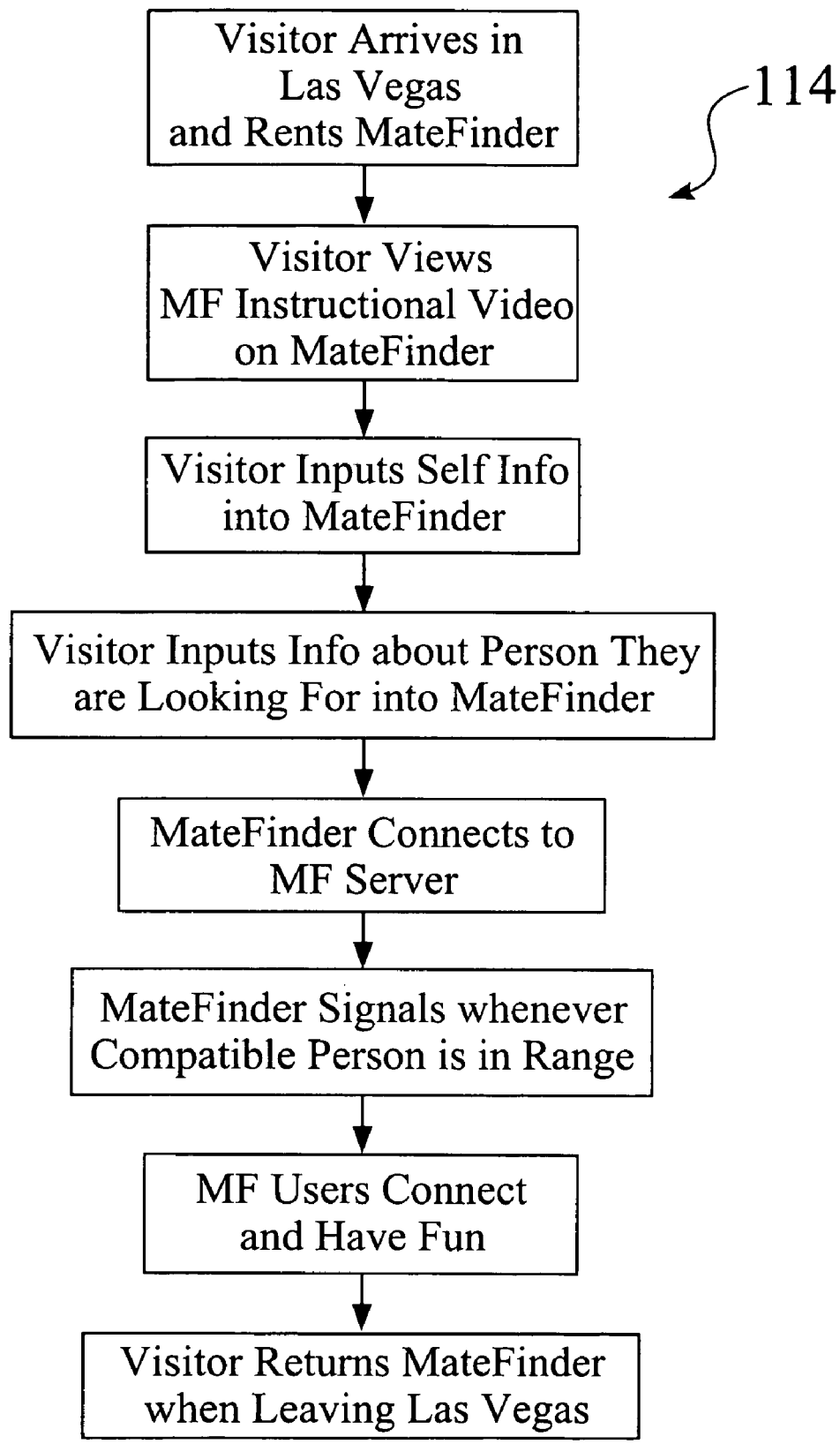

FIG. 53 provides an exemplary flowchart for user operation of one embodiment of a Wi-Fi MateFinder system.

Figure 54:
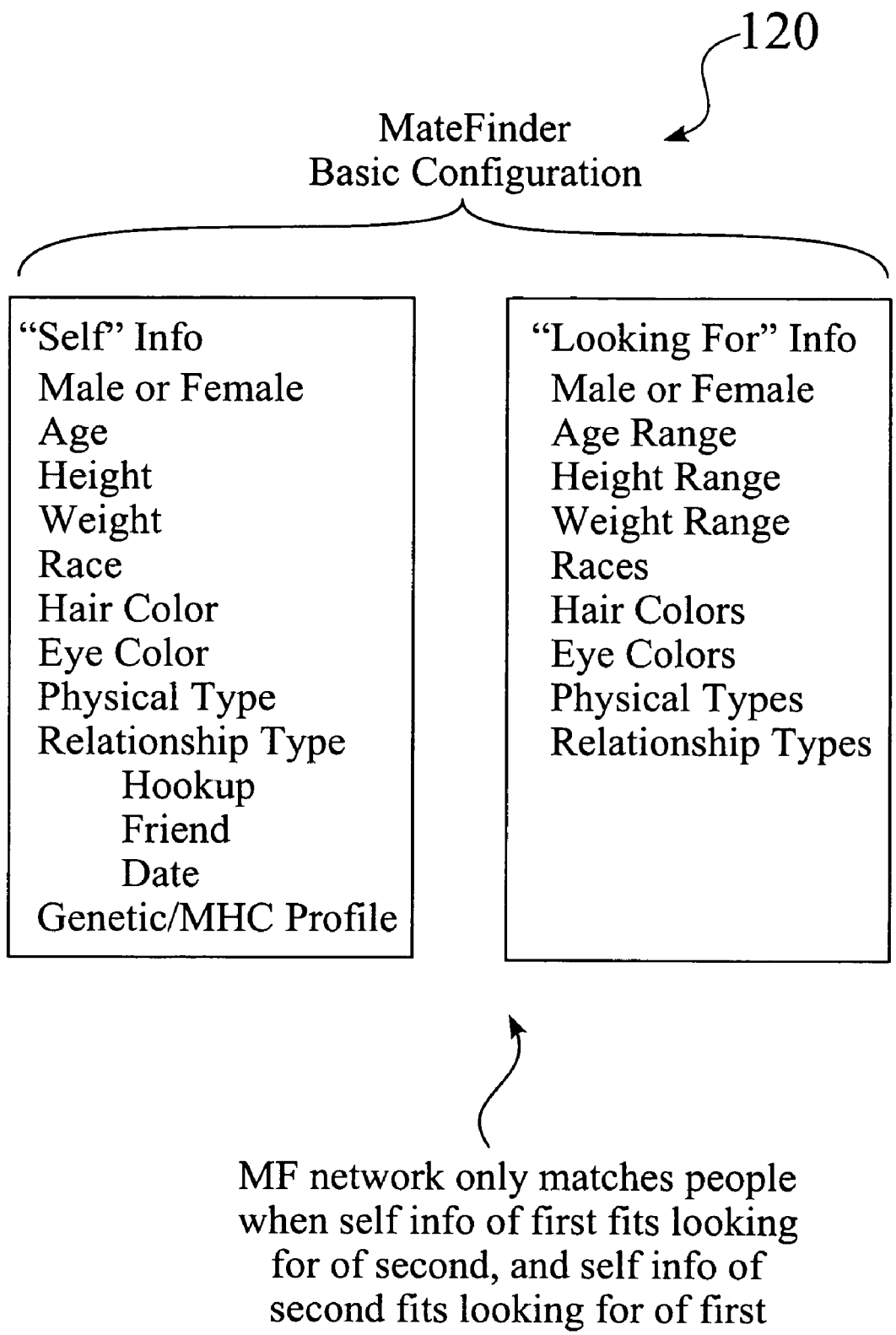

FIG. 54 shows exemplary input and matching of self-information and target information in one embodiment of a Wi-Fi MateFinder system.

FIG. 55 shows typical distances over which exemplary MateFinders can connect to Wi-Fi networks.

Figure 56:
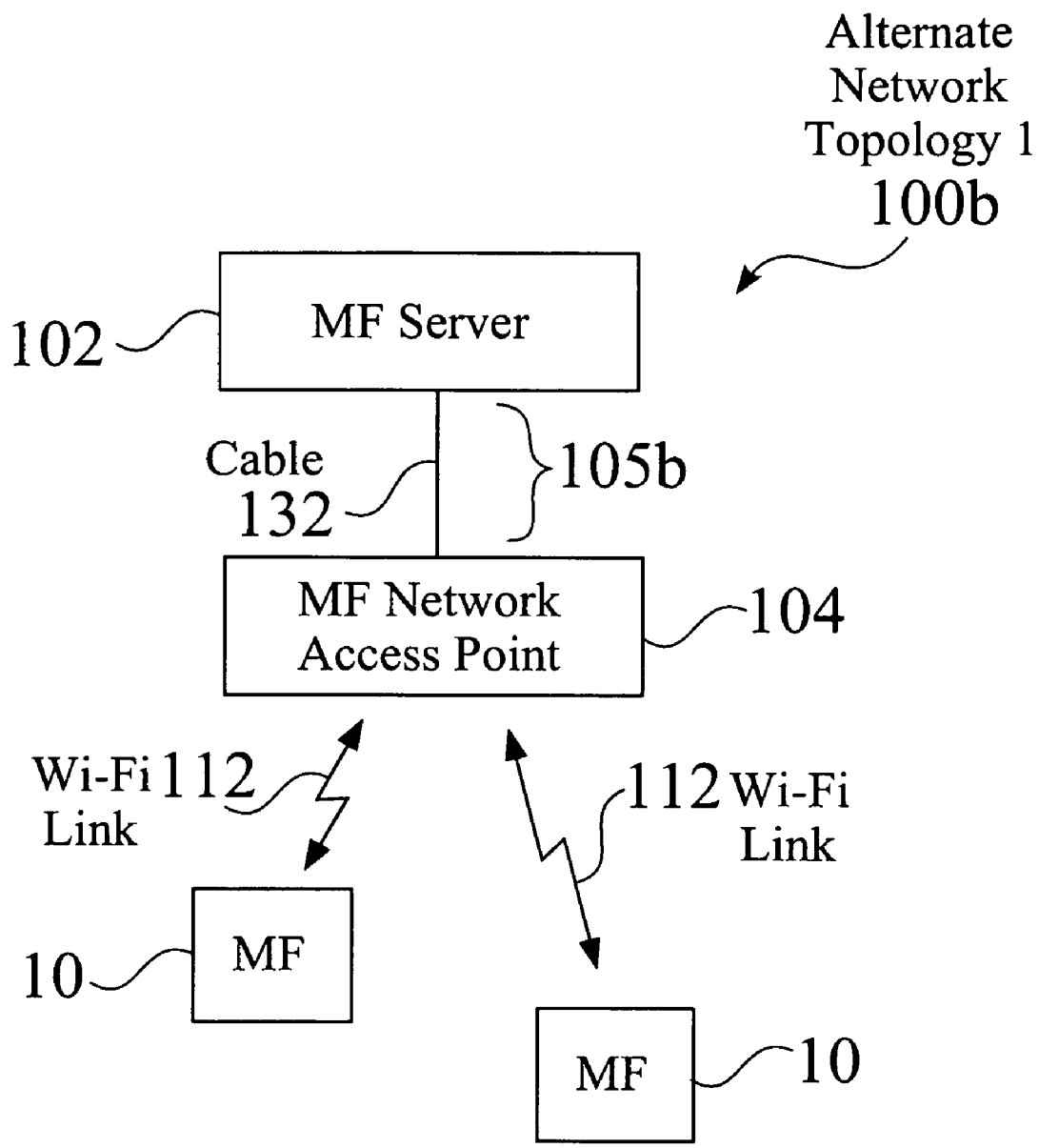

FIG. 56 shows network topology for a MateFinder network comprising a wired link between a network access point and a MateFinder server and Wi-Fi links between MateFinders and the network access point.

Figure 57:
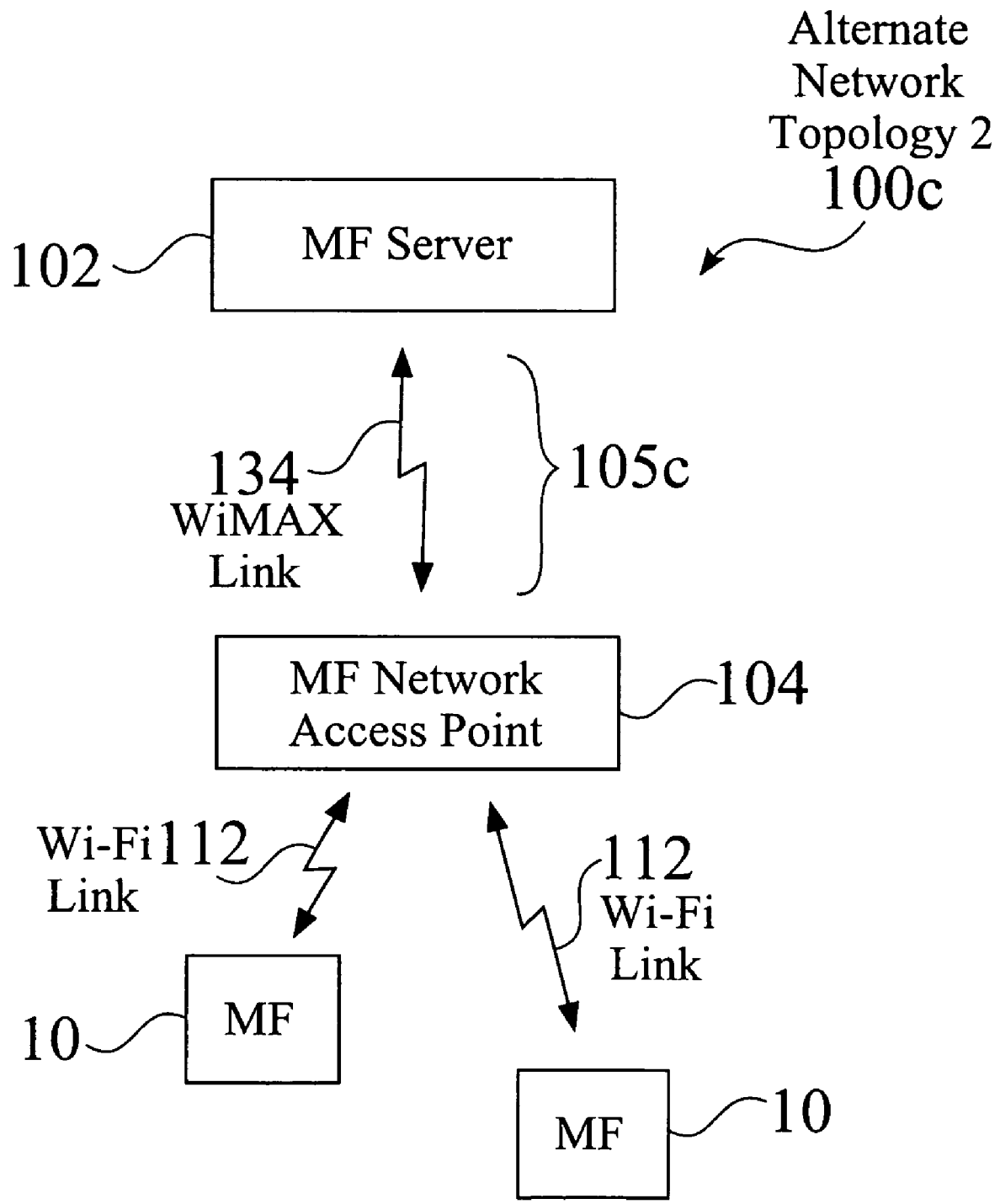

FIG. 57 shows network topology for a MateFinder network comprising a Wi-Max wireless link between a network access point and a MateFinder server and Wi-Fi links between MateFinders and the network access point.

Figure 58:
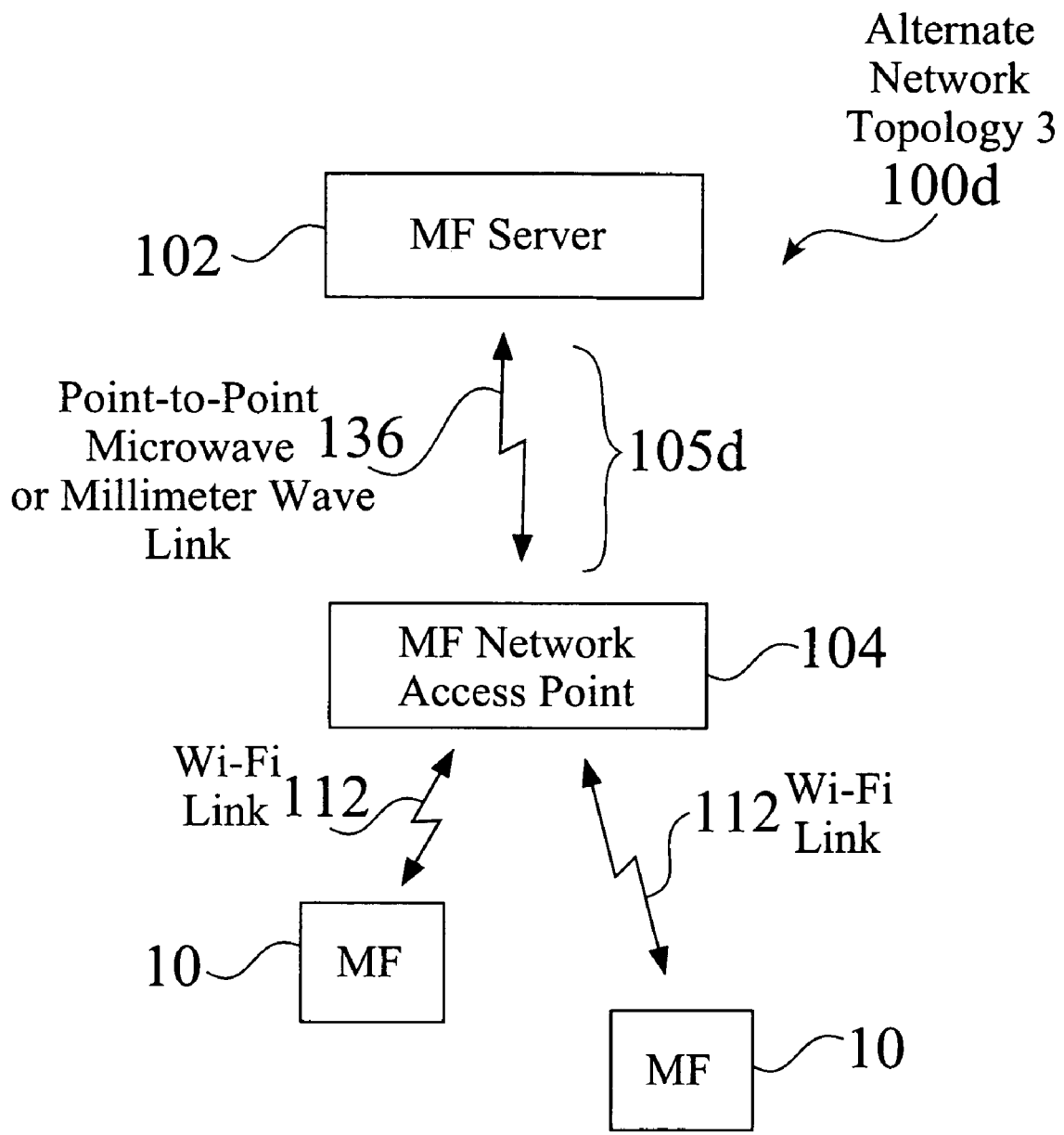

FIG. 58 shows network topology for a MateFinder network comprising a point-to-point wireless link between a network access point and a MateFinder server and Wi-Fi links between MateFinders and the network access point.

Figure 59:
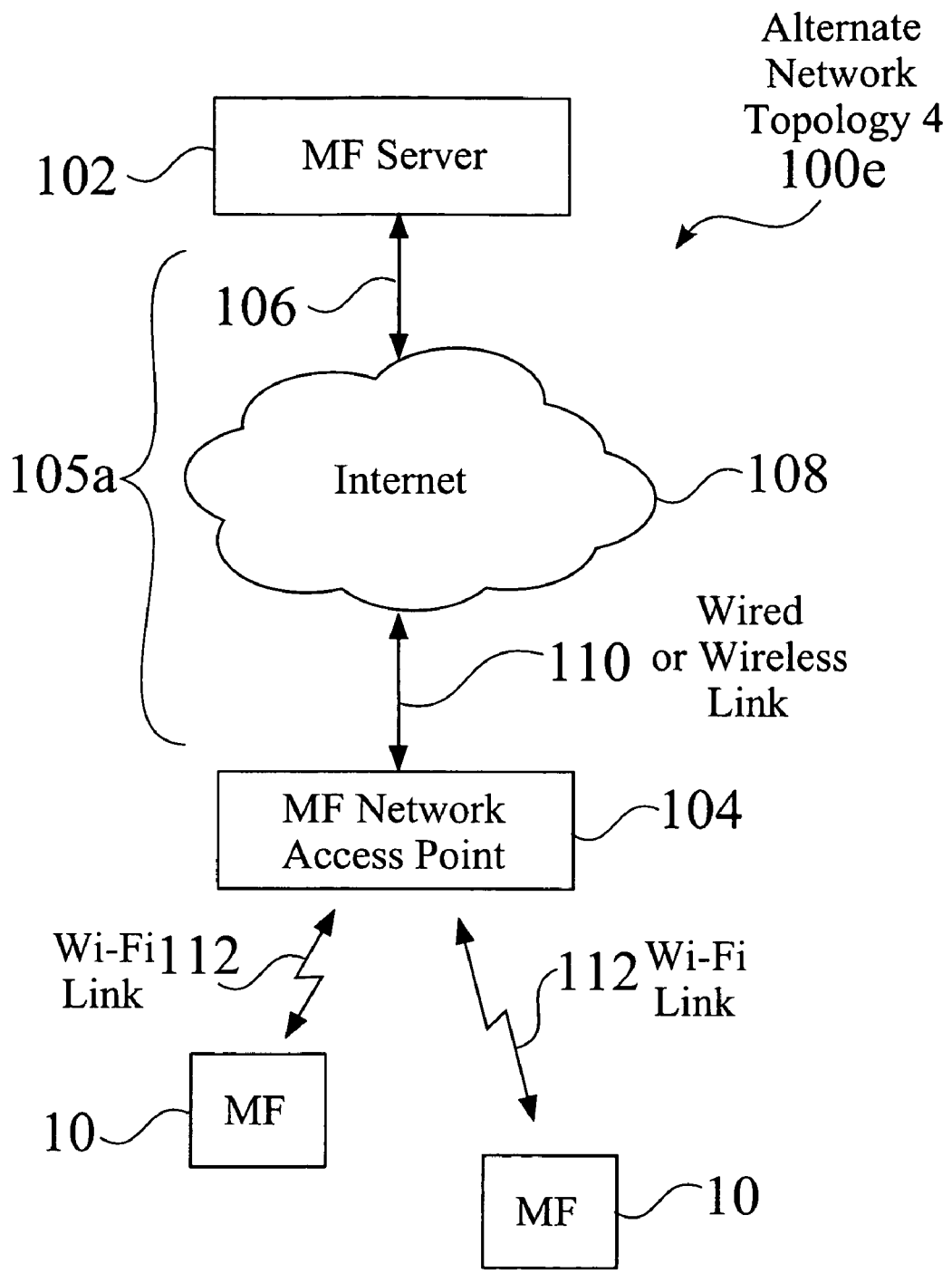

FIG. 59 shows network topology for a MateFinder network comprising an Internet connection between a network access point and a MateFinder server and Wi-Fi links between MateFinders and the network access point.

Figure 60:
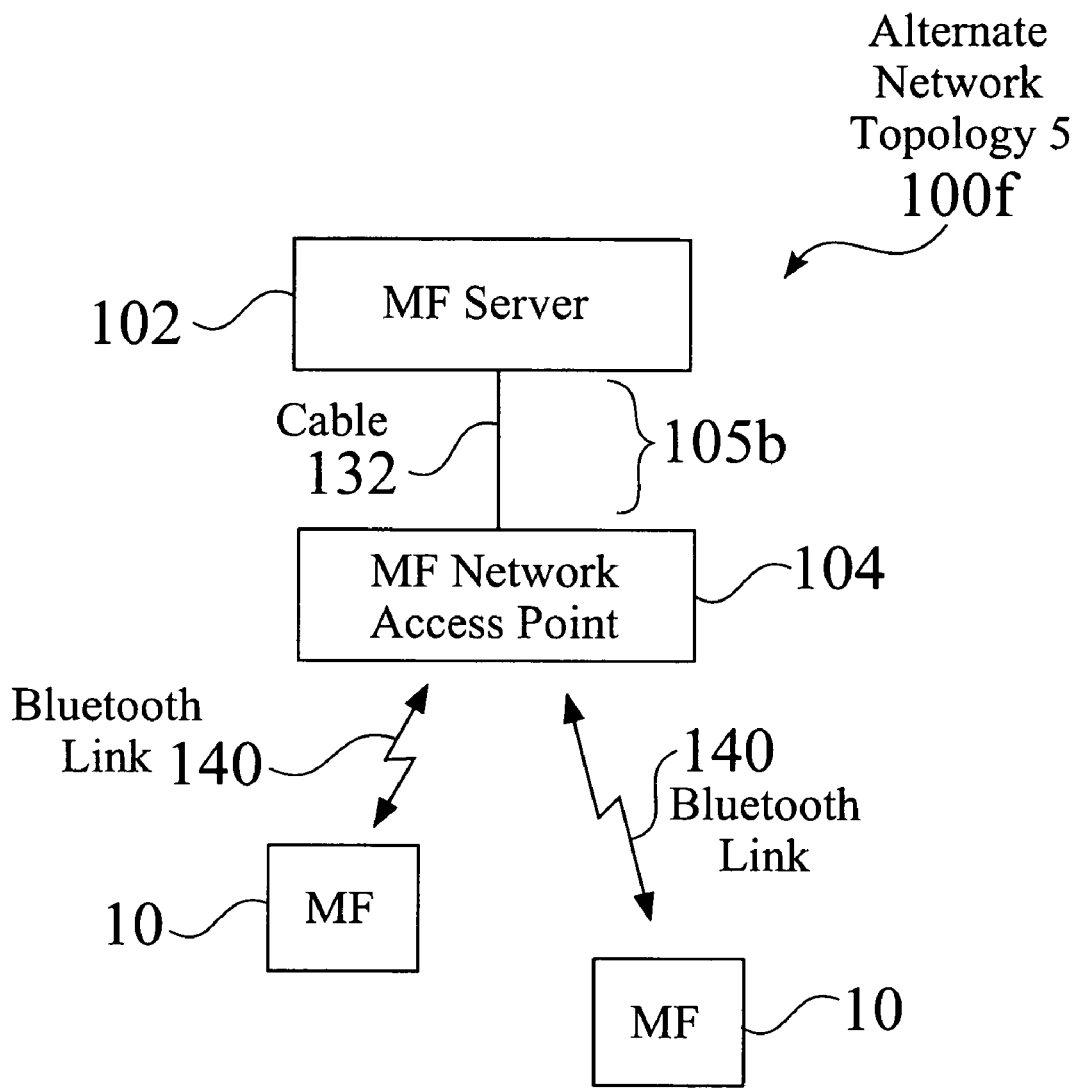

FIG. 60 shows network topology for a MateFinder network comprising a wired link between a network access point and a MateFinder server and Bluetooth wireless links between MateFinders and the network access point.

Figure 61:
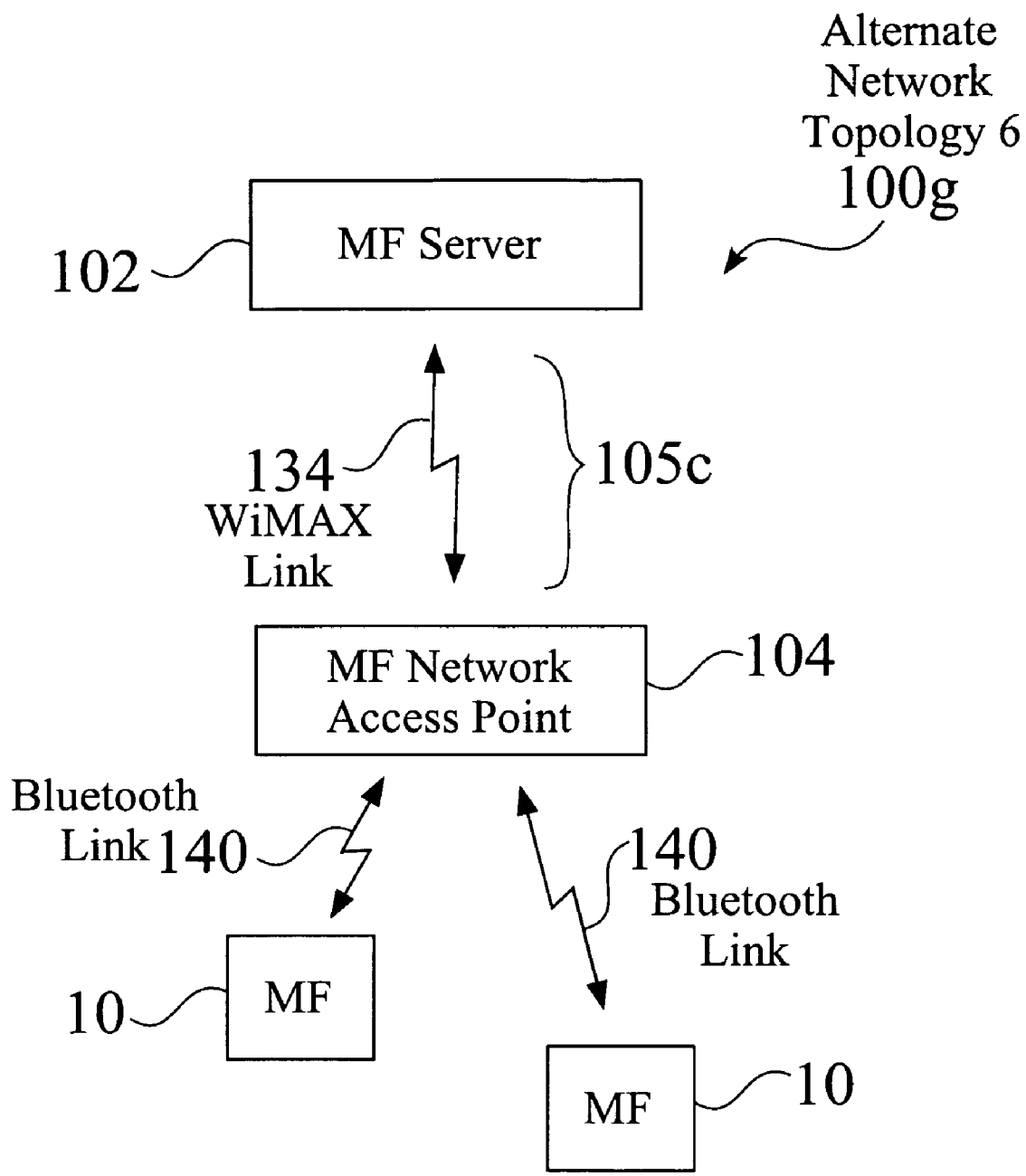

FIG. 61 shows network topology for a MateFinder network comprising a Wi-Max wireless link between a network access point and a MateFinder server and Bluetooth wireless links between MateFinders and the network access point.

Figure 62:
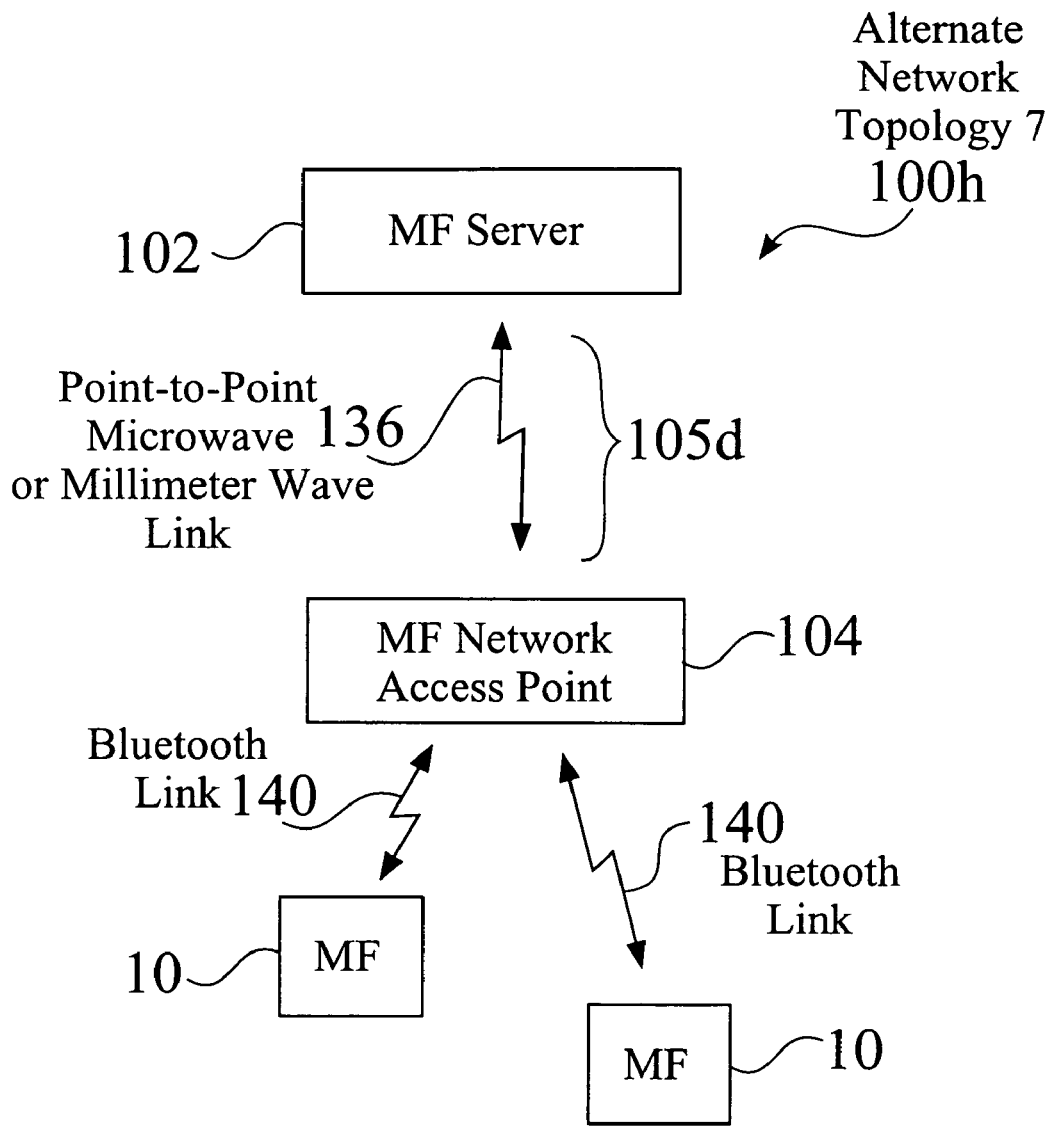

FIG. 62 shows network topology for a MateFinder network comprising a point-to-point wireless link between a network access point and a MateFinder server and Bluetooth wireless links between MateFinders and the network access point.

Figure 63:
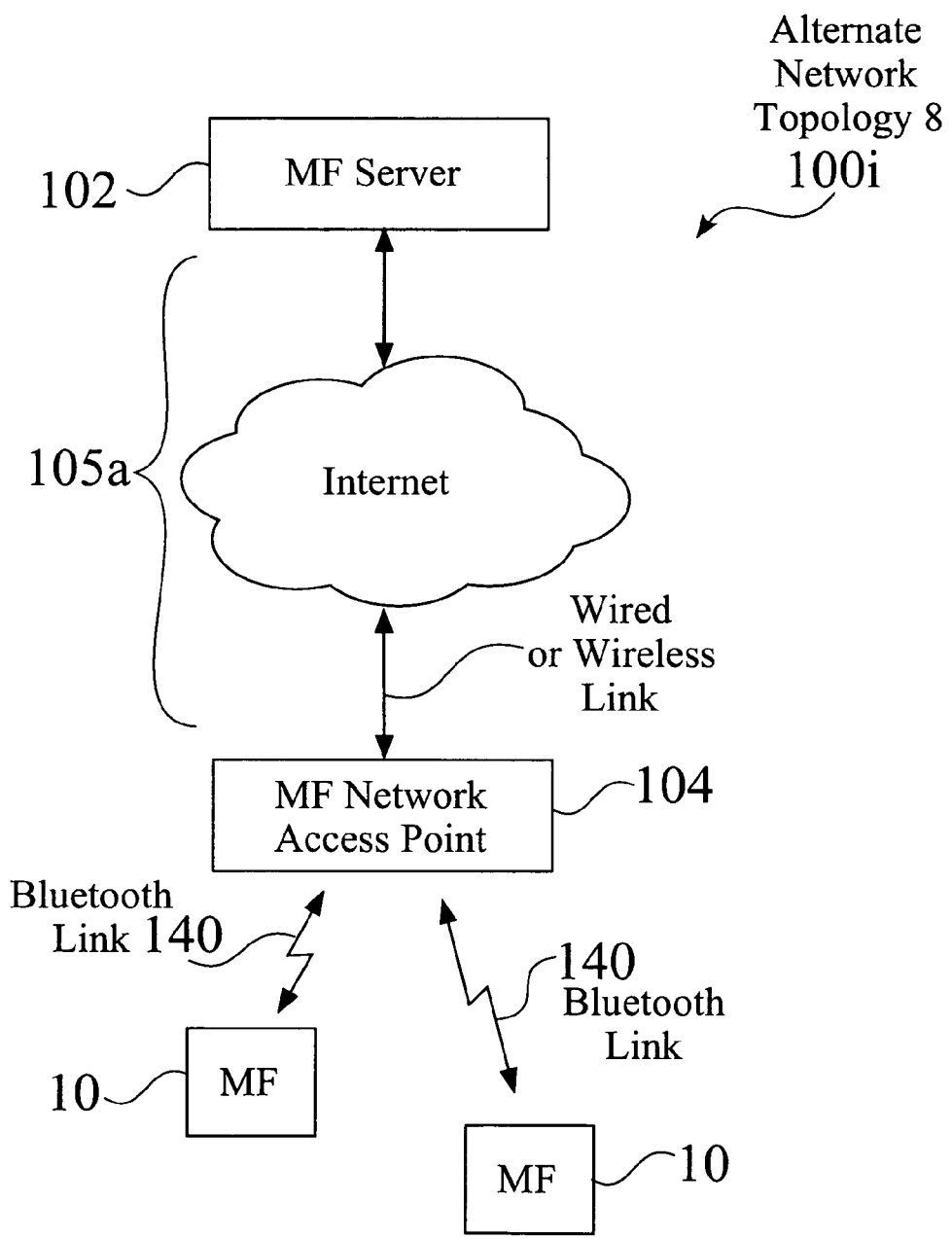

FIG. 63 shows network topology for a MateFinder network comprising an Internet connection between a network access point and a MateFinder server and Bluetooth wireless links between MateFinders and the network access point.

Figure 64:
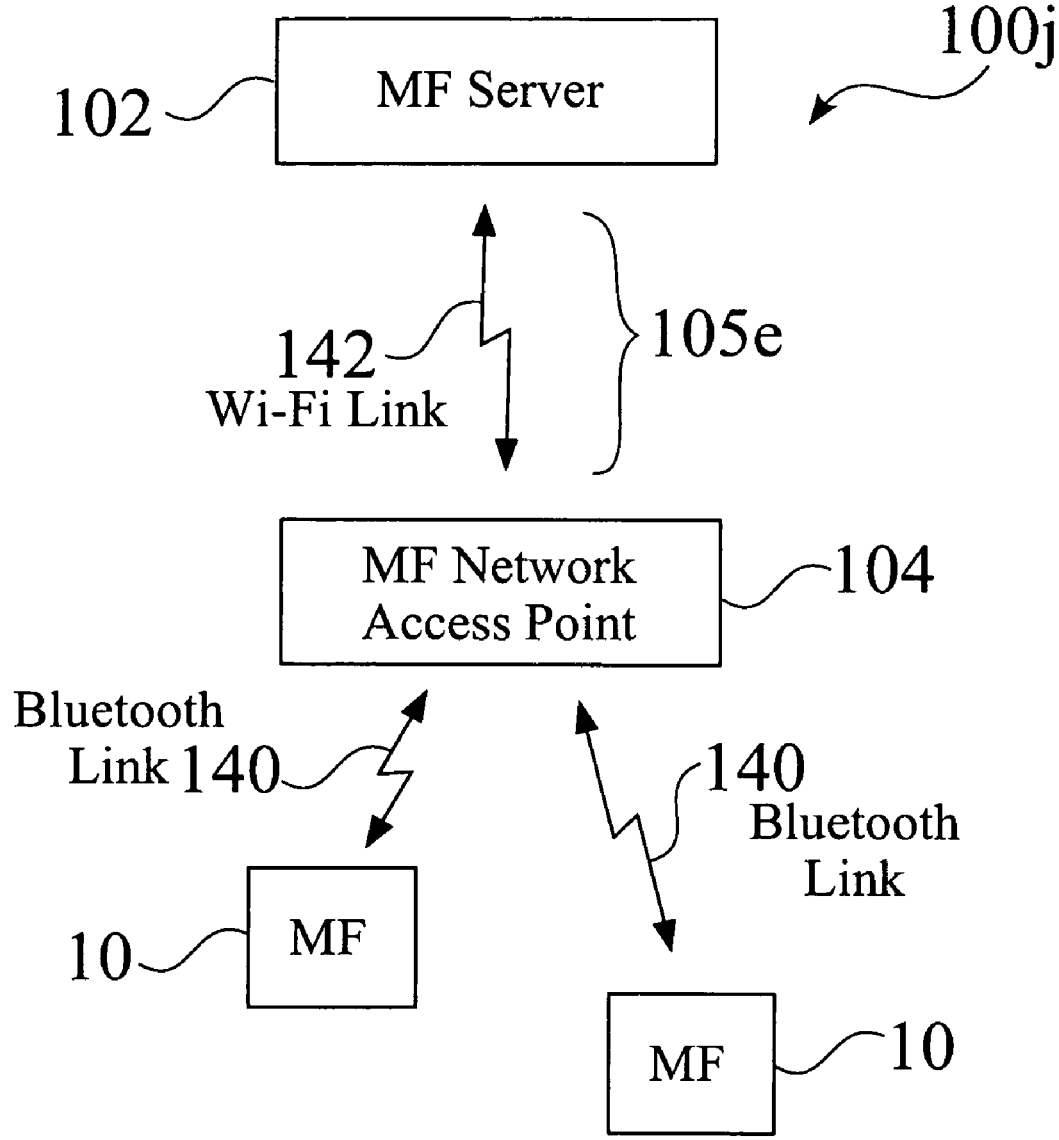

FIG. 64 shows network topology for a MateFinder network comprising a Wi-Fi wireless link between a network access point and a MateFinder server and Bluetooth wireless links between MateFinders and the network access point.

Figure 65:
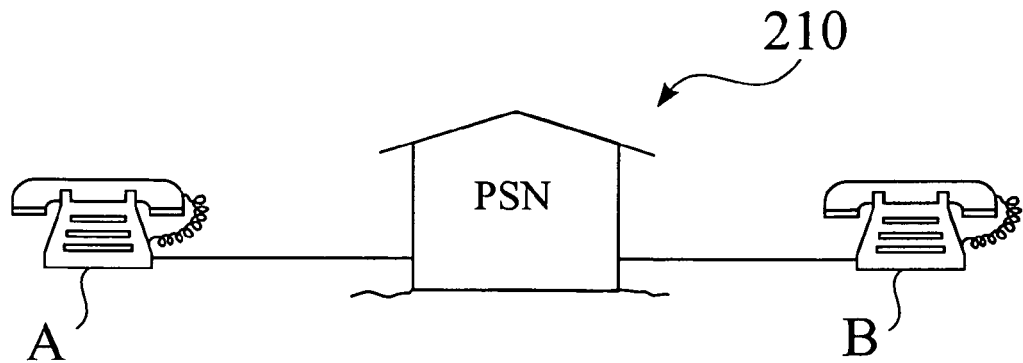

FIG. 65 is a diagram which shows the connection for a conventional telephone call.

Figure 66:
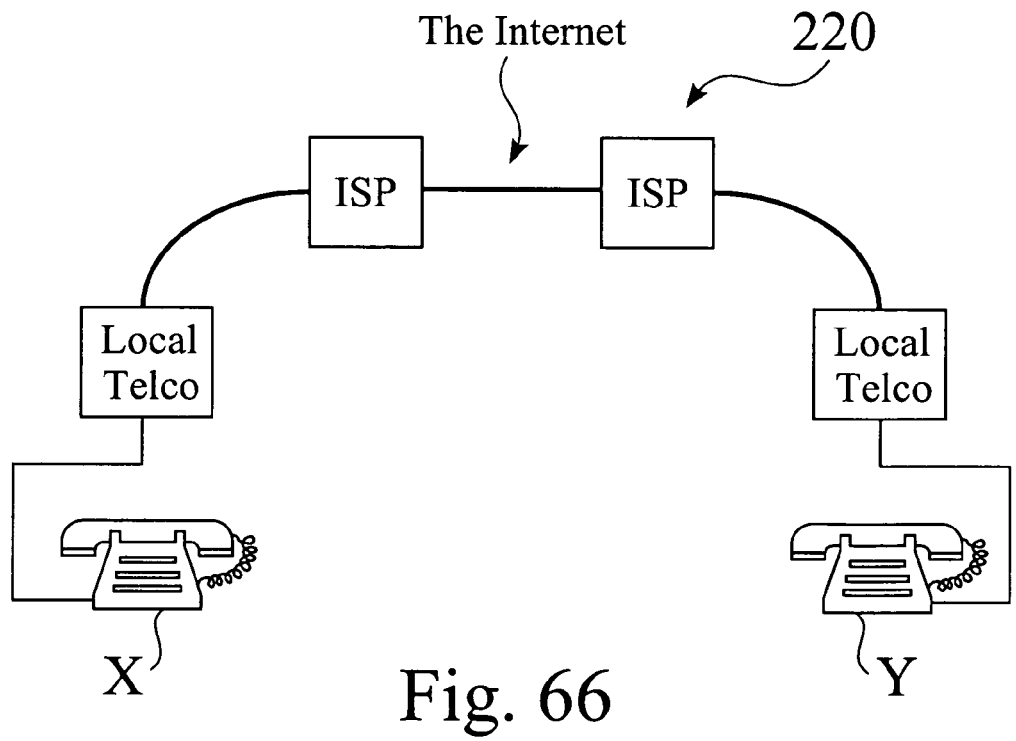

FIG. 66 is a diagram which shows the connection for voice communications over the Internet using conventional telephones.

Figure 67:
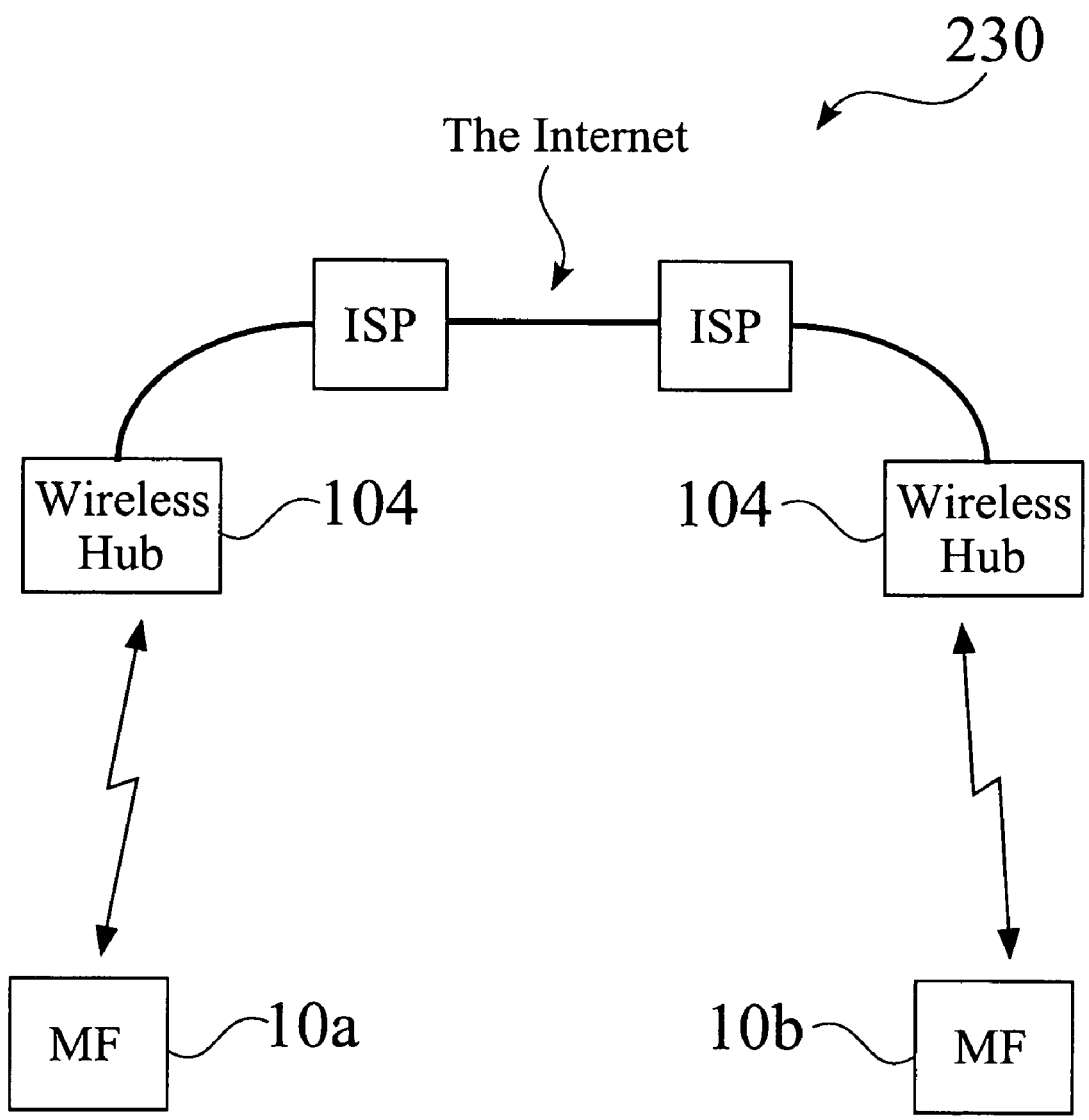

FIG. 67 is a diagram which shows the connection for voice communications over the Internet using wireless links between MateFinders and network access points.

Figure 68:
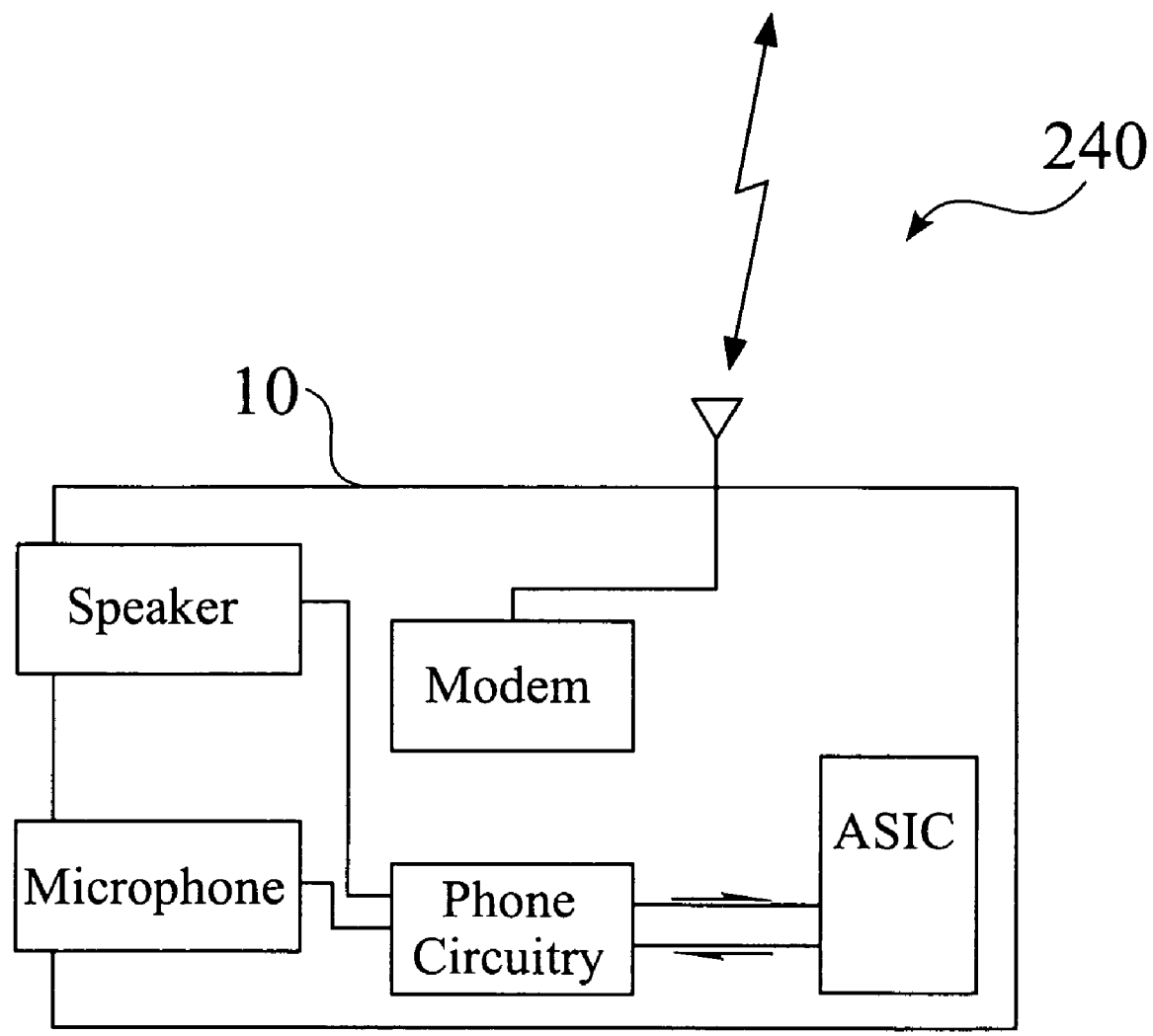

FIG. 68 is a schematic depiction of a portion of a MateFinder terminal that may be used to implement the VoIP communications.

Figure 69:
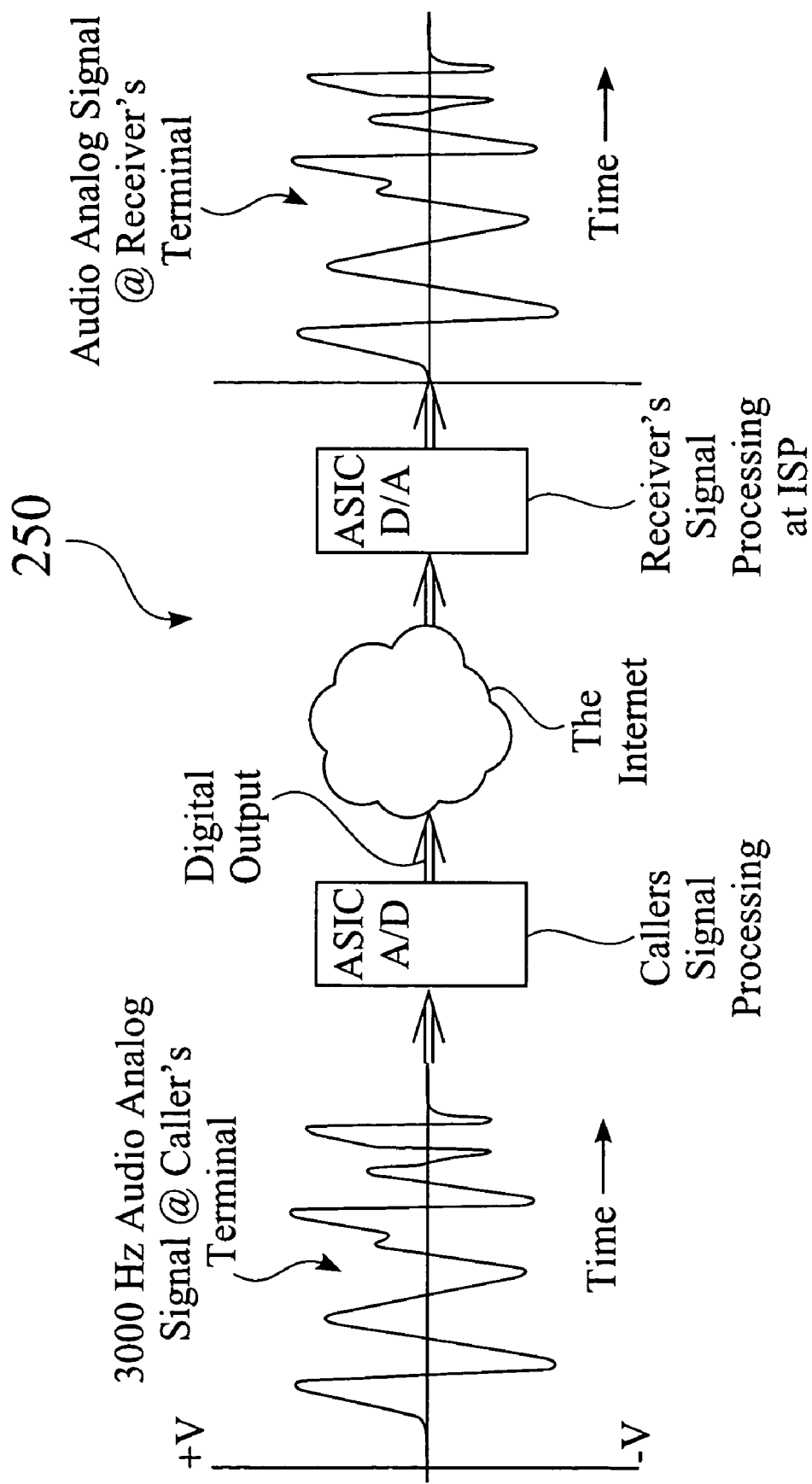

FIG. 69 illustrates one preferred method of VoIP communications using MateFinder terminals.

Figure 70:
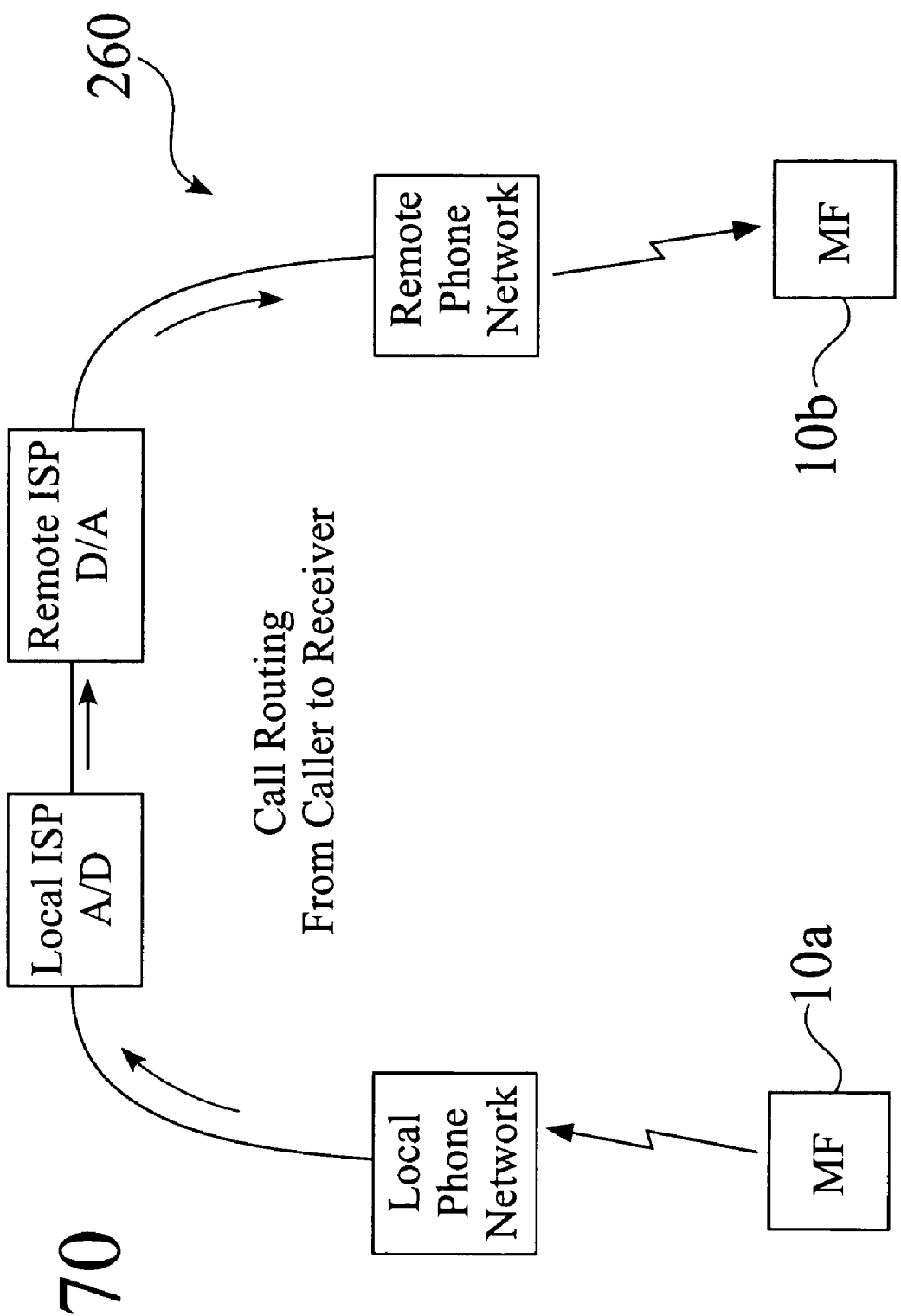

FIG. 70 shows an alternative embodiment of VoIP communication between MateFinder terminals.

Figure 71:
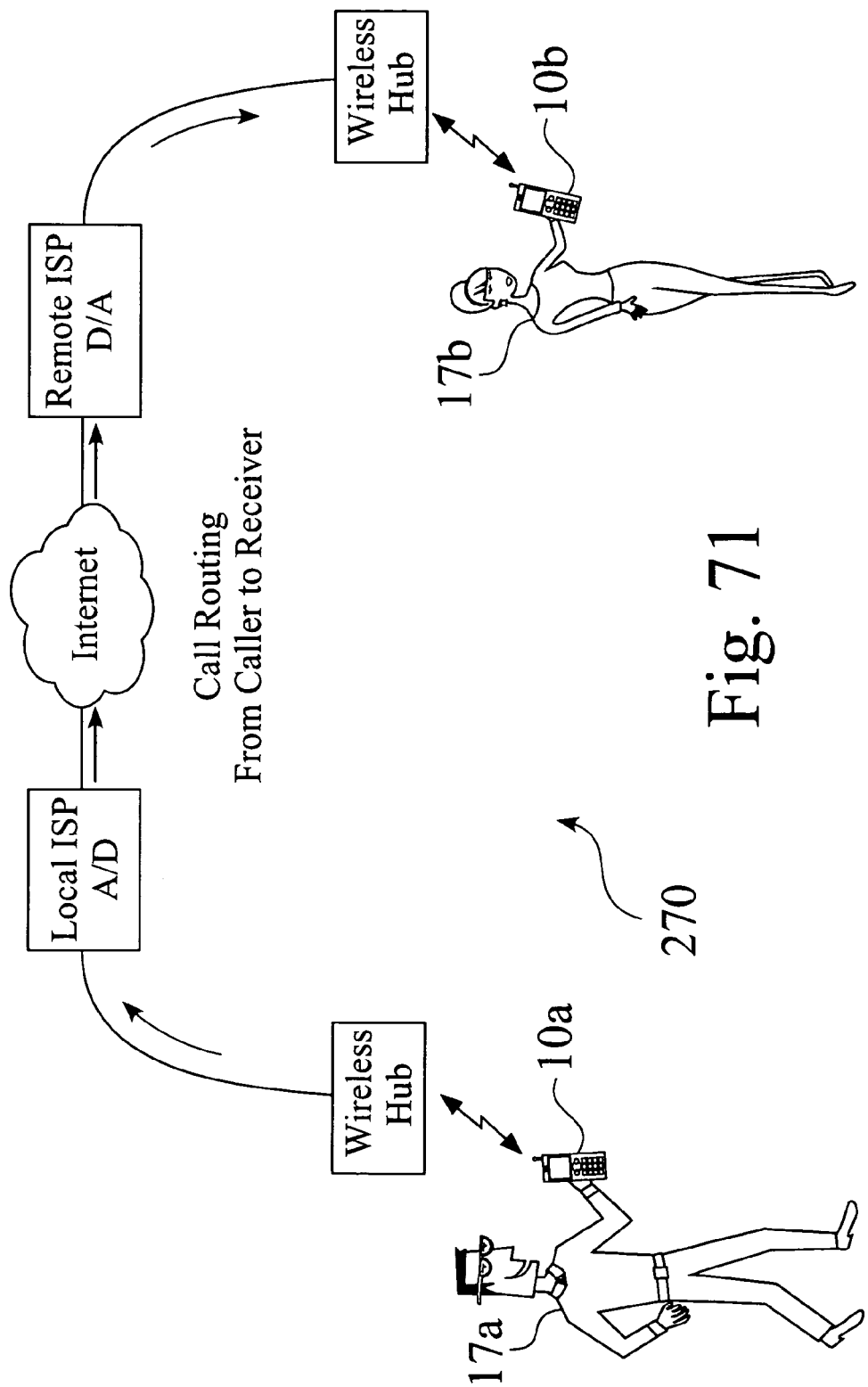

FIG. 71 shows a man and a woman communicating with MateFinders that use a VoIP network.

Figure 72:
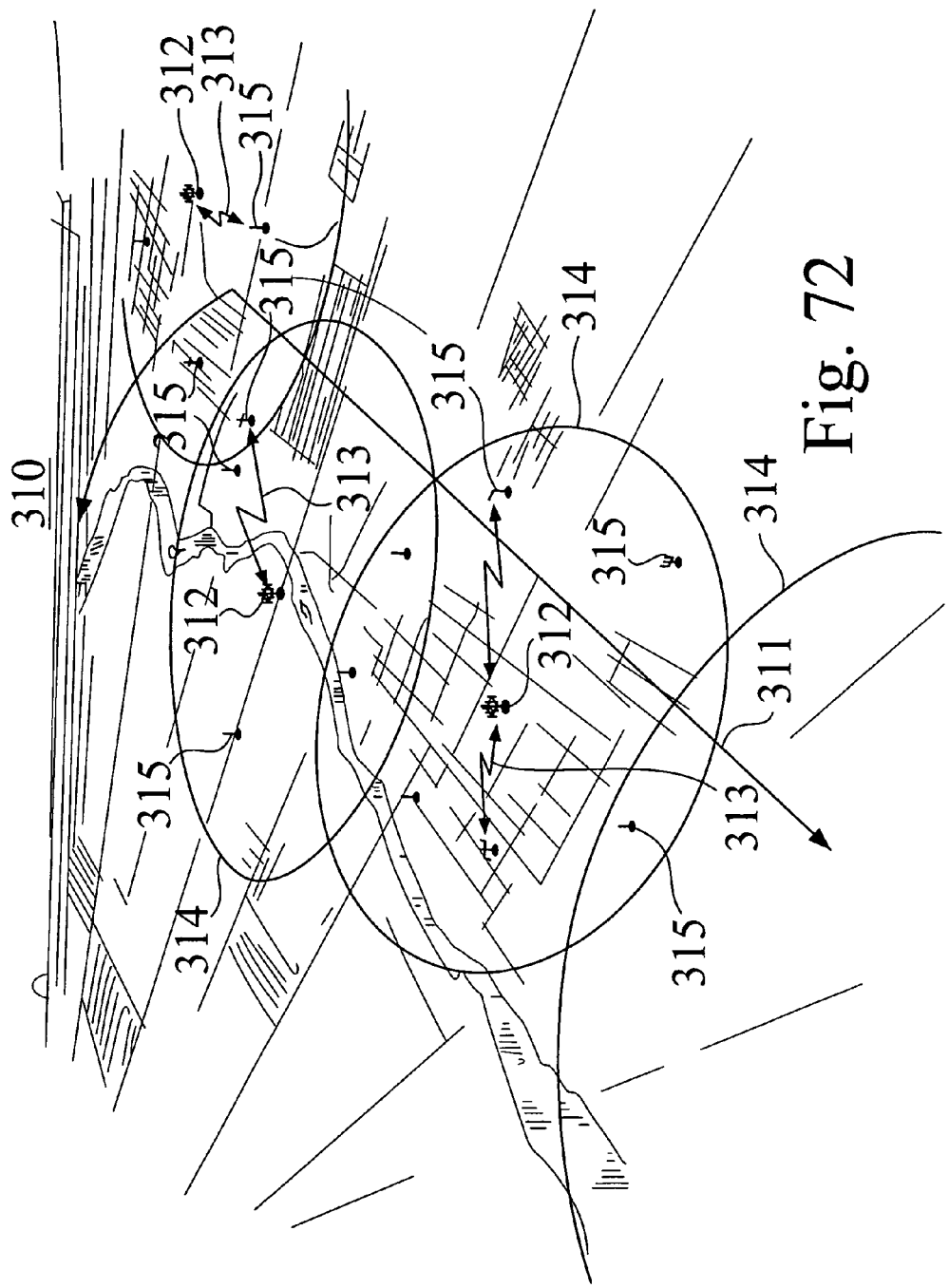

FIG. 72 is a perspective view of a portion of a Network Access Communication System serving urban and suburban communities, showing service areas, wide-area-network-access communication hubs and Mate Finder Access Point (MFAP) terminals.

Figure 73:
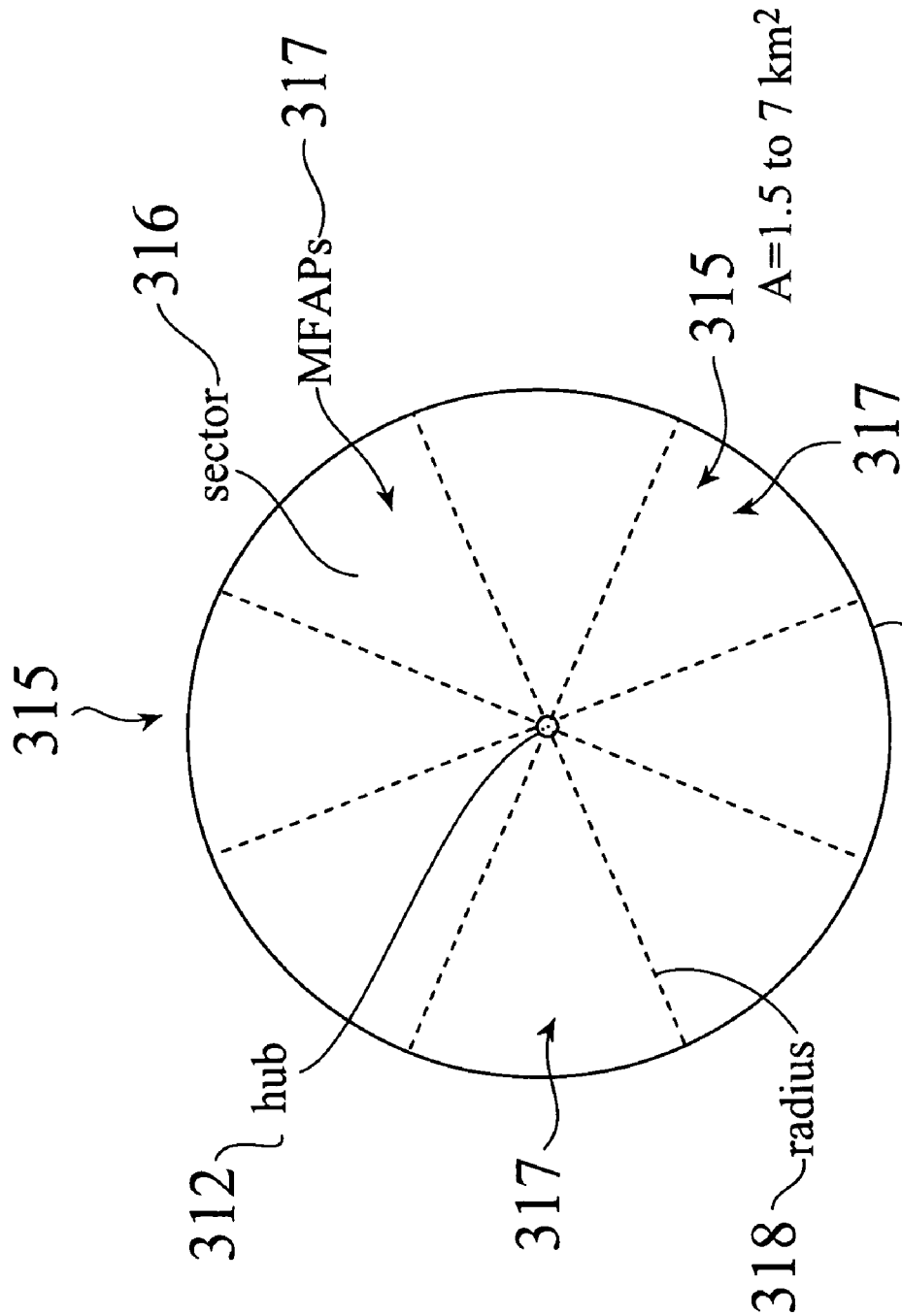

FIG. 73 is a plan view schematic diagram of a service area, containing a communications hub and MFAP terminals.

Figures 74, 75:
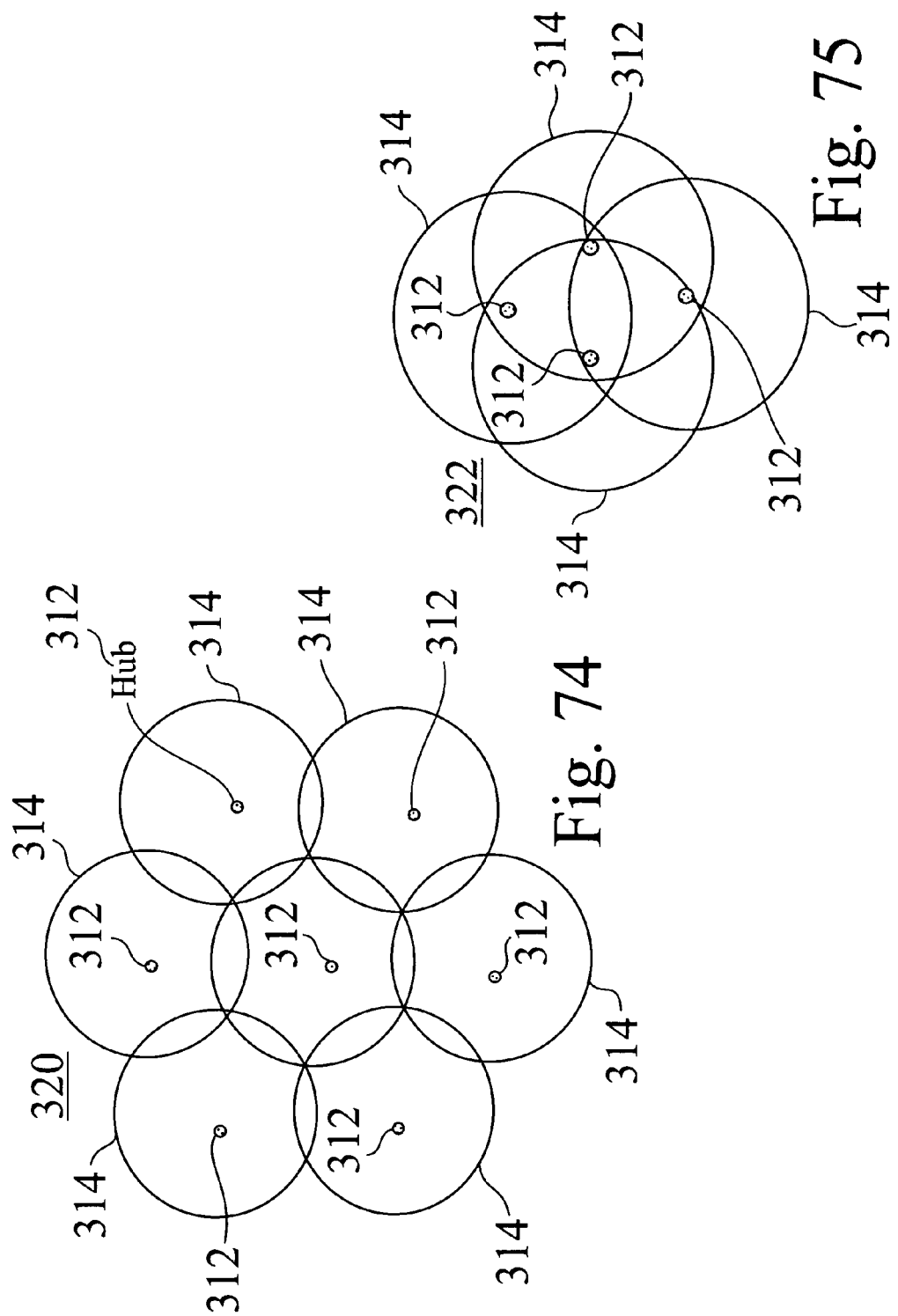

FIG. 74 is a schematic diagram showing a plurality of communication hubs, grouped and partially overlapped to provide a system of network access over large areas.

FIG. 75 is a schematic diagram of another system configuration having a plurality of communication hubs, grouped and partially overlapped to provide a large number of MFAP terminals with line-of-sight communications with a wide-area-network-access hub.

Figure 76:
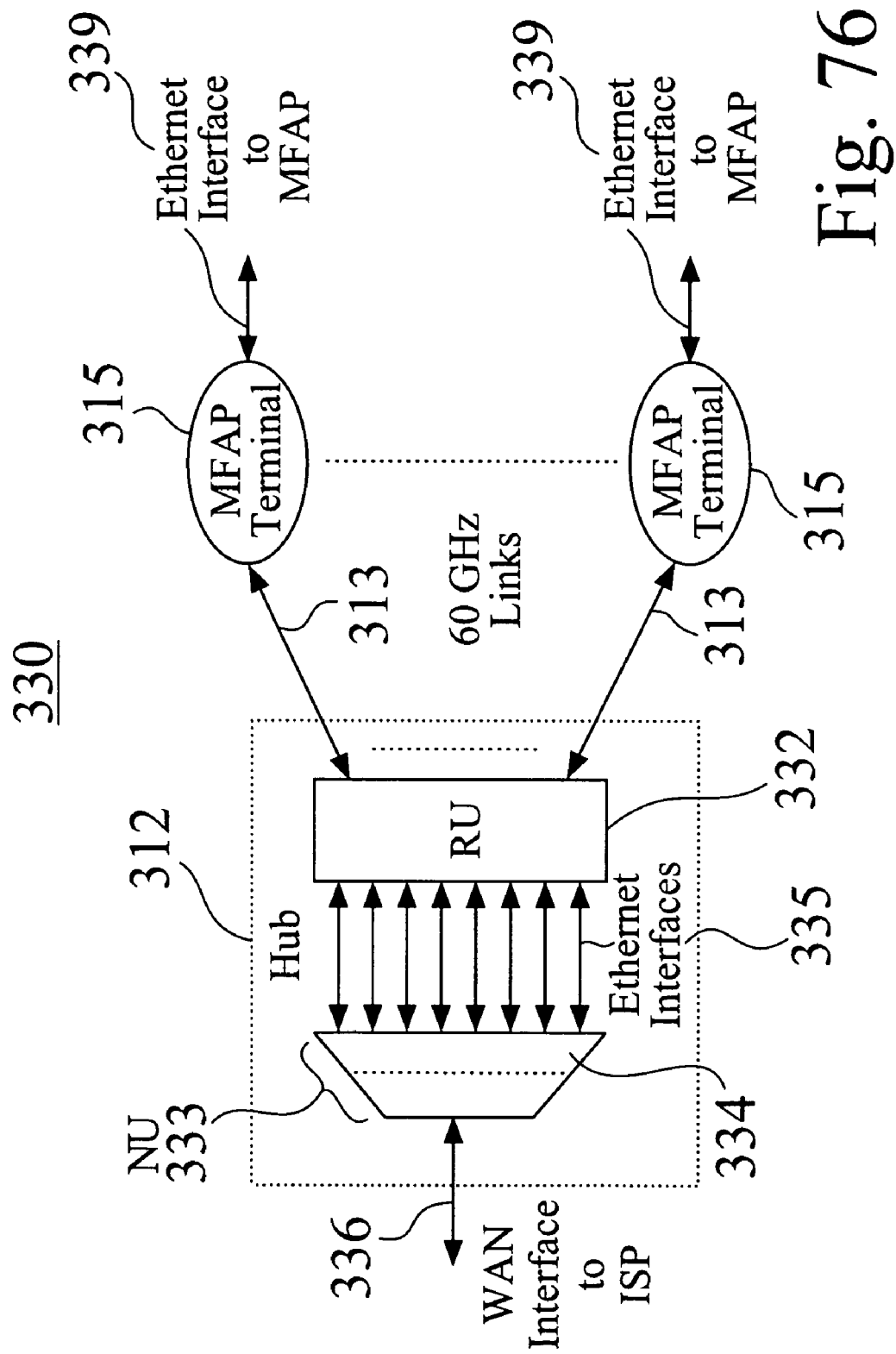

FIG. 76 presents in schematic form, a diagram of signal flow to and from MFAP terminals accessing a communications hub, revealing the network unit (NU) and the radio unit (RU) comprising the hub.

Figure 77:
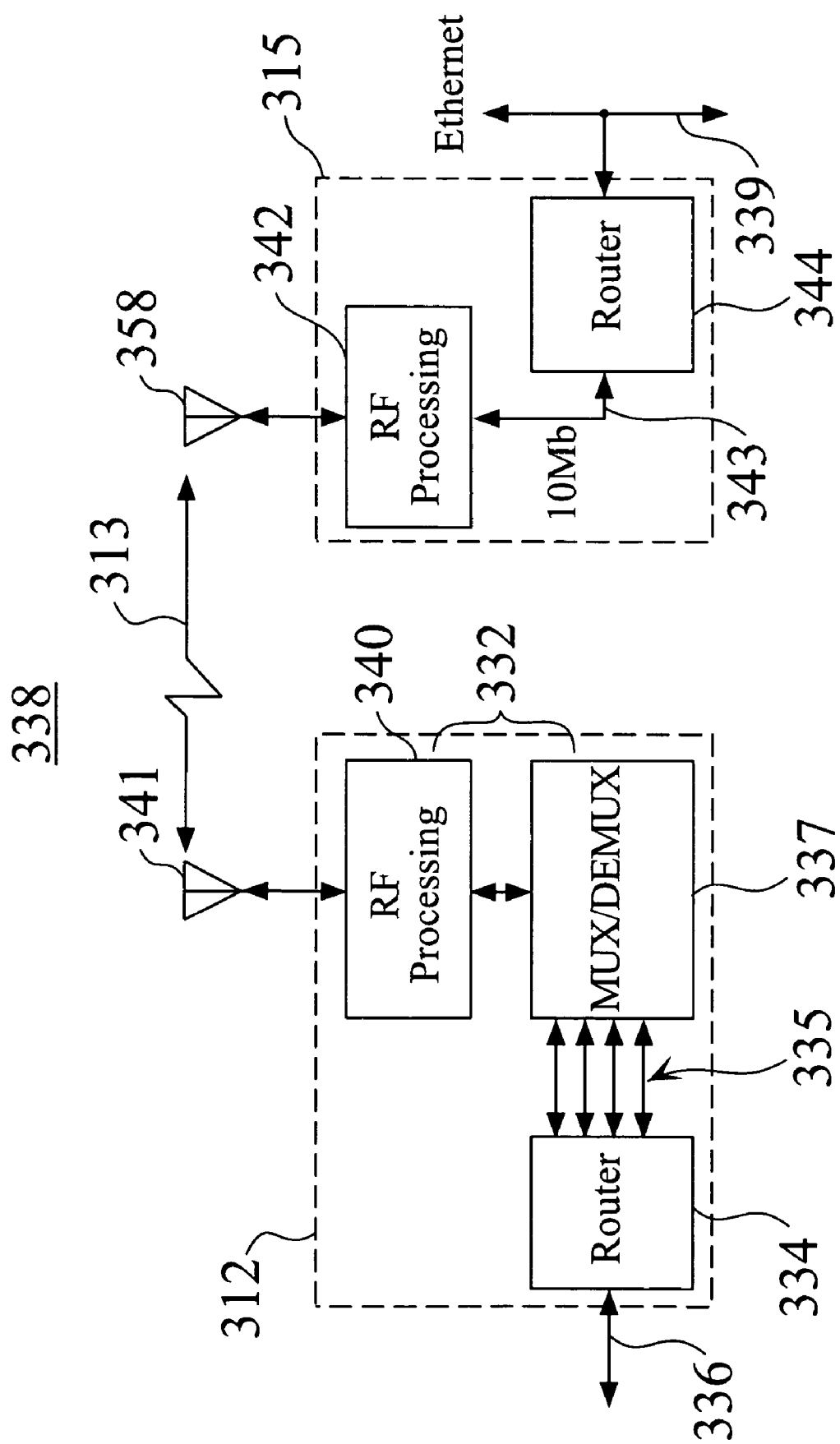

FIG. 77 is a functional block diagram of a network communications hub and an terminal, showing the router functions distributed to the hub and MFAP terminal.

FIG. 78 presents a table of communication link budgets for a 60 GHz radio link used for communications between a communications hub and an MFAP terminal.

Figure 79:
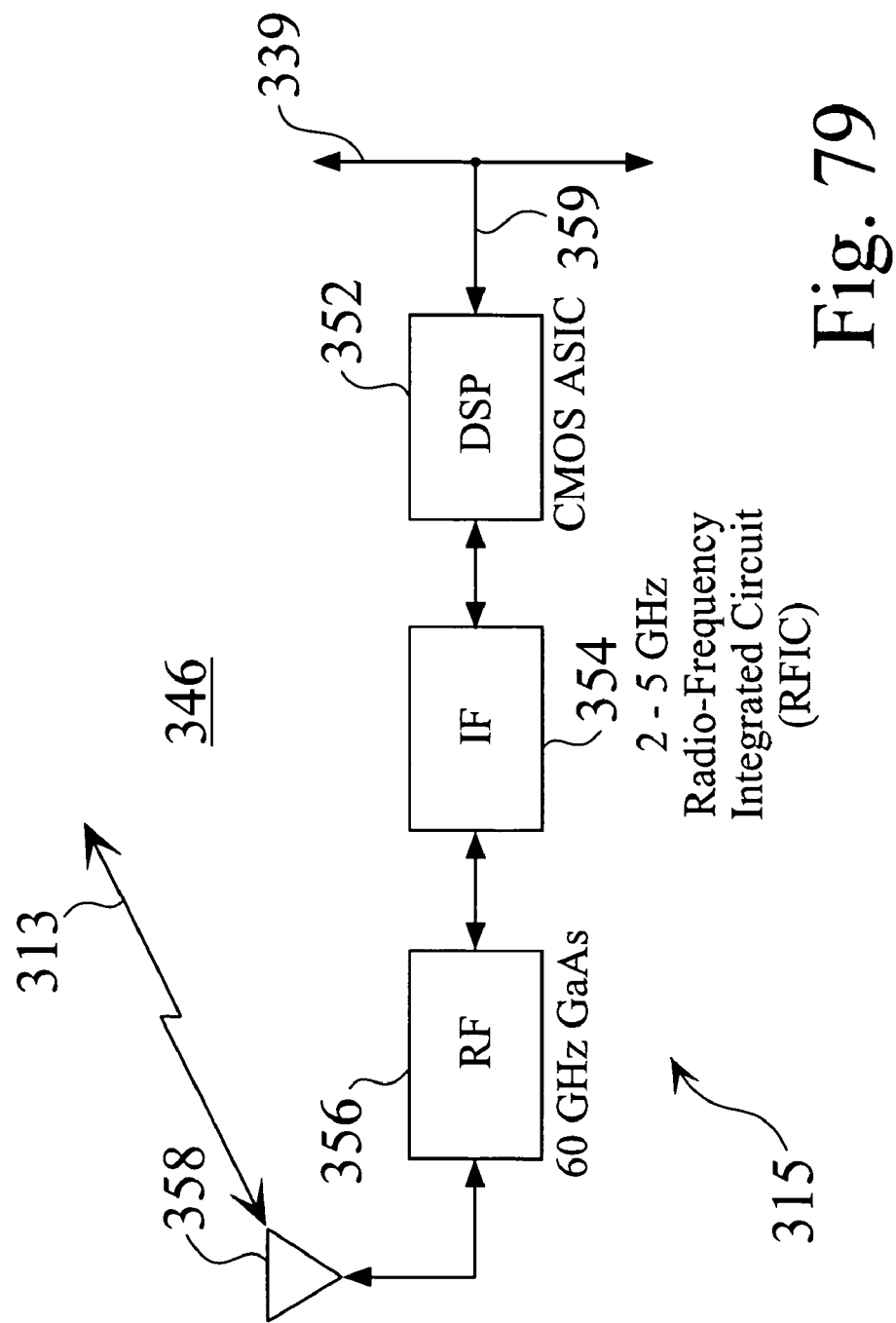

FIG. 79 is a top level functional block diagram of an MFAP terminal.

Figure 80:
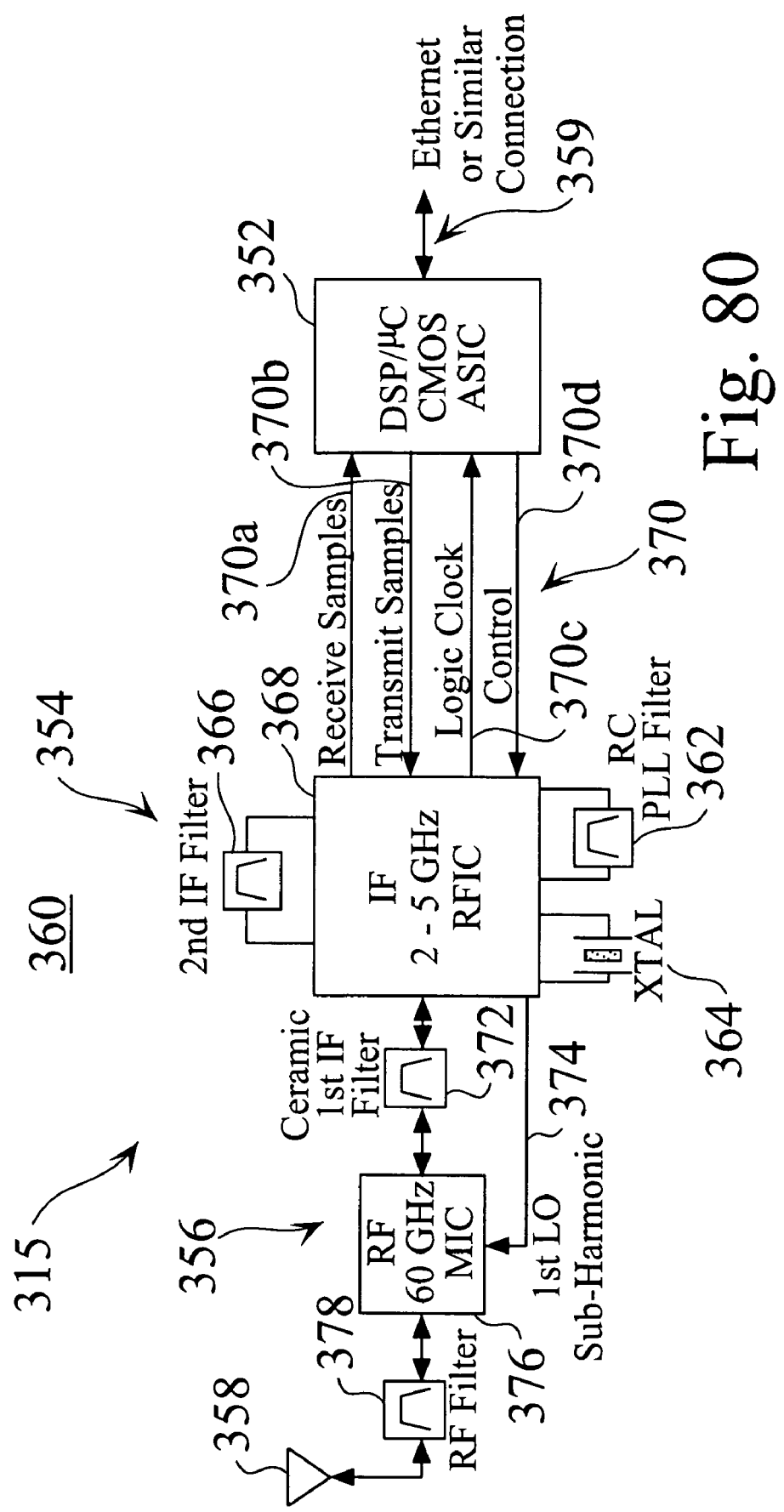

FIG. 80 shows a detailed functional block diagram of an MFAP terminal. This figure includes an ASIC modem and an intermediate frequency (IF) Radio-Frequency Integrated Circuit (RFIC).

Figure 81:
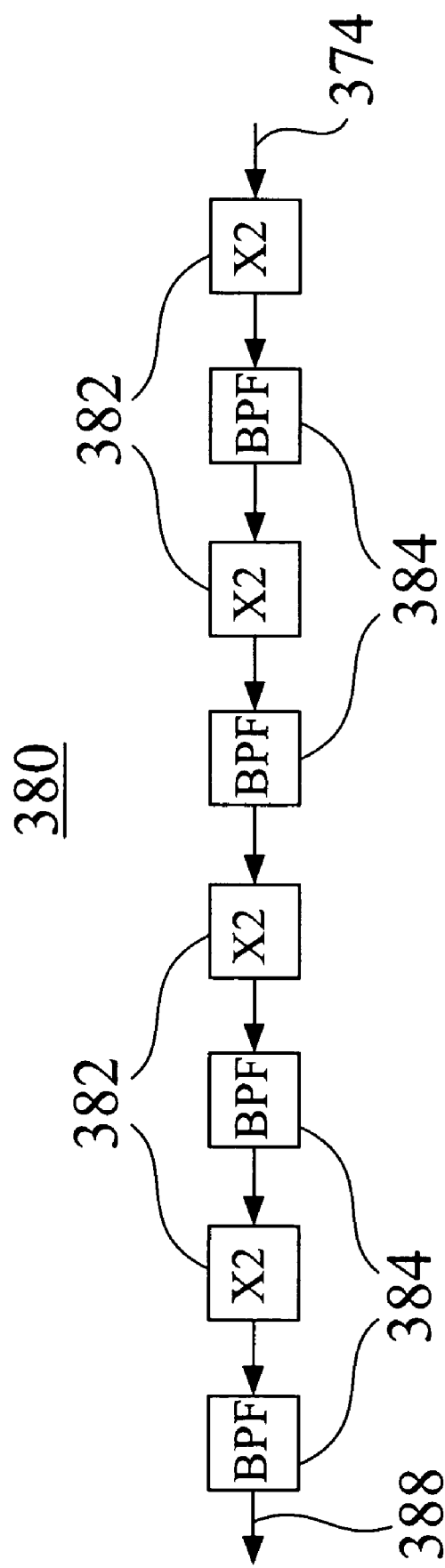

FIG. 81 is a block diagram of a portion of the frequency multiplier used to form a local oscillator (LO) signal from a sub-harmonic frequency generated in the IF ASIC of FIG. 8. The LO signal is provided to a radio frequency microwave integrated circuit (MIC) mixer.

Figure 82:
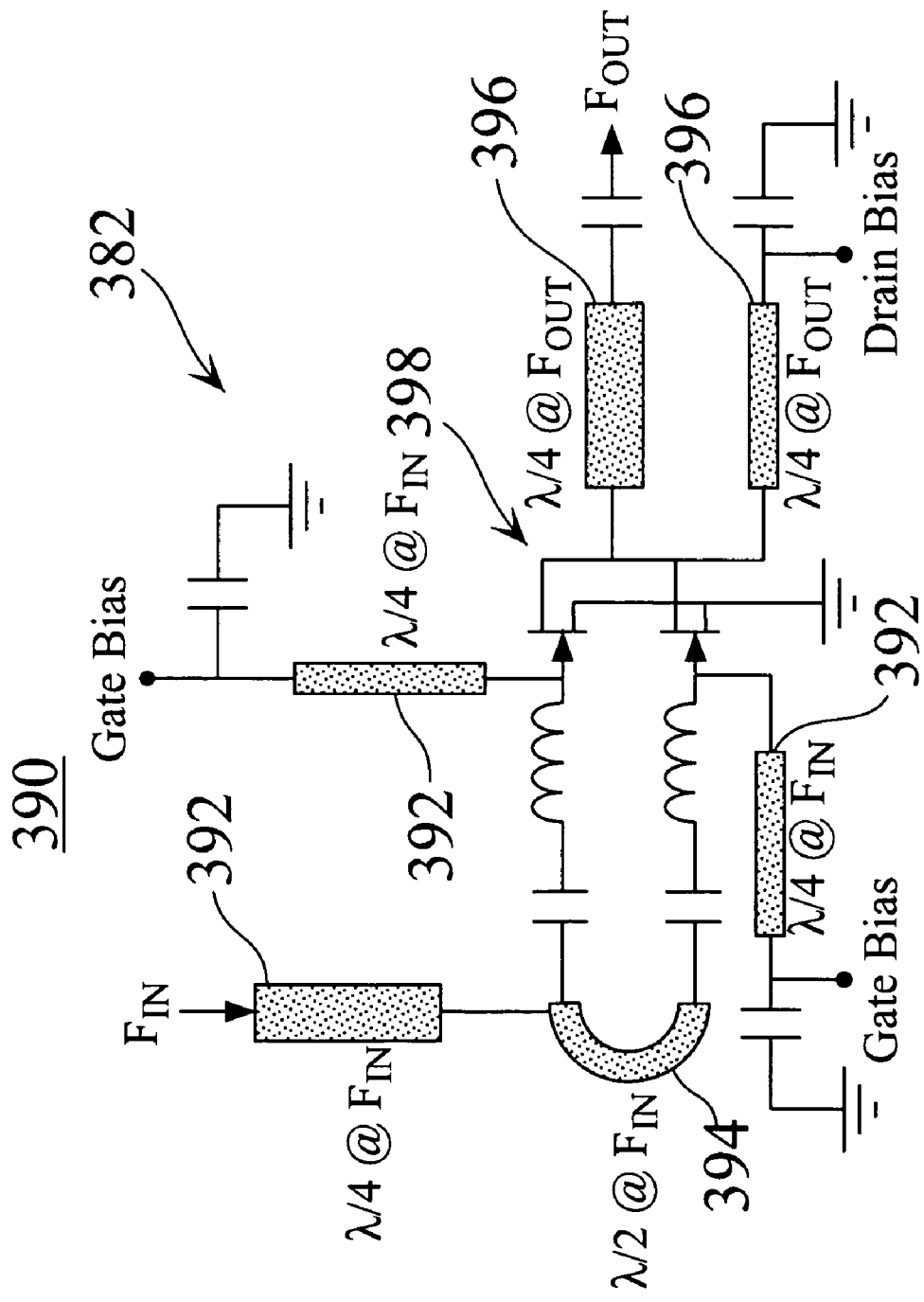

FIG. 82 reveals a schematic diagram of a balanced active doubler used in the frequency multiplier circuits of FIG. 81.

Figure 83:
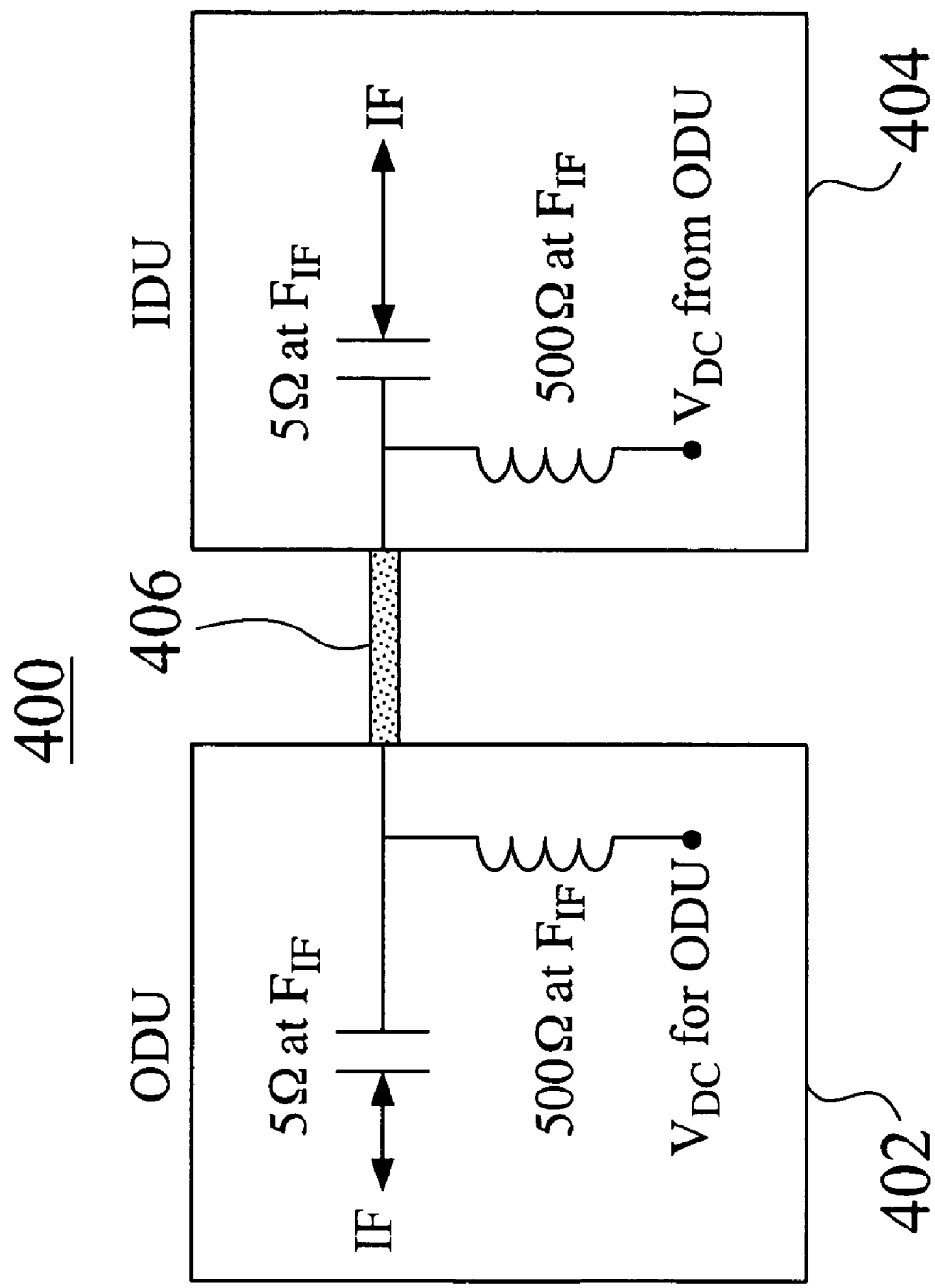

FIG. 83 presents a schematic diagram of a portion of the MFAP terminal, operating at an intermediate frequency (IF), which is separated into an indoor unit (IDU) and an outdoor unit (ODU), connected by coaxial cable.

Figure 84:
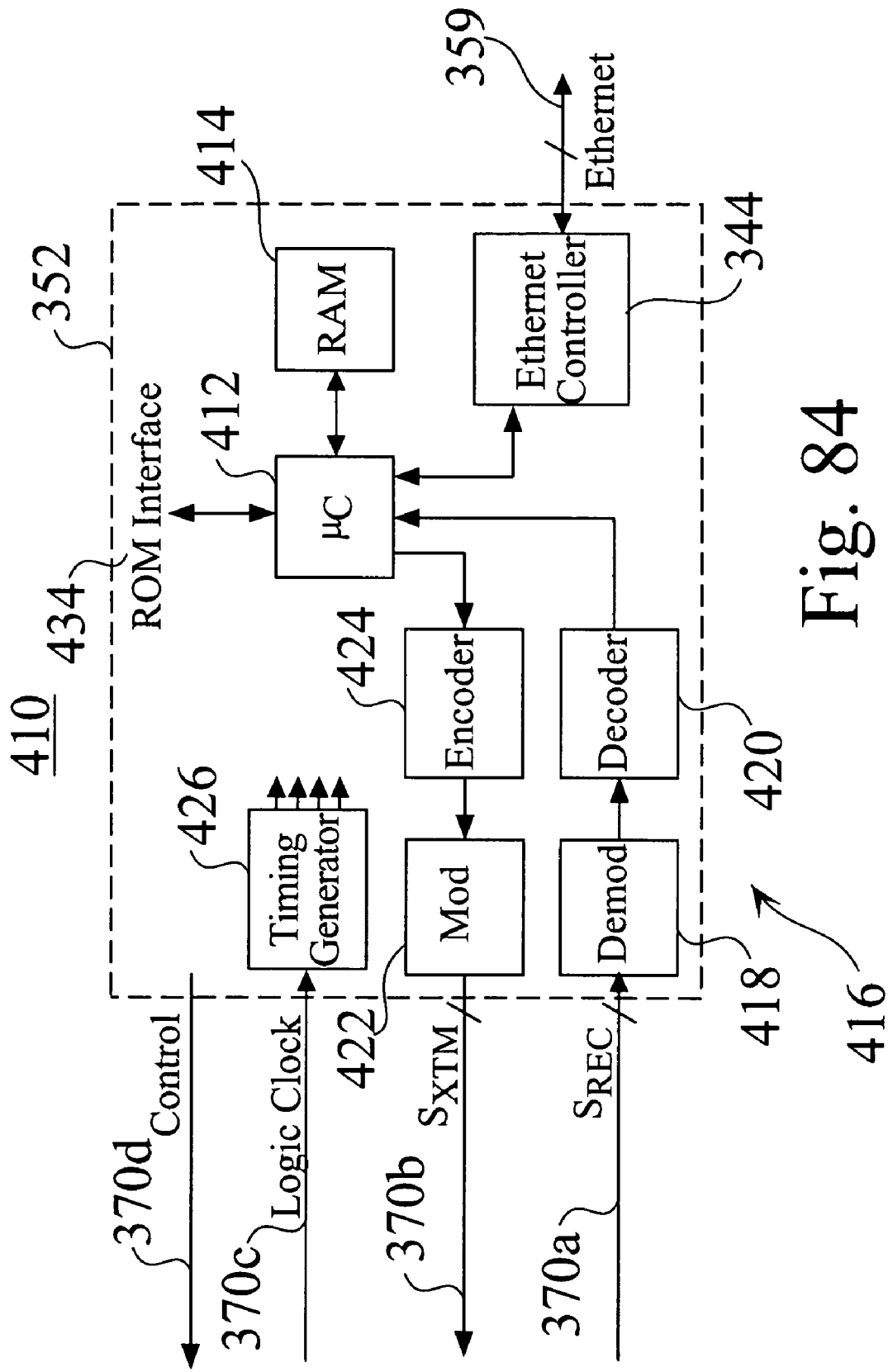

FIG. 84 reveals a functional block diagram of an application specific integrated circuit (ASIC) used for digital processing of signals (DSP) which modulate and demodulate the radio frequency transmissions between an MFAP terminal and a communications hub.

Figure 85:
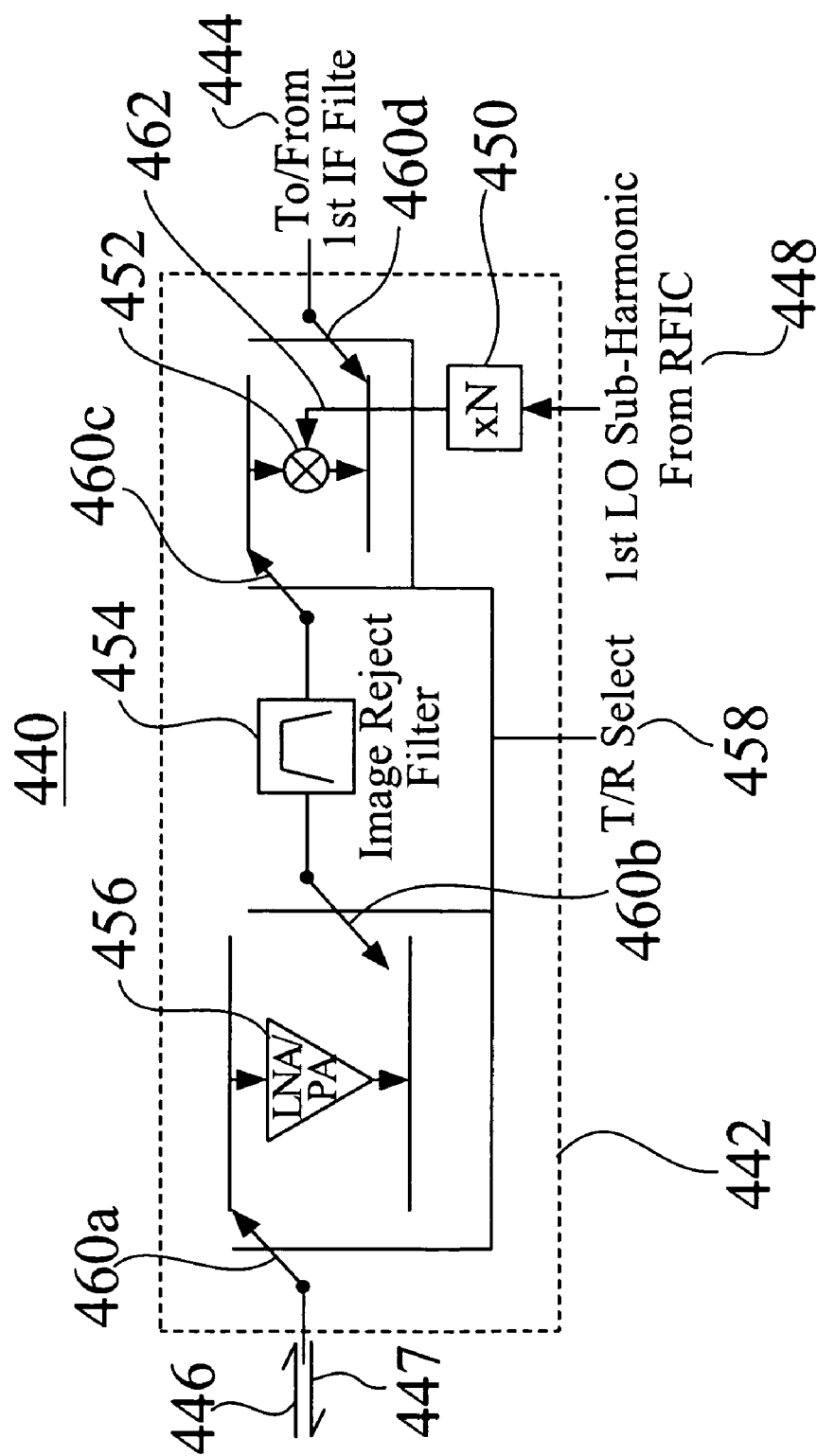

FIG. 85 is a schematic diagram of a transmit/receive module used in a time division duplex operation mode as both a first receiver stage and a final transmitter stage for signals communicated both ways over the Network Access Communication System.

Figure 86:
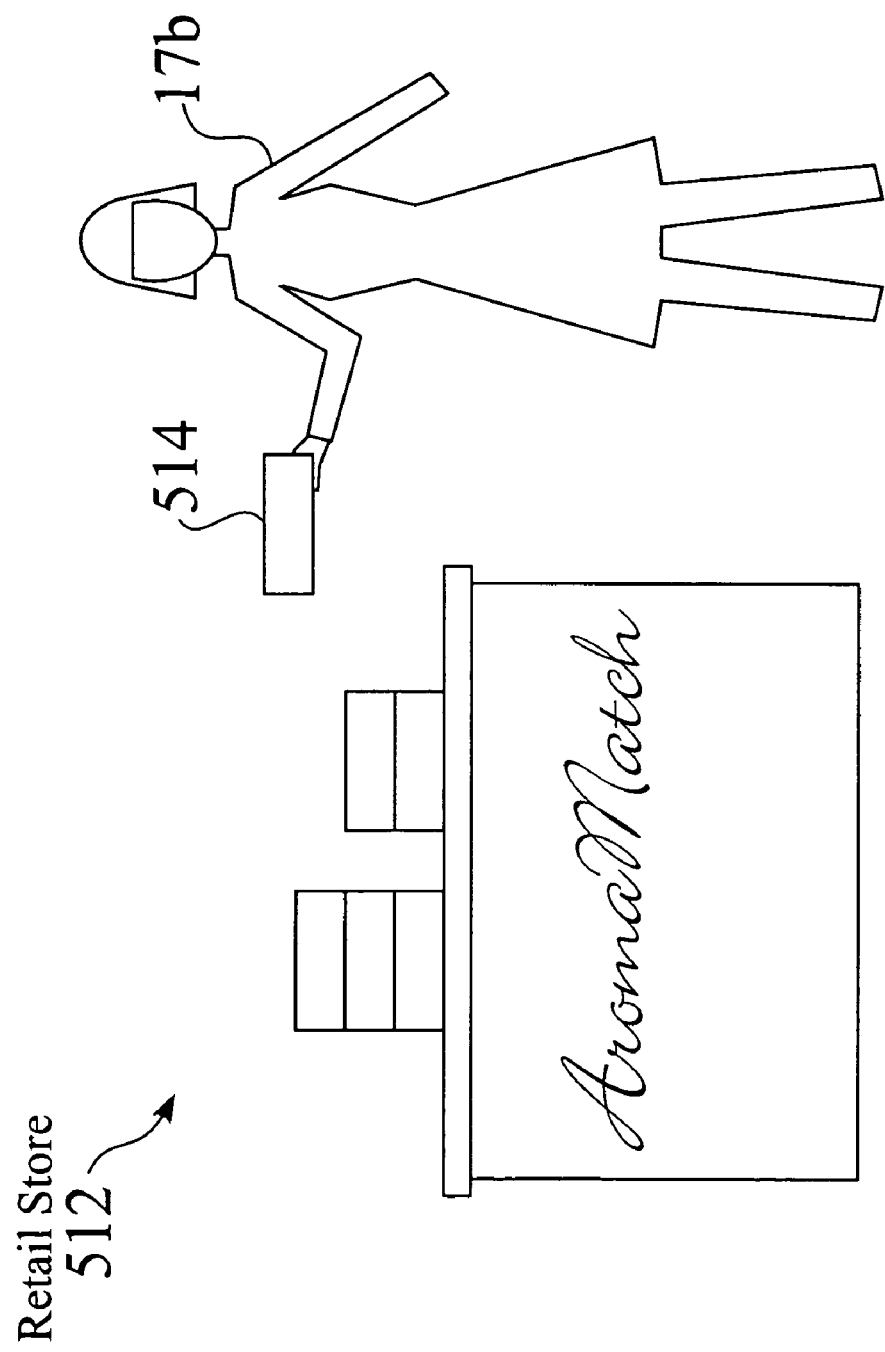

FIG. 86 shows a woman purchasing an AromaMatch Test Kit at a retail store.

Figure 87:
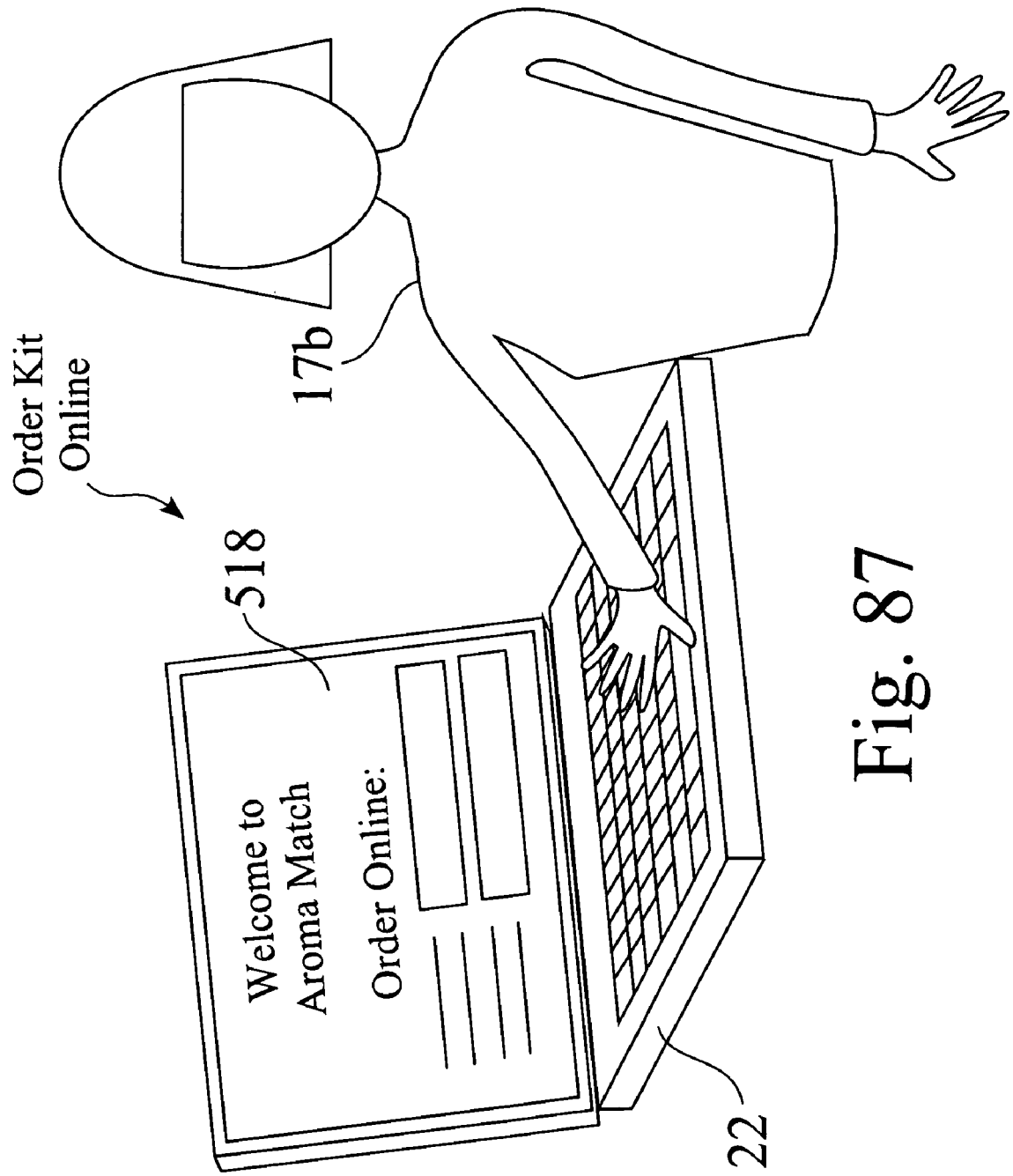

FIG. 87 shows the same woman purchasing an AromaMatch Test Kit on a website.

Figure 88:
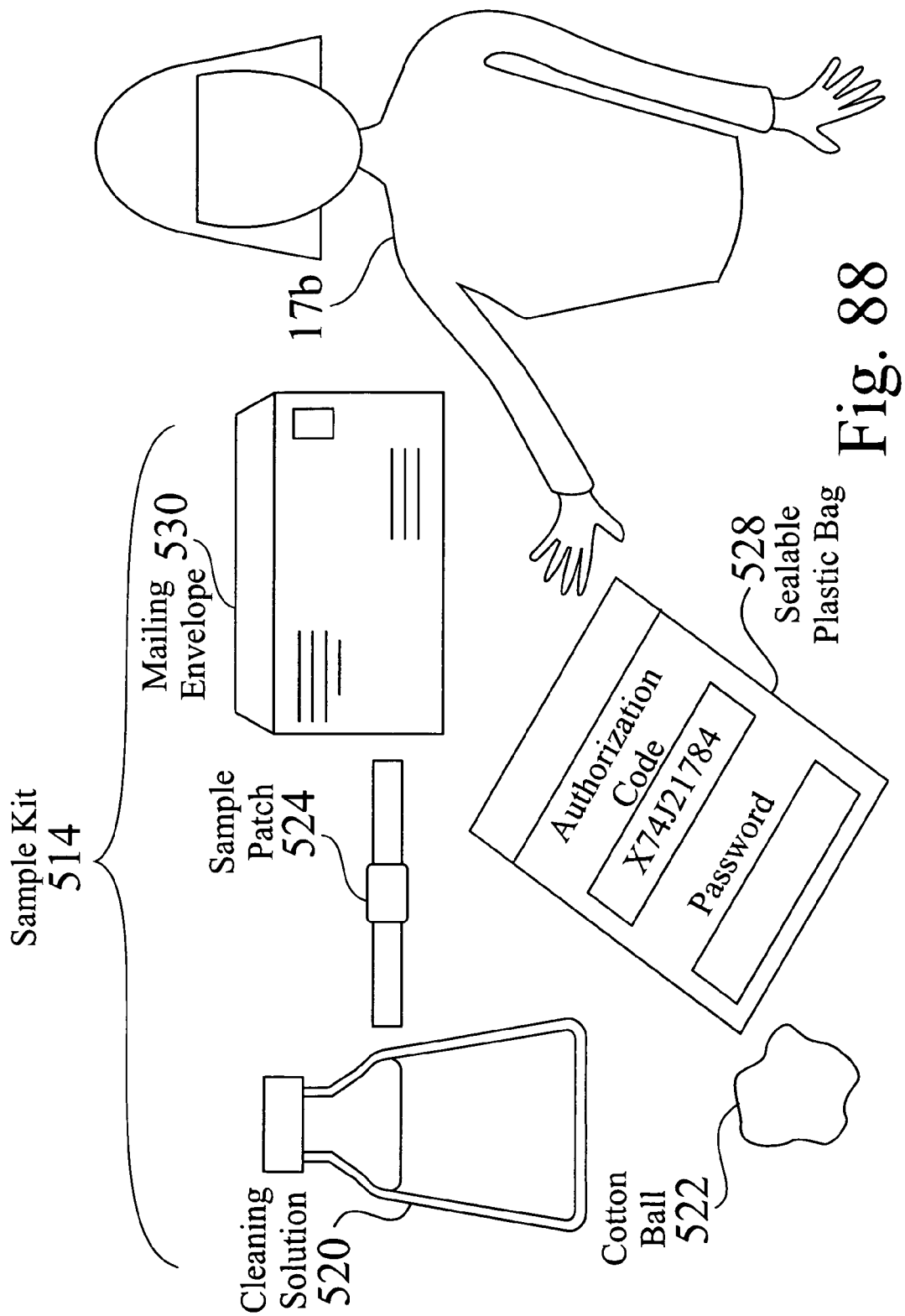

FIG. 88 depicts the woman opening the AromaMatch Test Kit to reveal its contents: a bottle of cleaning solution, a cotton ball, a sample patch, a sealable plastic bag and a mailing envelope.

Figure 89:
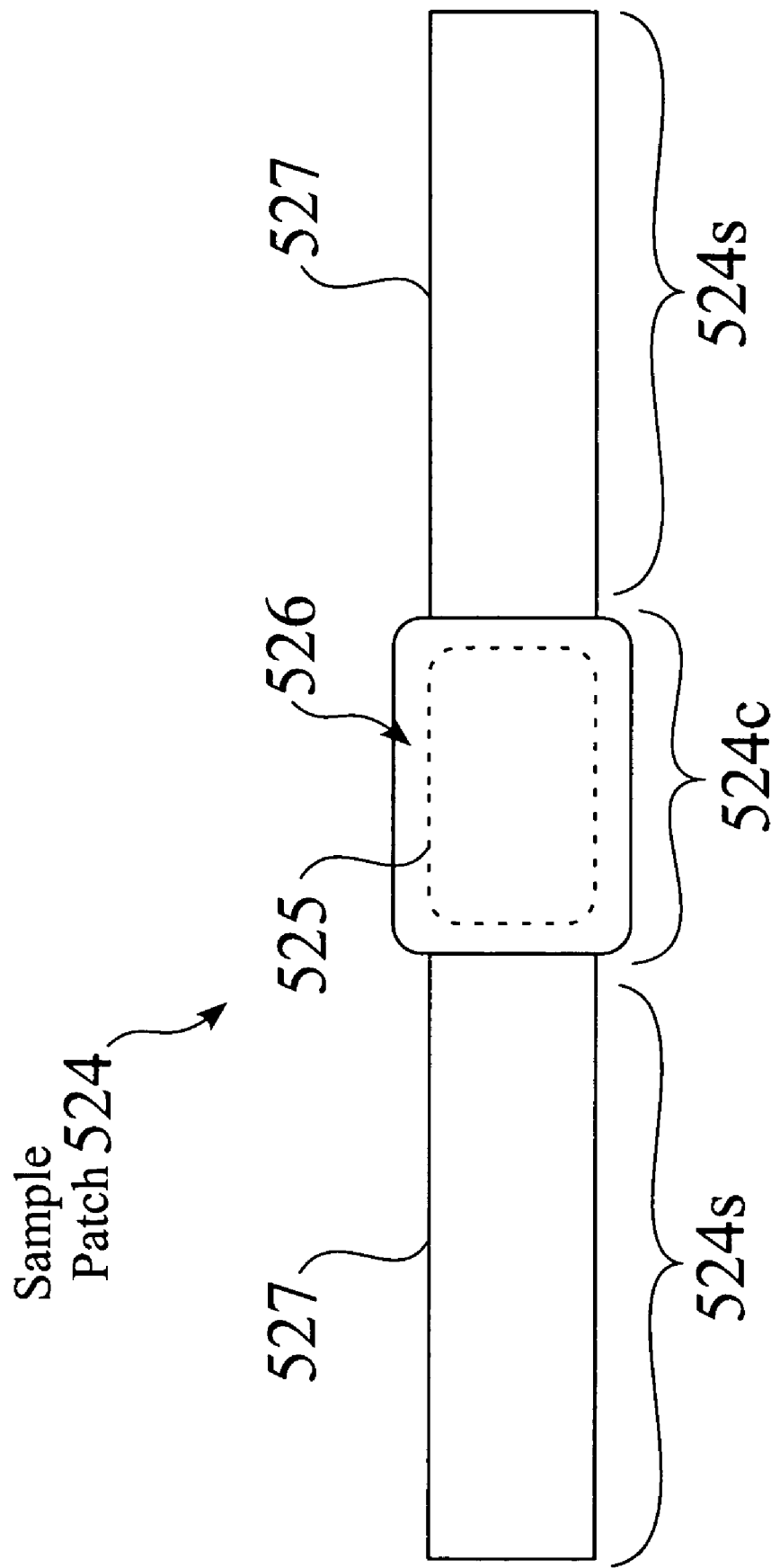

FIG. 89 supplies a detailed view of the sample patch.

Figure 90:
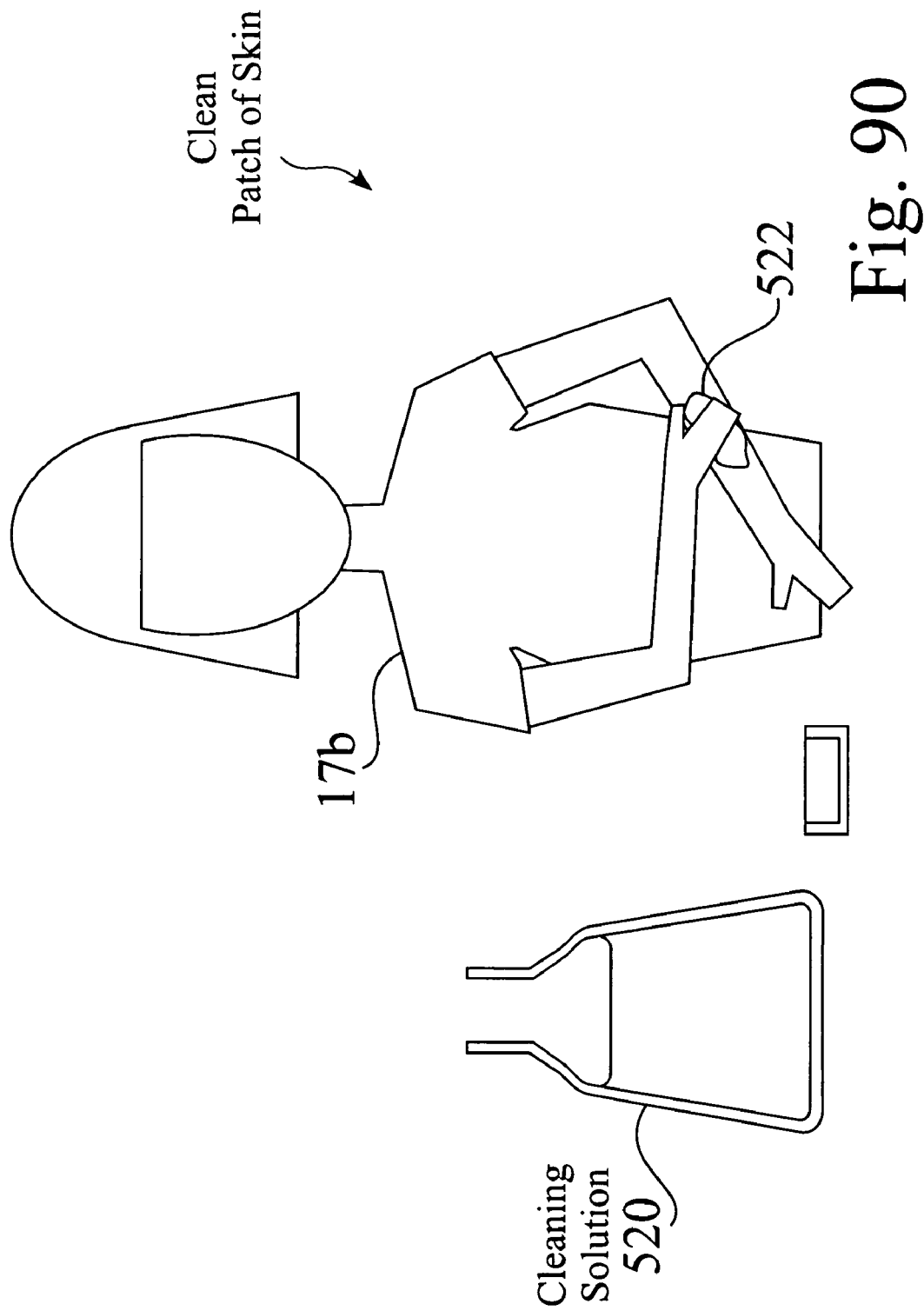

In FIG. 90, the woman cleans a patch of skin in preparation for applying the sample patch to her arm.

Figure 91:
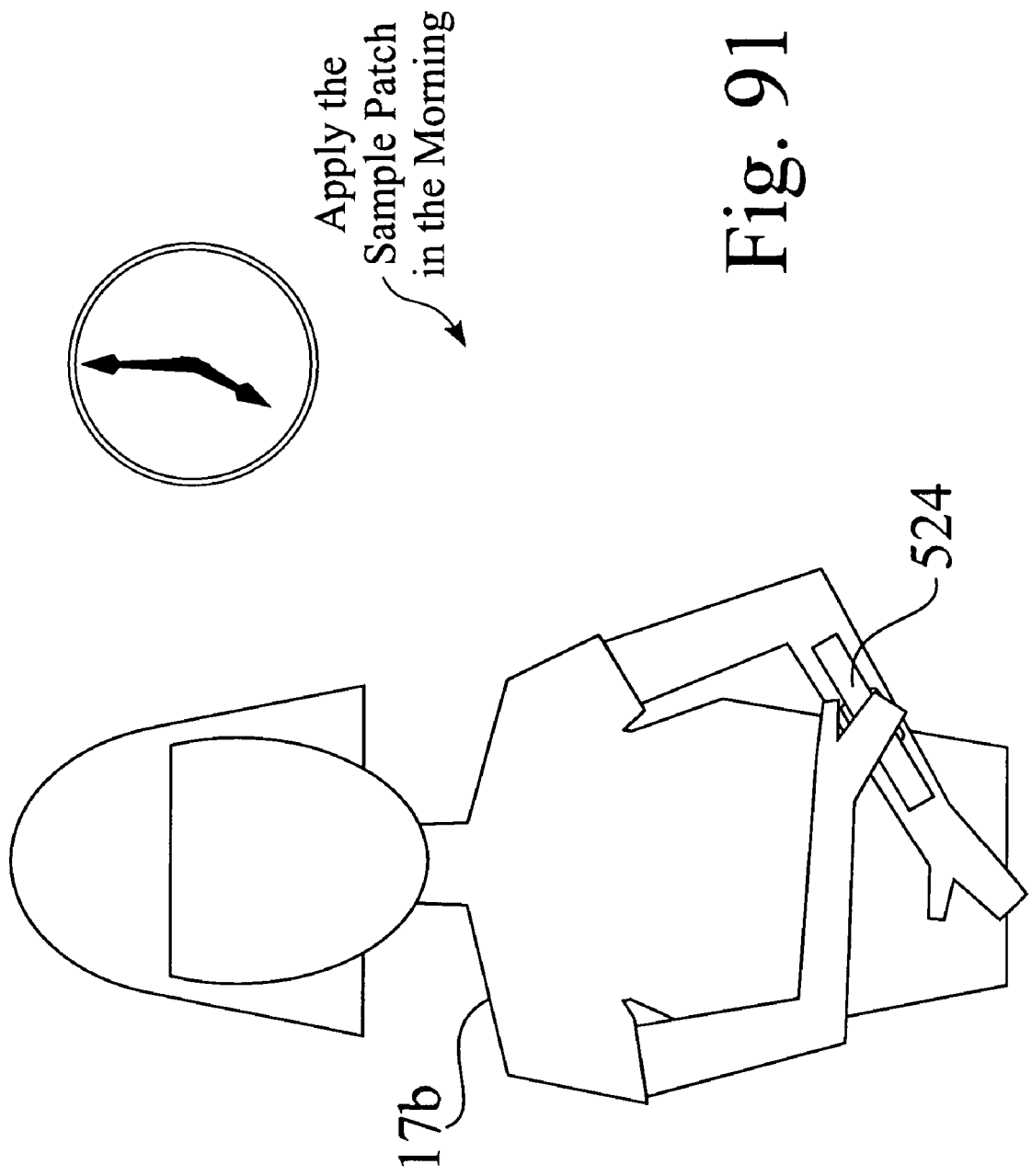

In FIG. 91, the woman applies the patch to her forearm.

Figure 92:
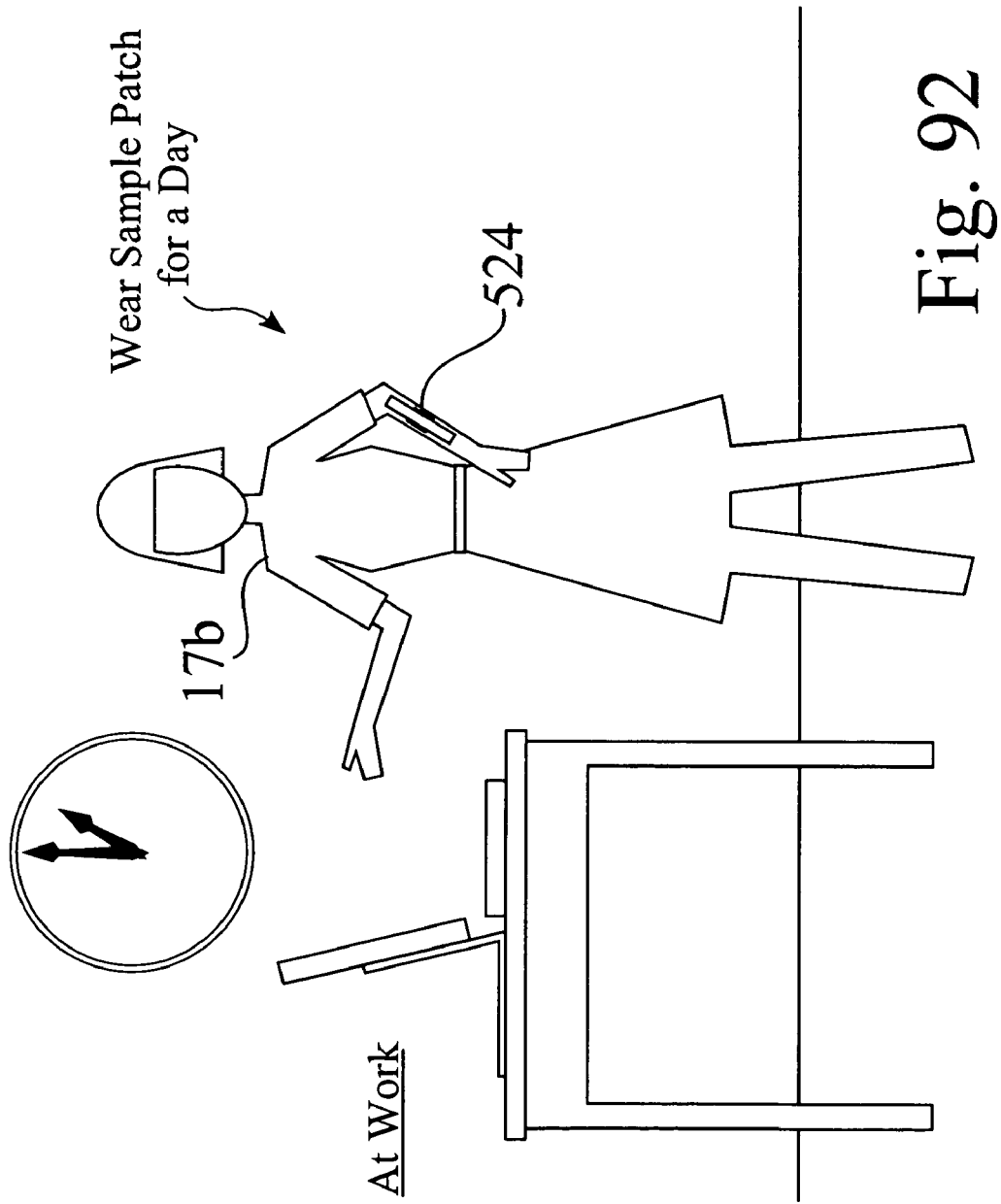

FIG. 92 shows the woman wearing the patch all day.

Figure 93:
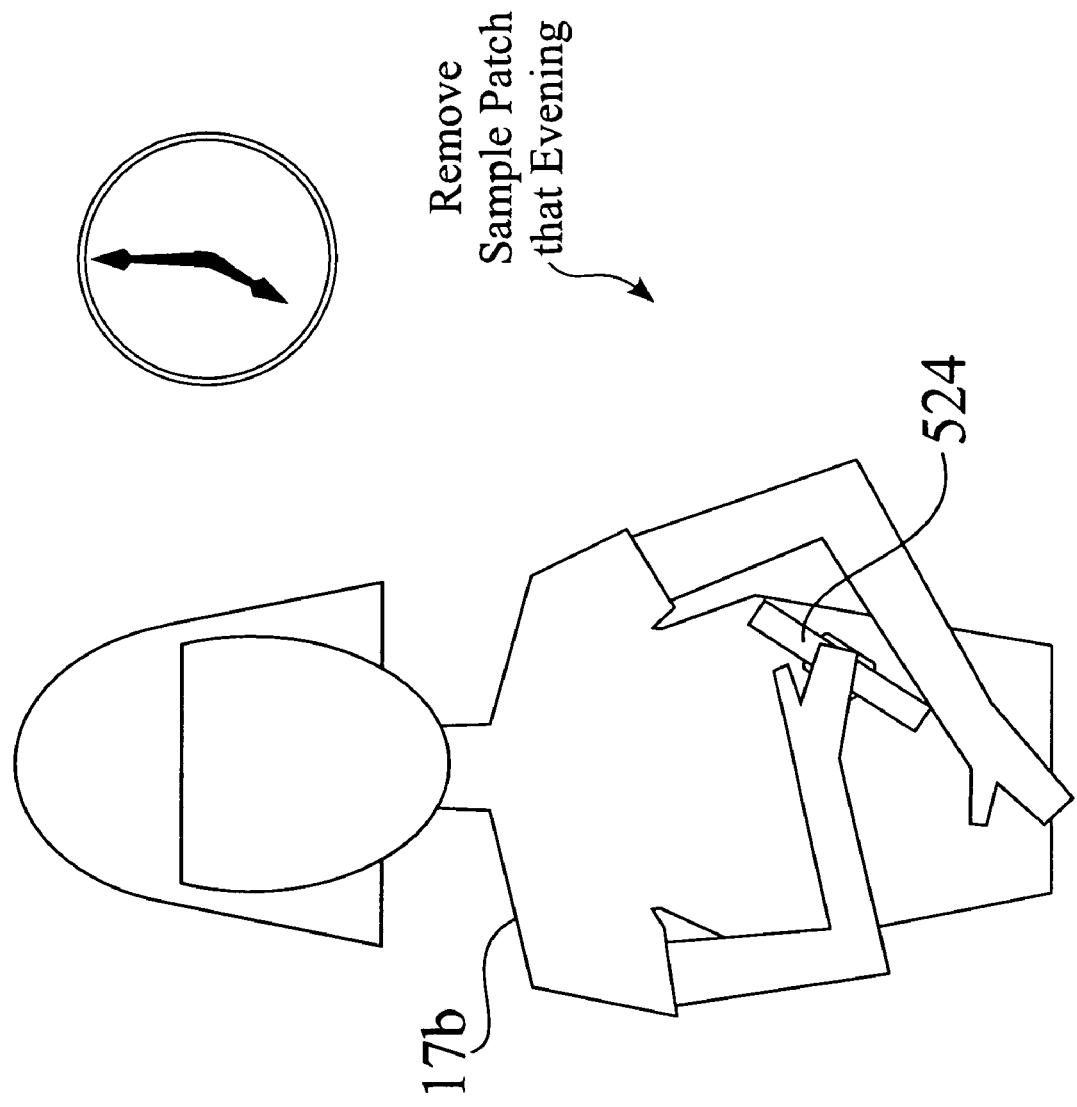

FIG. 93 portrays the woman removing the sample patch from her arm later that evening.

Figure 94:
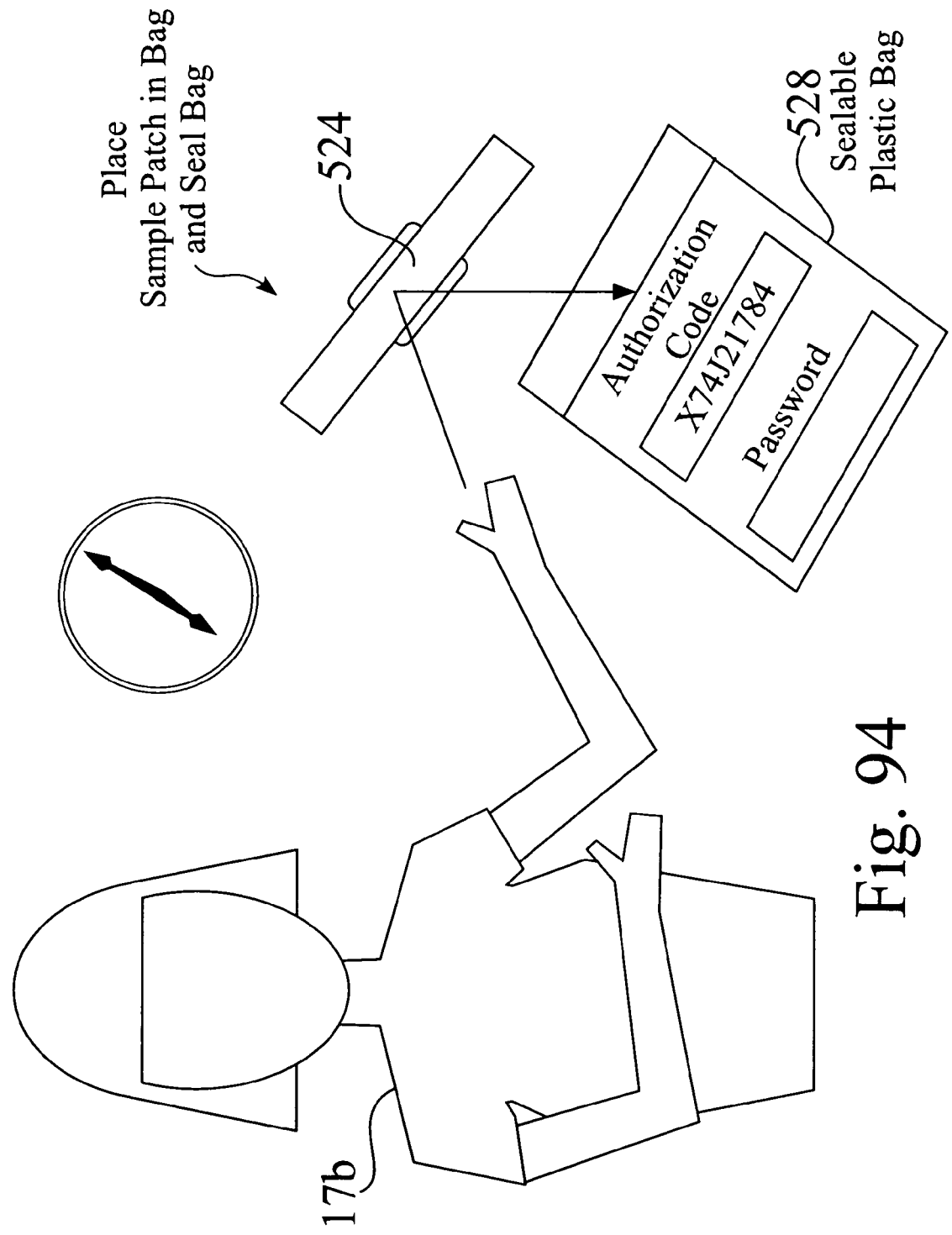

In FIG. 94, the woman places the sample patch that she has worn for a day into the bag, and seals it.

Figure 95:
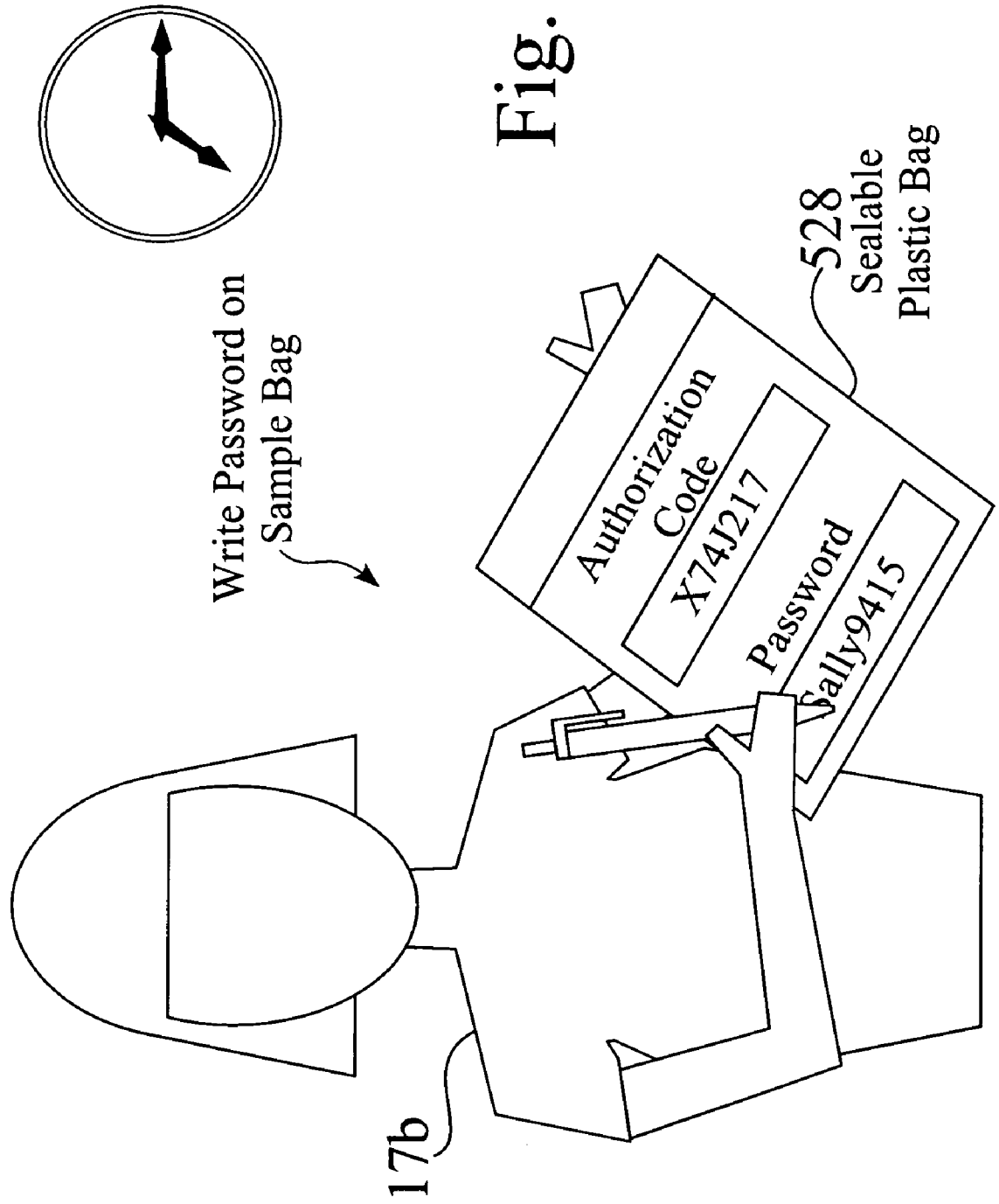

In FIG. 95, the woman writes her password on the sealable bag.

Figure 96:
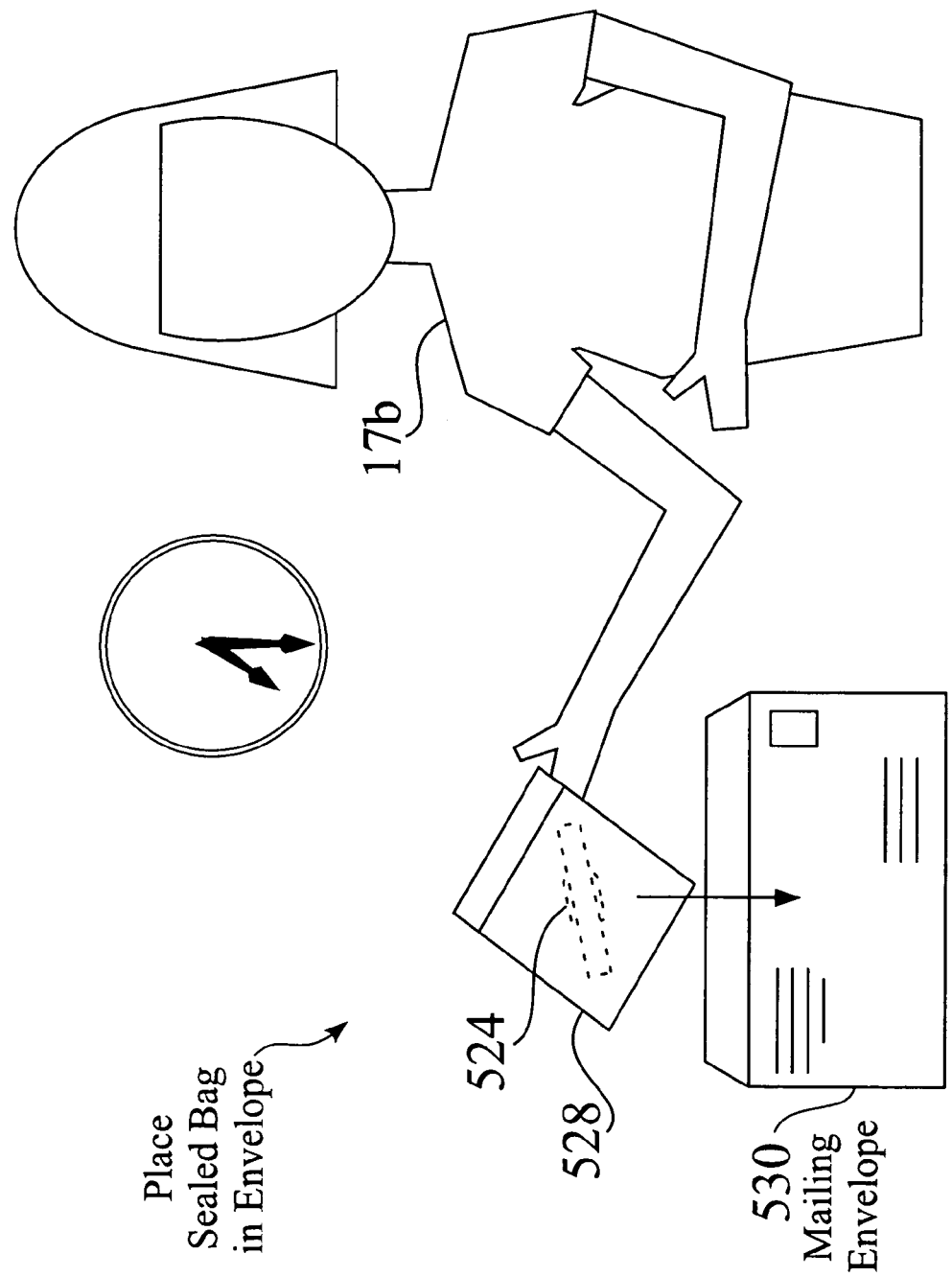

In FIG. 96, the sample that has been sealed in the bag is placed in a mailing envelope.

Figure 97:
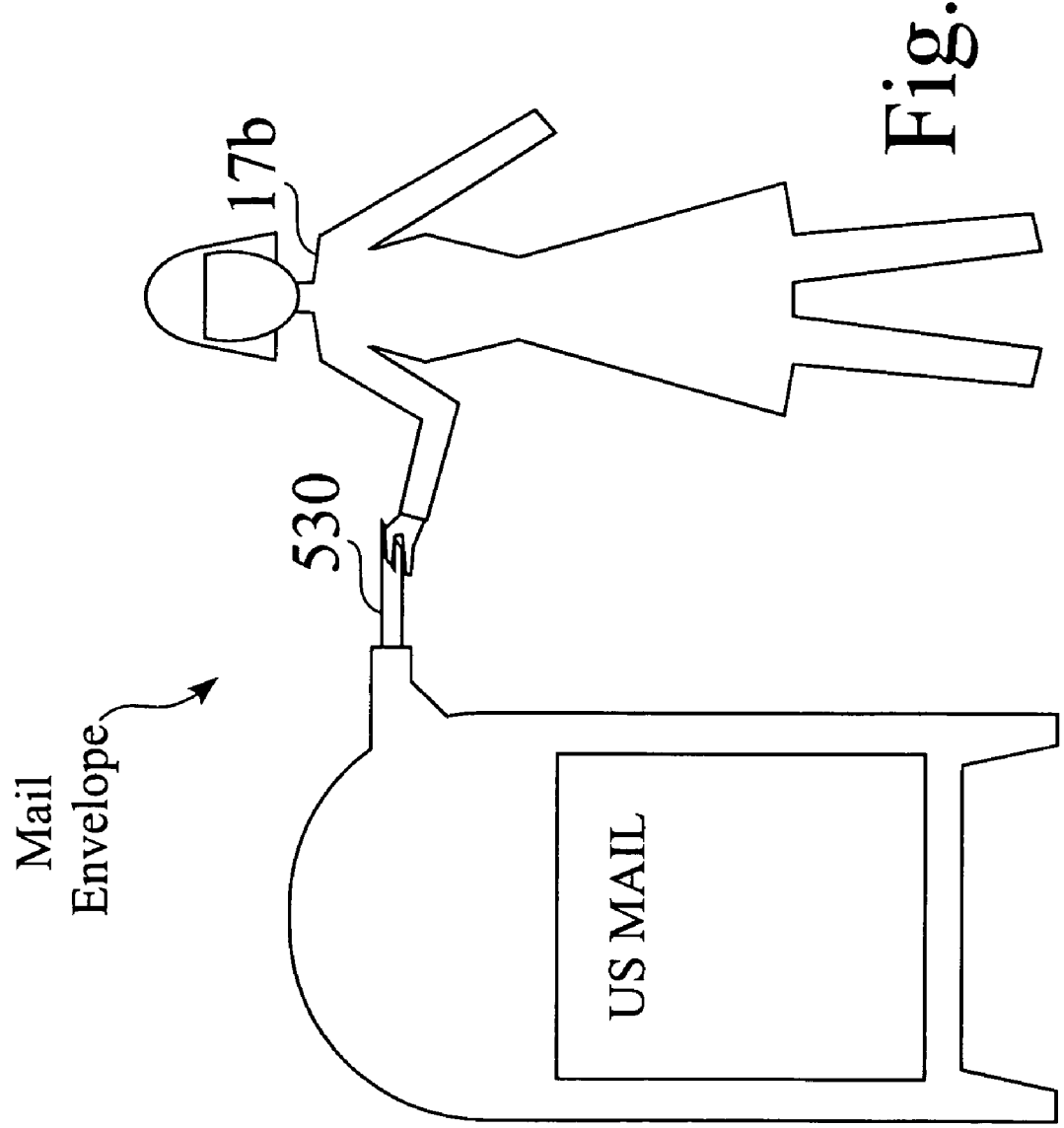

FIG. 97 shows the woman mailing an envelope which contains the bag, which, in turn, contains the worn sample patch.

Figure 98:
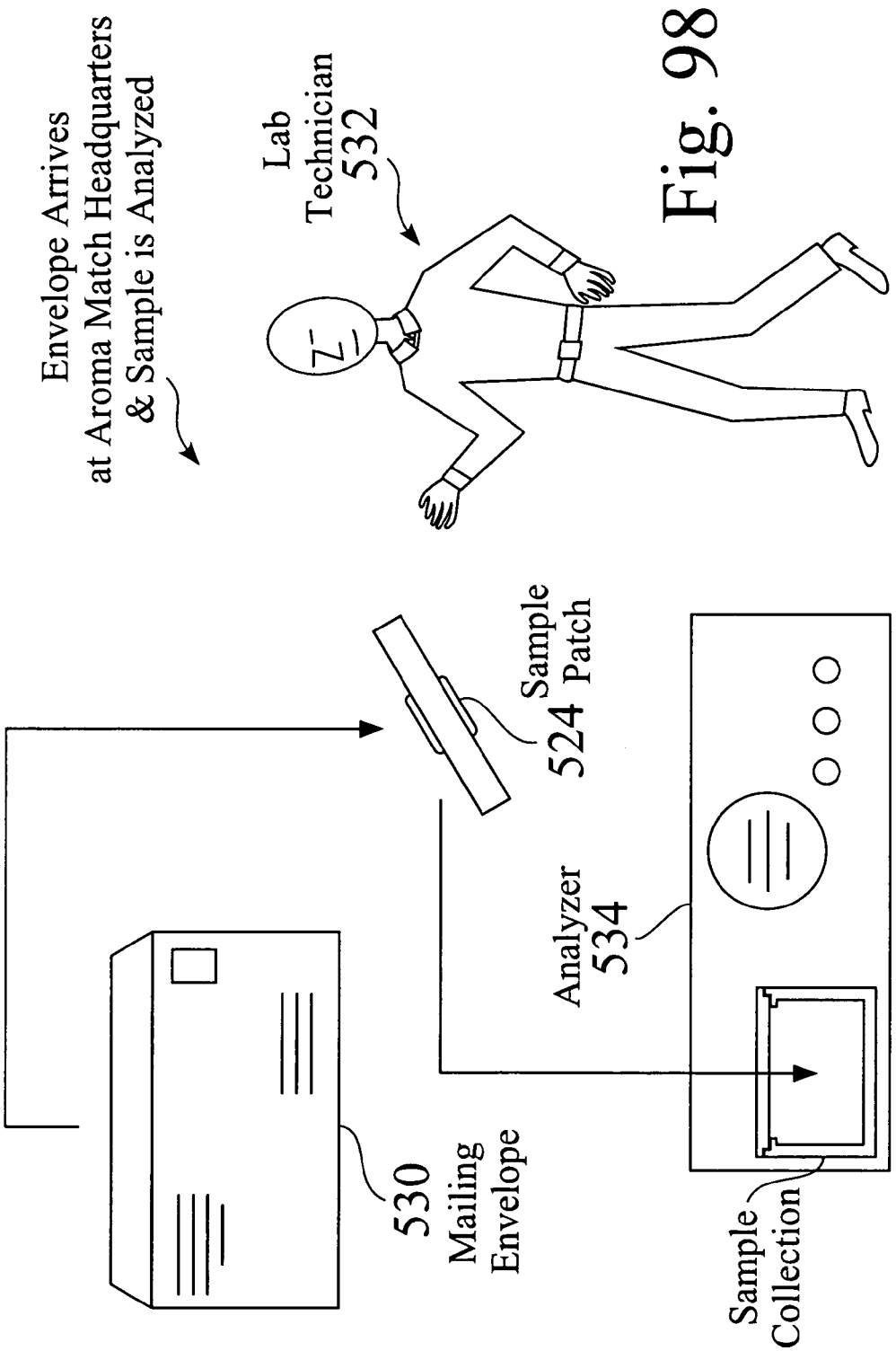

FIG. 98 shows a laboratory technician using an analyzer to determine the genetic attributes of the odor or tissue sample that has been received from the woman depicted in FIG. 97.

Figure 99:
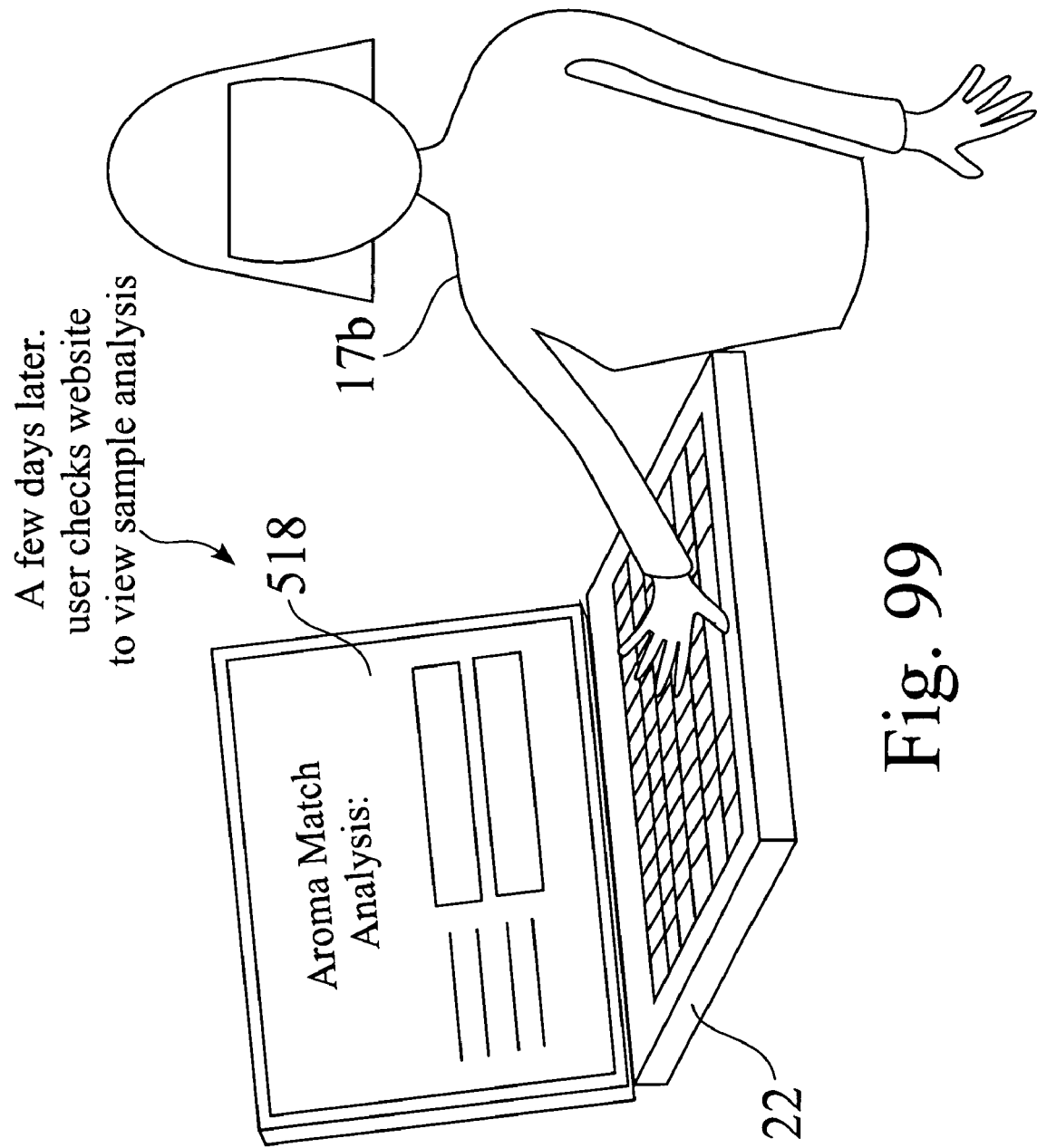

In FIG. 99, the woman uses her computer to visit a website to obtain the results of the laboratory analysis.

Figure 100:
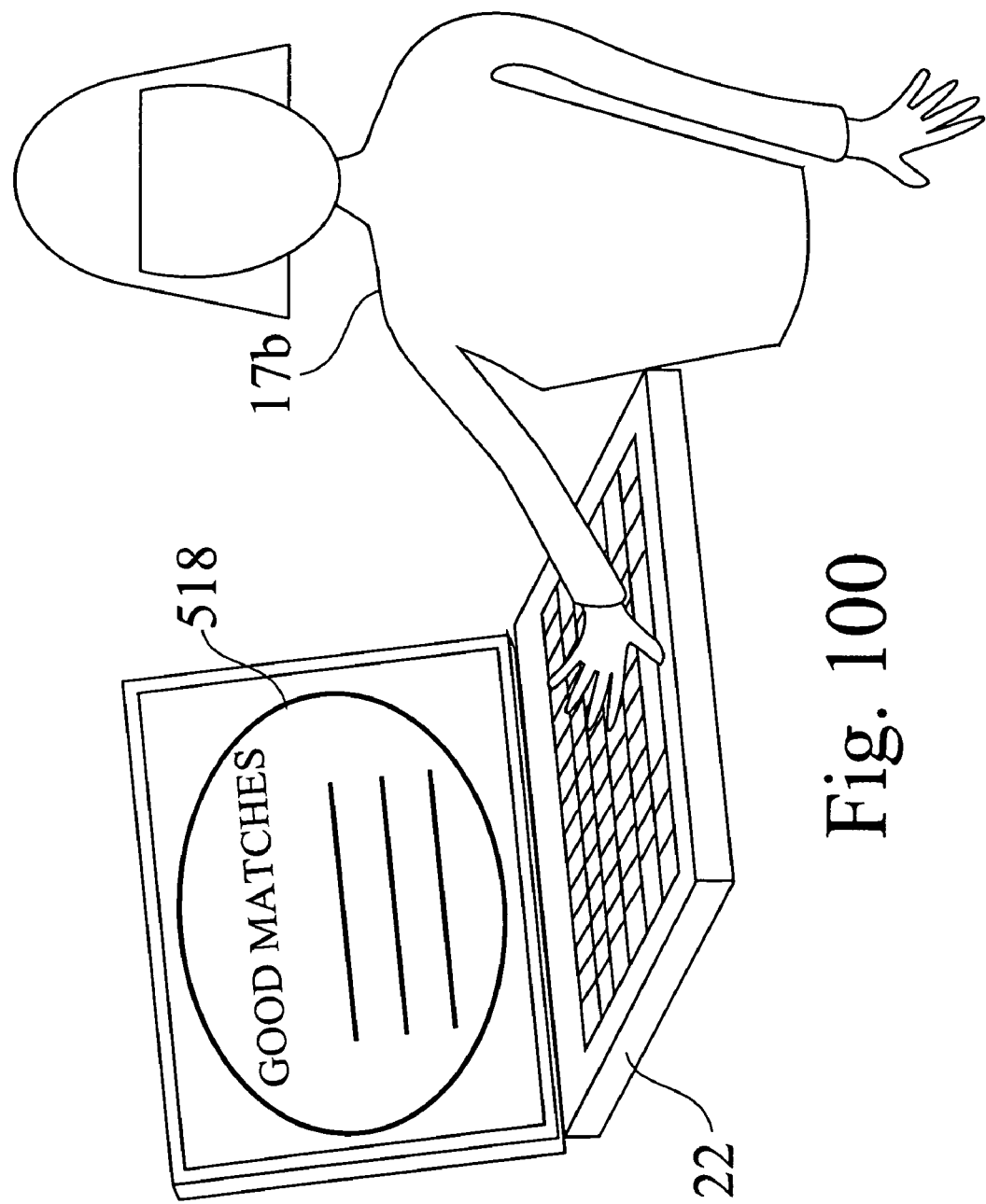

In FIG. 100, the website reports the results of a matching process that has been performed using a library of candidates.

Figure 101:
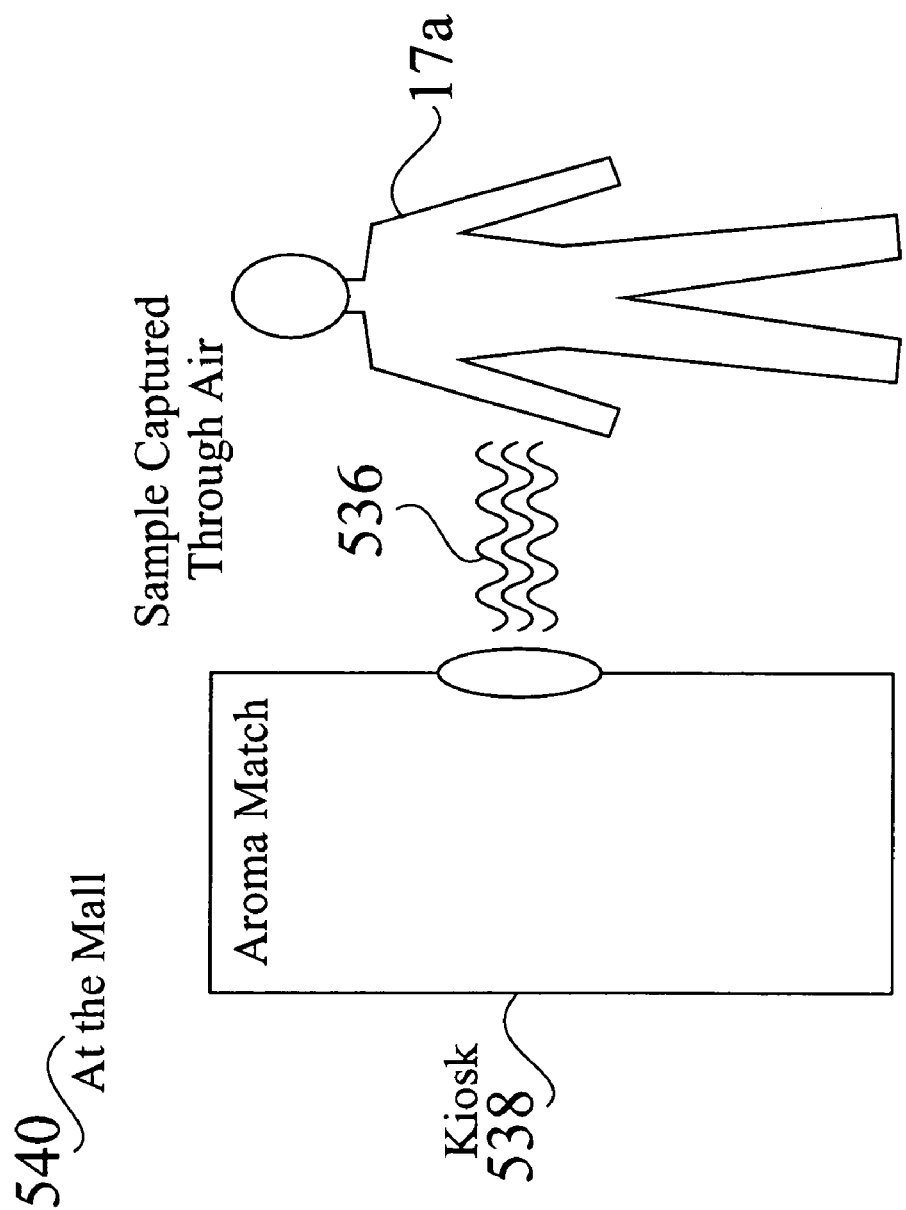

FIG. 101 exhibits an alternative embodiment, which collects a sample directly from the air surrounding a man.

Figure 102:
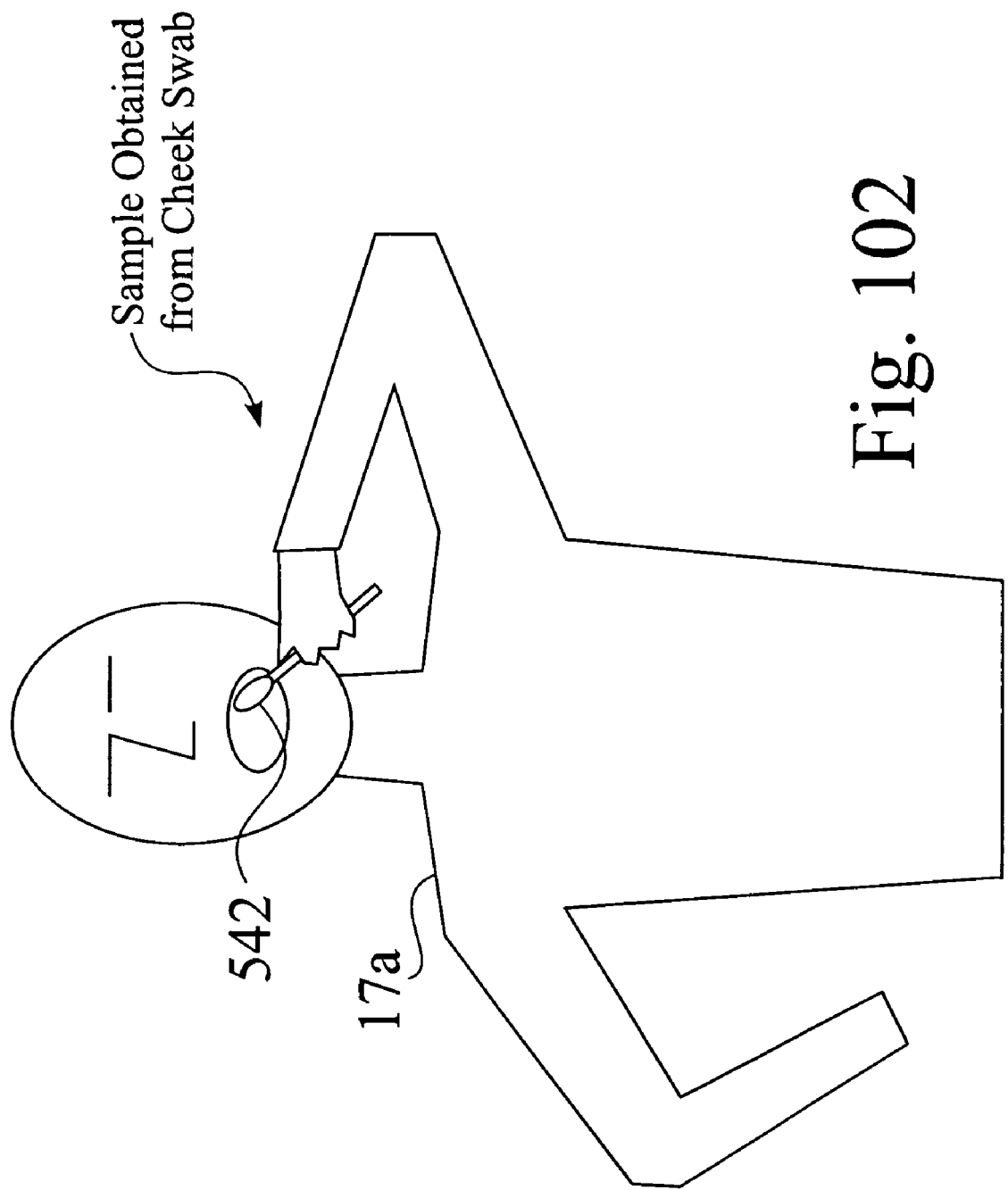

FIG. 102 reveals yet another alternative embodiment, in which a tissue sample is obtained using a cheek swab.

Figure 103:
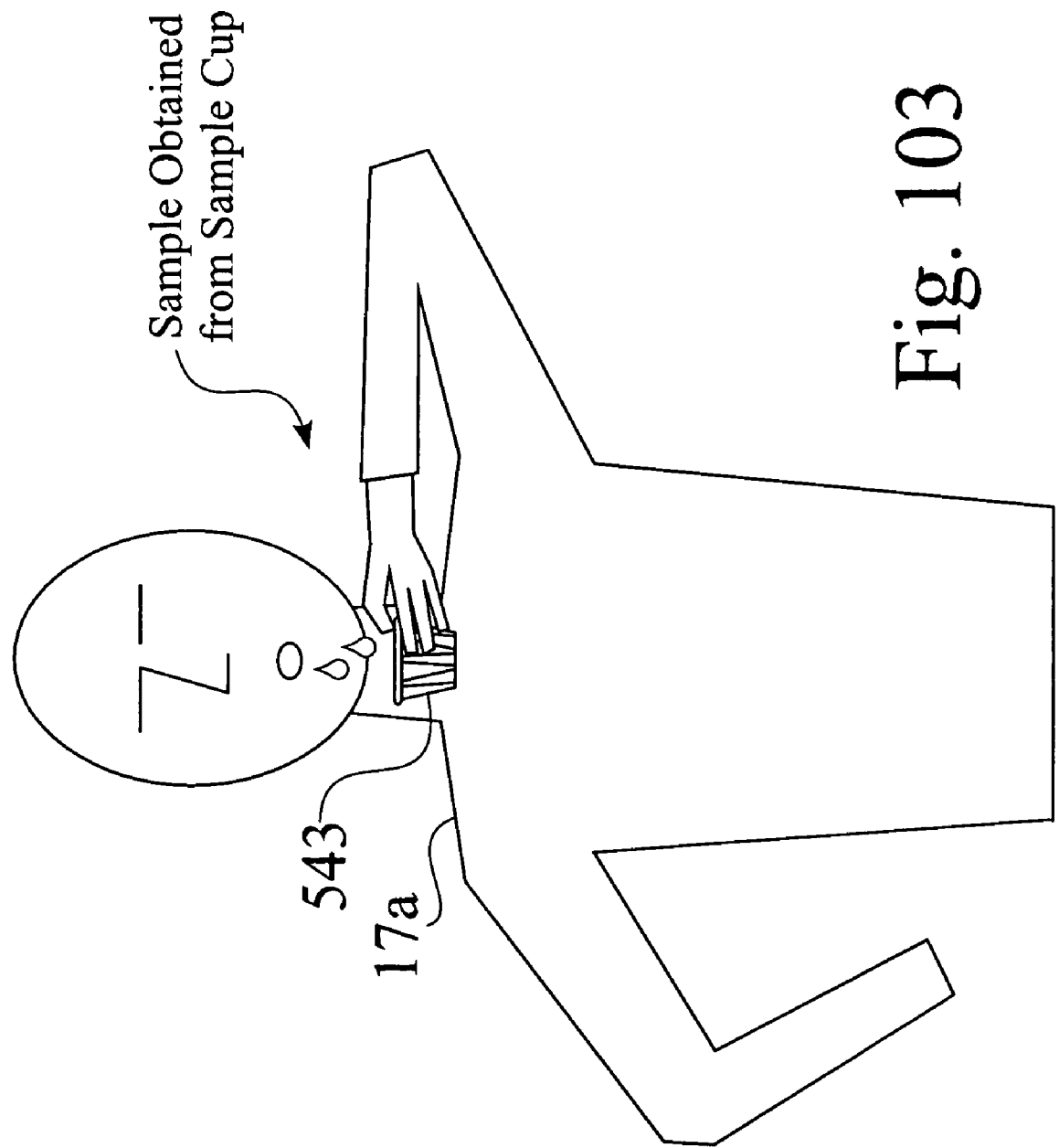

FIG. 103 reveals an embodiment of the invention in which a saliva sample is obtained using a spit cup.

Figure 104:
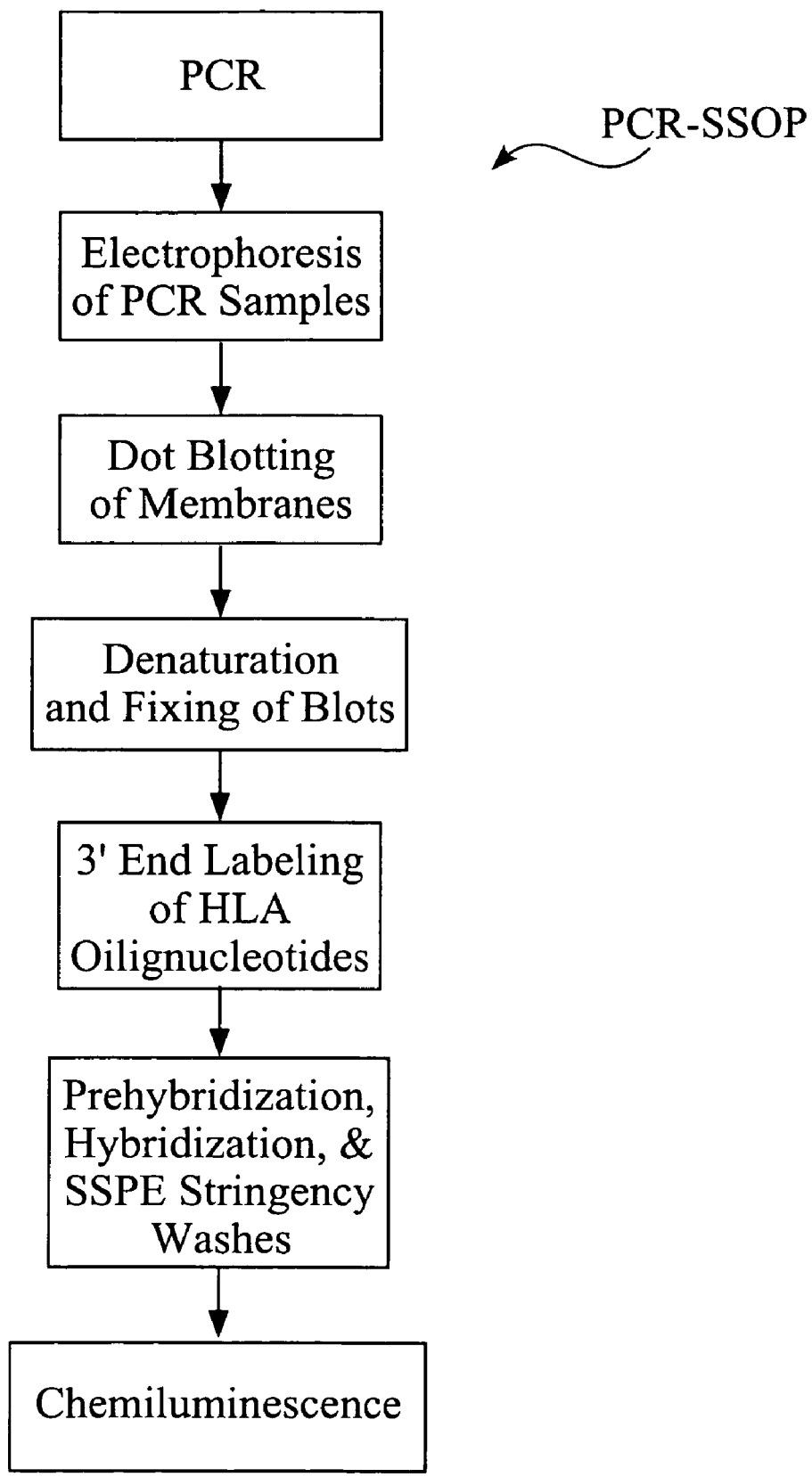

FIG. 104 is a flow-chart that outlines polymerase chain reaction using sequence-specific oligonucleotide probes (PCR-SSOP) processing in some embodiments of the present invention.

Figure 105:
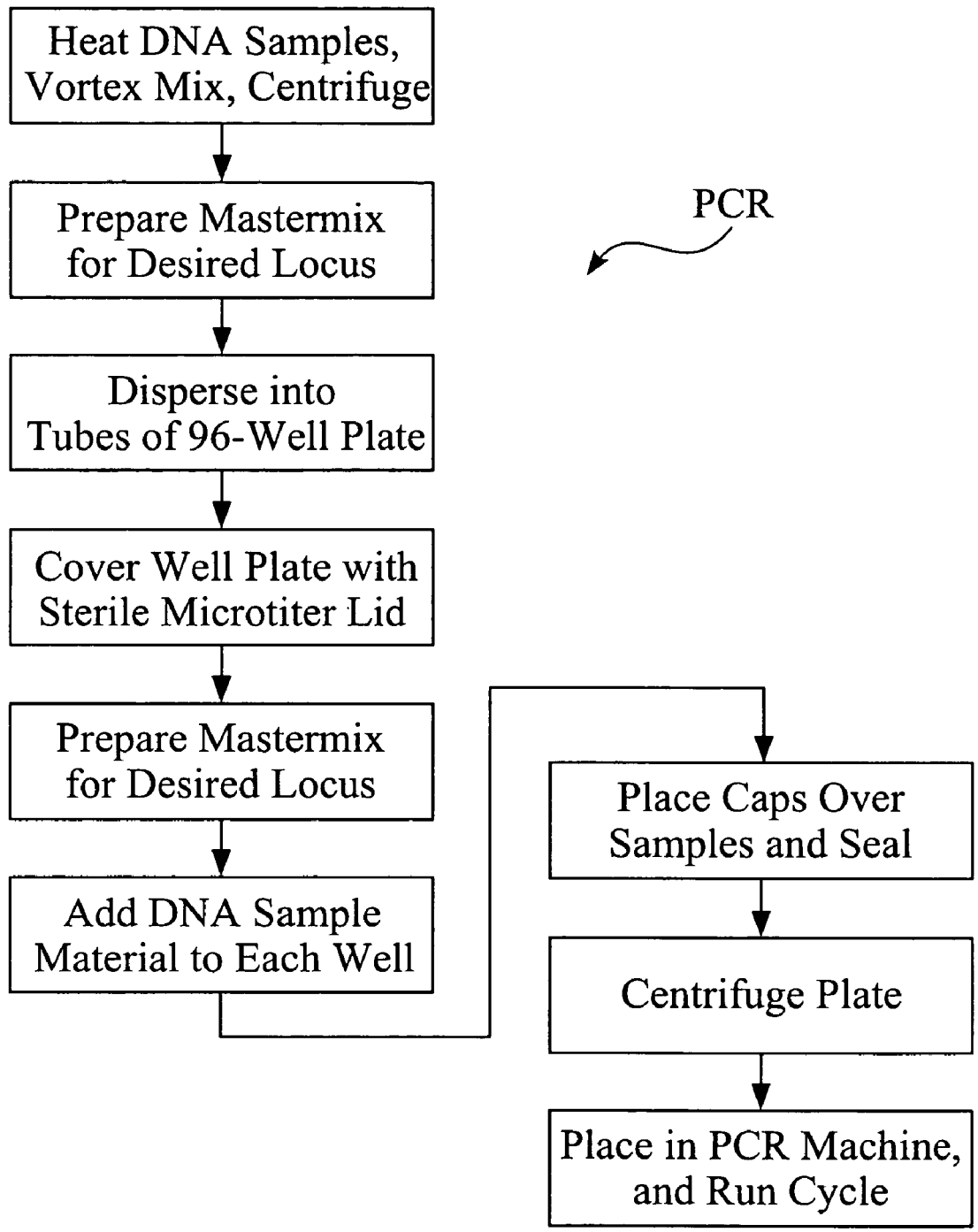

FIG. 105 is a flow-chart PCR methodology for received deoxyribonucleotide (DNA) samples.

Figure 106:
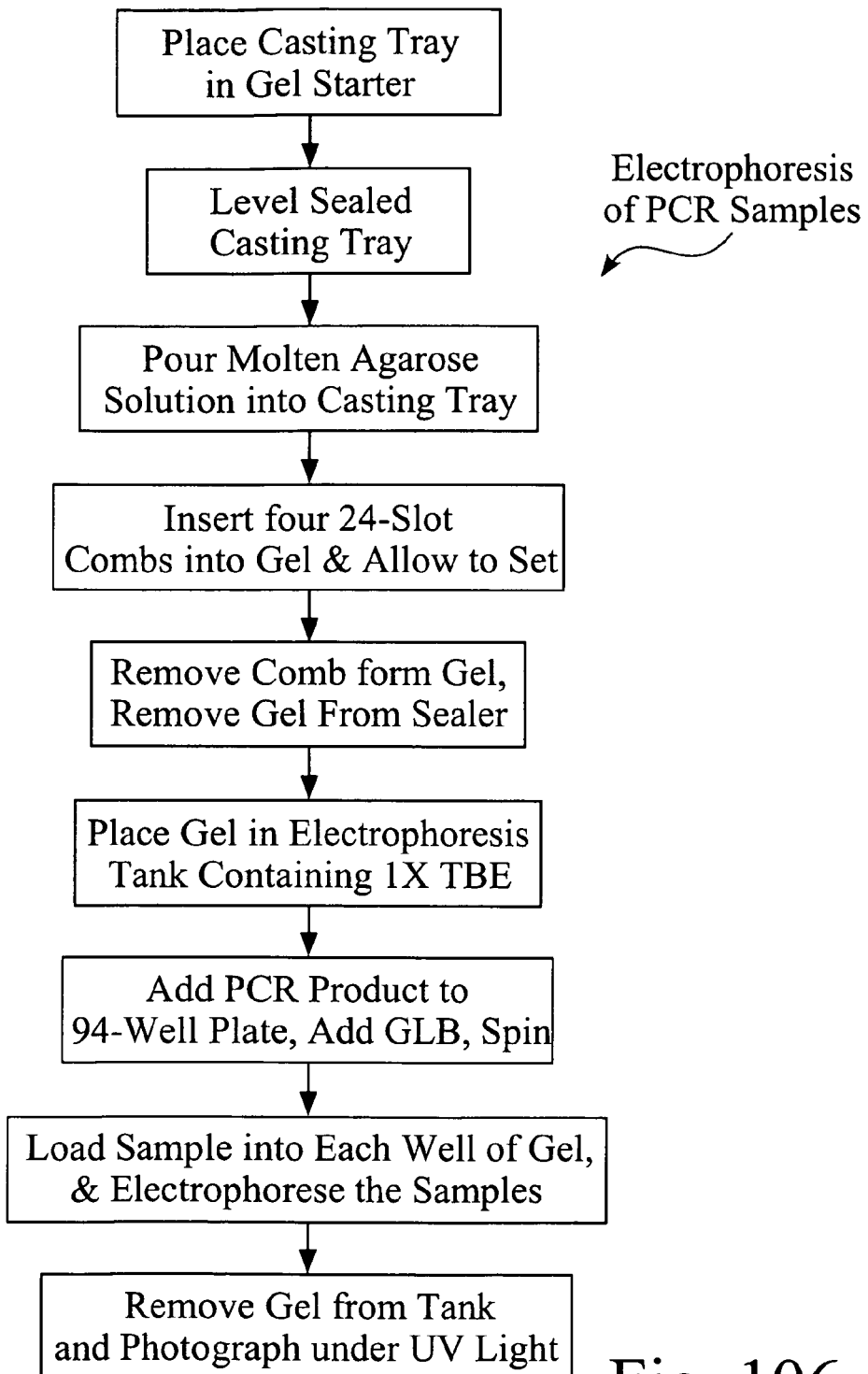

FIG. 106 shows process steps associated with electrophoresis of PCR samples.

Figure 107:
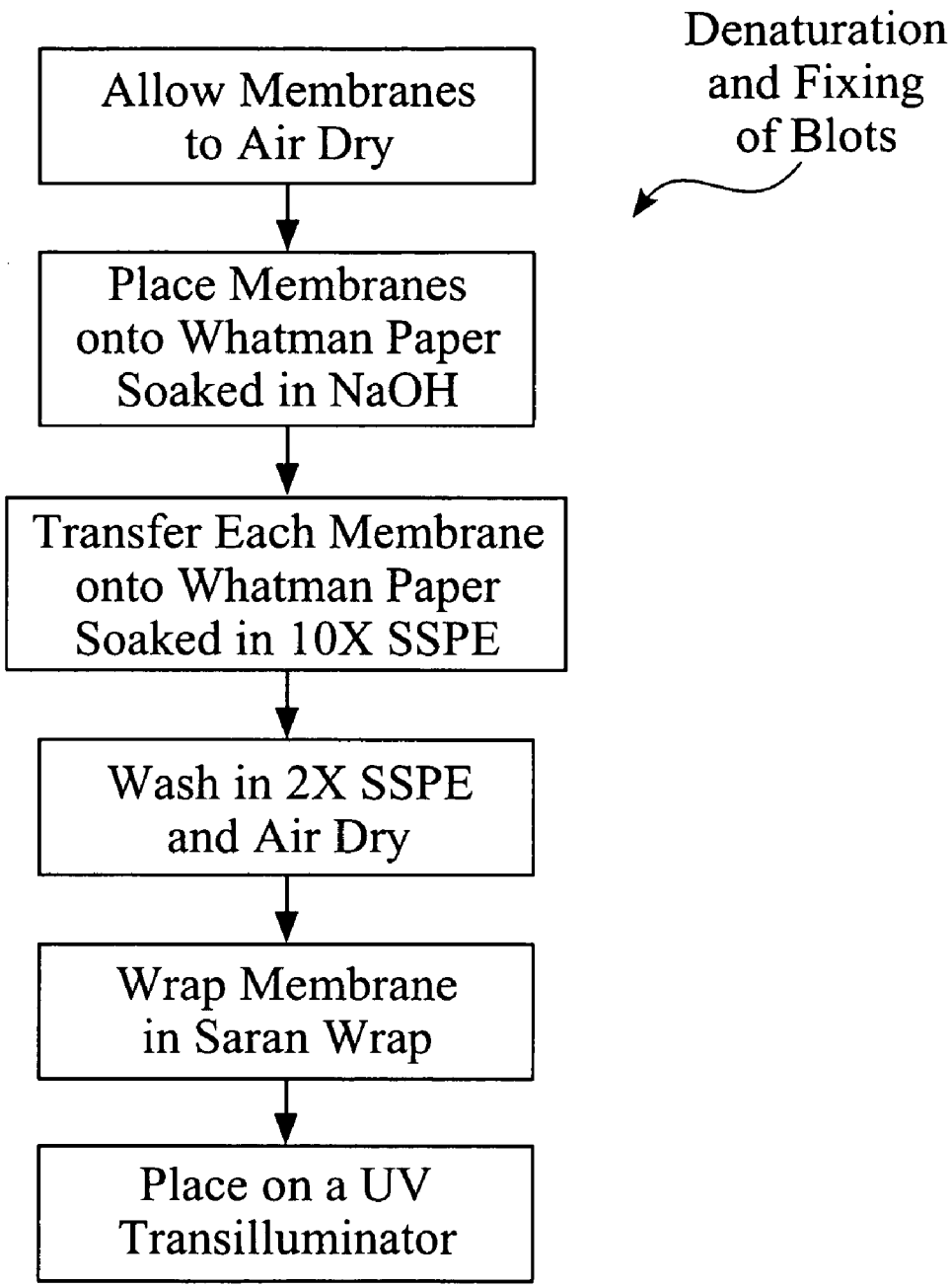

FIG. 107 is a flow-chart that outlines denaturation and fixing of membrane blots.

Figure 108:
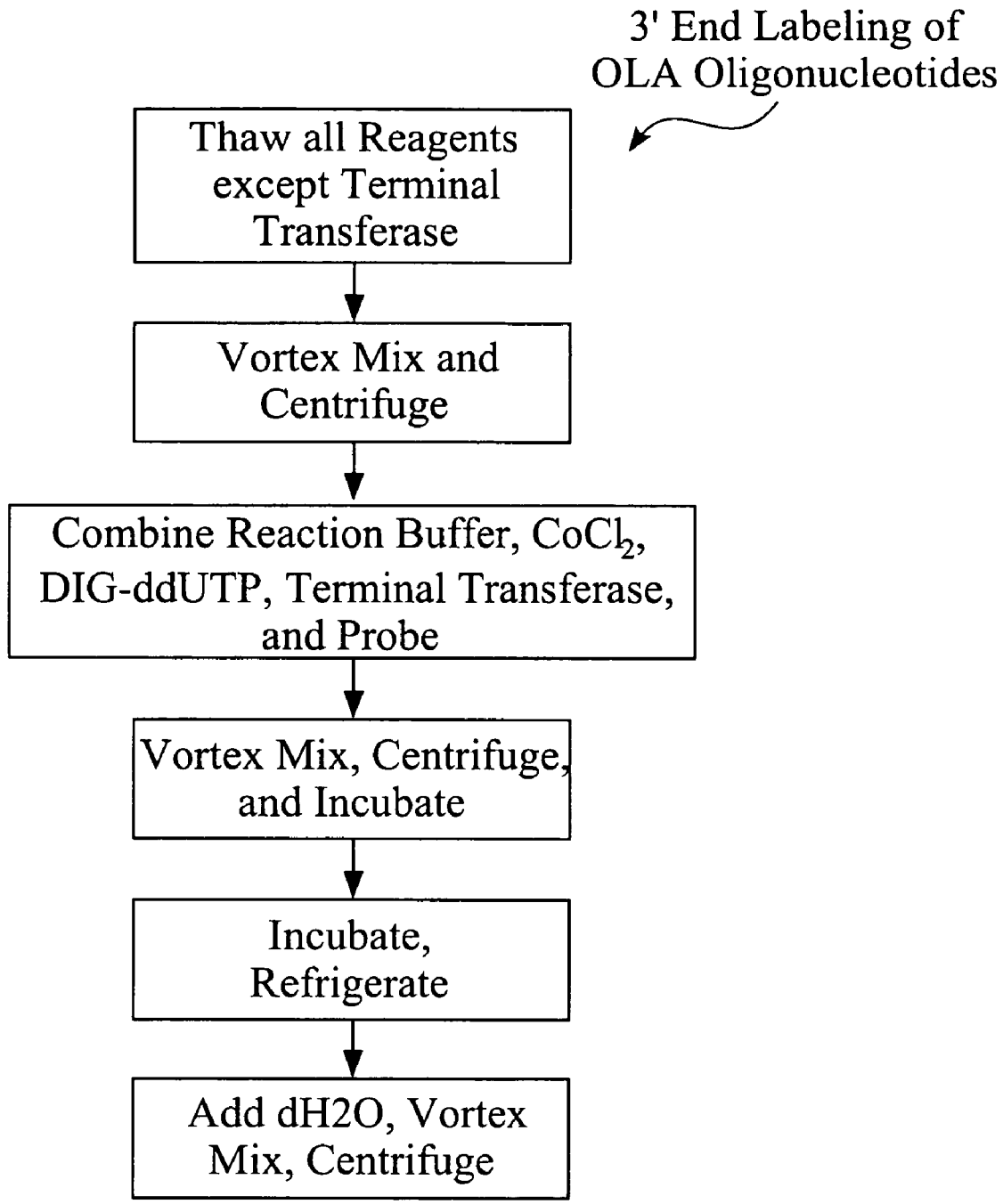

FIG. 108 shows process steps associated with end labeling of HLA oligonucleotides.

Figure 109:
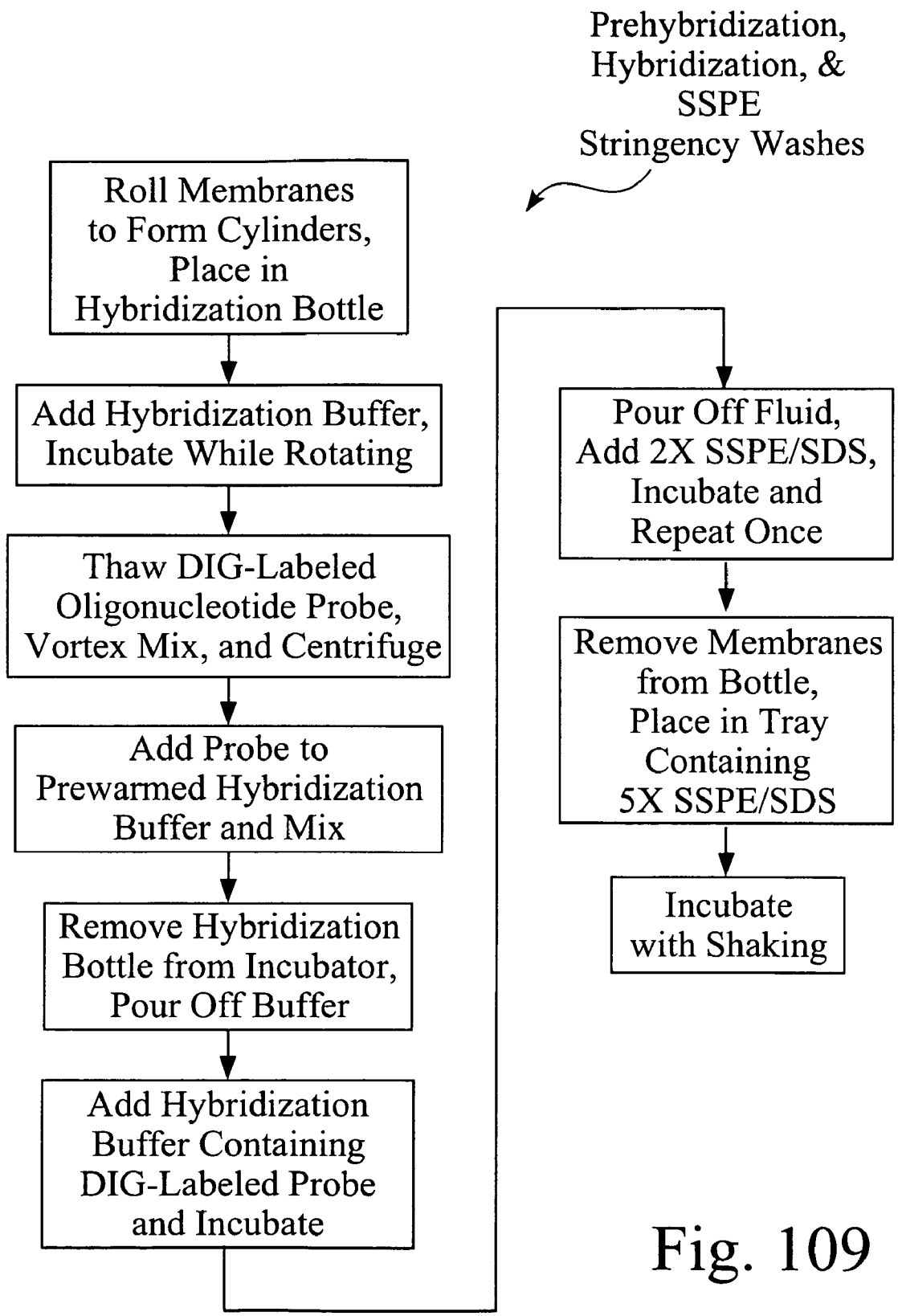

FIG. 109 is a flow-chart showing prehybridization, hybridization and sequence-specific probe eluctation (SSPE) stringency washing of membranes.

Figure 110:
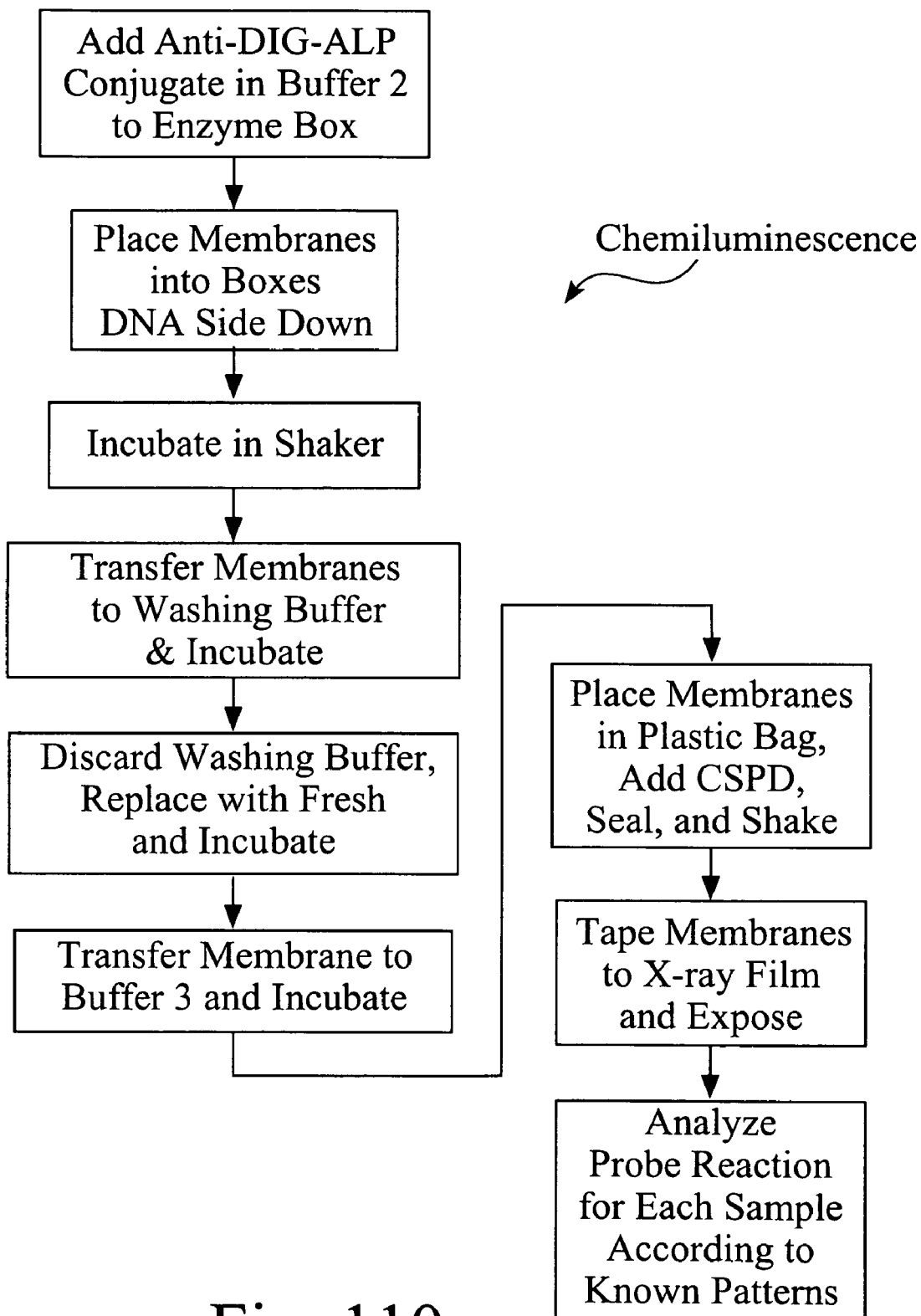

FIG. 110 shows procedures associated with chemiluminescence in some embodiments of the present invention.

Figure 111:
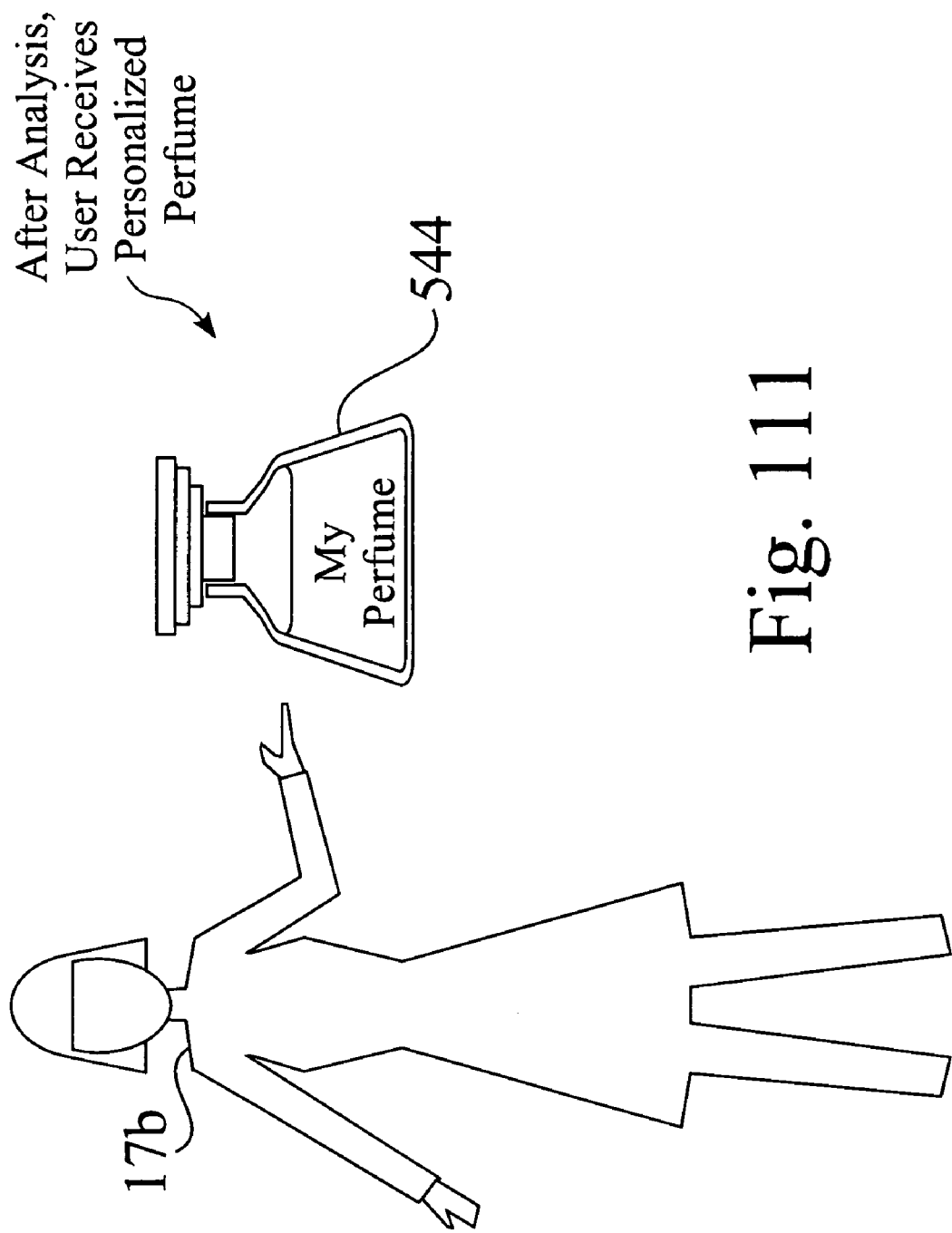

In FIG. 111, a woman whose tissue sample has already been analyzed receives a custom-formulated perfume which contains aromas that are correlated with her genetic attributes.

Figure 112:
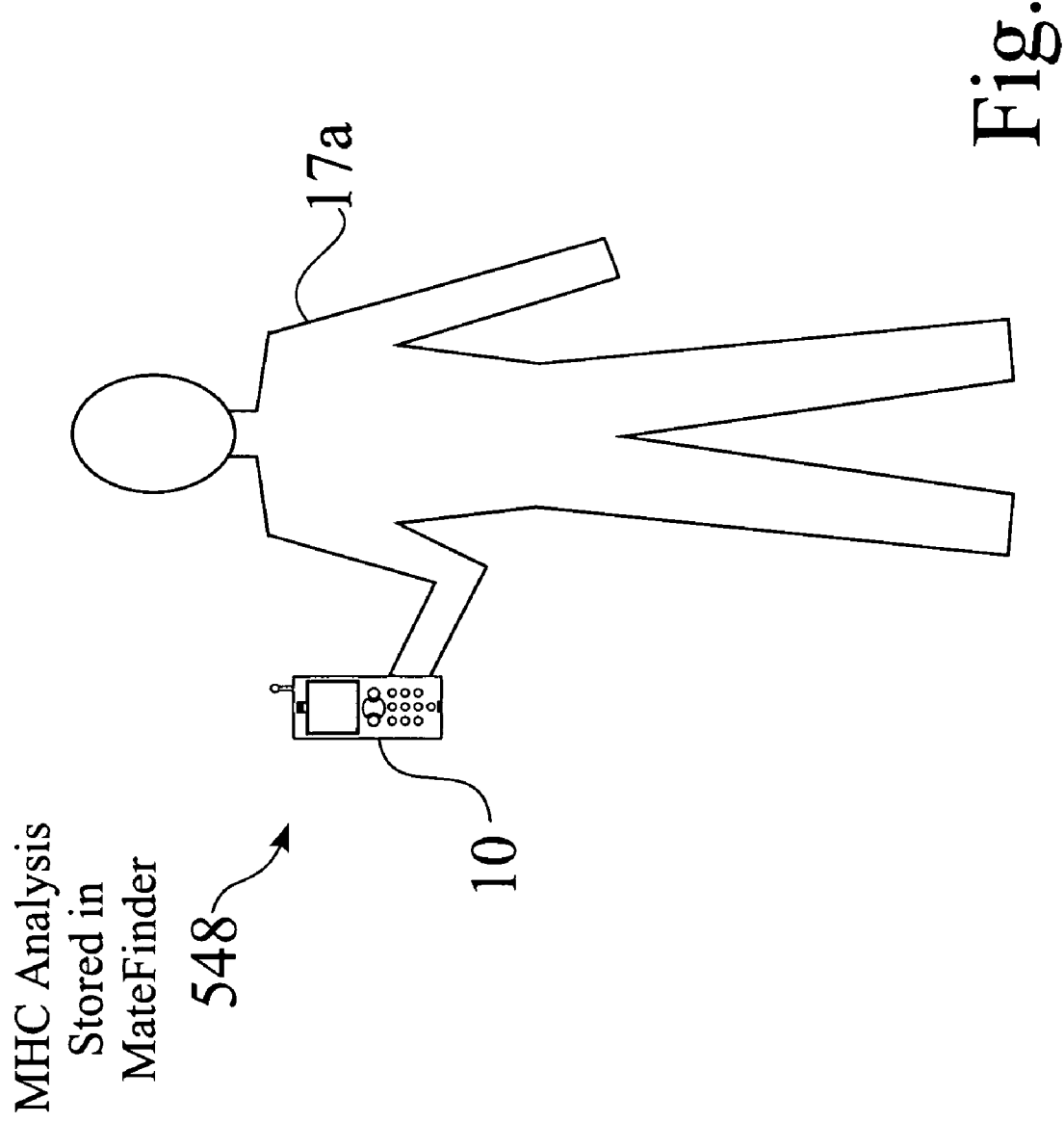

FIG. 112 shows a man using a MateFinder device which has been programmed with his genetic attributes, as determined in accordance with the present invention.

Figure 113:
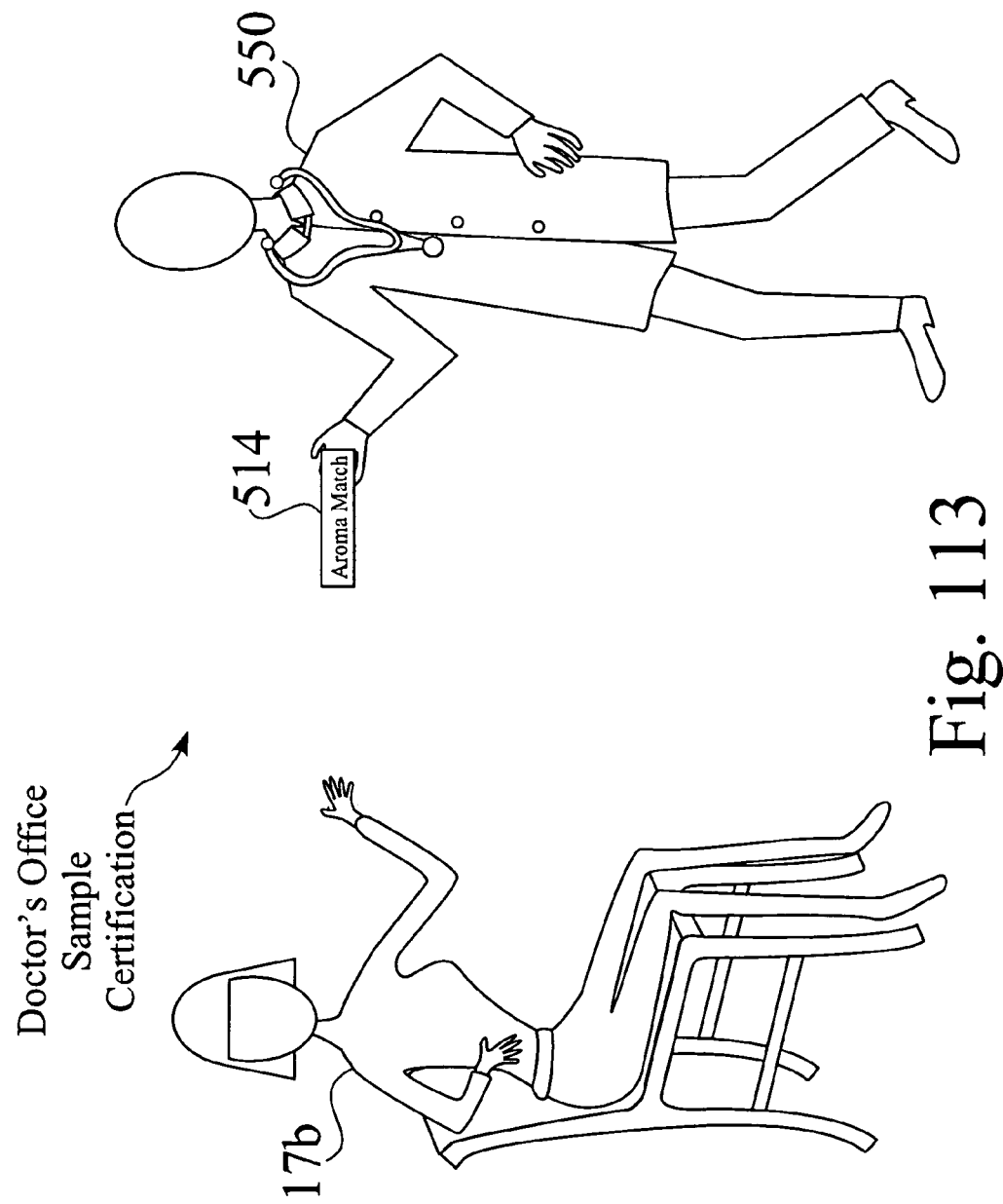

FIG. 113 shows a woman visiting a doctor's office or an independent laboratory to provide a tissue sample, which is then certified by the doctor or laboratory technician before it is submitted for analytic comparison.

Figure 114:
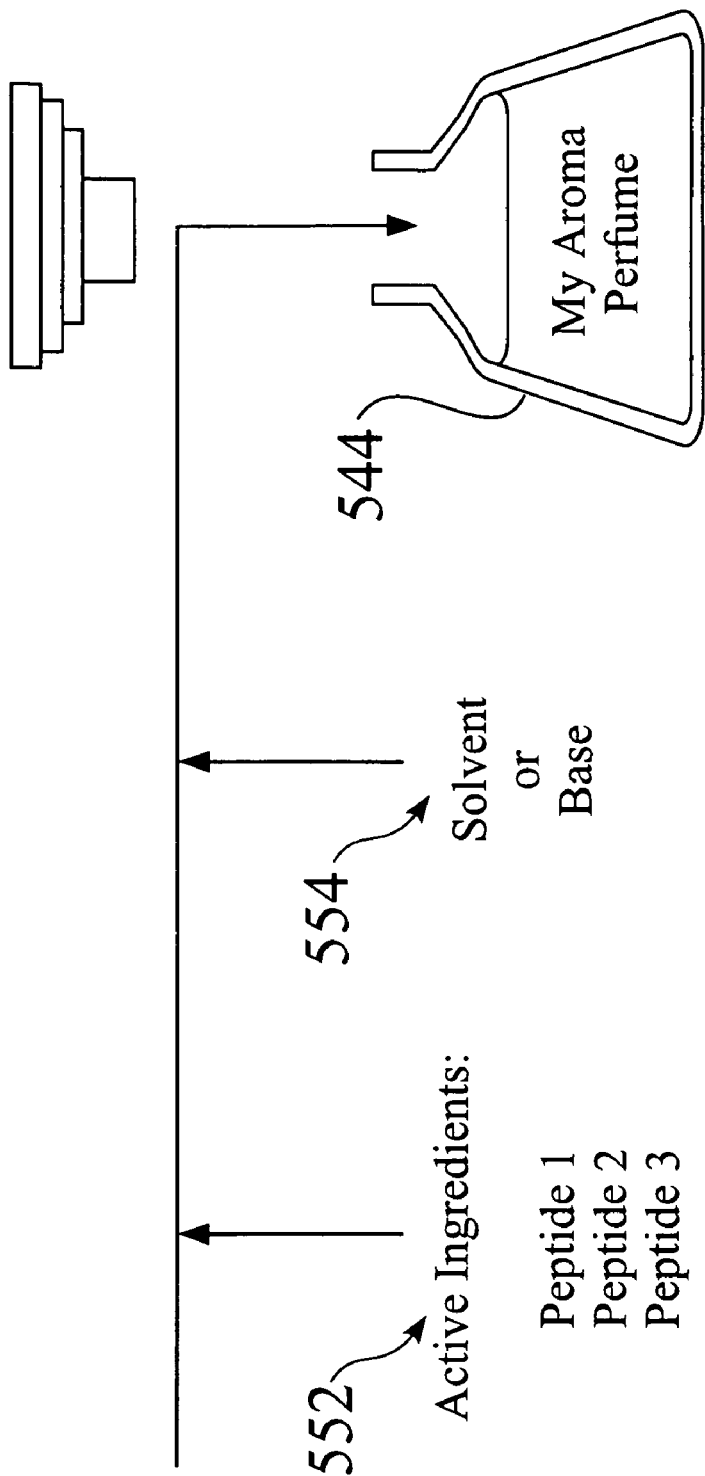

FIG. 114 depicts a method of manufacturing a customized perfume.

Figure 114A:
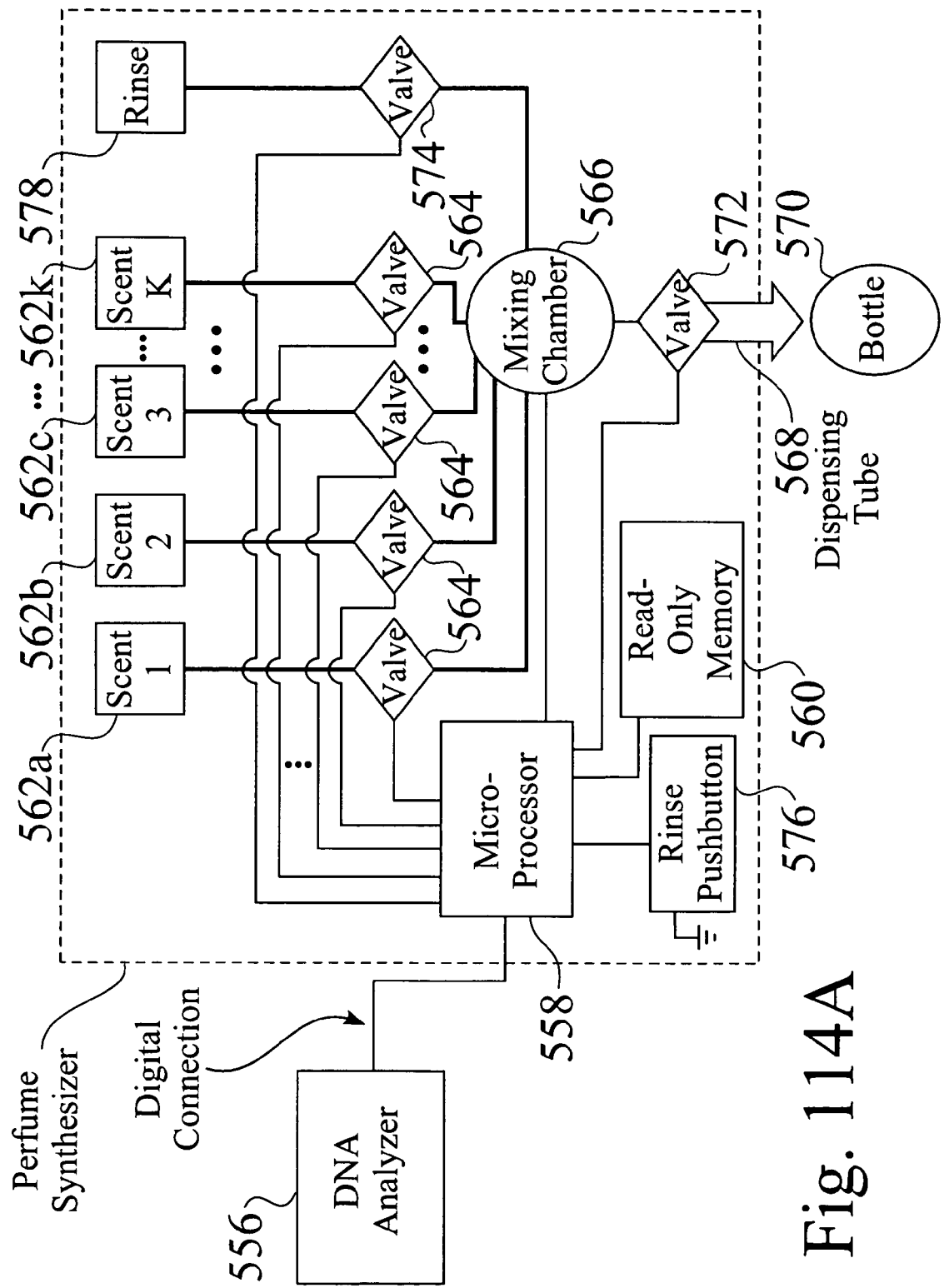

FIG. 114A depicts a method of automatically manufacturing a customized perfume based on a genetic profile of a customer which is obtained from a point-of-sale analysis of a customer's DNA sample.

Figure 114B:
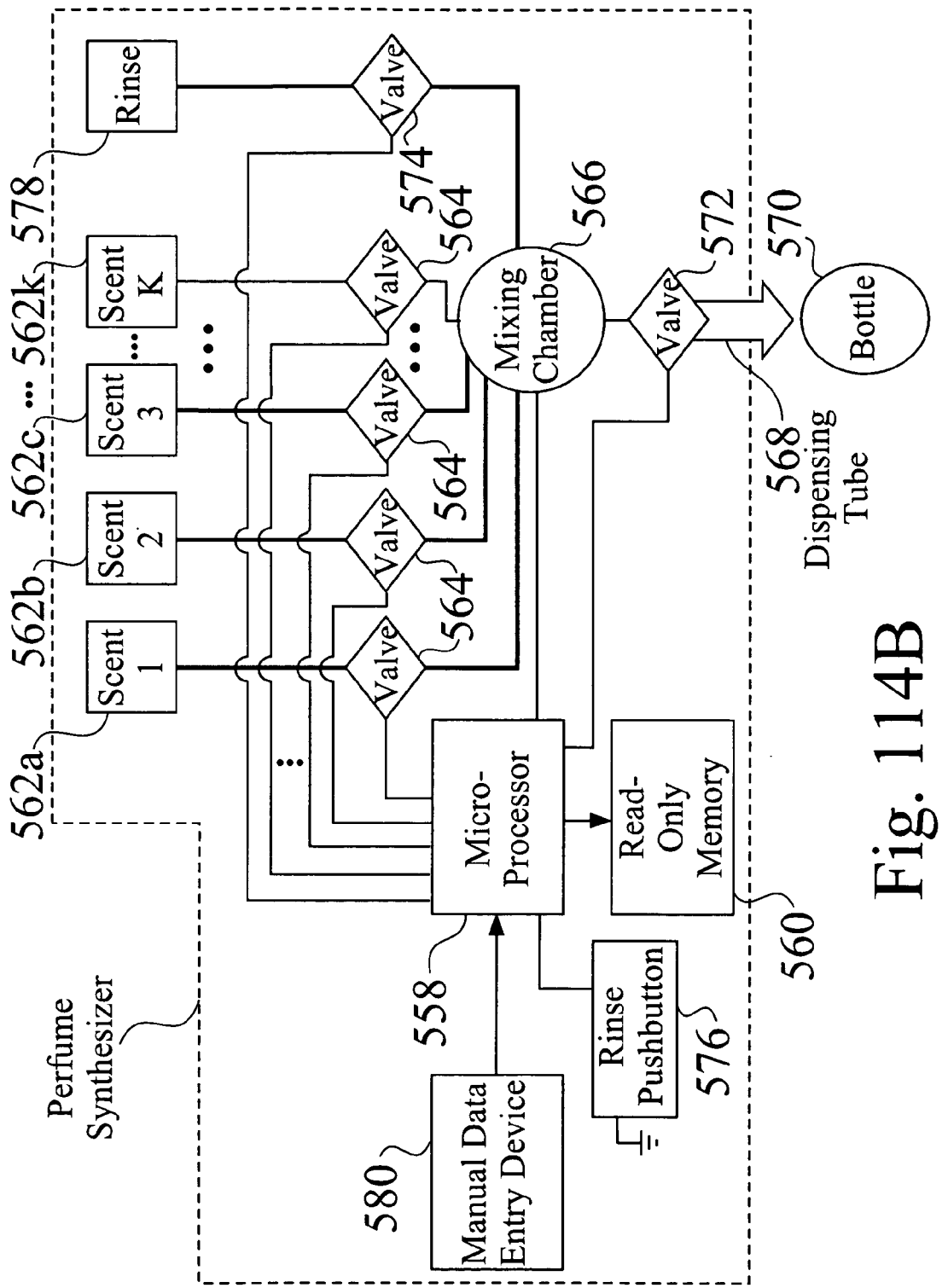

FIG. 114B depicts a method of manufacturing a perfume at the point of sale based on the manually entered genetic profile of the customer.

Figure 115:
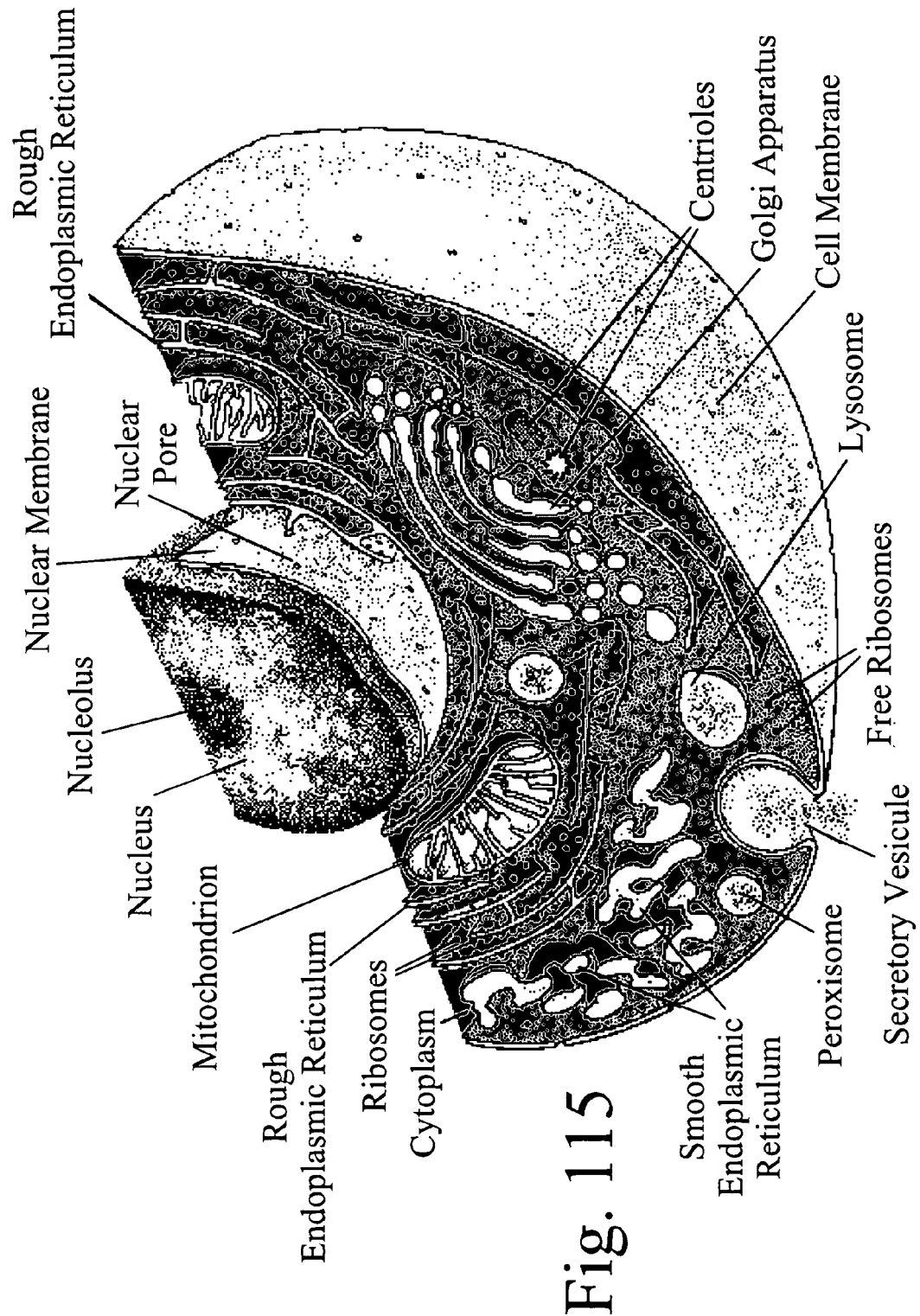

FIG. 115 depicts a cell.

Figure 116:
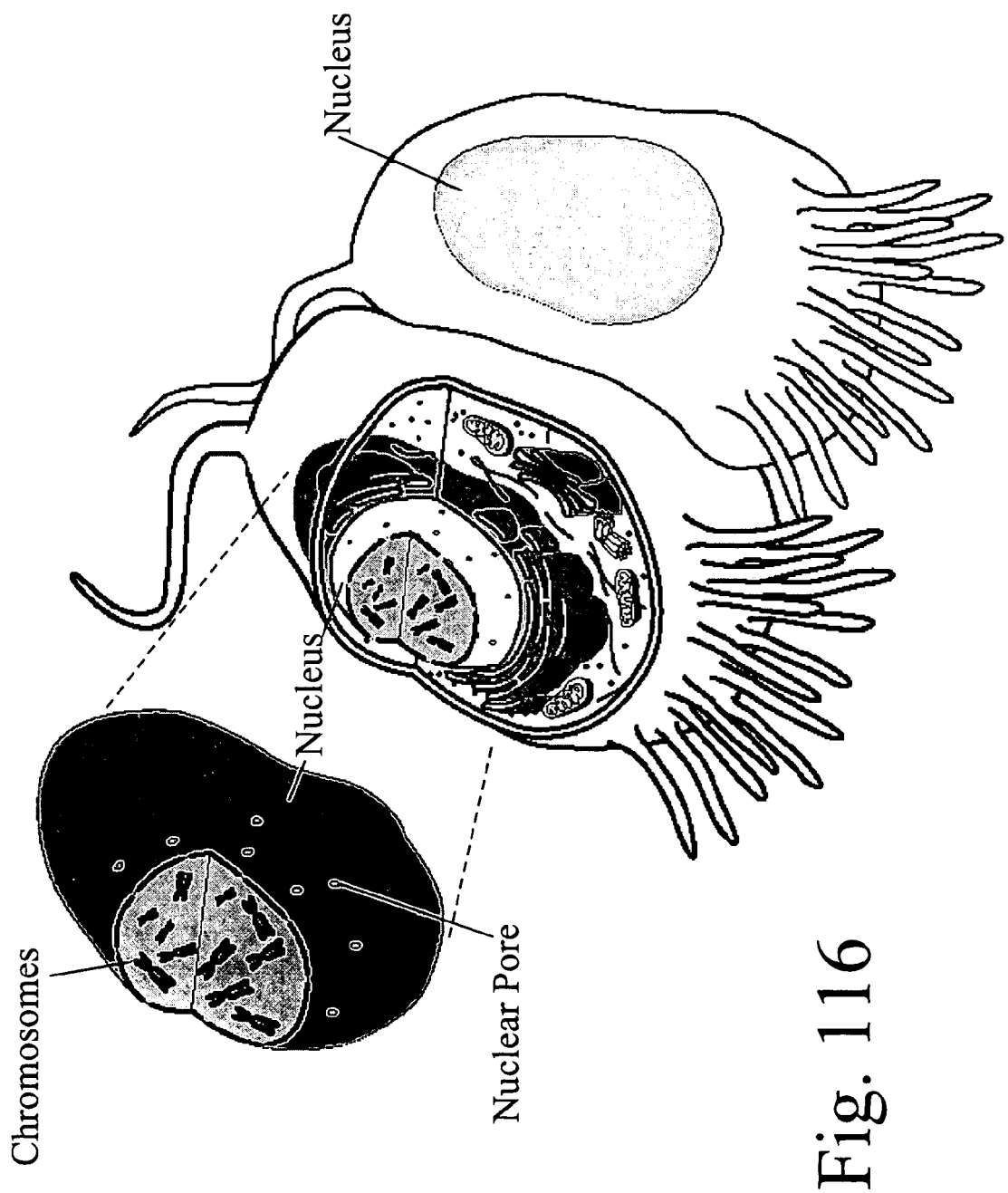

FIG. 116 illustrates a nucleus in a cell.

Figure 117:
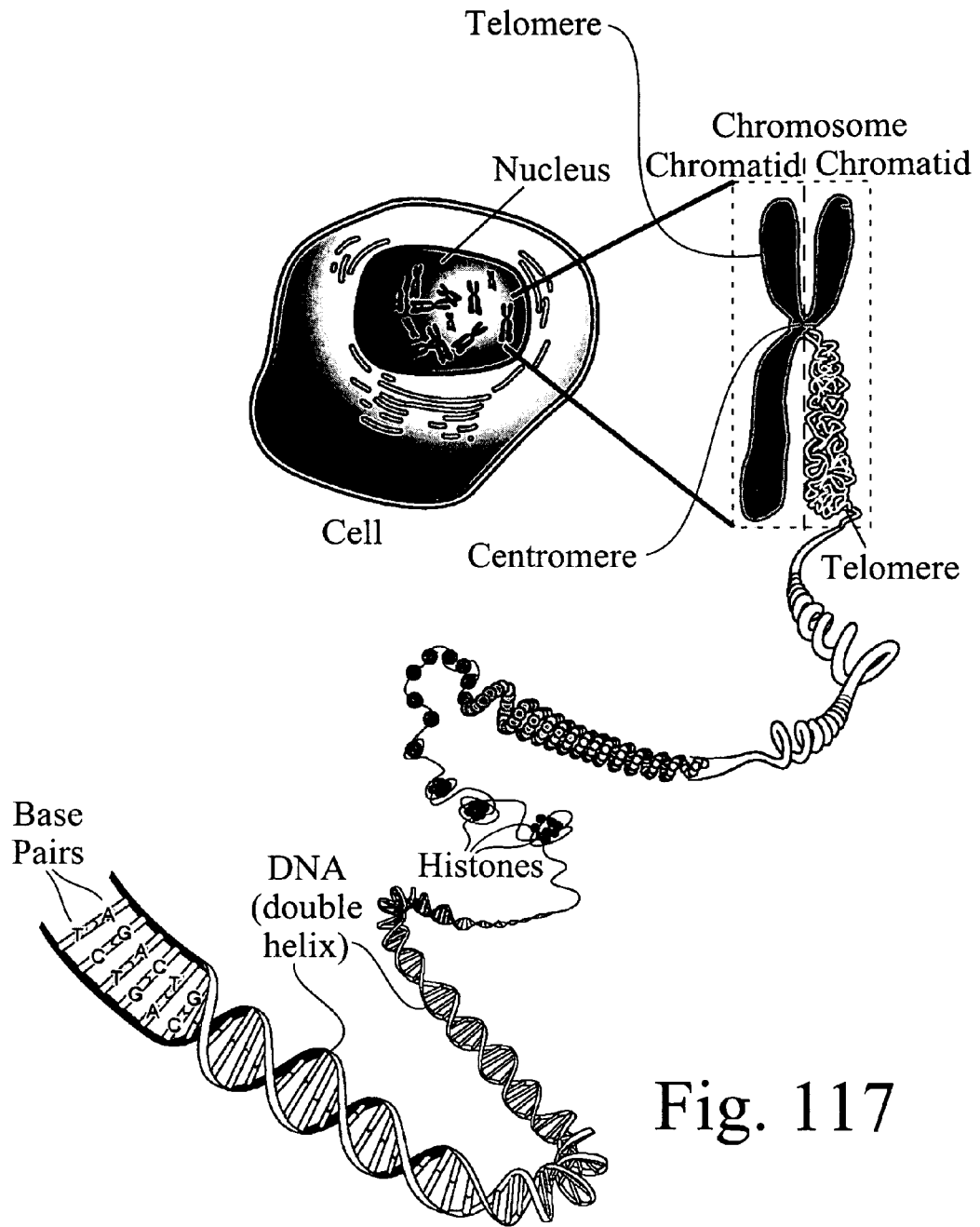

FIG. 117 portrays a chromosome inside the nucleus.

Figure 118:
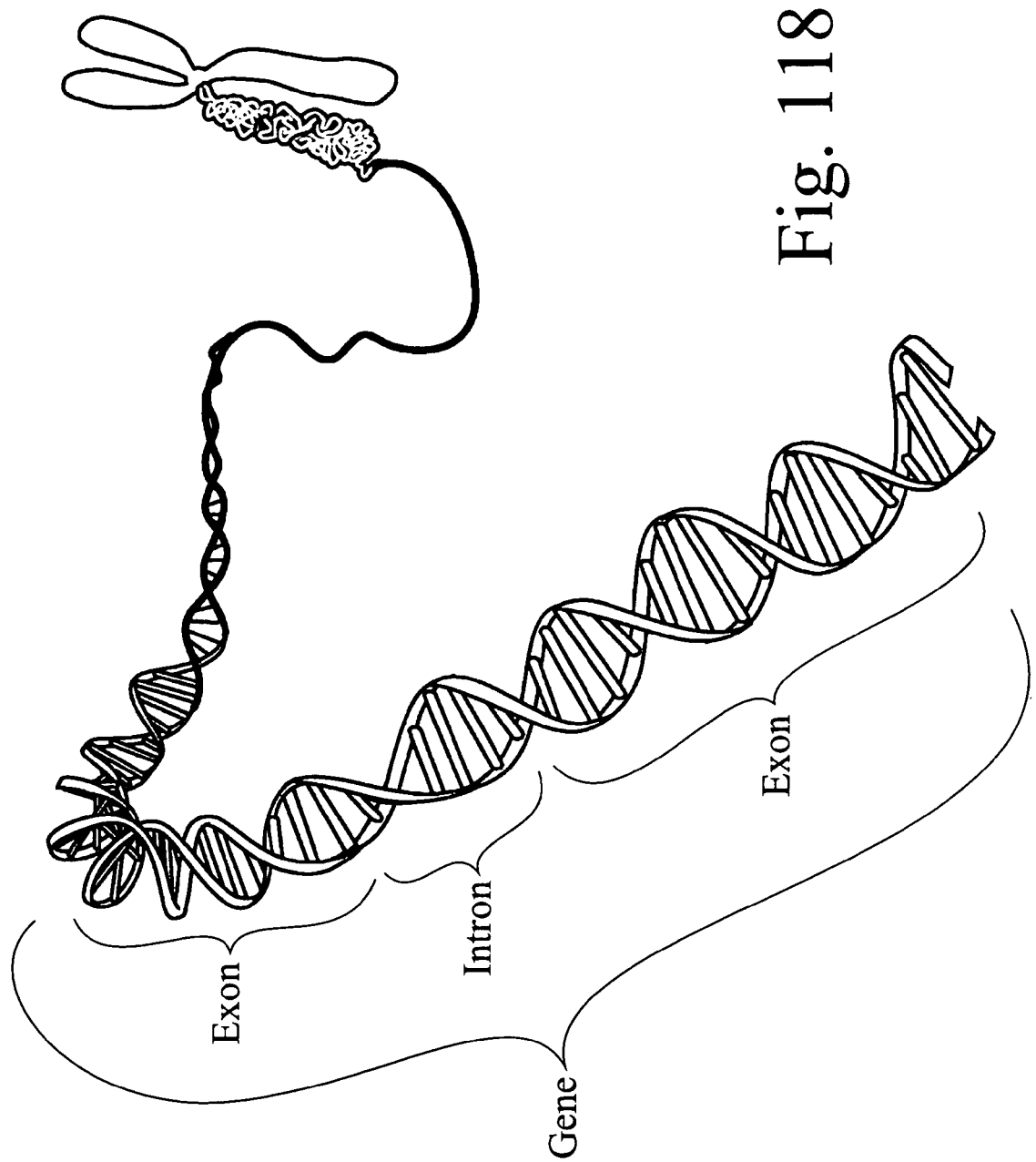

FIG. 118 exhibits a gene, which is a portion of a chromosome.

Figure 119:
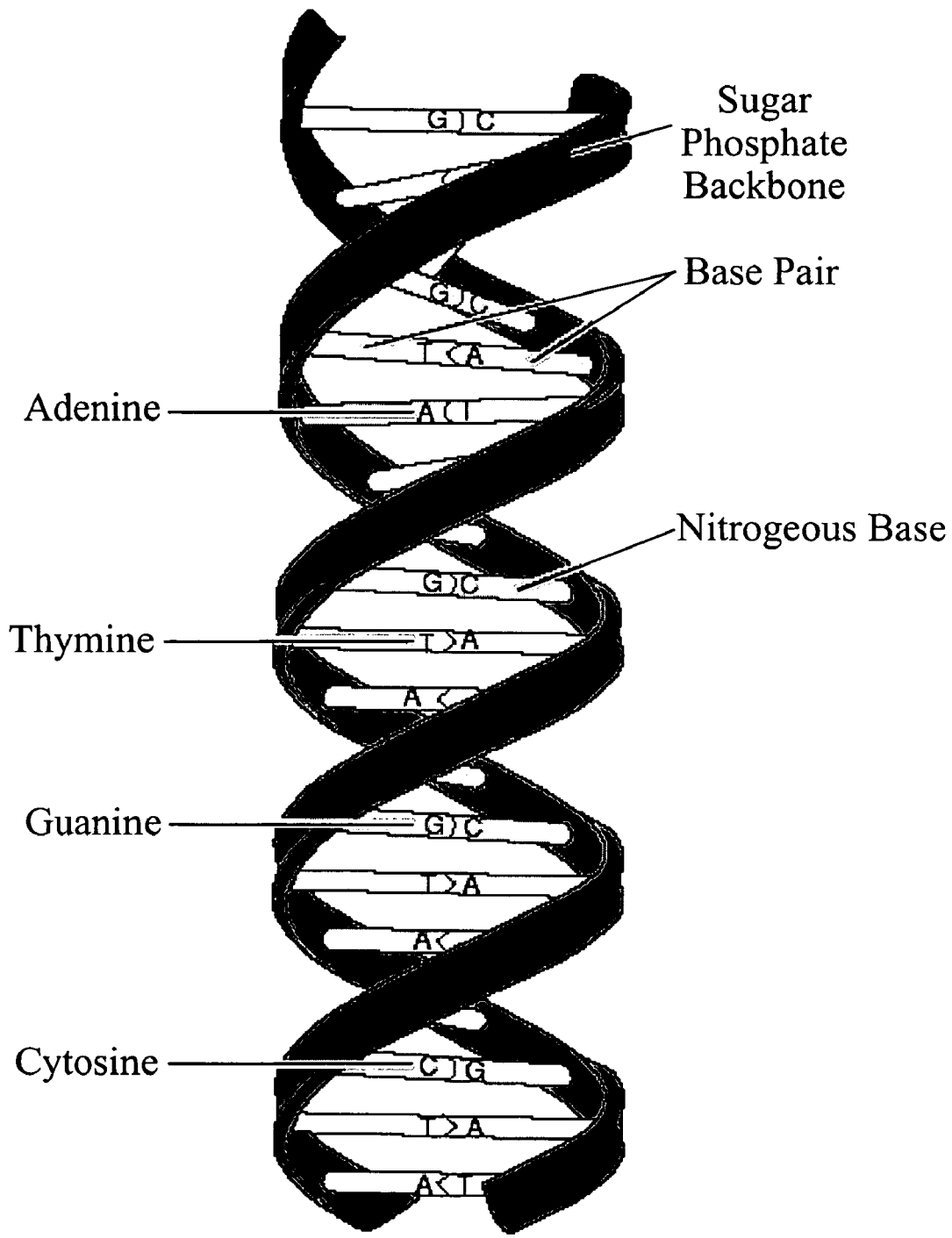
Figure 120:
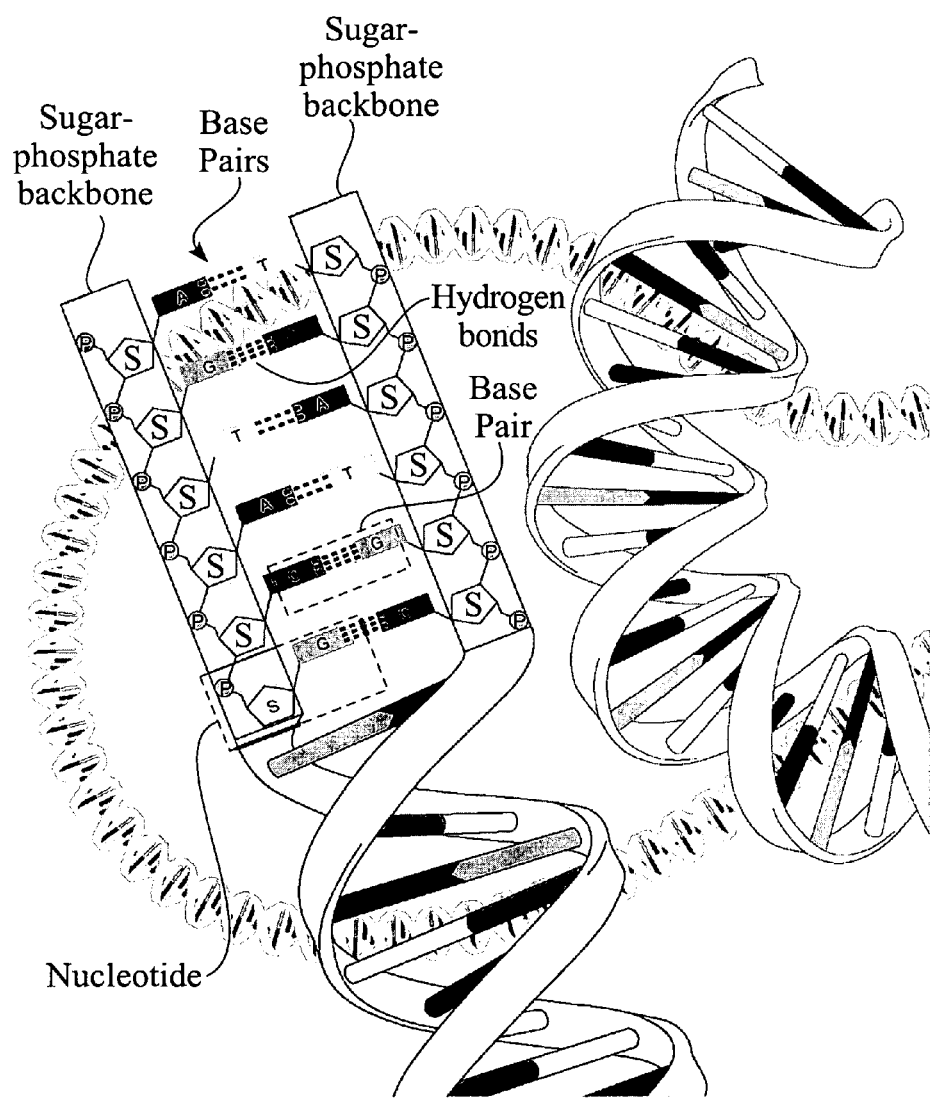

FIGS. 119 and 120 exhibit strands of DNA.

Figure 121:
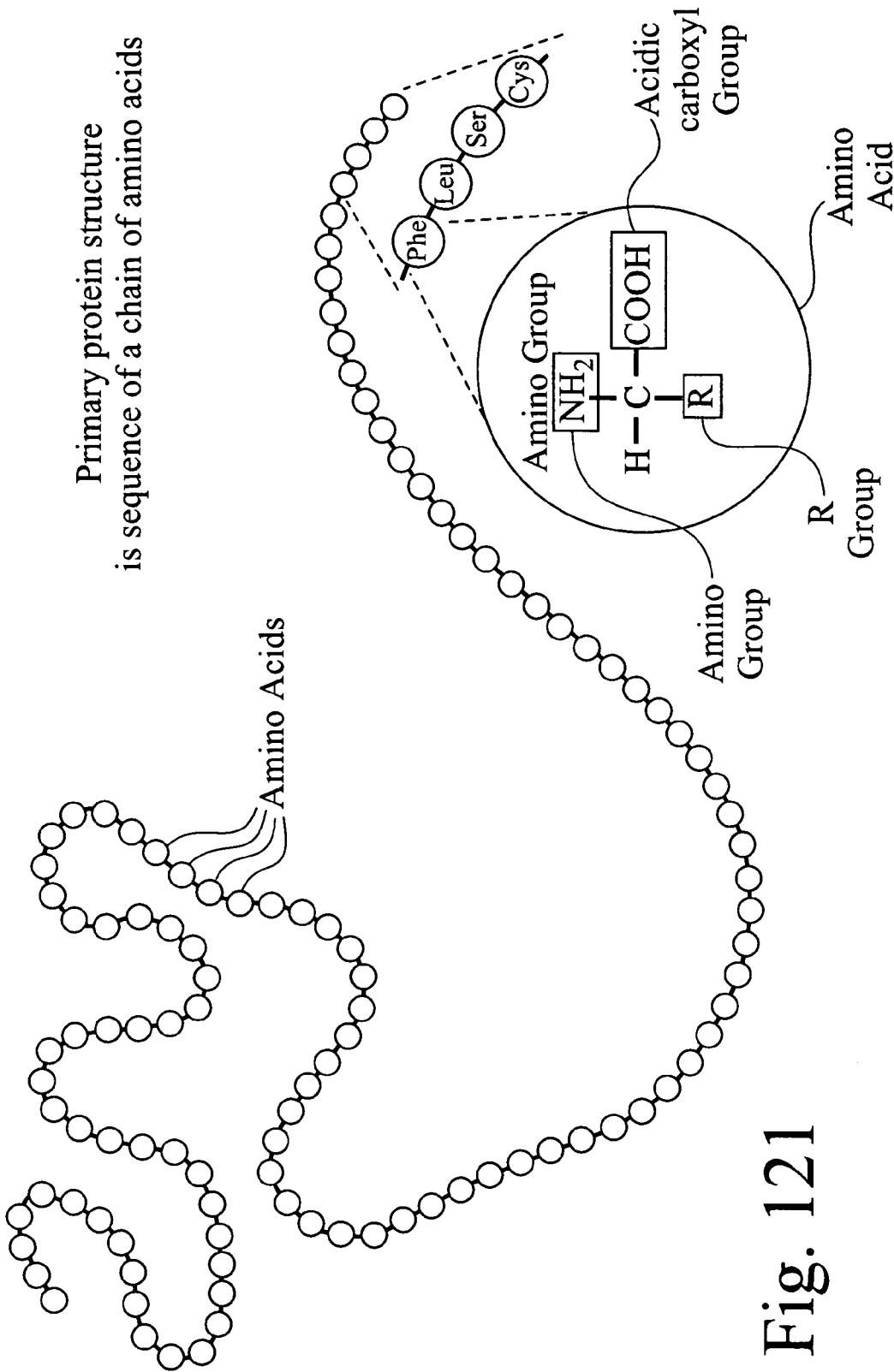

FIG. 121 furnishes a view of a chain of amino acids.

Figure 122:
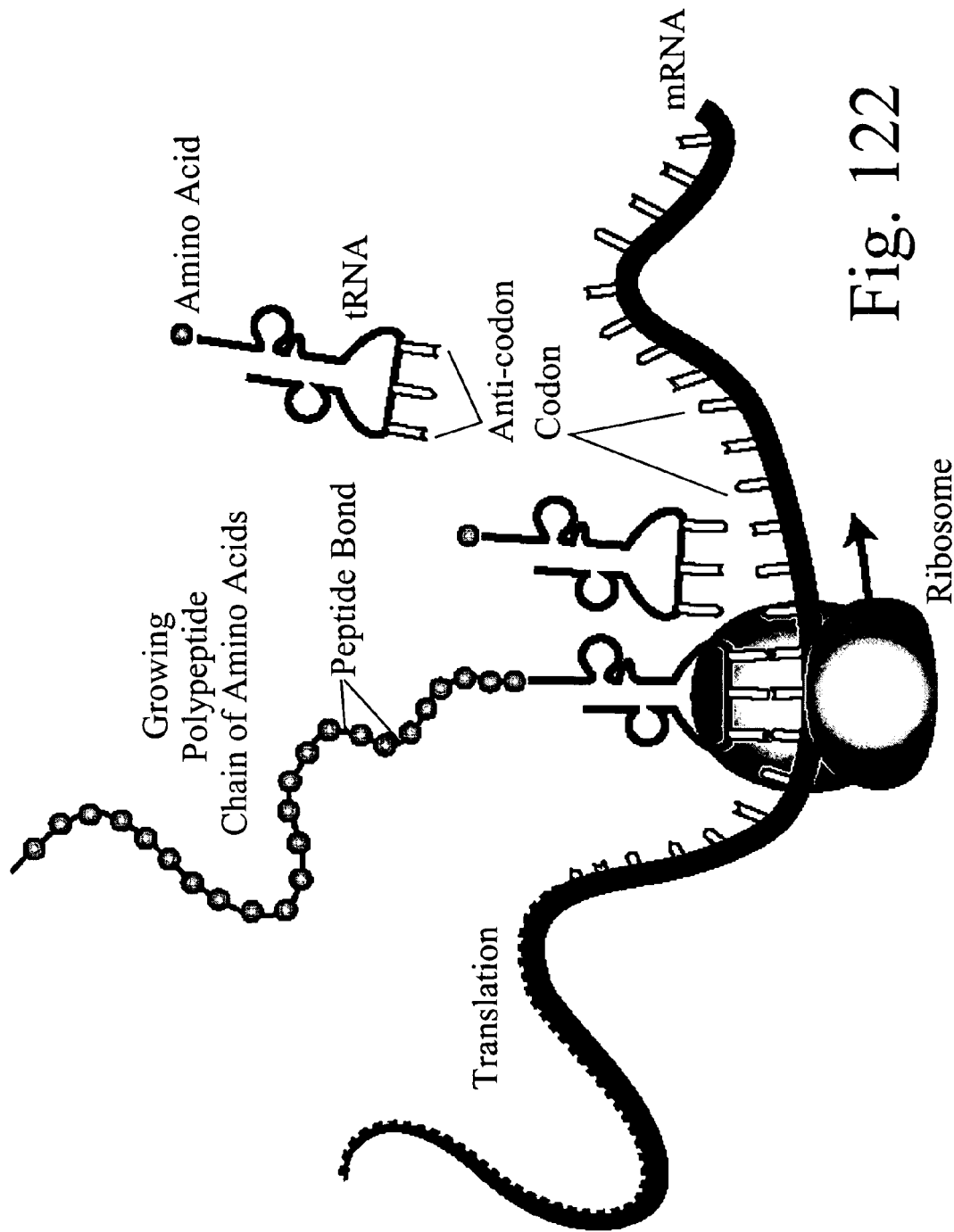

FIG. 122 reveals the growth of a polypeptide chain of amino acids.

Figure 123:
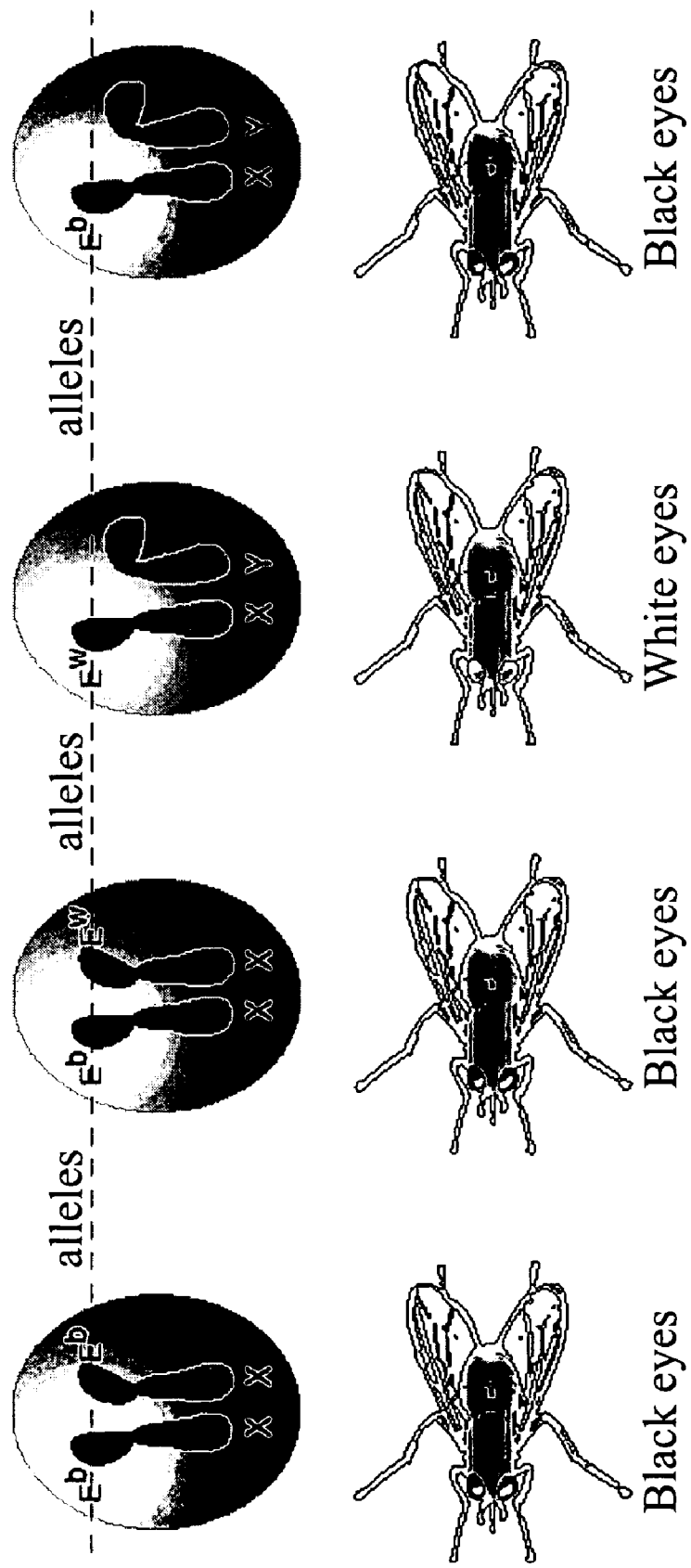

FIG. 123 offers a view of the function of alleles.

Figure 124:
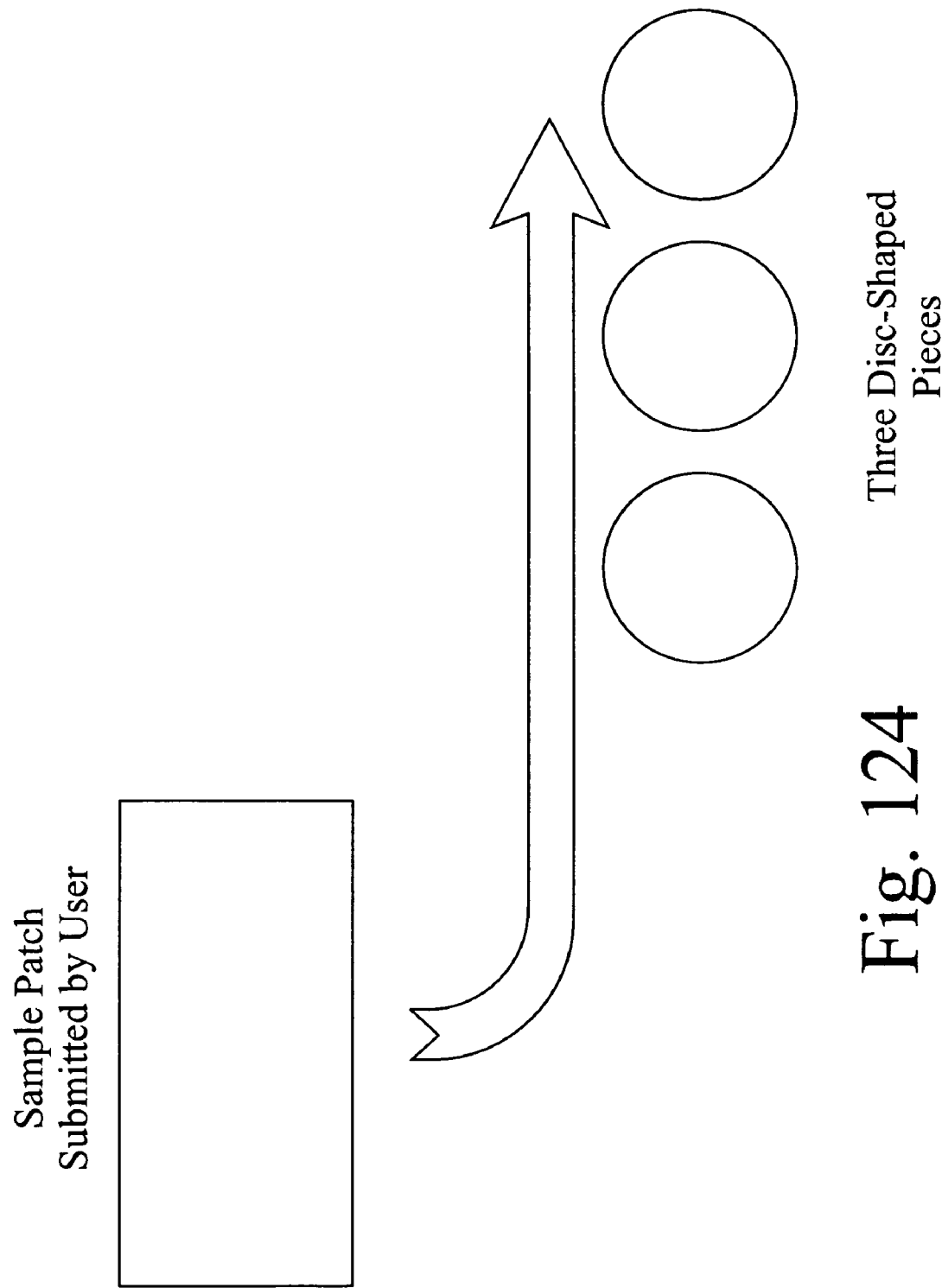

FIG. 124 shows how a sample patch is cut into three disc-shaped pieces.

Figure 125:
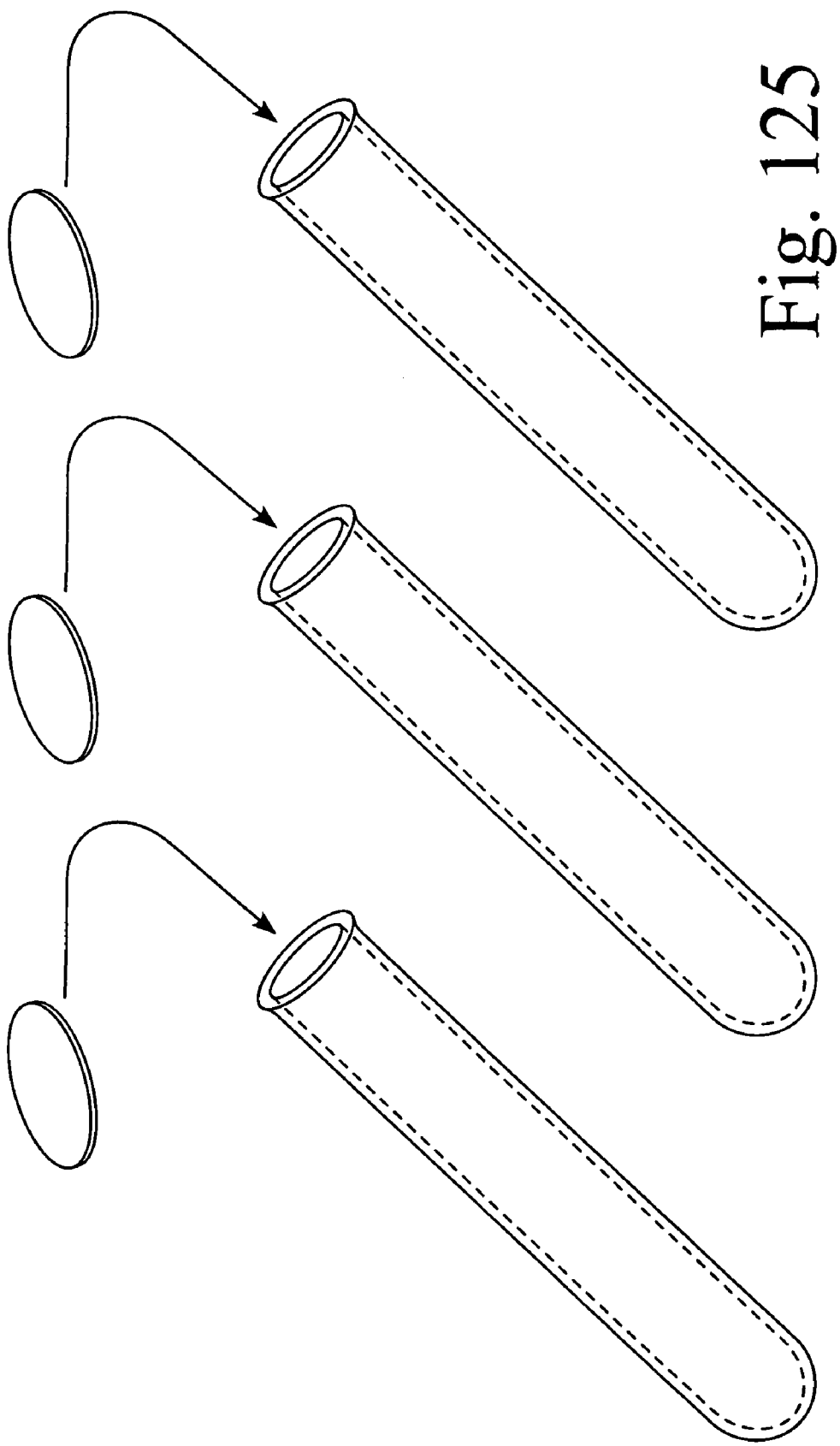

FIG. 125 illustrates the method of placing the three disc-shaped pieces into test tubes for processing and analysis.

Figure 126:
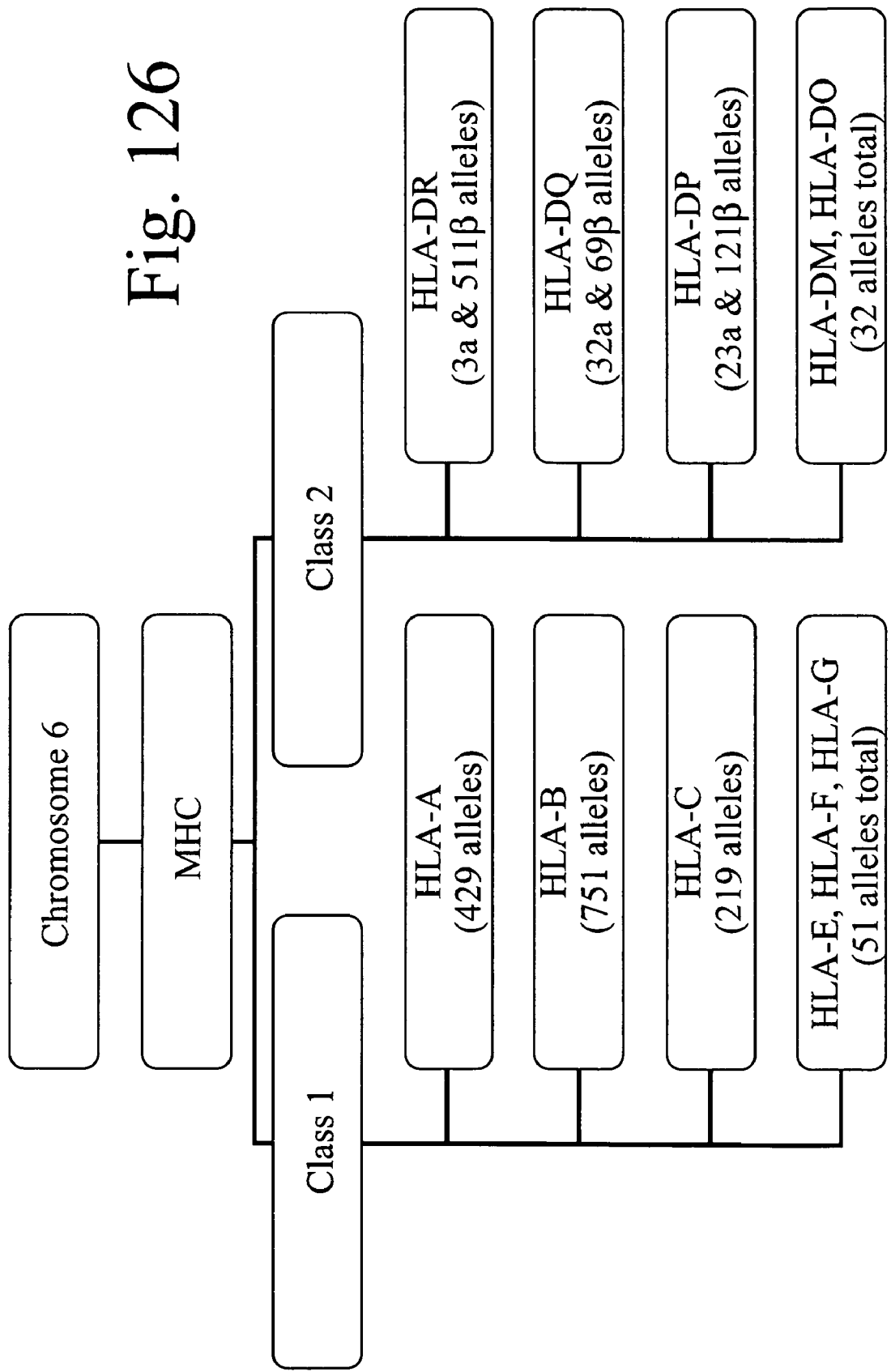

FIG. 126 is a chart showing the relationship of alleles in the MHC Group on human Chromosome Number 6.

Figure 127:
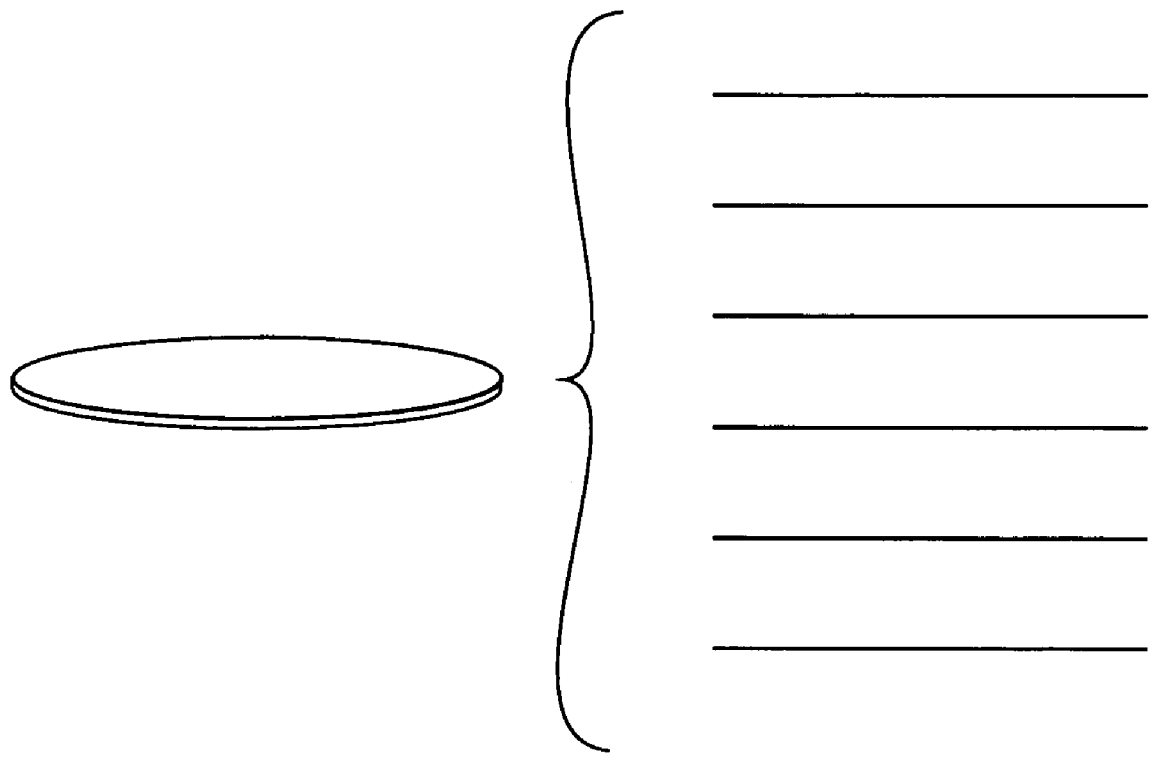
Figure 132:
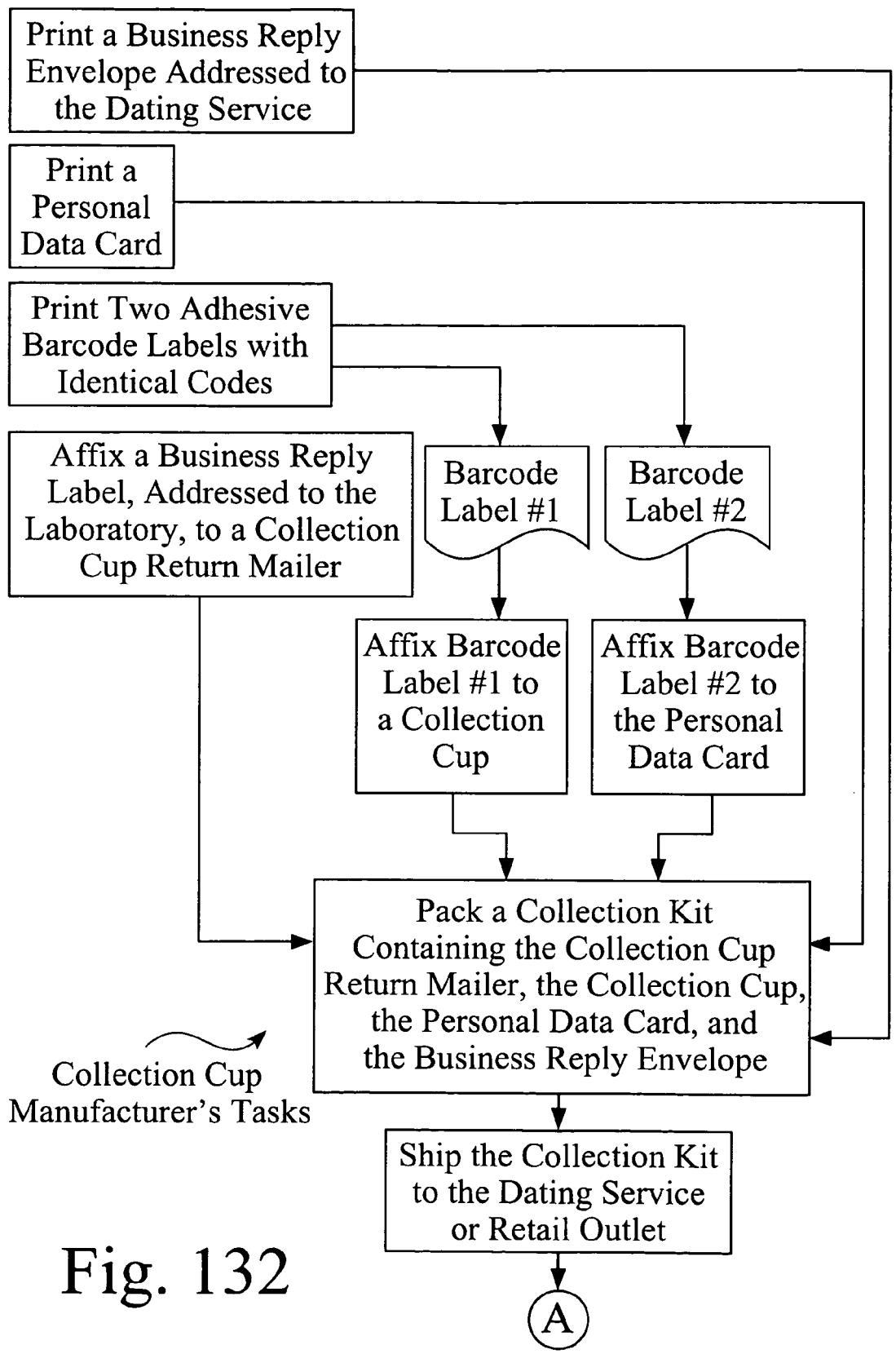
Figure 133:
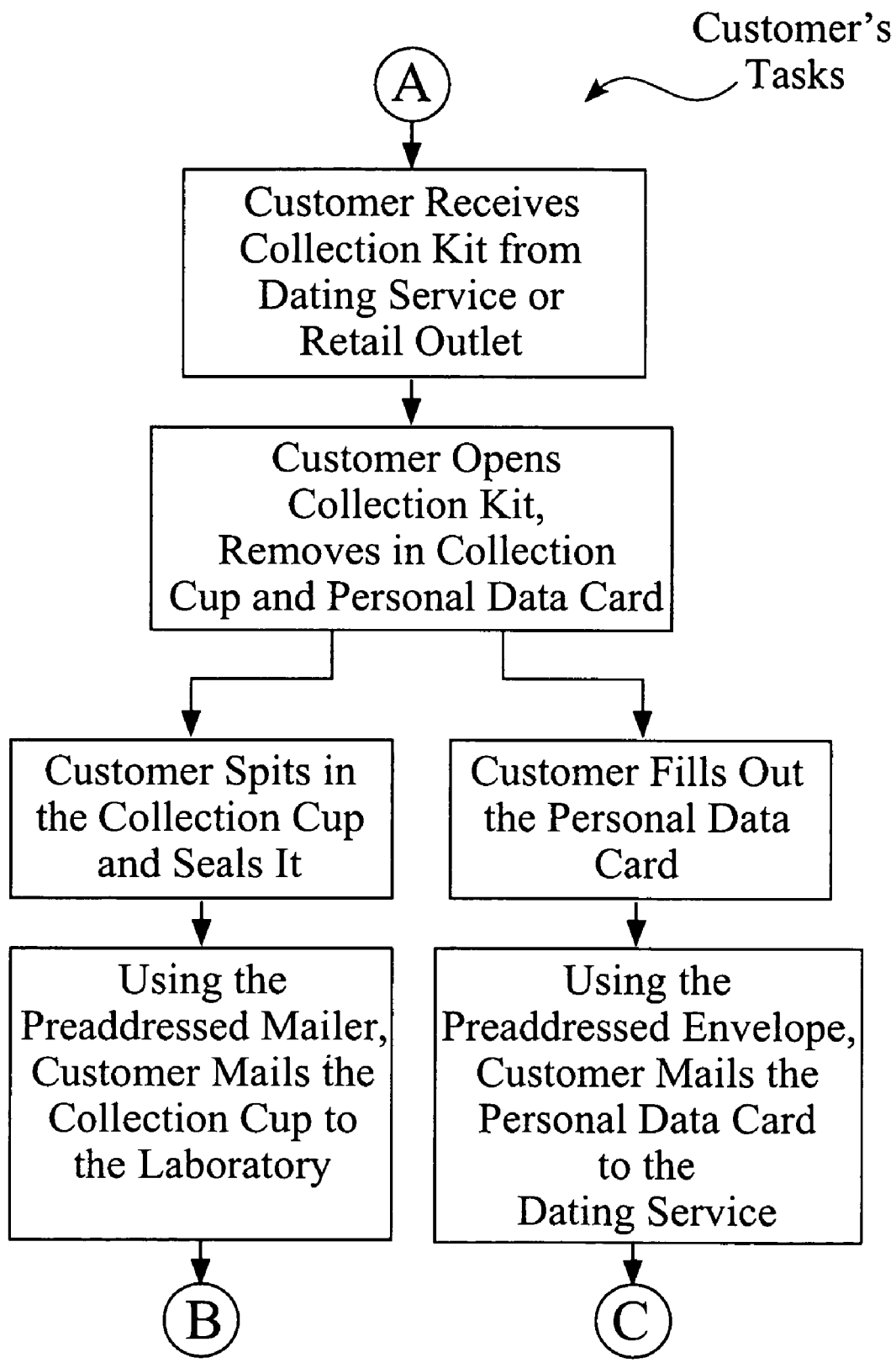
Figure 134:
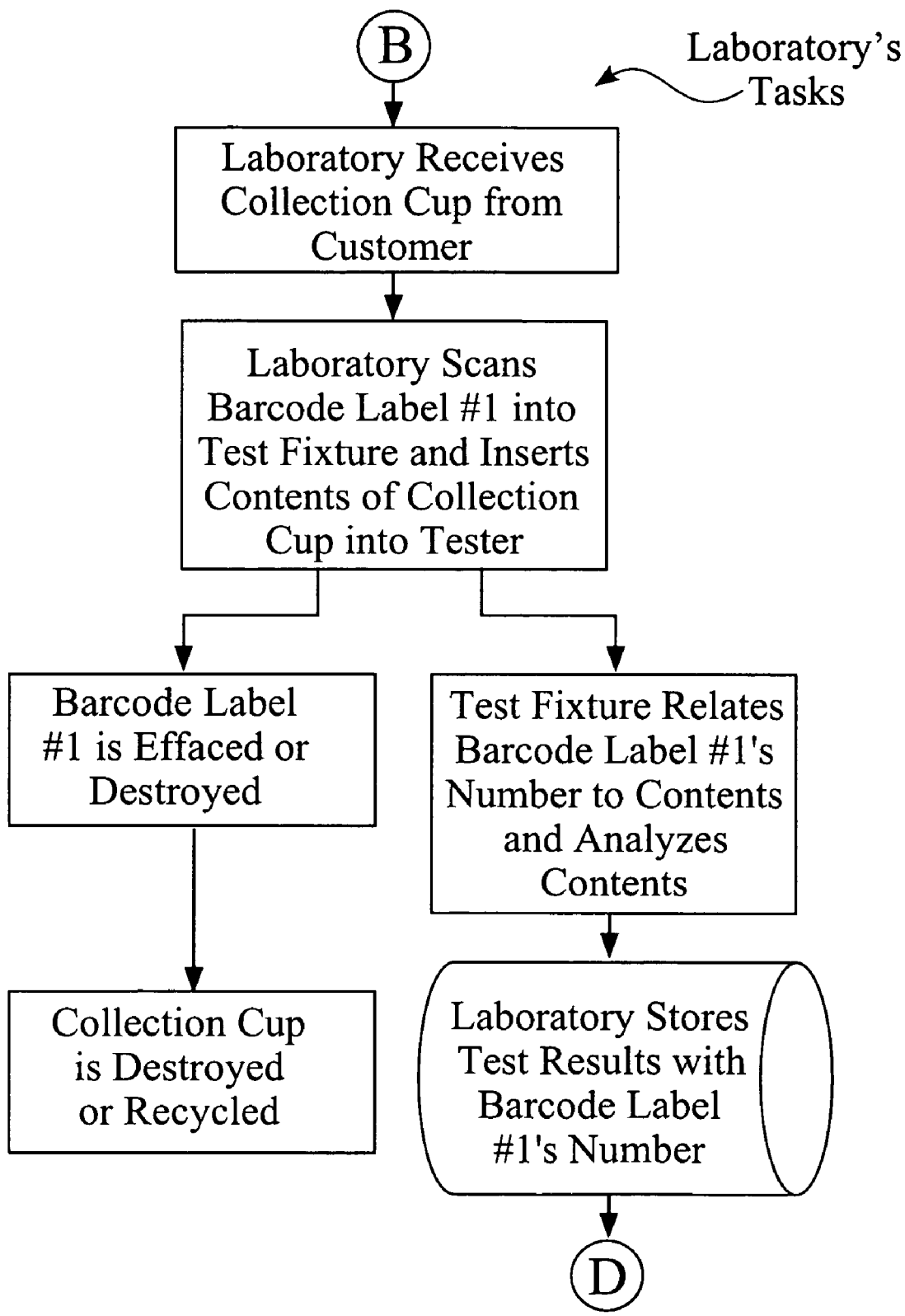
Figure 135:
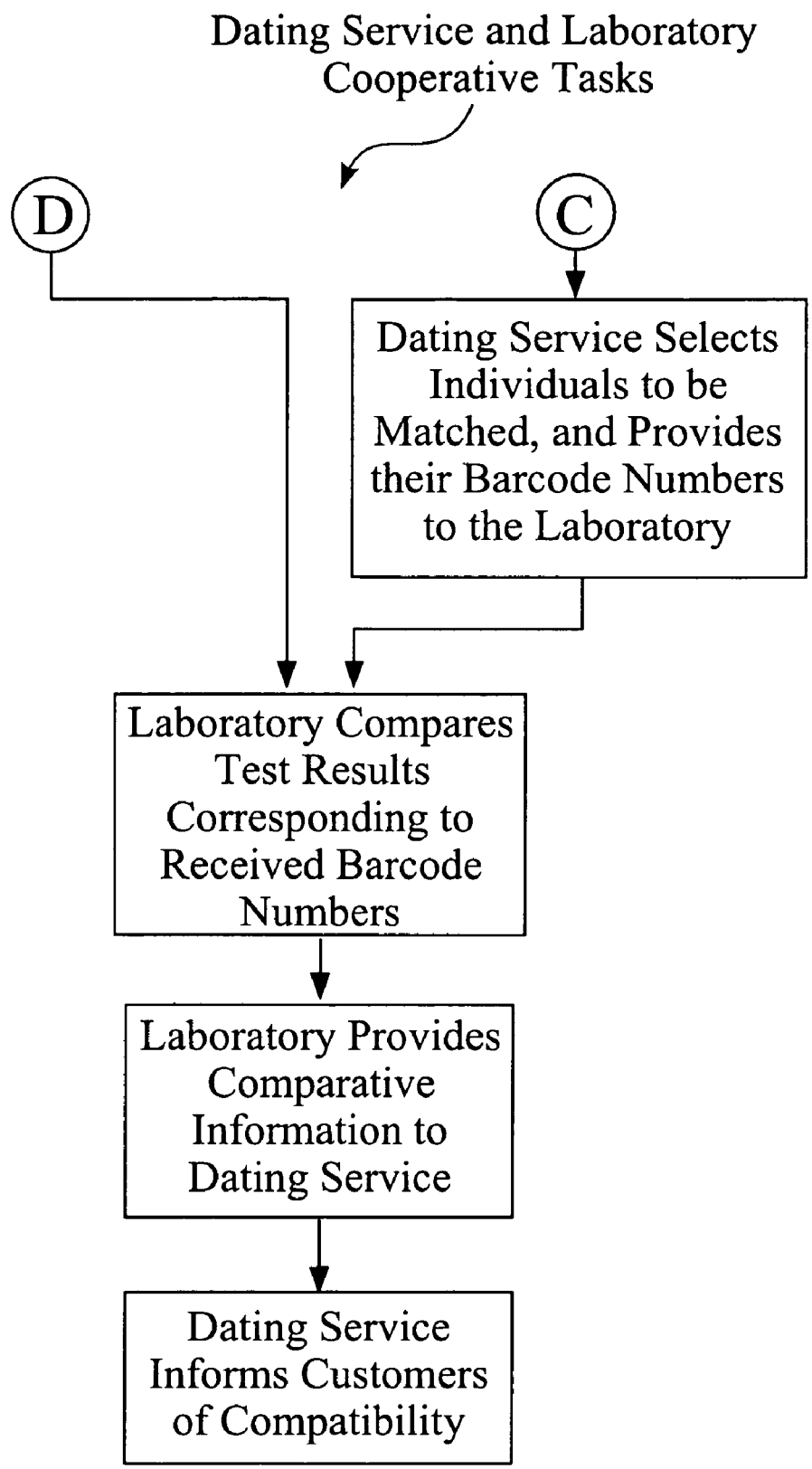

FIG. 127 is a schematic illustration of test results based on the analysis of one of the disc-shaped samples.

FIG. 128 describes a Human Leukocyte Antigen.

FIG. 129 describes Diploid Haplotypes.

FIG. 130 depicts MHC Allele Groups.

FIG. 131 describes a Similarity Metric.

FIGS. 132, 133, 134 and 135 are a flow chart that shows a representative double-blind process of maintaining sample and user anonymity

A DETAILED DESCRIPTION OF PREFERRED & ALTERNATIVE EMBODIMENTS

I. A Preferred Embodiment of the Invention

The present invention comprises methods and apparatus for finding someone or something with specific attributes using a radio device. In one embodiment of the invention, a MateFinder™ 10, which resembles a pager, may be used by a man or a woman to find a match.

Figure 1:
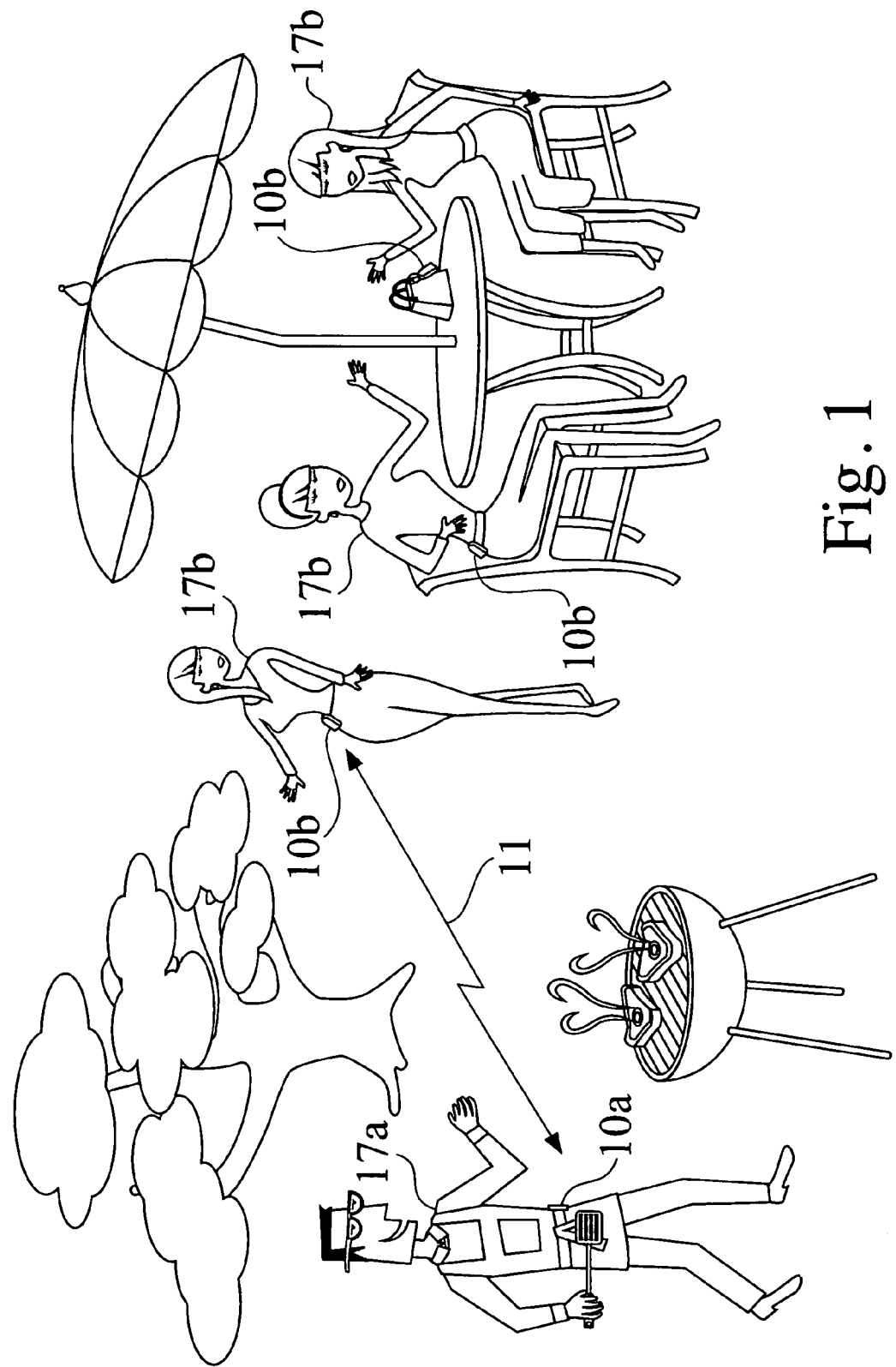

FIG. 1 is a representation of a private party. One of the hopes of some of the men and women who attend the party is that of finding a friend or a mate. In accordance with one embodiment of the present invention, a man 17a is shown wearing a MateFinde™ 10a clipped to his belt. A group of women 17b standing around or sitting at a table also have MateFinders 10b, which are clipped to their belts or purses or are concealed in their clothing. In general, the MateFinder™ 10 is an electronic device which uses a radio to help find someone or something which fits a predetermined description or some preselected criteria. In this Specification and in the Claims that follow, the MateFinders 10 are generally identified as 10a when used by a man or an unspecified "first user" 17a, and as 10b when used by a woman or unspecified "second user" 17b. The use of the reference characters ending in "a" and "b", which are also recited in the Claims as the "first" and "second" transceivers, 10a and 10b, are intended to assist the reader in understanding the invention, but do not connote any substantive differences in the device 10.

The man's MateFinder™ 10a continuously emits an automatic and generally continuous radio seeking or interrogation signal 11. This signal 11 illuminates or interrogates other MateFinder radios that are within range. The man 17a has programmed his MateFinder 10a with a set of attributes that describes himself, and this information is conveyed by the signal 11 emitted by his MateFinder. This signal 11 may also convey a description of the woman that he is interested in finding. If the man's MateFinder signal finds a woman who fits his preselected set of criteria, his MateFinder issues a visual and/or audible alert. If the man's MateFinder signal contains a description that matches the woman's predetermined description of a suitable man, the woman's MateFinder alerts her to his presence. The location and/or identity of each person carrying the MateFinder is not initially available to the users. For example, in one possible use, exemplars of the device would be worn (possibly concealed) by a number of users attending a large private party or public function. Each user's MateFinder would emit its own interrogation signal, for example, first interrogation signal 11a, and second interrogation signal 11b. Users would be alerted to the presence of compatible types, along with an indication of the degree of correlation found and whether a selected matching signal's position is masked. The user would then have the option of unmasking his or her position to the emitter of a specific signal, possibly by changing the modulation scheme to one that allows its strength to be detected. Users could then approach each other by maximizing their indication of the other's signal strength. It should be possible to see the target person at a safe distance before making further contact. The present invention reduces the risk that is inherent in Internet or other forms of remote or electronic dating by allowing a user to evaluate a prospective match in person before initiating contact. Some of the embodiments may also enhance the user's privacy, because his or her personal data are not sent to a website or other third party.

Figure 2:
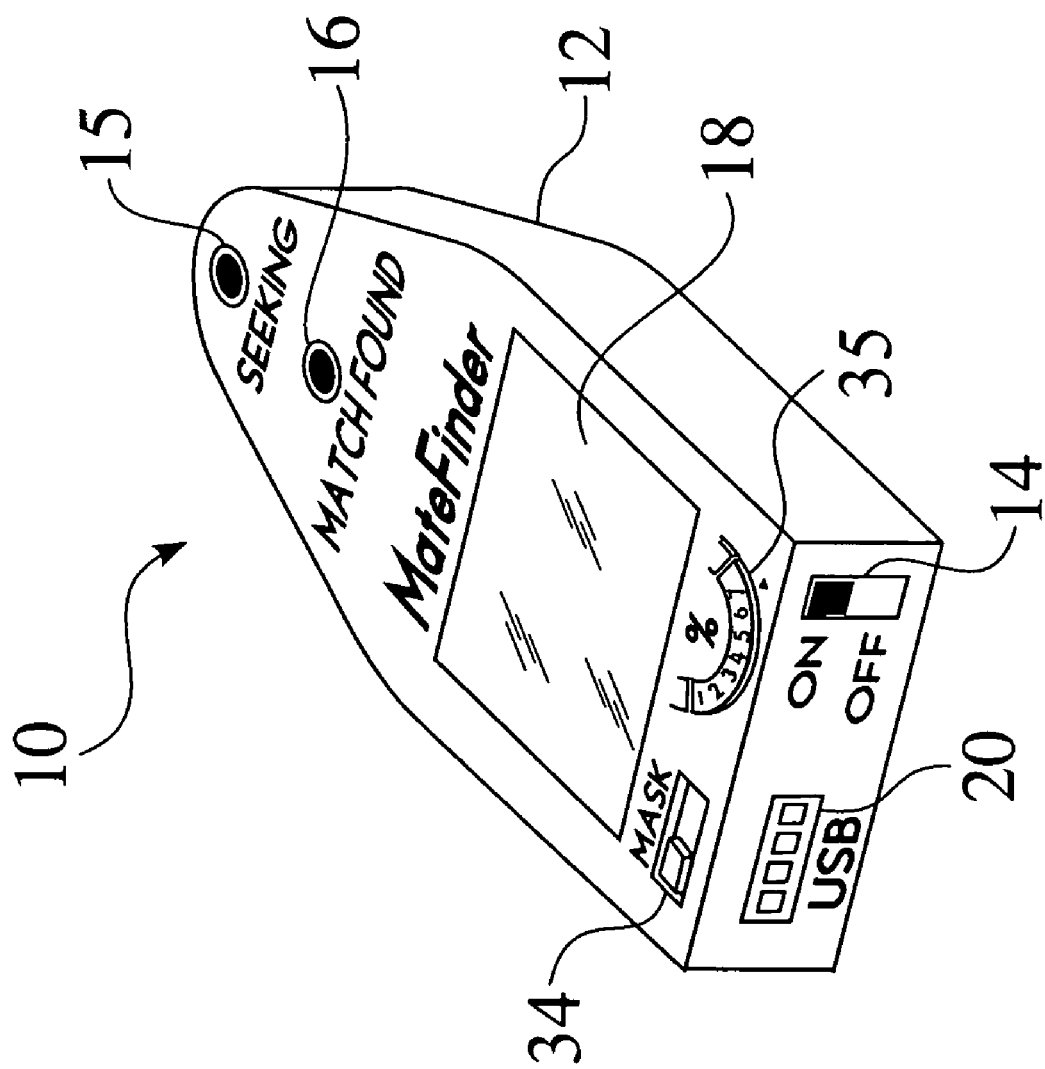

FIG. 2 furnishes a perspective view of one embodiment of the MateFinder device 10. A housing 12 made of plastic or some other suitable material encloses a radio (not shown in FIG. 2). A power switch 14 is located on the base of the housing 12. When the power switch 14 is moved to the "ON" position, a light-emitting diode (LED) 15 labeled "SEEKING" flashes periodically to indicate that the MateFinder™ 10 is emitting a signal. When the MateFinder™ finds a match, an LED 16 labeled "MATCH FOUND" is illuminated. The illumination of the "MATCH FOUND" LED 16 may be accompanied by an audible alarm or tone, vibration or some other suitable means for alerting the user. In an embodiment in which two MateFinders 10 are used, each MateFinder includes a match indicator, 16a and 16b. A miniature liquid-crystal display (LCD) screen 18 is situated on one side of the MateFinder 10. This screen 18 is used to view messages, photographs or other material which may be sent for identification and location purposes by the person who is detected by the seeking signal 11, or to view a list of possible matches detected by the MateFinder. A USB 20 or some other suitable port for connecting the MateFinder 10 to a personal computer or some other appliance or device is located on the base of the device. In an alternative embodiment, the USB port 20 may be replaced or enhanced by a wireless connection. A "Mask" switch 34 enables the user to allow the matching MateFinder to locate him or her by electronic means. A correlation thumbwheel 35 enables the user to adjust the level of matching that is performed by the MateFinder. For example, if the user turns the thumbwheel 35 toward the "10" indicator on the wheel, he or she is instructing the MateFinder to seek out a stronger or higher level of correlation between the preselected qualities or attributes stored in his or her MateFinder and a potential candidate. By turning the thumbwheel 35 down towards "1," the MateFinder reports matches that represent lower levels of correlation between preselected attributes and candidates.

In alternative implementations of the invention, the MateFinder 10 may be built into a bracelet, a necklace, a tie-clip, a hat, a shoe or some other suitable fashion item, article of clothing or ornament.

Figure 3:
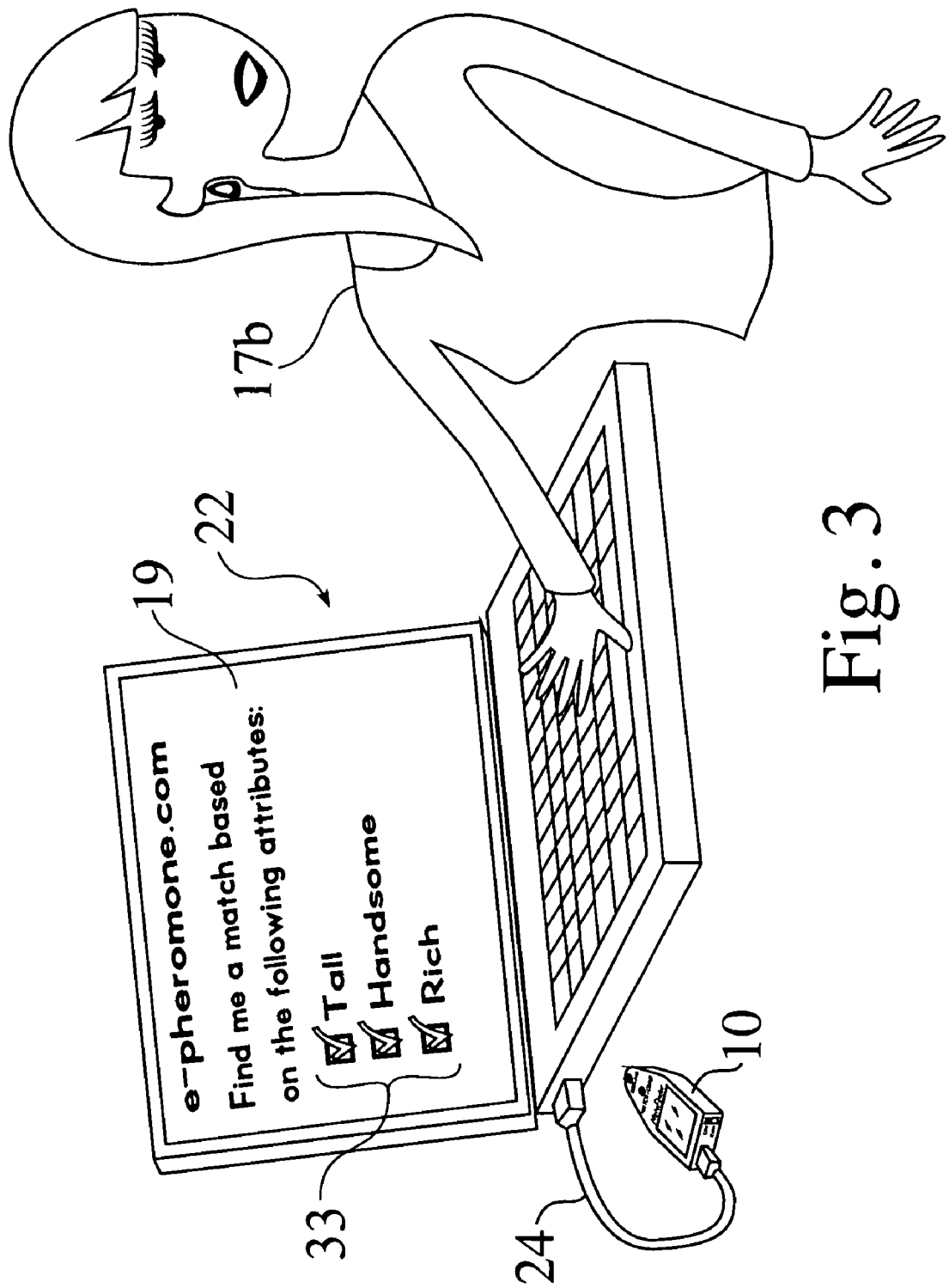

FIG. 3 depicts a woman 17b who has visited a website 19, www.e-pheromone.com. After connecting her MateFinder 10b to the USB port of her personal computer 22 with a cable 24, she is able to program her MateFinder 10b with two sets of attributes 33: a first set of attributes 33a that describes herself, and a second set of attributes 33b that describes her ideal mate. In general, an attribute is any form of data, criteria, information, measure of suitability, complementarity or compatibility; qualities or characteristics that describe a person, item, system, device or thing being sought by a user of the present invention. In one embodiment, two sets of attributes are employed, a first 33a, which pertain to the "seeking" user, and a second 33b, which pertain to the "target" user. Both of these sets of information may be entered into the personal computer 22 in response to prompts from the pages of the website 19. Software running on a server (not shown) which hosts the website then sends the data back to the woman's computer 22, where it is conveyed to the attached MateFinder 10 over the USB cable 24. In an alternative embodiment, the connection between the personal computer 22 and the MateFinder 10 may be wireless.

In one embodiment of the invention, the MateFinder may be programmed using a personal computer 22 with an Internet connection and a website 19. Alternatively, the programming may be accomplished with just a personal computer 22 loaded with suitable software. In an advanced embodiment, the MateFinder may be programmed without any other device or software by communicating directly with a website 19 over a wireless connection, or may be programmed using a keyboard or some other input means associated with the MateFinder.

In another embodiment, the website can also provide aliases for its members' e-mail addresses. In this way, e-mail is forwarded to their true address, which is kept secret. If a suitor is too persistent, a user can easily change her alias. The user may also block e-mails from unwanted suitors. The website may also provide a similar service for cellular telephone numbers, by furnishing a call-forwarding feature for a discreet call-in number.

The attributes 33 which may be selected by the user are virtually unlimited. In the case of a dating service, attributes 33 may be selected from an existing list of attributes 33. As an example, Table One presents attributes 33 which the website 19 displays may include.

TABLE ONE

| Category | Attribute |
| --- | --- |
| Gender | Male, Female |
| Age | |
| Appearance | Handsome/Knockout, Attractive/Cute |
| Marital history | Single, Divorced |
| Residence location | |
| Height | Tall, Average, Short |
| Weight | |
| Hair Color | Blonde, Brunette, Redhead |
| Occupation & Income | |
| Religiosity | Yes/No; Denomination |
| Political preferences | Conservative, Liberal, None |
| Interests or hobbies | |
| Educational level | |
| Social Class Marker | |

In this "electronic dating" embodiment, the user generally selects two sets of attributes 33: a first set 33a to describe herself or himself, and a second set 33b to describe his or her ideal match. In another embodiment, the user may only select one set, either only attributes that describe herself 33a, or only attributes that describe a mate 33b. A set of attributes 33 may include any number of qualities, numbering from one to a large number. Both sets of attributes 33 are stored in a non-volatile memory that is housed within the MateFinder 10. In one embodiment of the invention, one MateFinder 10a with a first memory 32a is employed to find a second MateFinder 10b with a second memory 32b. These preselected attributes may be revised by visiting the website 19, or may be generated using a software template provided with the MateFinder, which is then reprogrammed to incorporate the new data. In an alternative embodiment of the invention, the MateFinder 10 may be programmed directly using voice commands, or by using a keypad built into the device (not shown).

Figure 4:
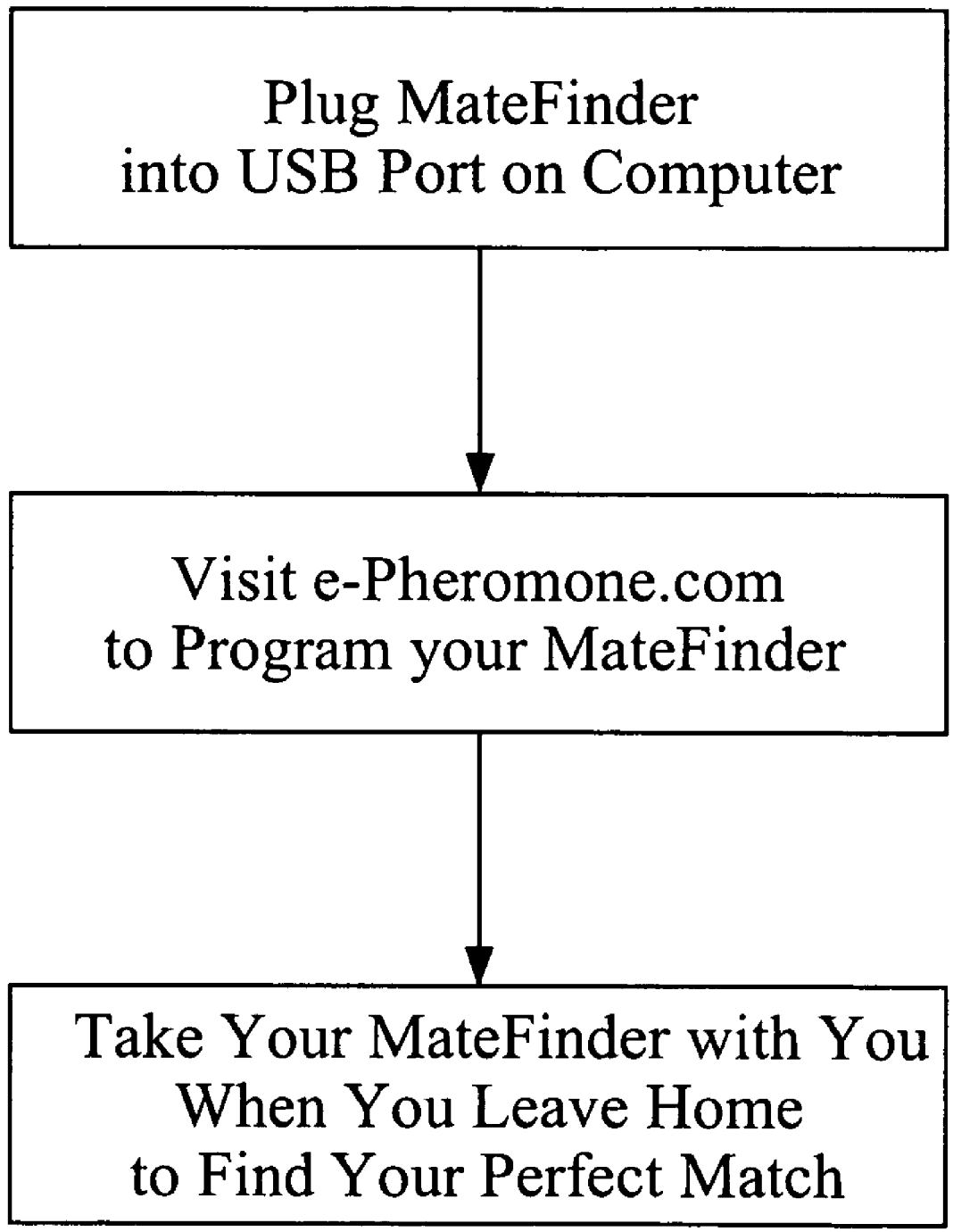
FIG. 4 is a flowchart that explains how a user employs the MateFinder™ to help find a person with characteristics that match the user's preferences.

FIG. 4 offers a basic flowchart that describes how this embodiment of the invention is used. After acquiring a MateFinder 10, the user connects it to a personal computer 22. The user visits a website 19 to select two sets of attributes 33 that are stored in his or her device, or uses a software template supplied with the MateFinder. When he or she is ready to enter a social setting, or simply leaves home, he or she then turns the MateFinder on, and takes it along.

Figure 5:
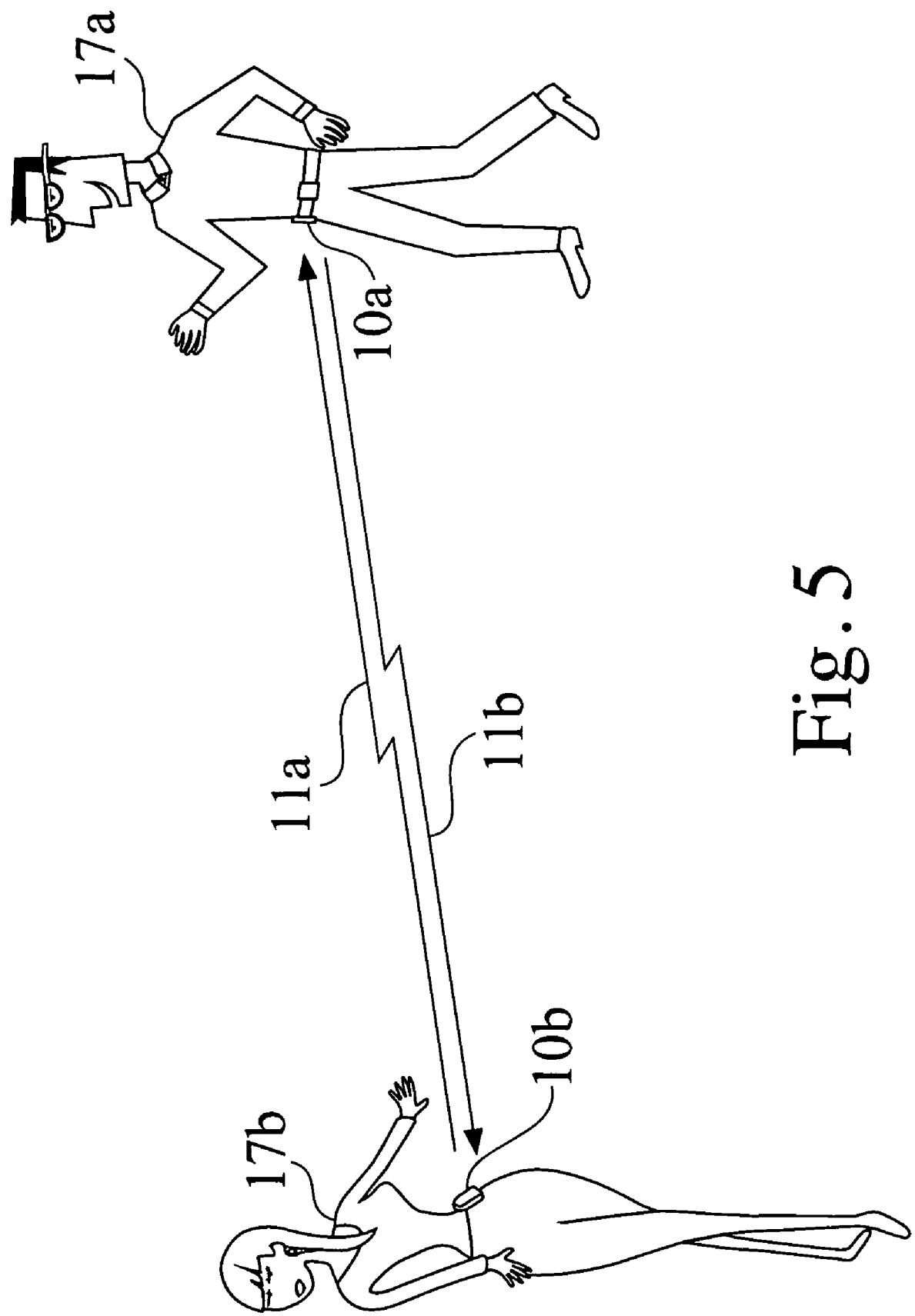
FIG. 5 shows the same woman at some sort of social event, perhaps at the beach, in a park, at a concert or attending a sporting event. The woman's MateFinder™ has found a match in the crowd, and alerts her to his presence.

As shown in FIG. 5, the automatic and intermittent or continuous seeking signal 11 finds a match. The woman 17b shown in FIG. 5, who may be attending a party, a concert or a sporting event, finds a match 17a based on her preselected attributes 33.

FIG. 6 reveals the operation of a more complex embodiment of the invention. After a man's MateFinder 10a has located a suitable match 17b, the man's MateFinder 10a conveys its unique address ("MF Address") or some other identification message to the woman who has been matched. Her message may appear on the screen 18 of his device 10a. The woman 17b then has the option to communicate with the man 17a immediately. In one embodiment of the invention, the woman 17b may use her cellular or VoIP telephone to call a toll free number, such as 1.800.SEEKING, a conventional telephone number, or a "900" number from which the service provider may obtain revenue. In another embodiment, the MateFinder itself can provide text-messaging, either through its radiated signal or through a local network 37 or the Internet. The address or identification information which has been sent to her MateFinder 10b by the man's MateFinder 10a is displayed on her LCD screen 18. After dialing the toll-free number, she enters this address or identification information, and is then prompted to enter a text message, or to record a voice message.

FIG. 7 is a simplified schematic diagram of the circuitry that may be employed to implement one embodiment of the present invention. The power switch 14 controls the flow of energy from a battery 26 that powers the MateFinder 10. When the MateFinder 10 is turned on, a radio/processor assembly 28 automatically and intermittently or continuously emits a seeking signal 11 using antenna 30 over a short range. A USB port 20 is connected to the radio/processor assembly 28. The antenna 30 may be contained within the housing 12. When the radio/processor assembly 28 is broadcasting, the "SEEKING" LED 15 flashes periodically. When a match is found, the "MATCH FOUND" LED 16 illuminates, or some other audible or vibrating alarm is activated. The radio/processor assembly 28 is also connected to the LCD screen 18, which may be used to display text messages, images, or other material that are received from another MateFinder 10.

The radio/processor assembly 28 is also connected to a memory 32, which is used to store attributes that describe the user and his or her ideal mate. The memory 32 may comprise any suitable non-volatile device, including, but not limited to, a flash memory or hard-drive. In an alternative embodiment, a "MASK" switch 34, which is connected between the microprocessor 36 and ground, may be included to allow the user to mask his or her location.

A suitable frequency for the radio emissions, such as one of the unlicensed "ISM" or "RF device" bands set aside by the United States Federal Communications Commission, is selected to avoid creating unwanted interference. The MateFinder 10 may be configured to emit and/or receive a variety of signals or emanations of energy. In the United States, some embodiments of the invention may use the 900 Mz, 2.1 GHz, 5.8 GHz, 59-64 GHz or some other radio frequency band. In other countries, other suitable frequency bands may be selected for the operation of the present invention. Other embodiments of the invention may employ light energy, voice commands, audible tones or ultrasonic emissions; mechanical, physical or chemical manifestations; radioactivity, or any other suitable means for communication.

In a more advanced embodiment of the invention, some or all of the discrete components described in FIG. 7 may be integrated on a single computer chip.

FIG. 8 provides a schematic diagram that illustrates one particular implementation of the invention. A microprocessor 36 is connected to a flash memory 32, a USB port 20 and an indicator 16. The microprocessor 36 is also connected to a receiver assembly 38 and a transmitter assembly 44. The outputs of the receiver 38 and the transmitter 44 are connected to an automatic transmit-receive switch 39, which, in turn, is connected to a bandpass filter 48 and an antenna 30. FIG. 9 offers a flowchart which depicts the basic operational steps of a particular software program that may reside at the website 19 used by the present invention. In the first step of the process, a user visits the website 19, such as e-pheromone.com. The user's browser requests information from the website 19, and the website responds by sending the user a welcome screen. The welcome screen invites the user either to create a new account, or to login to his or her existing account with a username and a password.

After the user has logged in for the first time, a new screen prompts the user to attach his or her MateFinder to his or her computer with a USB cable. After the user's computer has reported back to the website that the MateFinder is connected, the website generates a new screen that prompts the user to program his or her MateFinder using menu selections and/or a set of input fields.

After the user completes the selections, this information is recorded on a website database, and the website 19 sends the data back to the user's computer in a form that may be recorded in the MateFinder's memory. The user then disconnects the MateFinder, and may be offered a variety of premium services, such as background checks, certification of attributes or compatibility analysis, before he or she logs off.

In another alternative embodiment of the invention, the MateFinder may be designed to work in combination with an existing Wi-Fi or similar wireless network 37 that is operating in the place where the user happens to be located. The user would be able to employ the wireless local area network (LAN) or wired network (via a cable to the MateFinder), and would then be able to take advantage of all the connections offered by the Internet.

II. Applications & Uses of the MateFinder Invention

FIGS. 10, 11, 12, 13, 14, 15, 16, 17, 18, 19, 20, 21, 22, 23, 24, 25, 26 and 27 summarize the various combinations of uses, applications and functions of the present invention. All of these figures use a convention common in the communications industry when describing secure communication systems, in which there are three humans or systems involved in the transaction. The originator is called "A" or "Alice," regardless of whether it is a man, woman or system; similarly, the first intended recipient is "B" or "Bob." A third person or system, which may be attempting to eavesdrop, is called, "Eve."

The attributes 33 that describe Alice or Bob are labeled "attributes," sometimes abbreviated "A." The attributes 33 that describe the entity that Alice or Bob is seeking are called "preferences," sometimes abbreviated P. When used in FIGS. 10-19, preferences are subsets, meaning that they are intended to be understood as members of the larger set of attributes 33. Thus, for example, the attributes that Alice uses for self-description are sometimes abbreviated "A's As," and the attributes Alice seeks are called, "A's Ps."

Each of the embodiments shown in FIGS. 10-27 are provided only as examples of the many possible uses of the present invention, and are not intended to circumscribe or limit the scope of the Claims.

Figure 10:
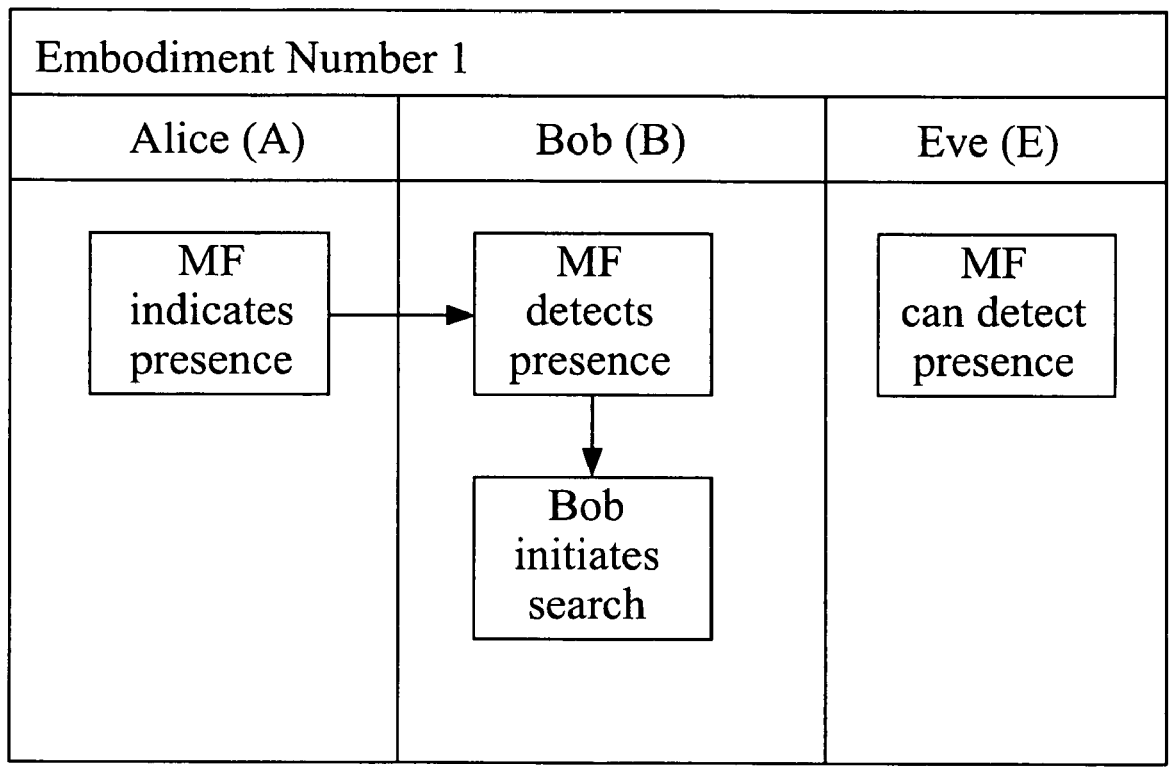

In Embodiment Number 1, shown in FIG. 10, Alice's MateFinder simply indicates her presence in the vicinity. Bob's MateFinder detects that information and alerts Bob, who may initiate a search (in this and later appearances of the word "search," the term implies the use of visual or electronic means, which may or may not be enabled by the MateFinder). Eve's and other MateFinders in the area can detect the presence of Alice's MateFinder.

Figure 11:
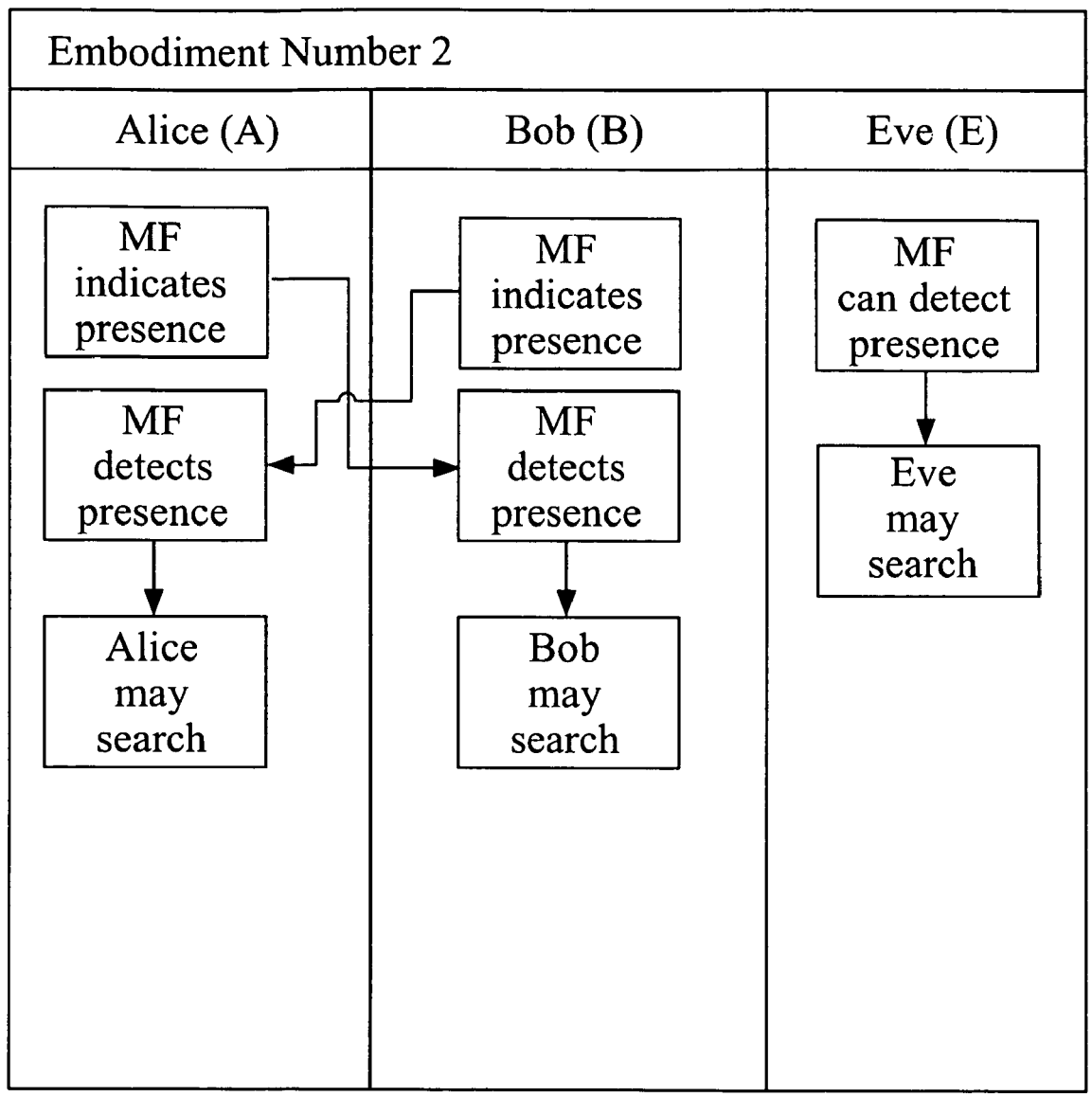

In Embodiment Number 2, shown in FIG. 11, both Alice's and Bob's MateFinders simply indicate their presence in the vicinity. Alice's and Bob's MateFinders detect that information and alert their wearers, who may initiate a search. Eve's and other MateFinders in the area can detect the presence of Alice's and Bob's MateFinders.

Figure 12:
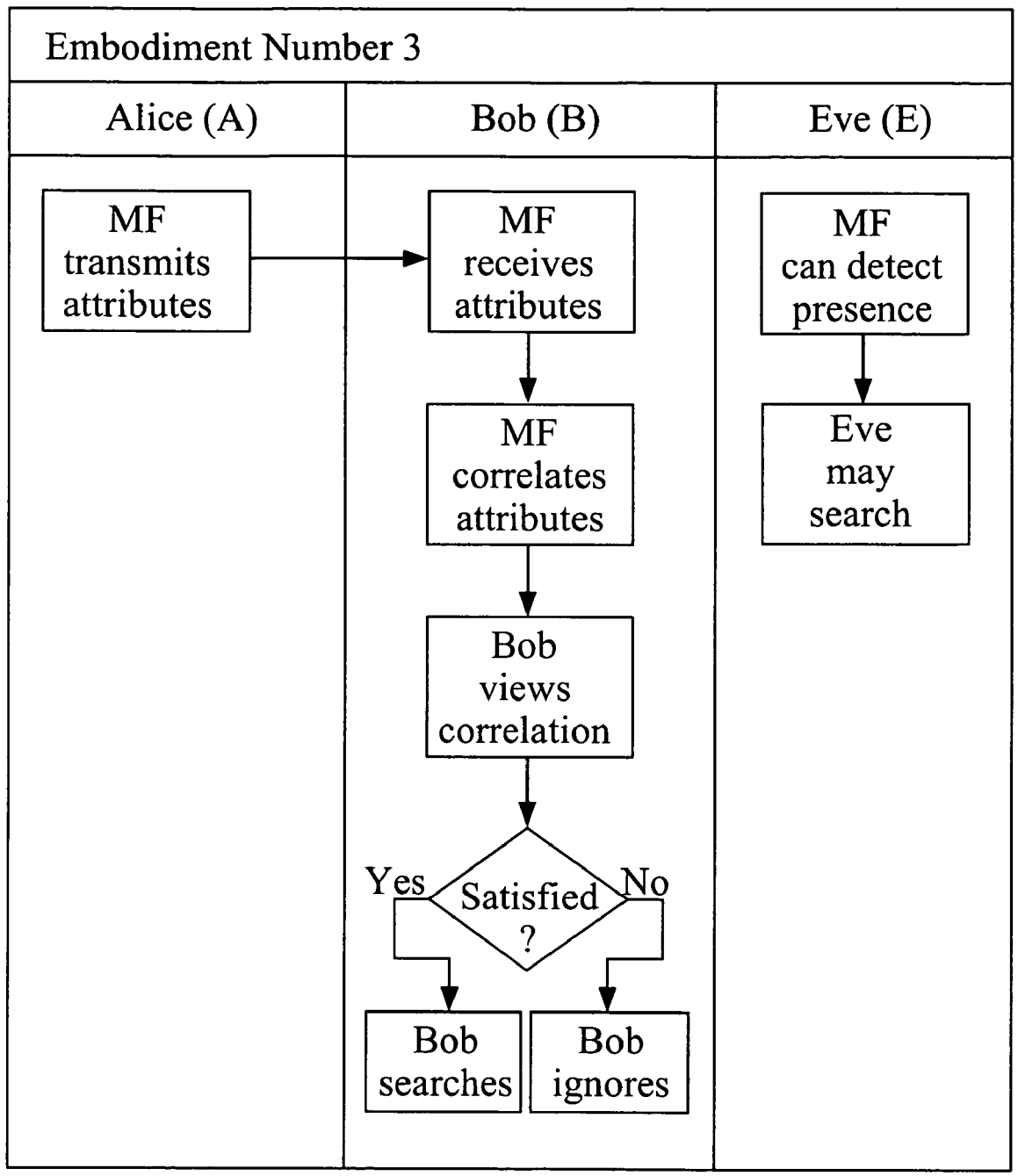

In Embodiment Number 3, shown in FIG. 12, Alice's MateFinder broadcasts Alice's attributes. Bob's MateFinder receives this information and correlates the received attributes with Bob's preferred attributes (hereafter called preferences). Bob views the degree of correlation and decides whether to initiate a search based on that information. Eve's and other MateFinders in the area can detect the presence of Alice's MateFinder.

Figure 13:
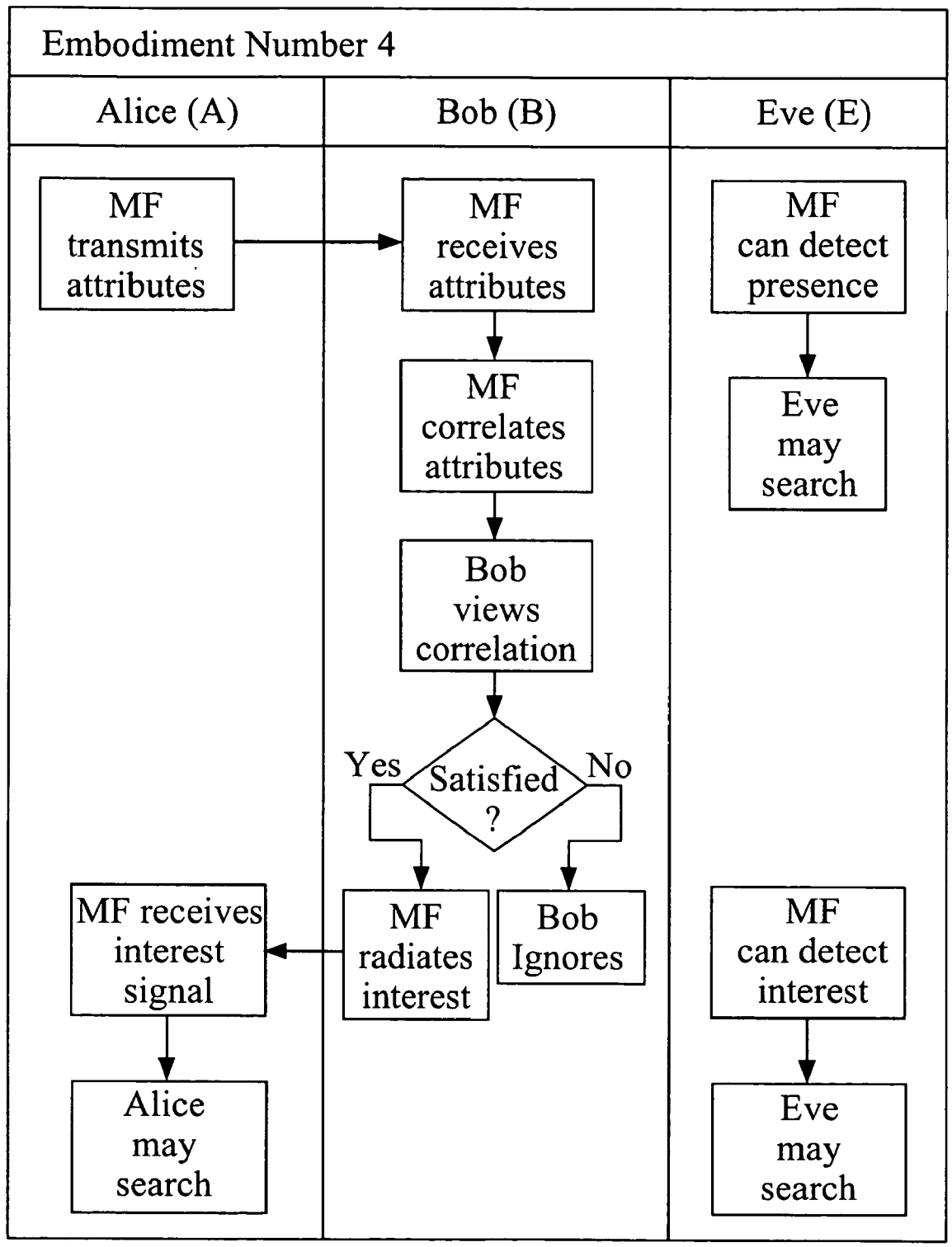

In Embodiment Number 4, shown in FIG. 13, Alice's MateFinder broadcasts Alice's attributes. Bob's MateFinder receives this information and correlates the received attributes with Bob's preferred attributes. Bob views the degree of correlation and decides whether to have his MateFinder radiate an interest signal. If Alice detects that signal, she may initiate a search based on that information. Eve's and other MateFinders in the area can detect the presence of Alice's and Bob's MateFinders, and can detect the interest signal when emitted.

Figure 14:
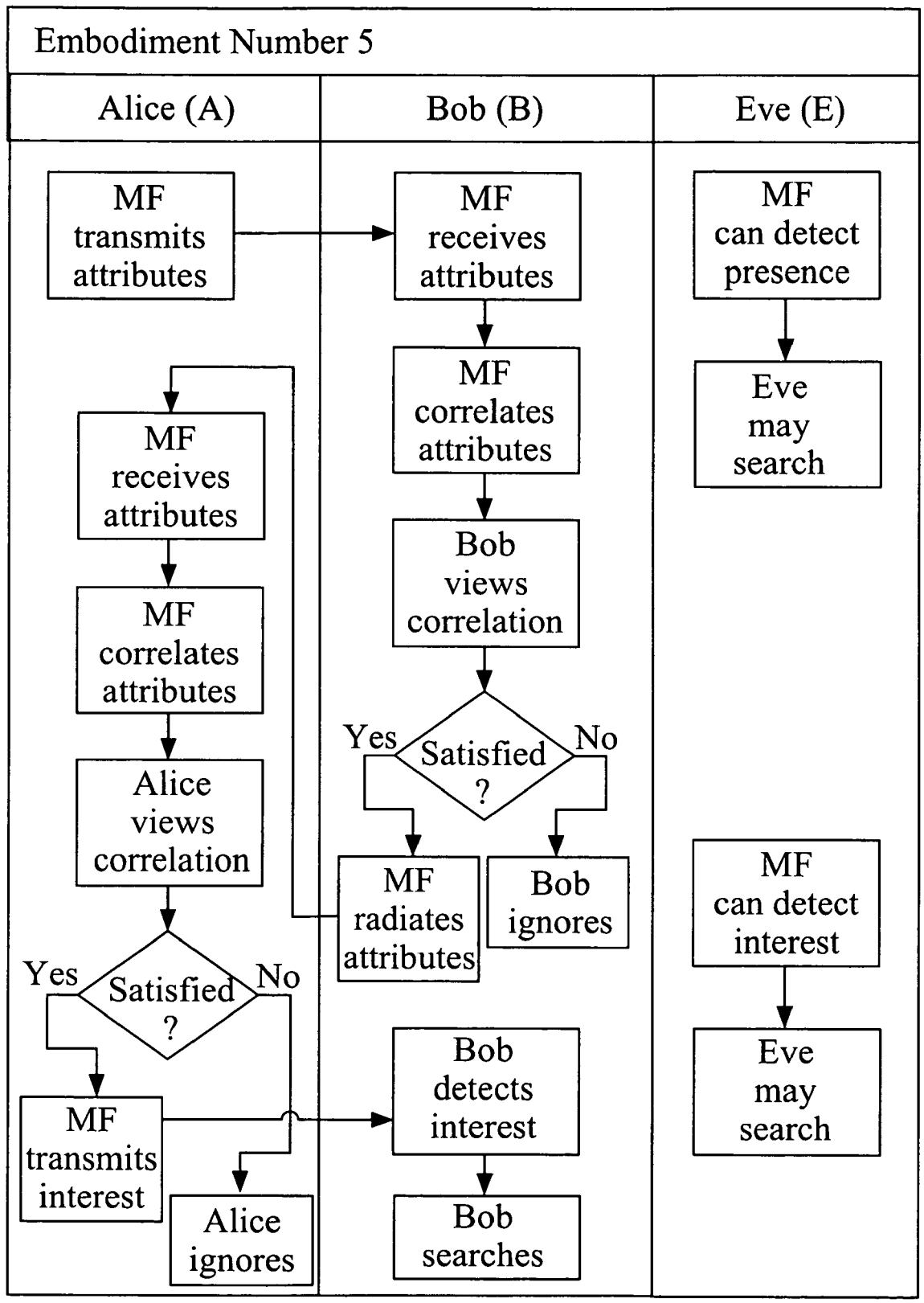

In Embodiment Number 5, shown in FIG. 14, Alice's MateFinder broadcasts Alice's attributes. Bob's MateFinder receives this information and correlates the received attributes with Bob's preferences. Bob views the degree of correlation and decides whether to have his MateFinder radiate his own attributes. If Alice's MateFinder detects that signal, it correlates the received attributes with her preferences. If she is satisfied with the correlation, she directs her MateFinder to emit an interest signal, and she may also search. If Bob's MateFinder detects the interest signal, he may initiate a search. Eve's and other MateFinders in the area can detect the presence of Alice's and Bob's MateFinders, and can detect the interest signal when emitted.

Figure 15:
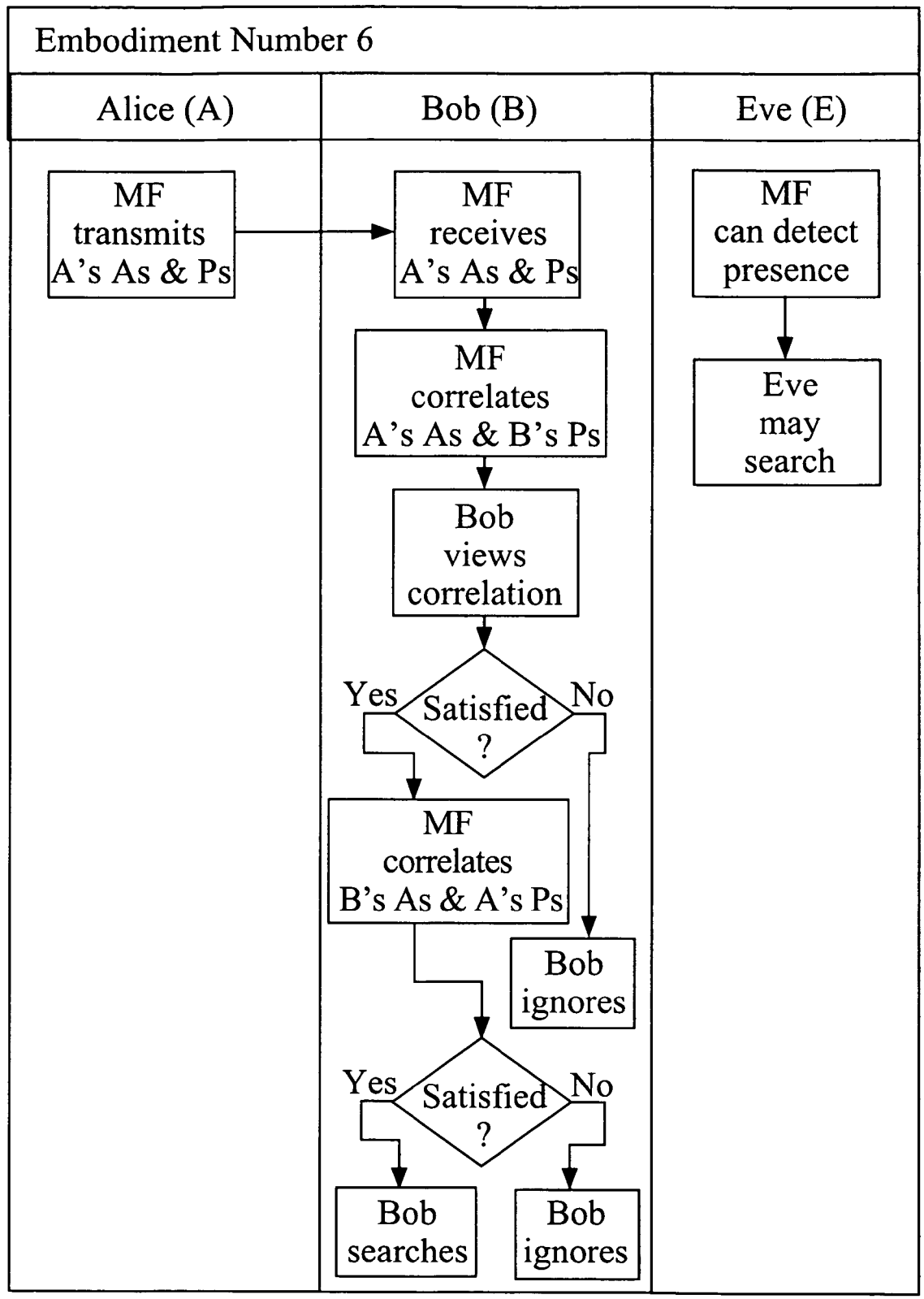

In Embodiment Number 6, shown in FIG. 15, Alice's MateFinder broadcasts both Alice's attributes and her preferences. Bob's MateFinder receives this information and correlates the received attributes with Bob's preferences If Bob is satisfied with the correlation between Alice's attributes and Bob's preferences, he may then have his MateFinder correlate Bob's attributes with the received preferences. Bob views the degree of this second correlation and, if satisfied, may initiate a search. Eve's and other MateFinders in the area can detect the presence of Alice's MateFinder.

Figure 16:
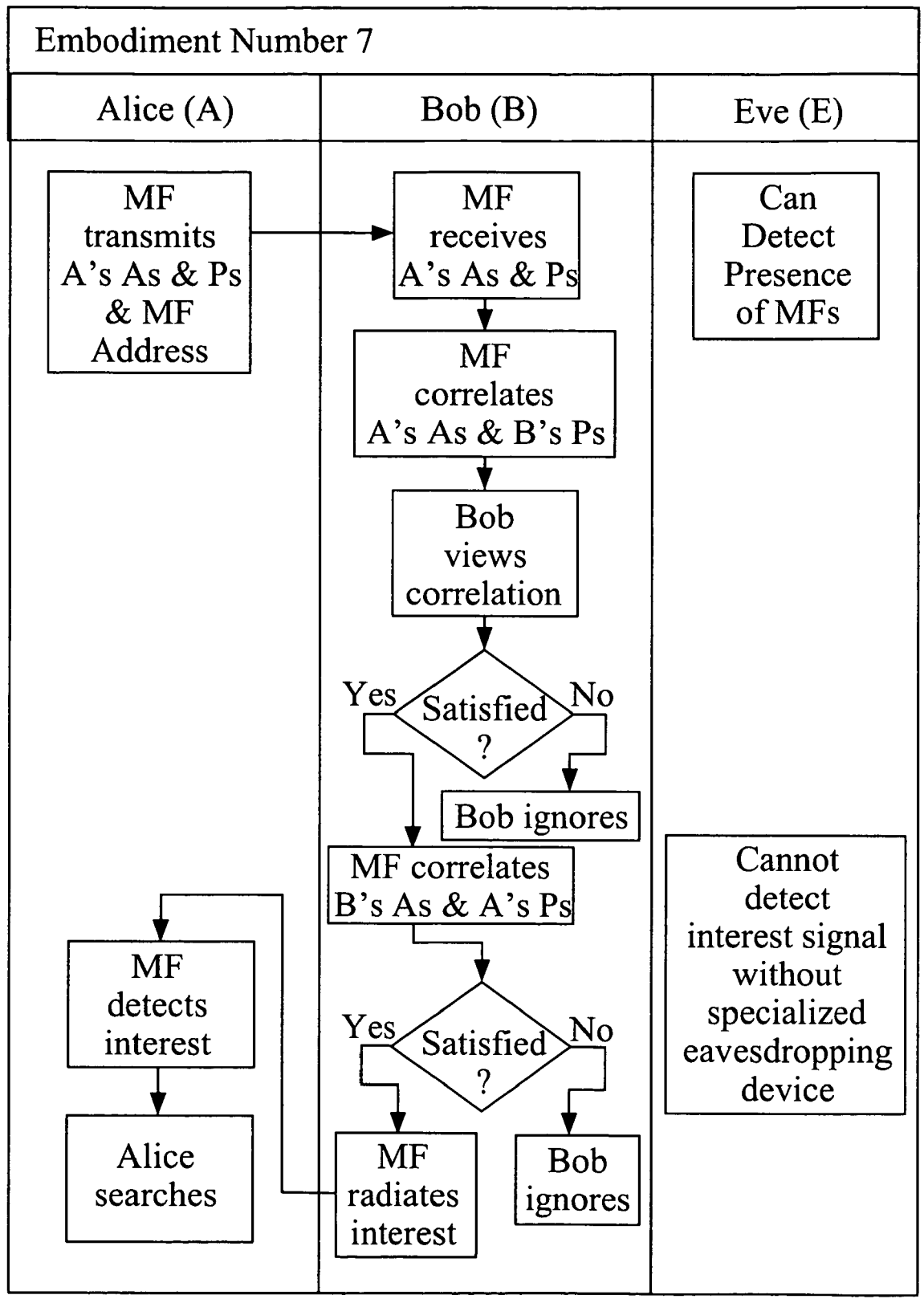

In Embodiment Number 7, shown in FIG. 16, events proceed as shown in FIG. 15, except that Alice's MateFinder adds an encrypted discrete address to her signal. Bob may choose to have his MateFinder radiate an interest signal directed to Alice's MateFinder's address. If Alice's MateFinder detects that signal, she may initiate a search. Eve's and other MateFinders in the area can detect the presence of Alice's and Bob's MateFinders. However, since Bob's interest signal is directed to a discrete address, other MateFinders cannot detect the interest signal.

Figure 17:
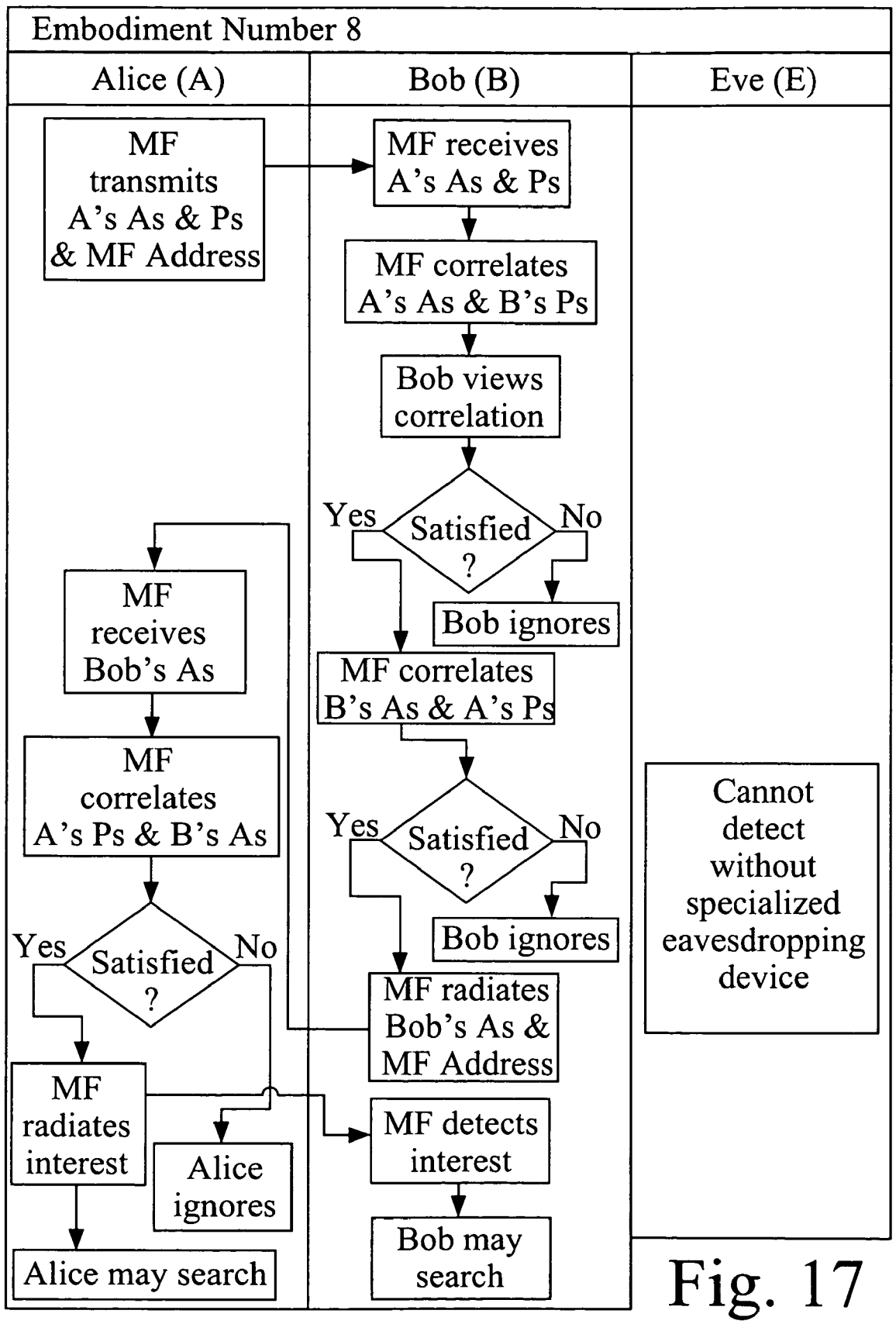

In Embodiment Number 8, shown in FIG. 17, events proceed as shown in FIG. 16, except that Bob may choose to have his MateFinder radiate his own attributes along with its encrypted discrete address. If Alice's MateFinder detects that transmission, it correlates Alice's preferences with the received attributes. If Alice is satisfied with the degree of correlation, she may initiate a search. Eve's and other MateFinders in the area can detect the presence of Alice's and Bob's MateFinders. However, since Alice's interest signal is directed to a discrete address, other MateFinders cannot detect the interest signal.

Figure 18:
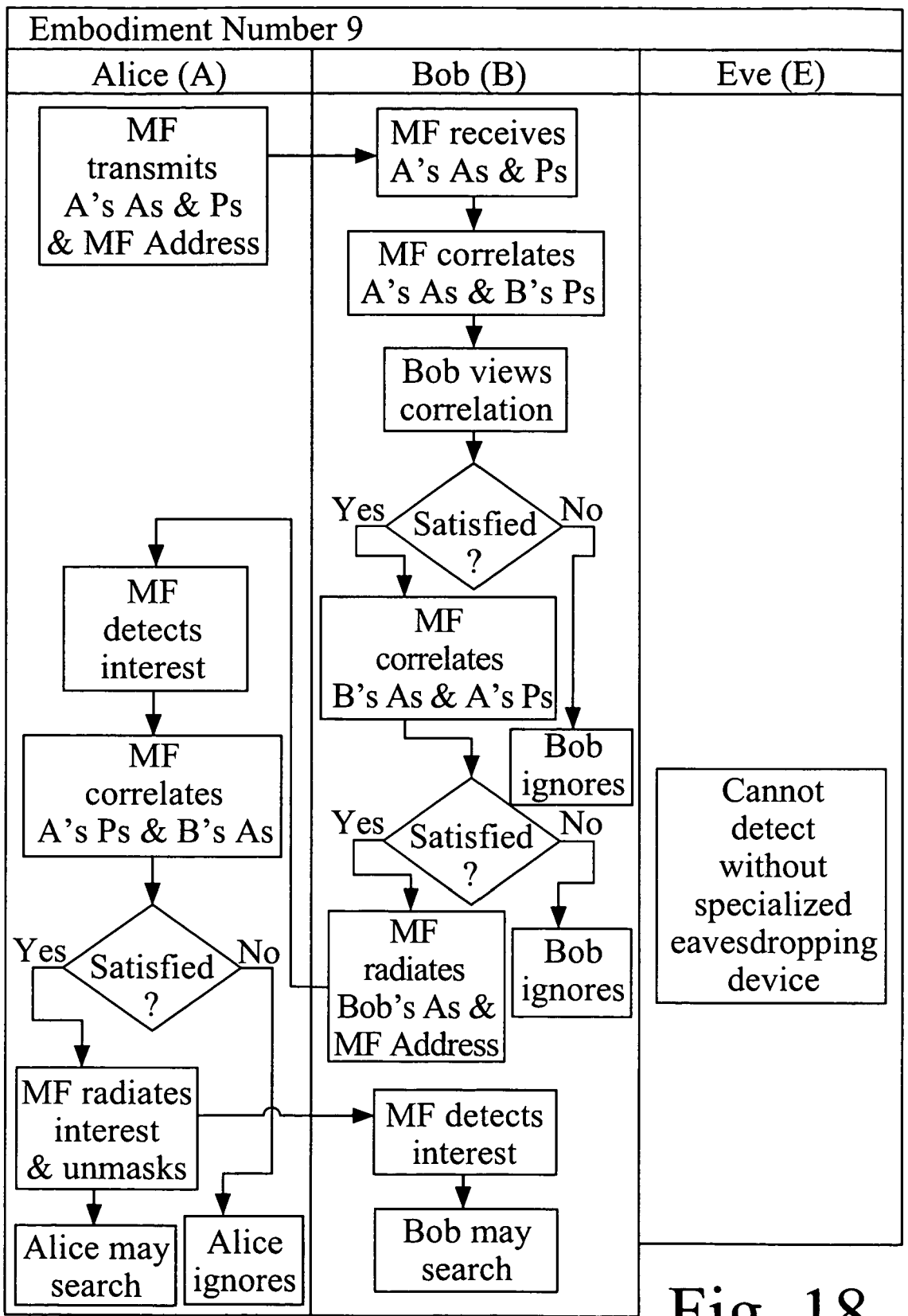

In Embodiment Number 9, shown in FIG. 18, events proceed as shown in FIG. 17, except that Alice may choose to have her MateFinder unmask her location to make her easier to locate, and at the same time to radiate an interest signal directed at the address of Bob's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's and Alice's interest signals are directed to the other's discrete address, other MateFinders cannot detect the interest signal.

Figure 19:
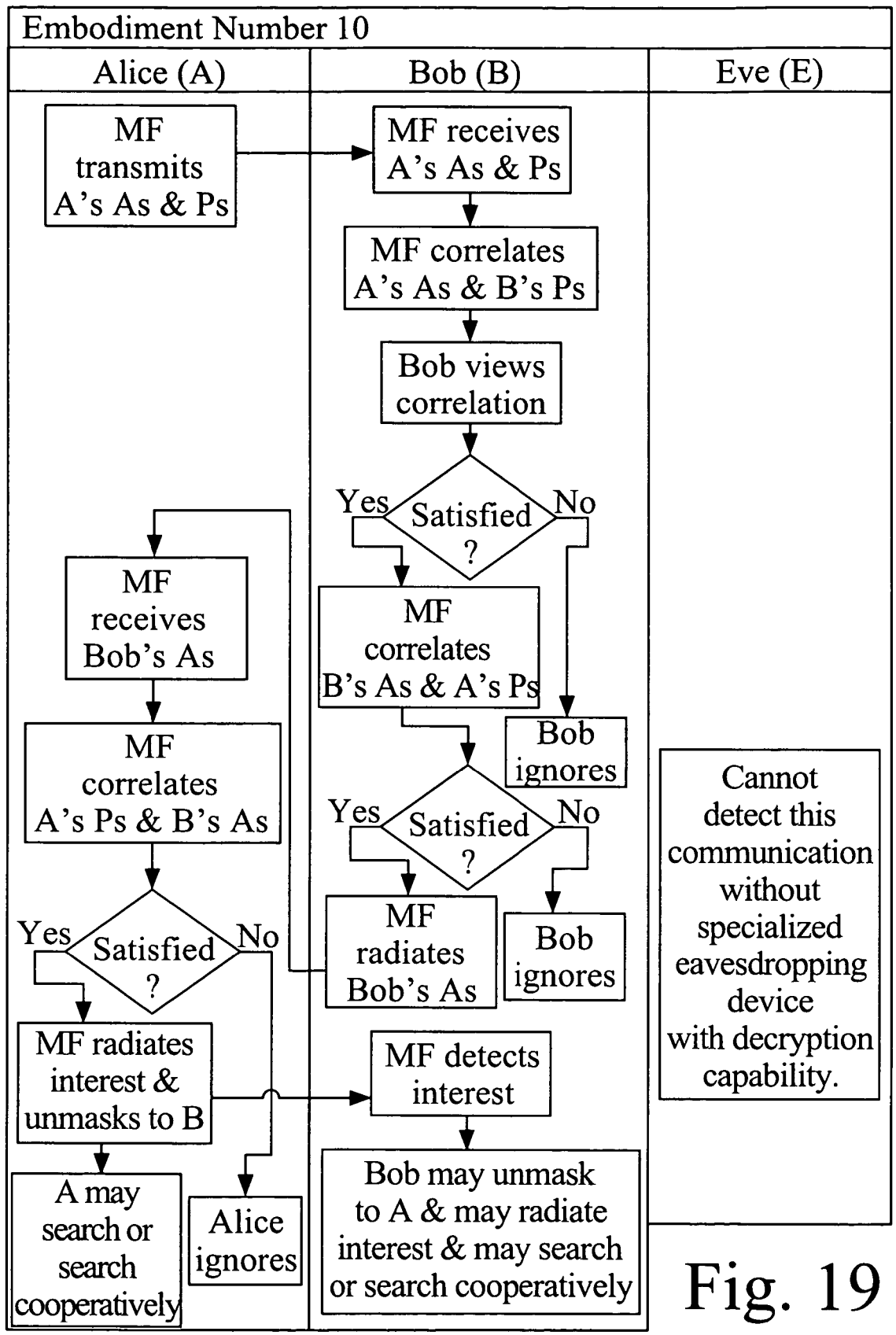

In Embodiment Number 10, shown in FIG. 19, events proceed as shown in FIG. 18, except that Alice may choose to have her MateFinder unmask her location to make her easier to locate, and upon receiving Alice interest signal, Bob may choose to unmask his location to Alice's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's interest signal is directed to a discrete address, other MateFinders cannot detect the interest signal. In addition, since unmasking is done only to discrete addresses which may be encrypted, even if equipped with specialized listening equipment, an eavesdropper cannot take advantage of the unmasking.

Embodiment Number 11, shown in FIG. 20, includes an embedded VoIP or cellular telephone. As before, Alice's MateFinder transmits her Attributes and Bob's MateFinder receives and correlates them with his Preferences. If he is satisfied with the match, he can confirm her Attributes or check her background through the embedded cellular or VoIP telephone, either by voice or browser. If he is satisfied with the result, he can offer his cellular or VoIP telephone number to Alice or send her a text message which includes his profile. If Alice is interested, she may call Bob's cellular or VoIP telephone number or send him a text message. She has the further options of ignoring his message or forwarding his profile to a third party.

In this embodiment, and in other embodiments that use cellular or VoIP telephones, a central system may rely on location information gleaned by a central server from the Global Positioning System (GPS) or other location device in the telephone, and delivered by the cellular or VoIP service provider as part of the users' service arrangement. In these cases, the central server may use this information to compute the relative positions of users and provide for the exchange of Attributes and Preferences through the cellular or VoIP network. This arrangement would obviate the need for special radio-frequency devices in the MateFinder.

Embodiment Number 12, shown in FIG. 21, proceeds as FIG. 20, except that if Bob is satisfied with the background check he may proceed to one of two secure communications protocols. These alternate protocols are described in FIG. 22 and FIG. 23.

In FIG. 22, Bob sends Alice an anonymous text message offering to exchange keys for a public-key cryptosystem such as the RSA™ algorithm. Using this or a similar public-key algorithm, Alice may send Bob a message encrypted with Bob's public key, which only Bob can decrypt, and similarly, Bob can send Alice a message using her public key which only she can decrypt. If Alice responds with her key, Bob can decide whether to request her cellphone number. If she is agreeable, they may exchange cellular or VoIP telephone numbers securely using the public-key system, and may manually dial the number using an embedded cellular or VoIP telephone or a separate telephone.

The protocol in FIG. 23 proceeds as FIG. 22, except that either or both embedded telephones may automatically decrypt the other's cellular or VoIP number and initiate a call.

Embodiment 13, shown in FIG. 24, is similar to earlier embodiments except that it allows for multiple MateFinders to interact. Bob may broadcast text messages using his MateFinder or other means. Those receiving his text messages may then respond and/or unmask their position.

Embodiment Number 14, shown in FIG. 25, is similar to that shown in FIG. 24, except that Bob may suggest and/or provide directions to a suitable meeting place at which face-to-face discussions may ensue.

FIGS. 26 and 27 show different embodiments of a Contractor Finder. This is a generalized device and process which can be used by individuals, groups or inanimate objects to locate compatible matches. Examples include cranes in a seaport, which are restricted to certain load limits and classes of cargo; visiting ships in a port or marina, seeking a suitable slip or dock; exhibitors at a trade show; and many other instances which will be apparent to those who are familiar with specialized fields. In FIG. 26, Alice calls a contractor placement service on her cellphone and is offered a variety of potential contractors, either by voice, browser or other means. She then considers these prospects, and may narrow her search by adding other criteria. She then views a narrowed list, and may make a selection from that list and contact suitable prospects, using information or links provided by the placement service.

In FIG. 27, Alice rents or borrows a ContractorFinder, a device similar to a MateFinder, and programs her preferences into the device at a kiosk or online. Her ContractorFinder then radiates these Attributes. If there are responses, Alice considers them and may add further criteria. She then repeats this process as many times as necessary to select a suitable match.

III. Embodiments of the Invention for Use with a Wireless Network

In another embodiment of the invention, a MateFinder™ 49 is configured to communicate over a wireless network 50 via wireless signals 51 using a network radio 52. In one preferred embodiment, this radio 52 is a cellular telephone that is built into the MateFinder. One example of this combination 49 is shown in FIG. 28. In alternative embodiments, the network radio 52 may be a two-way pager, a Blackberry™ or some other text-message/e-mail device, a personal digital assistant, a computer with wireless access, a short range radio such as a "walkie-talkie," a VoIP telephone, or any other device that provides wireless communication over network 50. In one embodiment of the invention, the transceiver 10 and the network radio 52 are co-located, meaning that they are combined in a single package, housing or enclosure. In an alternative implementation, a MateFinder may be connected to a cell phone using a wired or wireless link. In yet another embodiment of the invention, the transceiver and the network radio may be integrated into a single radio circuit that functions on more than one frequency band. In this Specification and in the Claims that follow, the term "radio" includes any means or device for communicating over a distance without a wired connection.

The use of the reference characters "52a" and "52b" to refer to network radios is intended to assist the reader in understanding the invention, but does not necessarily connote any substantive differences in the devices. Similarly, the use of the reference character "52a" does not necessarily mean that the user is a man, or that the user of a device labeled "52b" is a woman.

In one preferred embodiment of the invention, the network 50 is a cellular telephone network. In an alternative embodiment, the network 50 may be any public or private network that enables communications among network radios 52.

The user 10 may employ the cellular phone function of the MateFinder to place conventional voice calls. This cellular phone may also include a display screen, a keyboard and a camera. This phone may also offer one or more of the following functions: text messaging, e-mail, Internet browsing which is used to access a website 19, audio and/or video recording and GPS location.

A. MateFinder/Telephone Combination

FIGS. 29-34 depict an alternative embodiment of the invention, which uses a cellular or VoIP telephone 50 in combination with the present invention, which is referred to as the MateFinder/CP™ 49, a Trade & Service Mark owned by the Applicant. FIG. 24 portrays a woman with a MateFinder/CP 49 that includes a cellular or VoIP telephone, an LCD screen, and browser software which enables the user to access information via the Internet. Like the more basic embodiment of the MateFinder that is illustrated in FIG. 2, the device 49 shown in FIG. 29 detects a suitable match for the user. Unlike the version of the MateFinder shown in FIG. 2, the user may employ this enhanced version to download the profile of the suitable match. The attributes which prompted the match are displayed on the LCD screen. Other information, including photographs or videos may be presented for the user's consideration before she communicates with him or approaches him.

Figure 30:
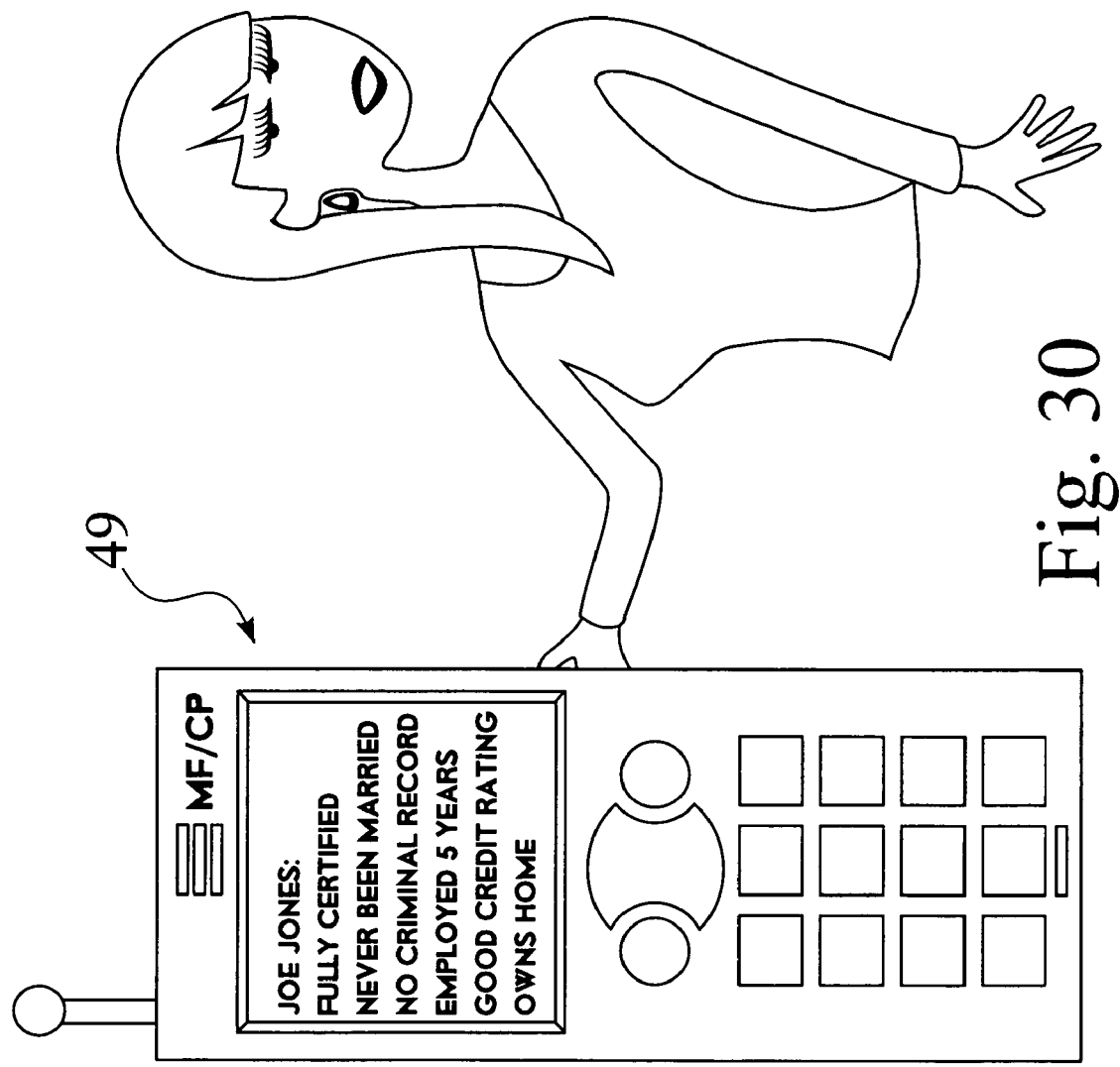

The user may also obtain certifications of the attributes of her prospective match, as shown in FIG. 30. These certifications may pertain to marital status, criminal record, employment history, credit rating, home ownership or any other independently verifiable public record that would help the user decide whether to communicate with the identified match.

Figure 31:
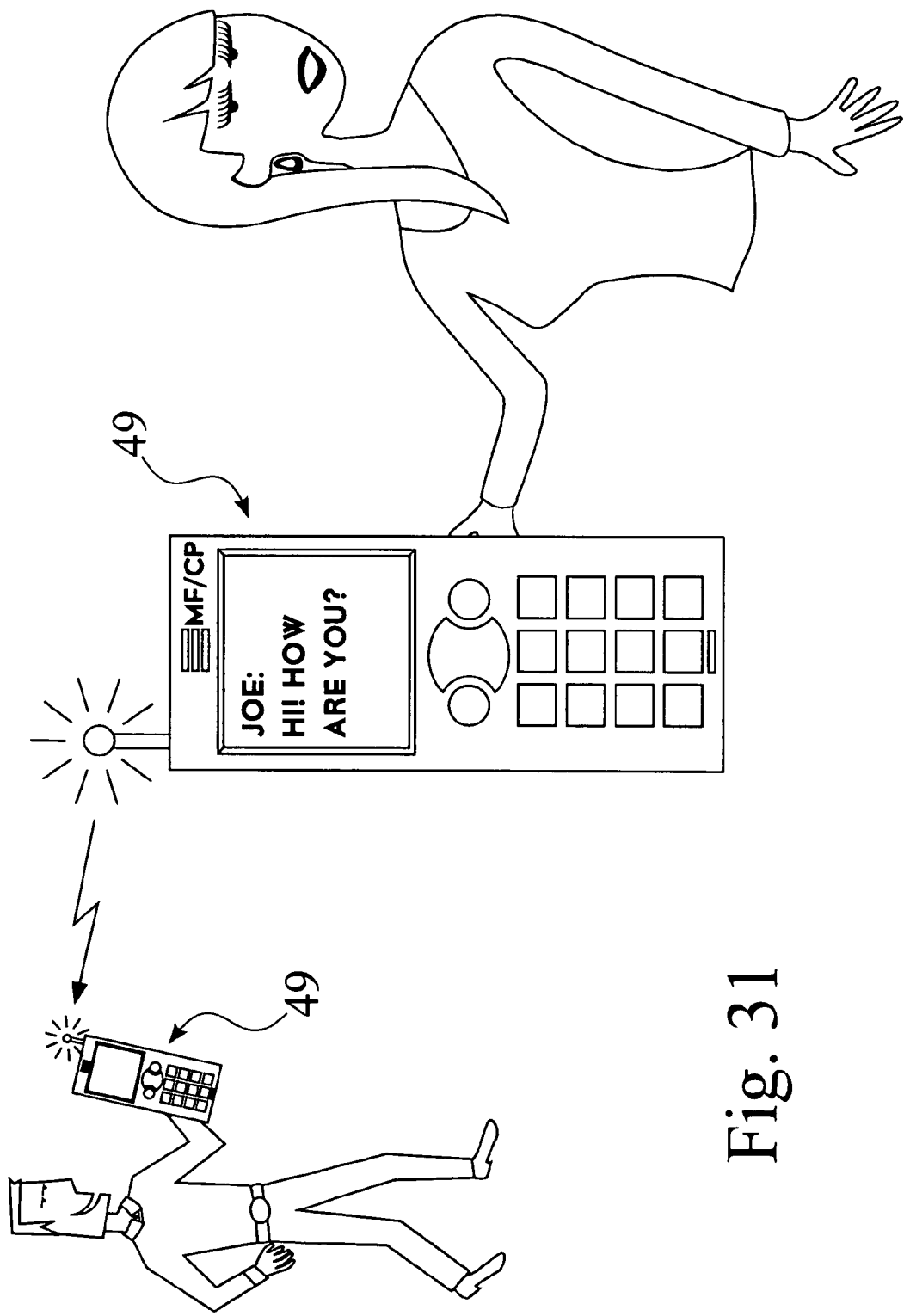
Figure 32:
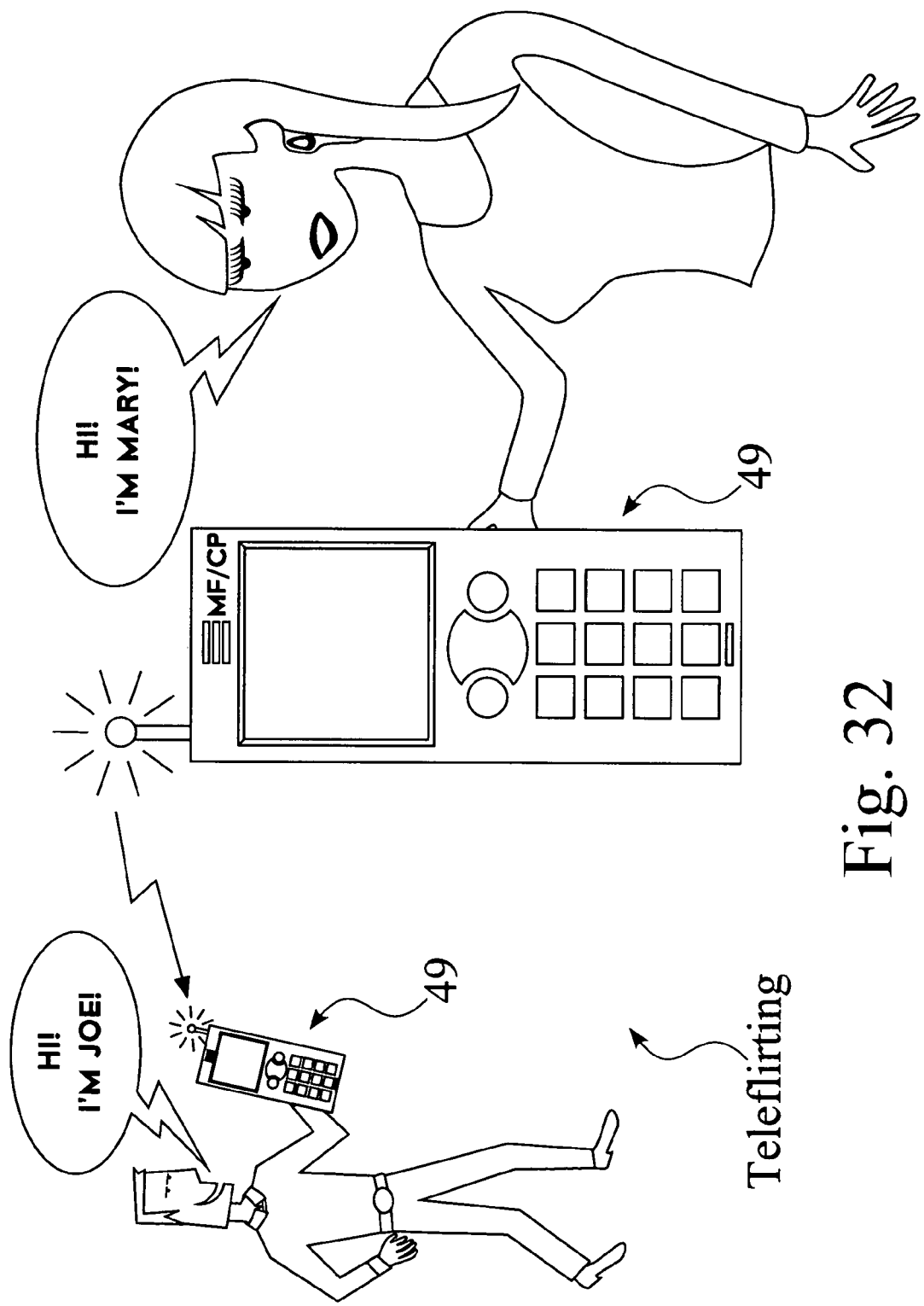

FIG. 31 reveals an additional feature of the embodiment of the invention which also functions as a telephone. After viewing the certified attributes shown in FIG. 30, the user decides to contact him directly by placing a call on the telephone, or by sending him a text message via the Internet. She may engage in some preliminary communications with her prospective match before approaching him. This feature of the invention is exhibited in FIG. 32, and is referred to as "TeleFlirting$^{SM}$," which is a Trade & Service Mark owned by the Applicant. The TeleFlirting function may also include making an audio and/or video recording using the camera and the network radio. This recording may then be sent to a prospective match as an e-mail attachment.

Figure 33:
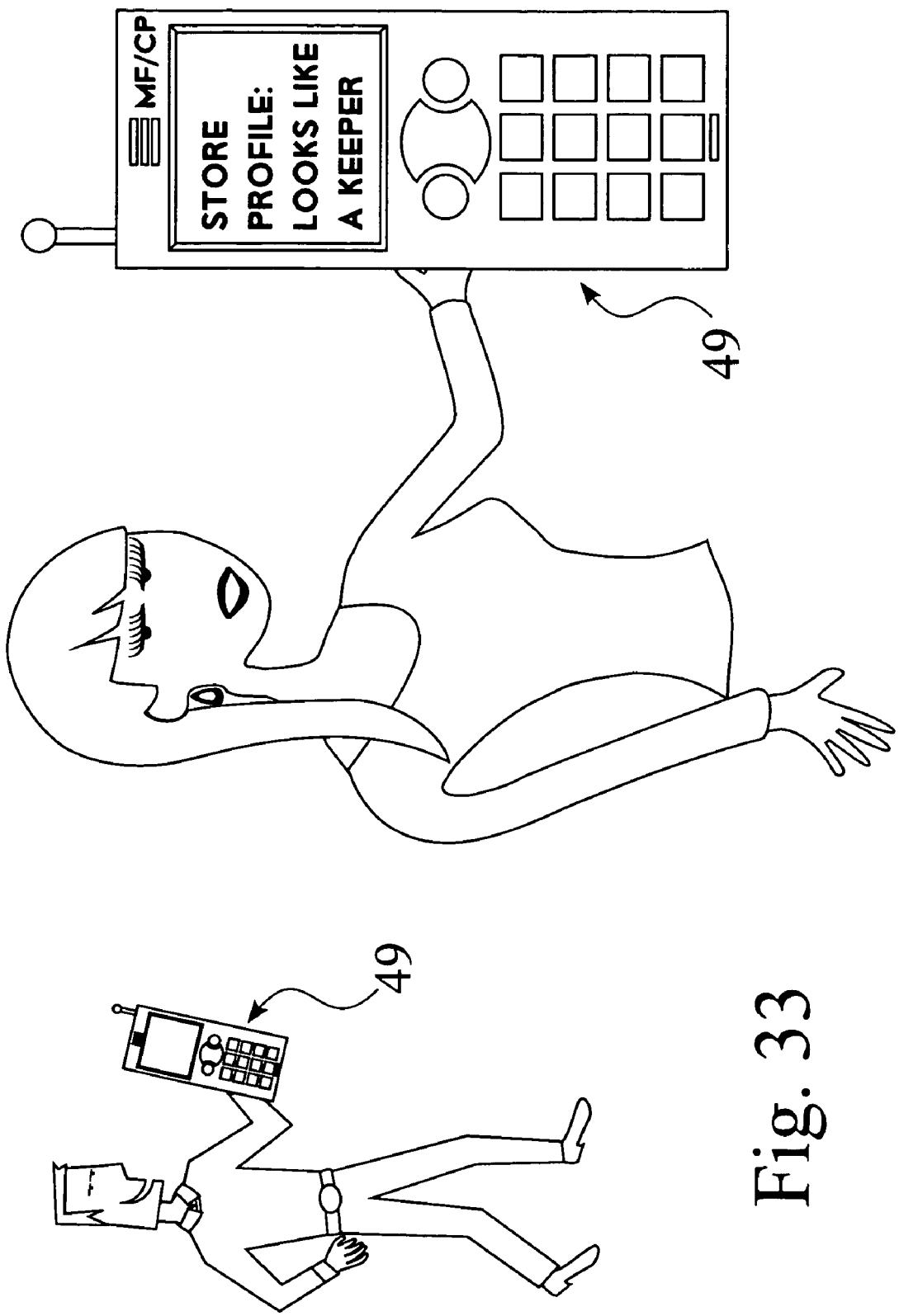
Figure 34:
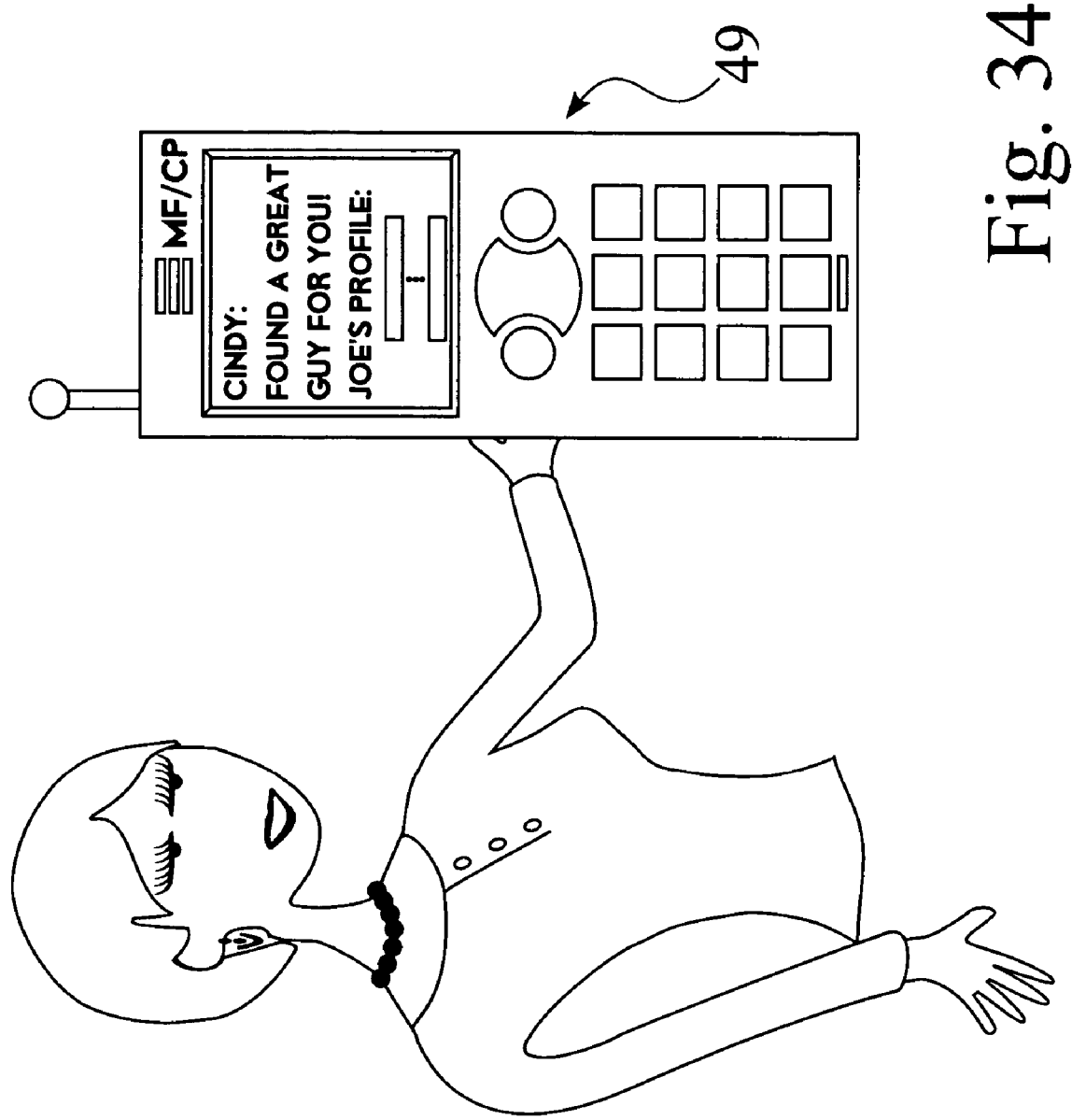

Another feature of this embodiment is portrayed in FIG. 33, which enables the user to save the profile of a potential match. In this Specification and in the Claims that follow, the term "profile" means a set of one or more attributes. The profile may be saved in a memory located in the MateFinder/CP 49, or may be saved as part of her account at the e-pheromone.com website. As an alternative, the user may decide that the prospective candidate is a better match for a girlfriend. In FIG. 34, the user has forwarded the downloaded profile to her friend's MateFinder/CP 49.

In another embodiment, the invention may also include a GPS receiver, which enables each active MateFinder to "know" its own position, and with the aid of a central server, or with information on the positions of other devices, to "know" its position with respect to the position of prospective matches. As discussed above, this embodiment may eliminate the need for other radio devices in the MateFinder.

B. The ContractorFinder™

Figure 35:
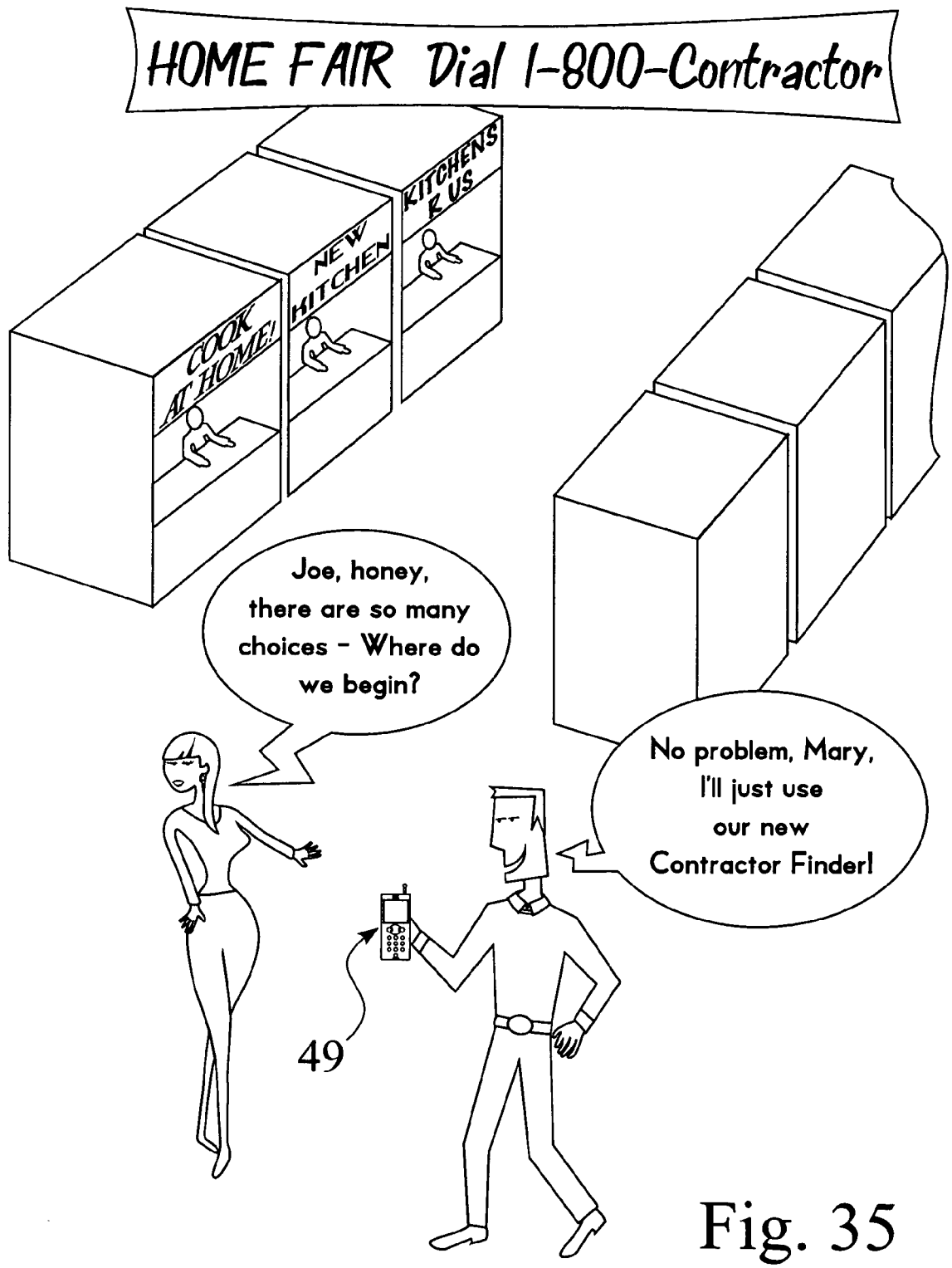
Figure 36:
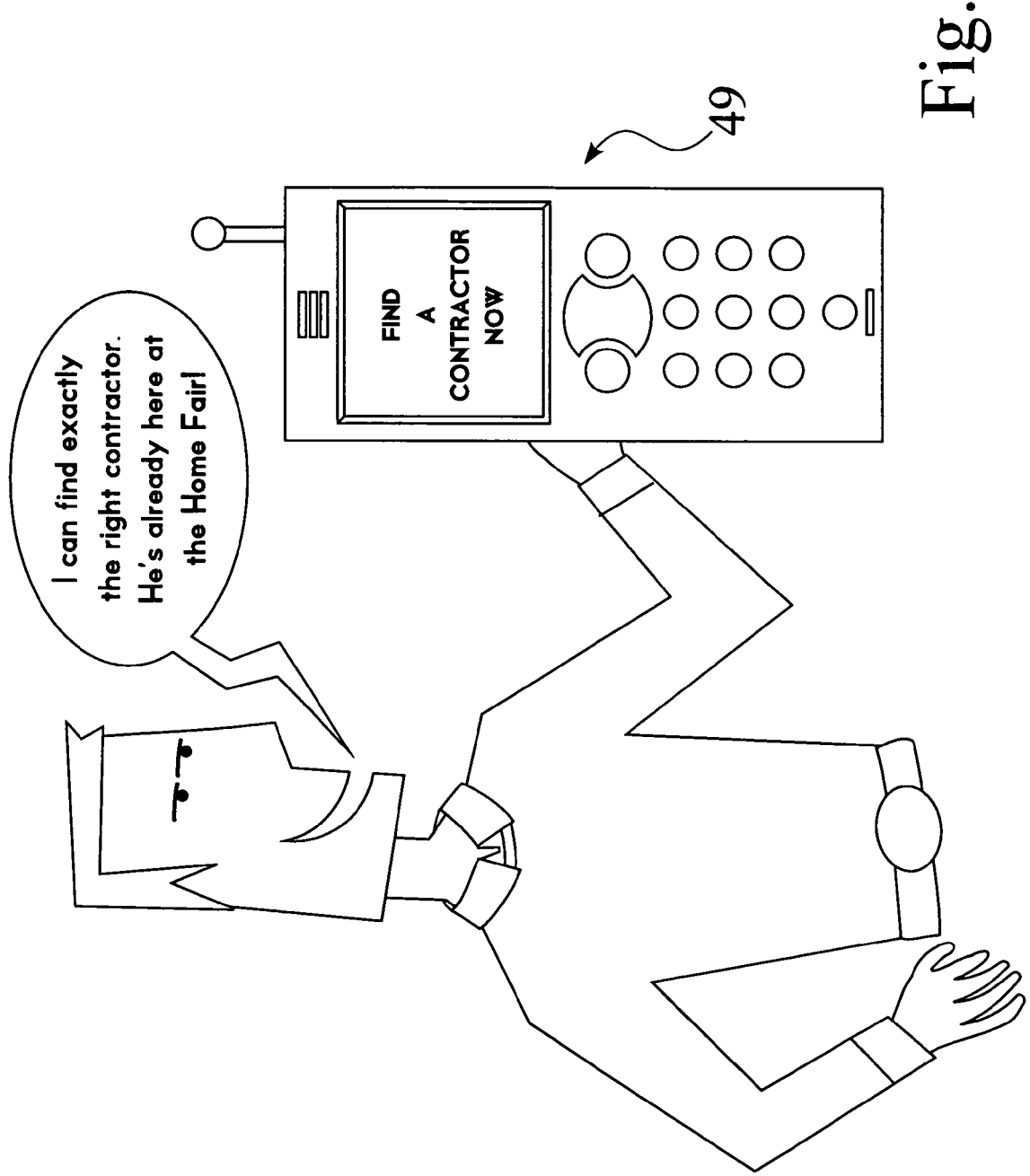

In yet another embodiment of the present invention, the MateFinder/CP™ may be used to obtain information about a product, service or some other subject matter of interest. In one particular implementation of the invention, the MateFinder/CP 49 is used as a ContractorFinder™. The ContractorFinder Trade & Service Mark is owned by the Applicant. FIG. 35 furnishes a view of two persons visiting a home show which is attended by many contractors who can provide a wide variety of services related to construction and remodeling. As shown in FIG. 36, one of the visitors uses his ContractorFinder to obtain information about contractors at the home show. He can either dial a toll-free telephone number such as "1.800.CONTRACTOR" or can use the browser function to access information via the Internet.

Figure 37:
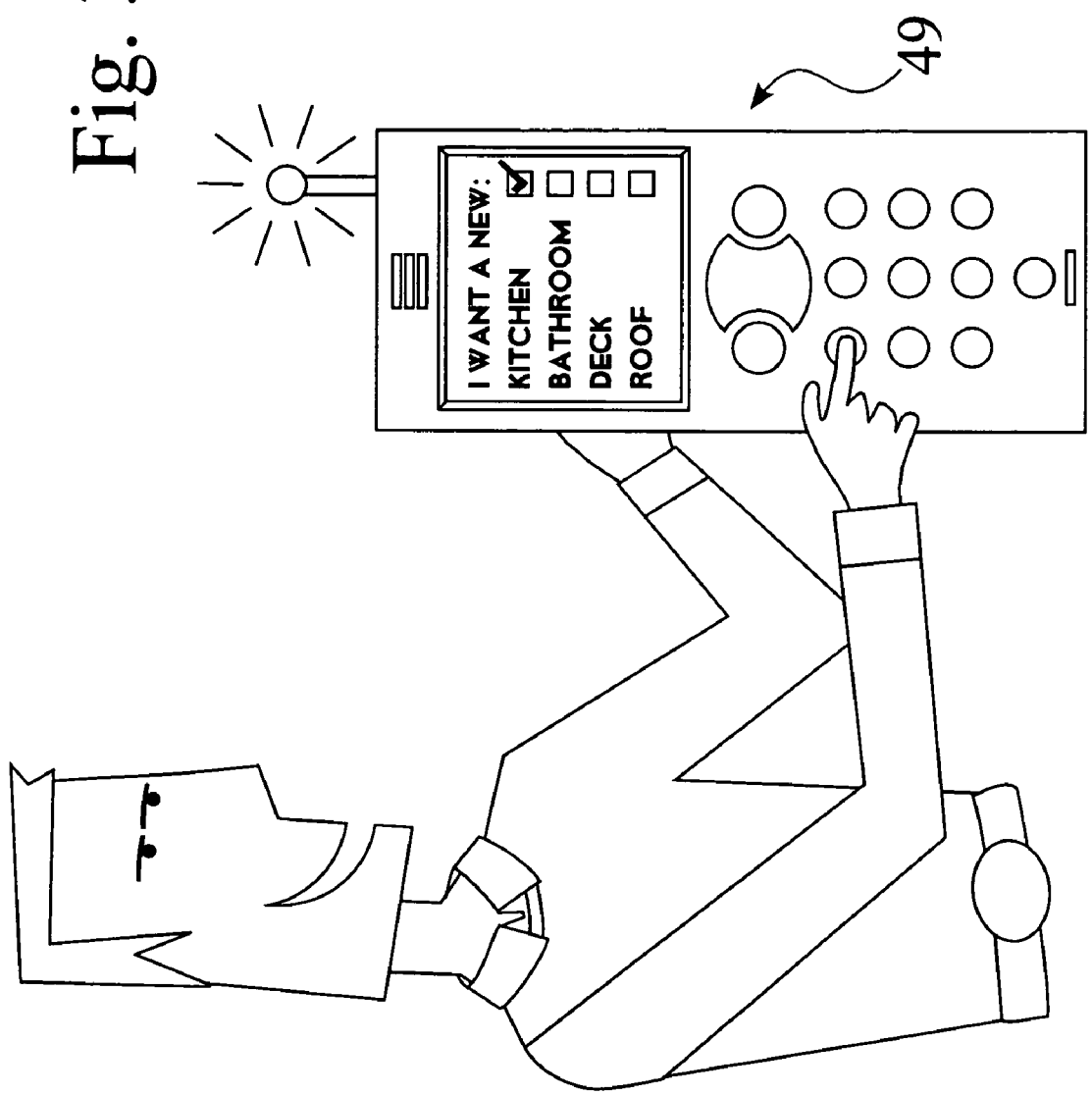
Figure 38:
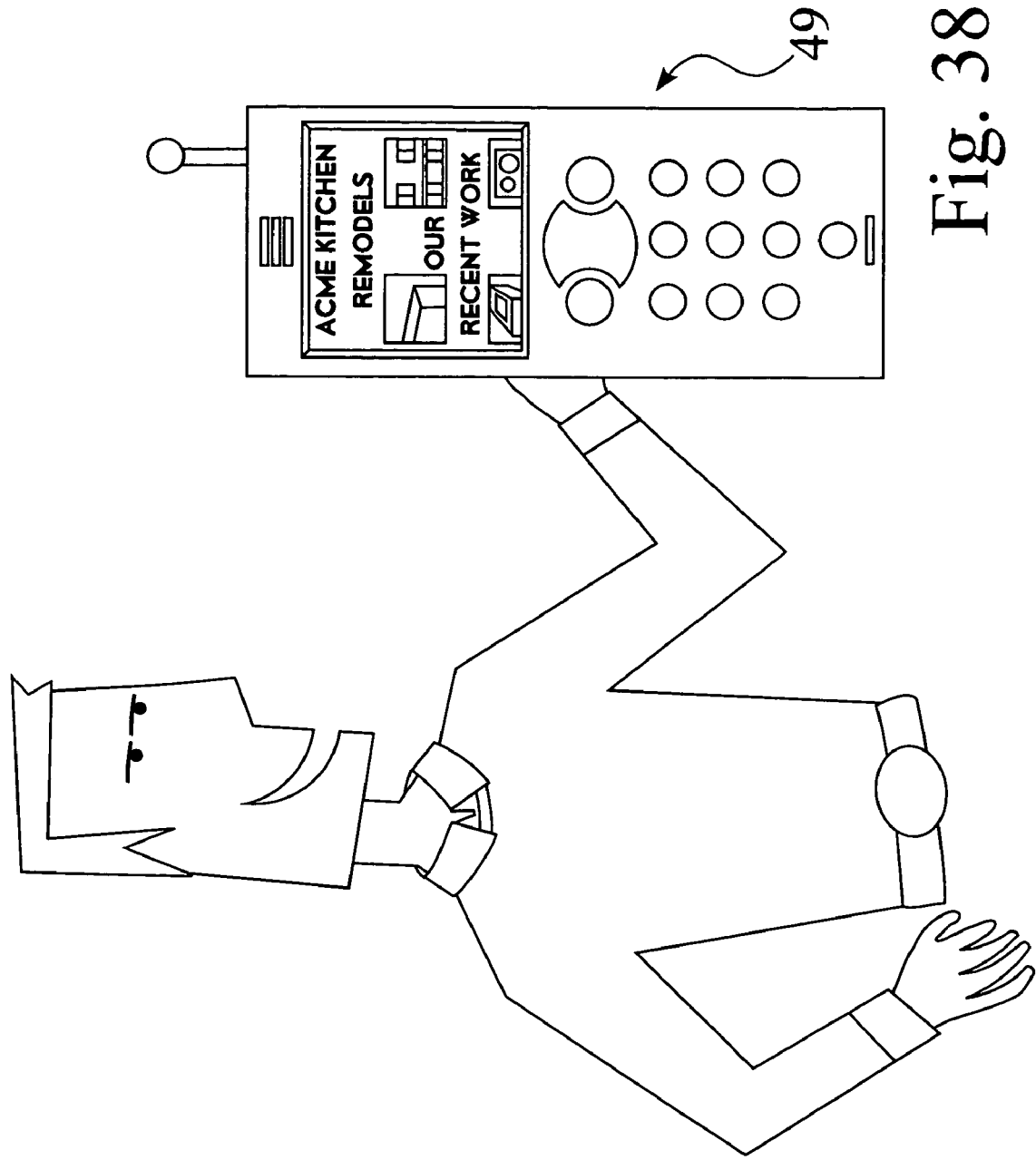

FIG. 37 shows a the LCD screen on the ContractorFinder as it displays a list of selections concerning contractor services. After the user chooses from among these choices, information about selected contractors is downloaded to his ContractorFinder in the form of text, images and/or videos, as shown in FIG. 38. The downloaded information may also help the user find the contractor's booth at the home show.

The description of this embodiment is intended to illustrate one particular application of the present invention, and is not intended to limit or to confine the invention to the particular embodiment of a home show attended by contractors. The invention may be used to find matches of attributes in any situation. Attributes may pertain to people, items in a warehouse, places or features of geography, or any other item or thing that is capable of being described and matched.

C. MateFinder with Direction & Range Finder

Figure 39:
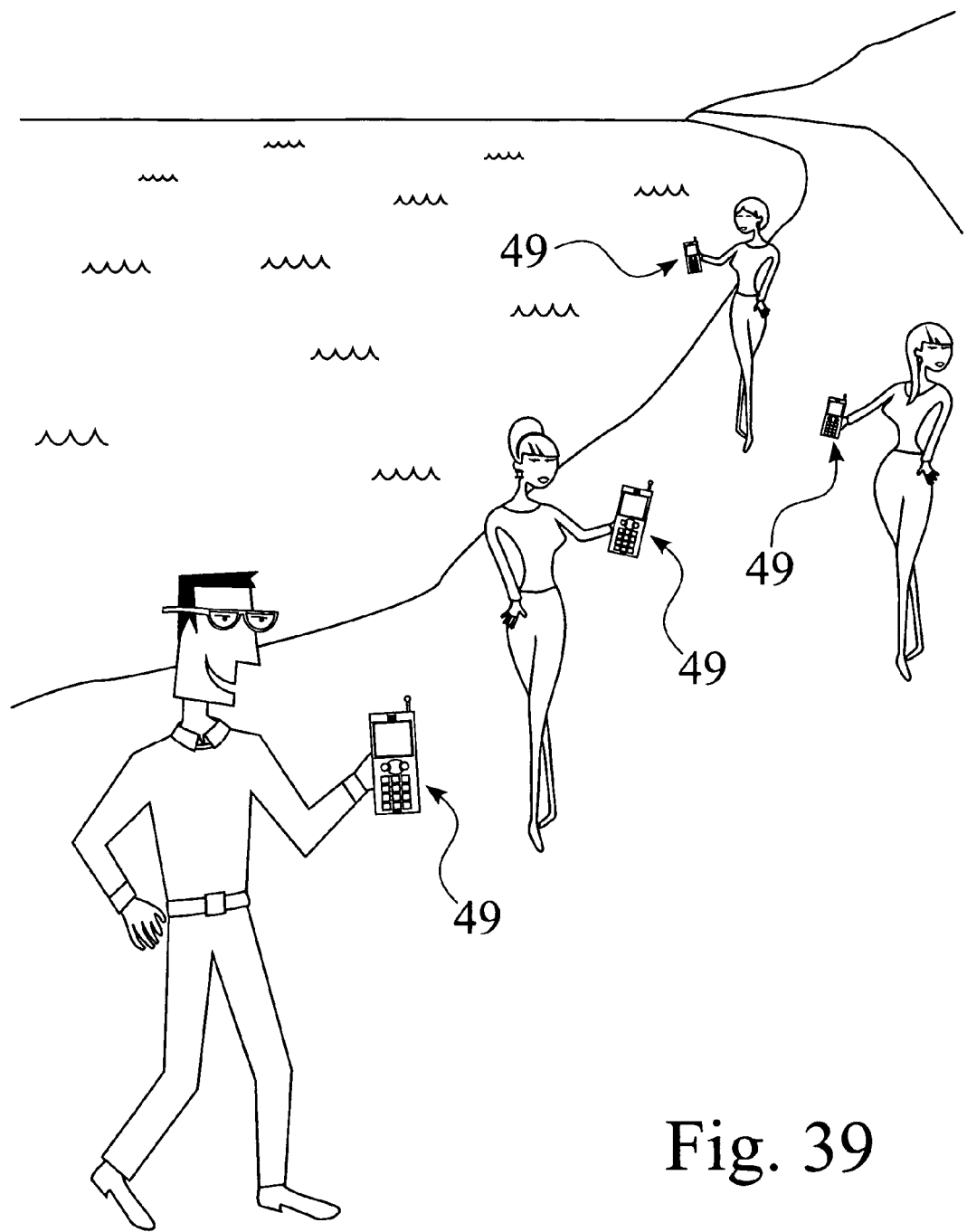
Figure 40:
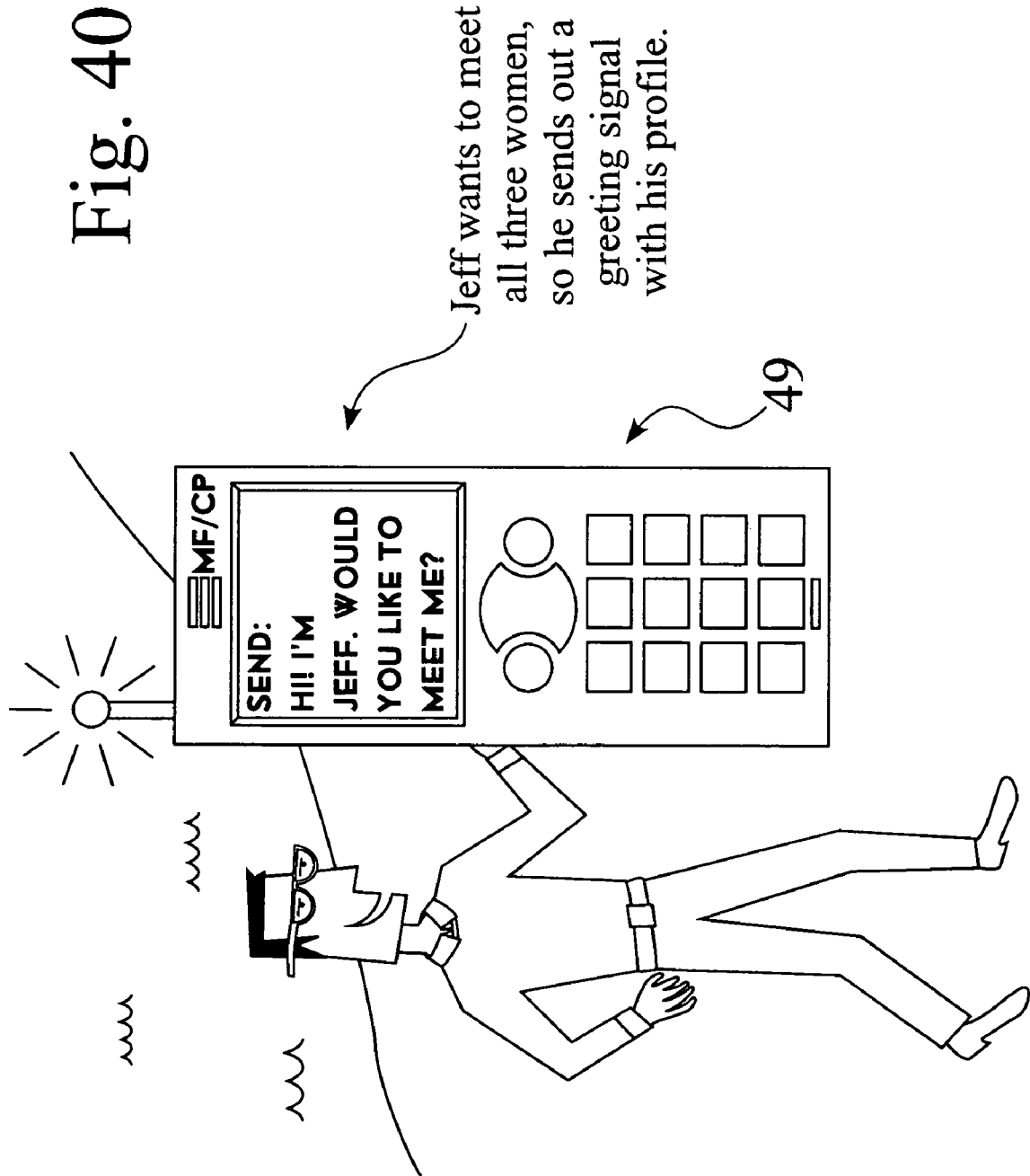
Figure 41:
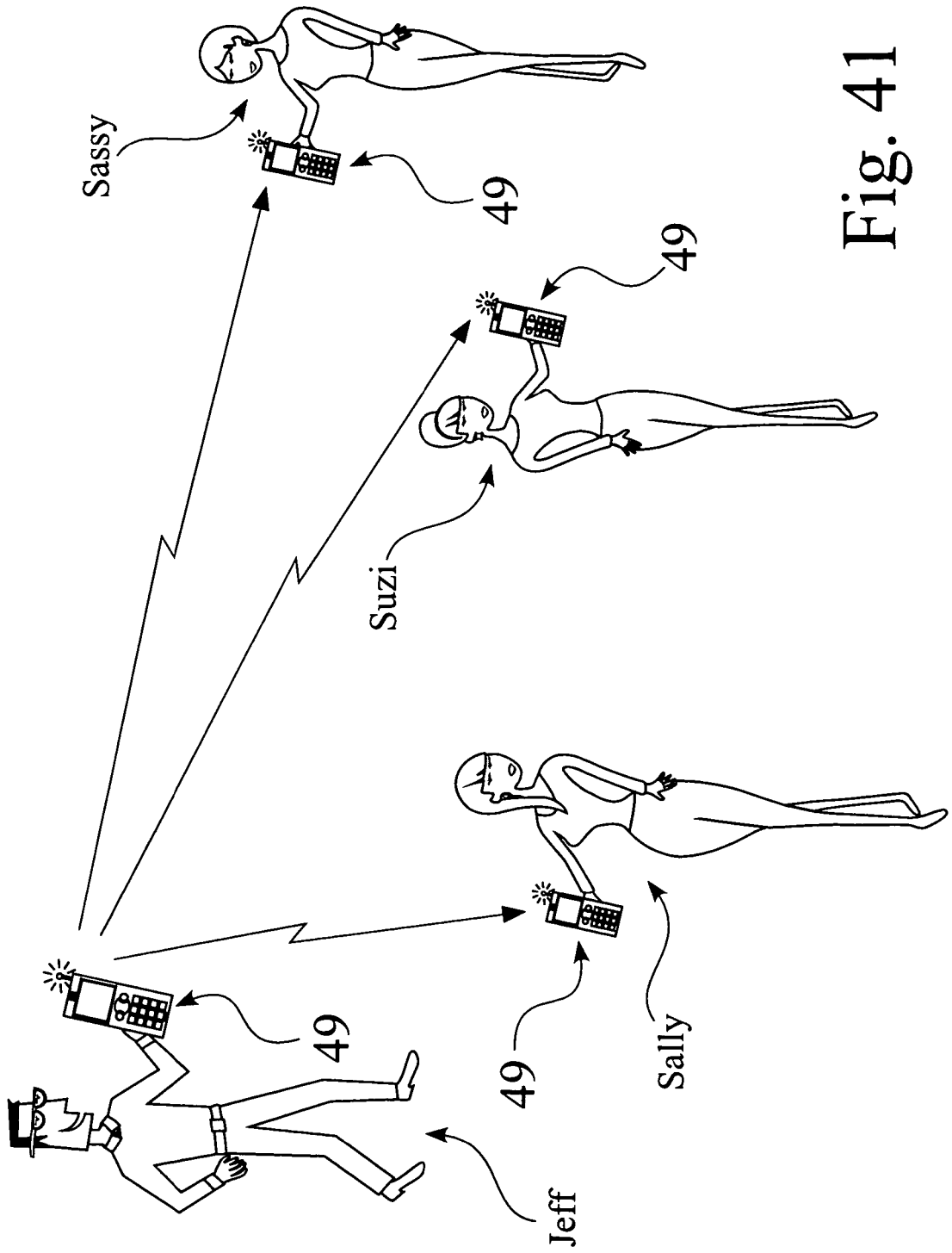
Figure 42:
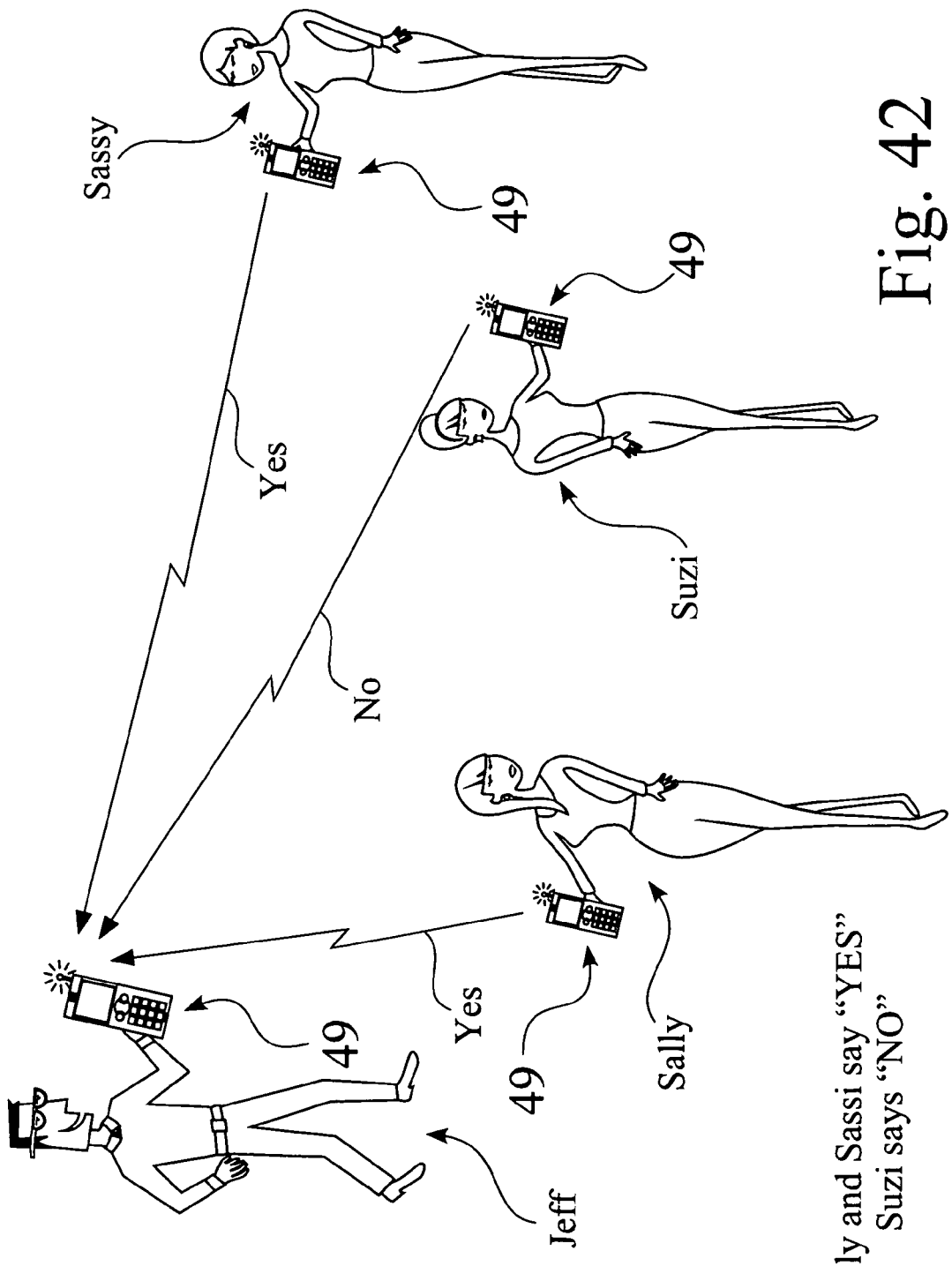
Figure 43:
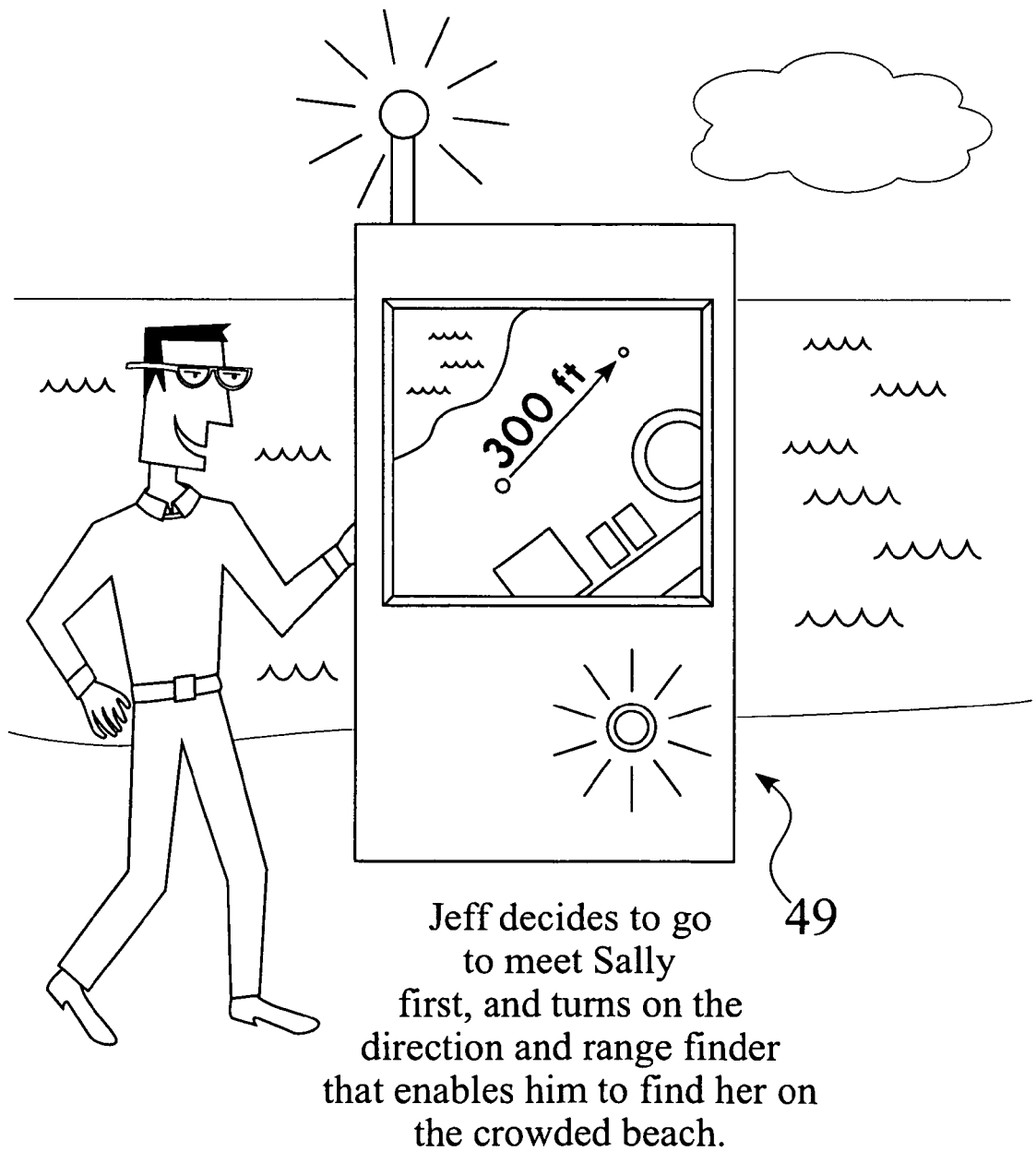

Another embodiment of the invention combines the MateFinder with direction and range finding capabilities. The combination is called the MateFinder/DRF™ 49. This Trade & Service Mark is owned by the Applicant. The MateFinder/DRF offers a user the ability to find someone in a large crowd, or in a large area, such as a beach or a ballpark. FIG. 39 furnishes a view of a user on a beach with his MateFinder/DRF, which has found three suitable matches in his general vicinity. In FIG. 40, the user sends a greeting message to three women using the text-message function. The greeting may be accompanied by the man's attributes, as presented in his profile on e-pheromone.com. In FIG. 41, the three women have received the greeting from the man. Two of the women decide to respond, while the third does not, as shown in FIG. 42. FIG. 43 shows that the man has decided to approach one of the women. He uses his MateFinder/DRF to request permission from the woman whom he is interested in meeting. When this woman grants permission, her MateFinder emits a homing signal, which enables the man to locate her by viewing a graphical display on the LCD screen of his MateFinder/DRF that supplies direction and range information.

In an alternative embodiment, the MateFinder with Direction & Range Finder may use a GPS radio to enable a user to find a match based on locations determined using the GPS System.

In yet another alternative embodiment, the MateFinder may use a method of location similar to that used the in the Distance Measuring Equipment (DME) used in aircraft navigation. In this embodiment, MateFinder A sends a signal to MateFinder B and starts an internal timer. MateFinder B, after a known delay Td, responds to Matefinder A. MateFinder A, on receiving this response, stops its timer and notes the interval Ti measured by the timer. MateFinder A may then calculate the distance between the two MateFinders by the formula:

$$D=c(Ti-Td)/2$$

where Ti and Td are as defined above, and c is the speed of light; in compatible units.

Matefinder A may then display this distance and continuously update it through this method, providing a means of locating MateFinder B.

D. MateFinder with Network-Pushed Attributes

Figure 44:
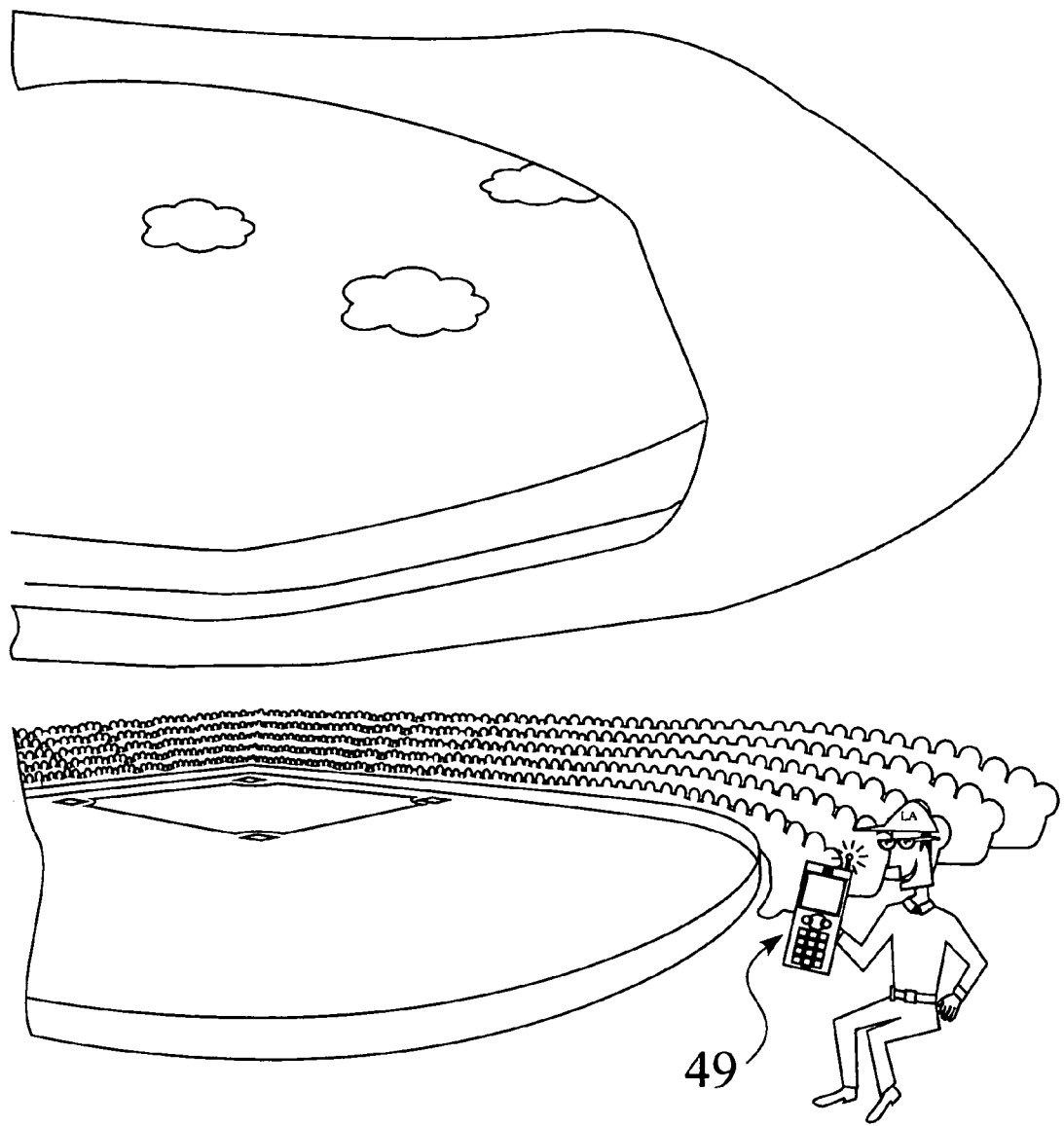
Figure 45:
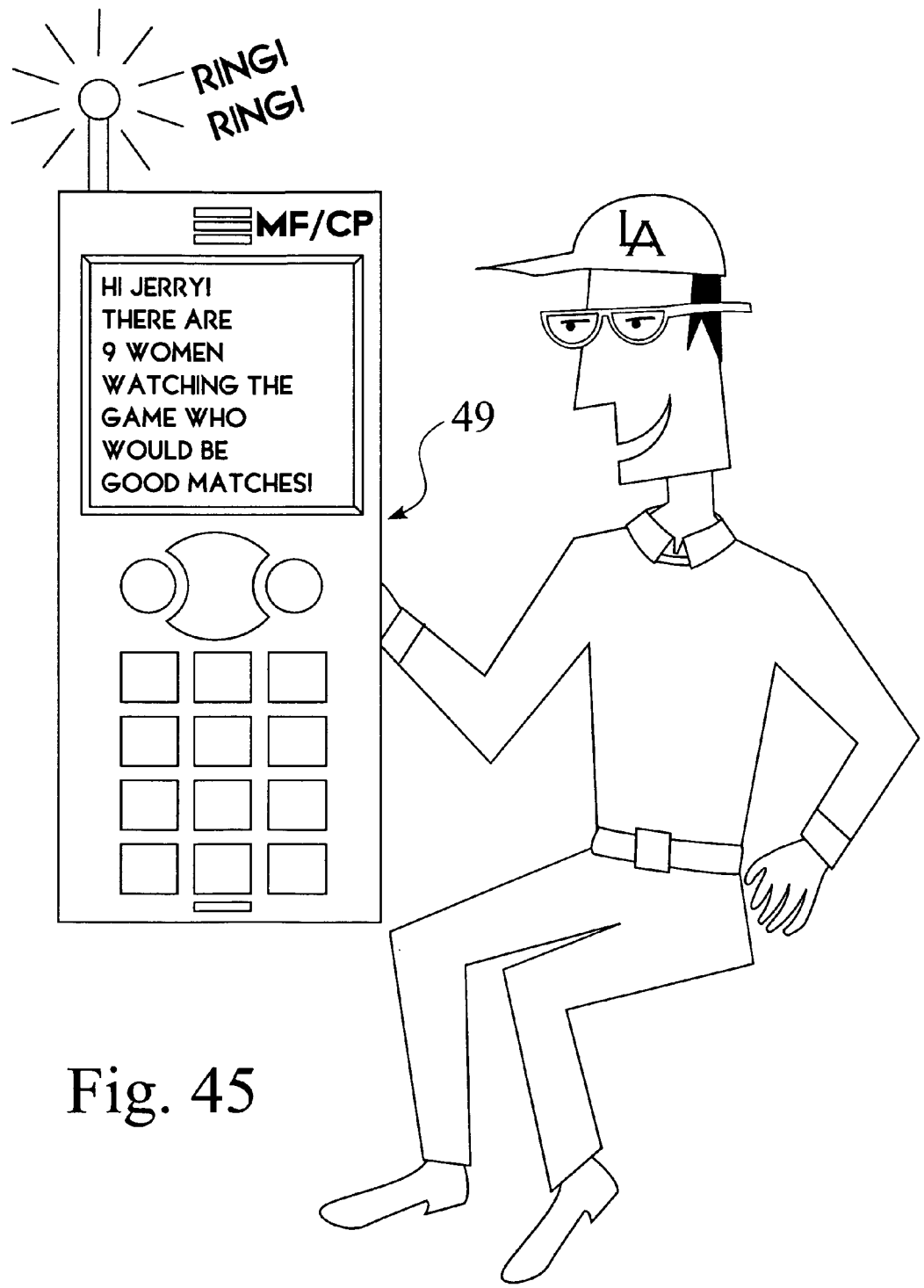

In another alternative embodiment of the invention, profiles of matches are automatically "pushed" to users. This version of the invention uses the MateFinder with AutoMatching™ 49. This Trade & Service Mark is owned by the Applicant. In one particular implementation, a user is watching a baseball game as shown in FIG. 44. His MateFinder with AutoMatching™ detects that there are several good matches who are also attending the game. Software at the e-pheromone.com website retrieves the profiles of the matches, and automatically sends them to the user's MateFinder, which rings or emits an alert to notify the user that profiles of matches have been conveyed to him, as shown in FIG. 45.

Figure 46:
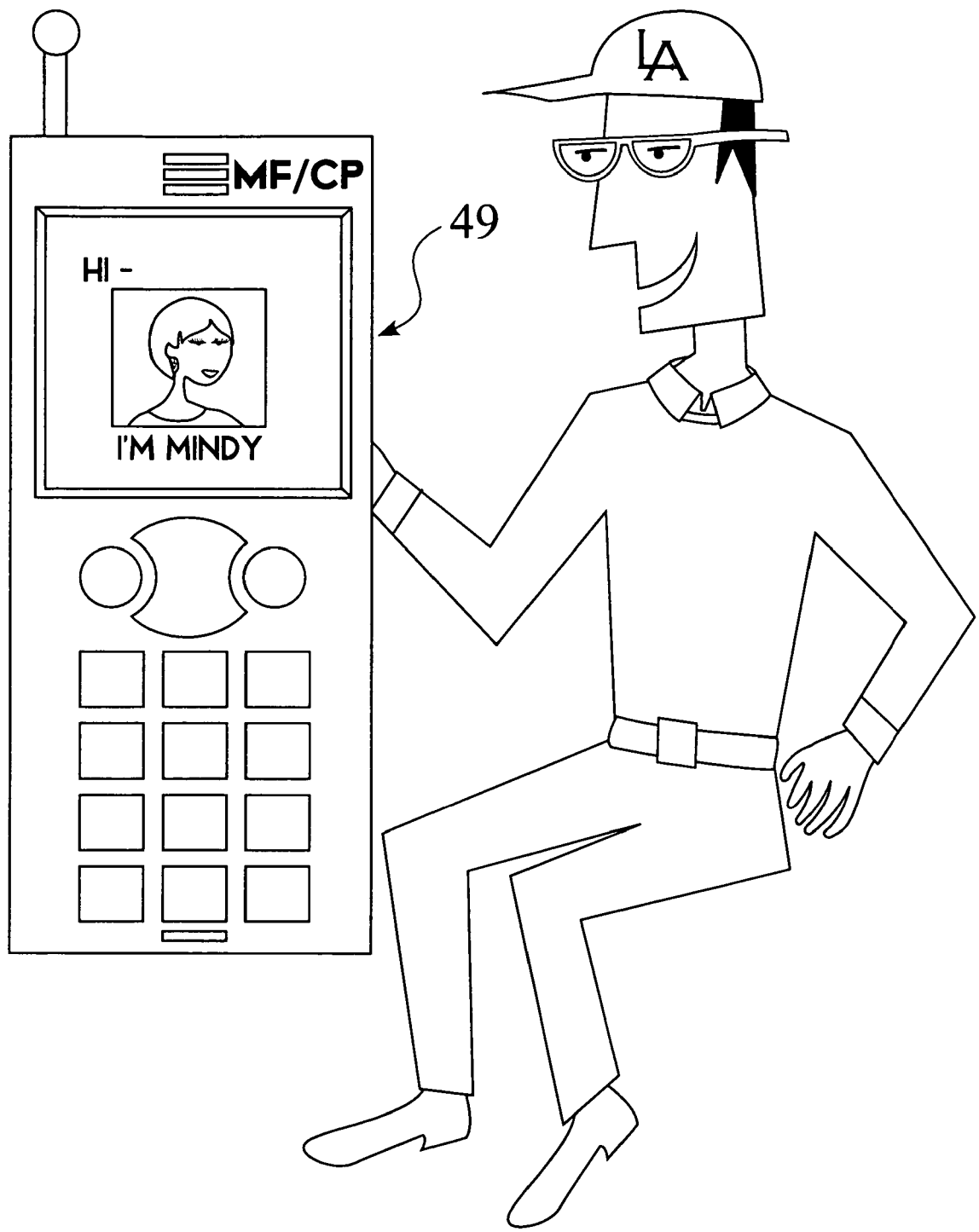
Figure 47:
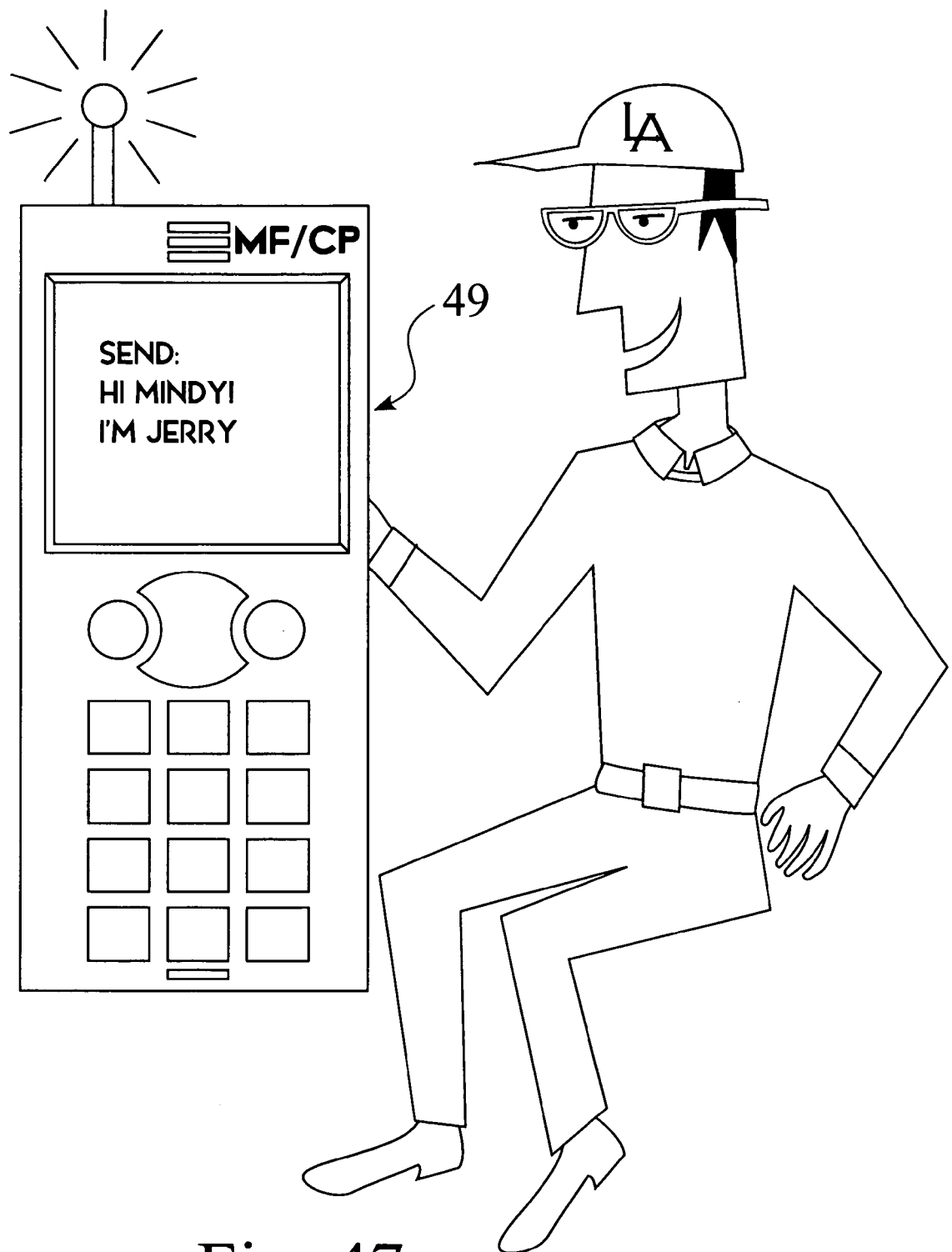
Figure 48:
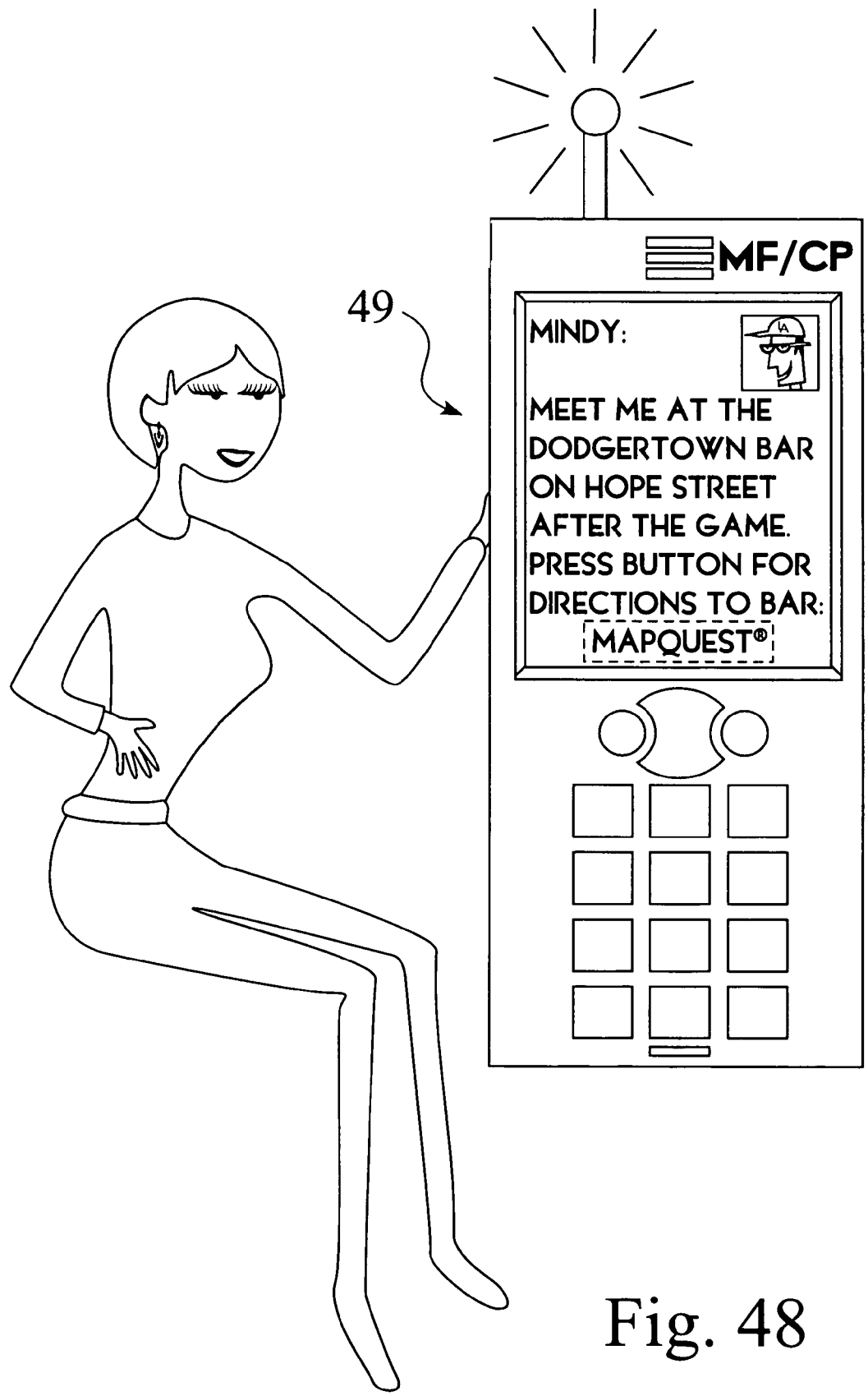

In FIG. 46, the user watches a short video or photograph which has just been received by his MateFinder, and decides to contact her via a text message or e-mail, as depicted in FIG. 47. In FIG. 47, the man sends the woman an invitation to meet after the ball game, and suggests a meeting at a restaurant near the stadium. As seen in FIG. 48, his invitation also includes a link to a webpage that furnishes a map and directions to the restaurant from the stadium.

E. MateFinder System Embodiments for Wi-Fi and Bluetooth Networks.

FIG. 49 is a basic schematic diagram for an exemplary Wi-Fi MateFinder 10. Wireless MateFinders 10 are typically portable handheld devices, and are small enough to fit in a shirt pocket or a purse, and/or can also be worn on belt clip. A microcontroller 32 having flash memory is connected to a wireless transceiver 70, which is connected to an antenna 30. As an example, the wireless transceiver 70 may be a Wi-Fi device. The Wi-Fi MateFinder 10 also includes a display 18, such as a 2.2" diagonal LCD TFT color display providing 176×220 resolution, and input means 53, such as a 48-key touchpad and controller, for user input allowing full alphanumeric entry. The exemplary Wi-Fi MateFinder 10 seen in FIG. 49 also comprises a USB port 20. This port 20 may be used to connect directly to a personal computer PC. A battery pack 72 may preferably be recharged through the USB port 20, either by connecting to high-power USB port on PC, or by connecting to AC-DC wall transformer. In some system embodiments, Wi-Fi MateFinders 10 comprise Wi-Fi enabled 802.11 devices that are limited to connecting with the system access points 104.

In some system embodiments, wireless MateFinders 10 are available in "singles" destinations, such as, but not limited to, Las Vegas, other gambling resorts, ski resorts, fun-in-the-sun resorts, singles only resorts, and/or cruise ships. MateFinders 10 provide an effective and efficient way to meet people for hookups, friendship, or dating.

In some MateFinder systems, MateFinder devices 10 may be rented to users at airports, at major hotels, and at kiosks around town. Upon receipt of a wireless MateFinder 10, a user configures the MateFinder device 10 with his or her own characteristics, and with desired match characteristics. Besides its normal function as an acquaintance-facilitation device, MateFinders rented by hotels, resorts and similar venues can be programmed, either directly when needed or wirelessly at any time by the renting entity to allow or deny entry or access to certain areas or services of the venue. Users may gain access to these areas or services by, for example, incurring an additional charge to their room or other account. The same system can also be used to verify the user's authorization to add the cost of purchases or other fees to his or her bill or account.

Wireless MateFinders 10 provide wireless connections through MateFinder access points 104, such as located around town, at casinos, clubs, and/or other hotspots (a "hotspot" as used herein is a place where Wi-Fi or other wireless service is available). The MateFinder devices wirelessly connect through MateFinder network access points 104 to a MateFinder server 102. The MateFinder server 102 matches users based on user provided self characteristics, desired match characteristics, and distance between users. Wireless MateFinders 10 may provide co-branding and co-marketing opportunities.

In one particular embodiment of the invention, a number of wireless matching devices are distributed to a number of individuals who are present at a predetermined destination, such as, but not limited to, a hotel, casino, cruise ship, airplane, bus, train, restaurant, bar, meeting, singles event, reunion, trade show, sporting event, concert, shopping center, convention or some other gathering or population. In this Specification and in the Claims that follow, the term "predetermined destination" encompasses any aggregation, grouping or organization of individuals in a generally specified space, area or place during a generally specified period of time. A predetermined destination may be a particular building or facility, or may fall within geographic or other boundaries, such as a street, a public park or square, a transportation terminal, a retail shopping center, a beach, a stadium, a state fair, a neighborhood, a town, a state or a country.

In one specific example, shown in FIG. 49A, a number of individuals may each a receive wireless matching device, such as one of the embodiments of the MateFinder described above, as they check into the hotel. As an alternative, a MateFinder may be waiting for each guest in their hotel room. When making his or her reservation, or during or after the registration process, each guest provides a sample. The sample may be provided somewhere in the hotel, or at an outside laboratory or facility. This sample may be obtained from saliva, blood, cheek tissue, odor or some other suitable bodily substance. These samples are then analyzed to determine attributes that are associated with each individual. These attributes may comprise genetic or biological information, and are recorded. Guests also record a number of self-describing characteristics, as well as a number desired attributes of another person who would constitute a good match. All these three types of information may be recorded using a conventional pen or pencil and paper; or may be recorded using an electronic device, such as, but not limited to, a MateFinder, a wired or wireless telephone, a television, a Wi-Fi device, a WiMAX device, a Voice over Internet Protocol device, an information appliance, a touch screen at a kiosk or a personal computer.

All these three types of information, the attributes determined by the sample test, the self-describing attributes and the desired attributes of a person's good match are then stored in a wireless matching device. This information may also be stored using an Internet dating service website which is accessed by a personal computer. Each individual then turns on their wireless matching device, and brings it along as they enjoy the events offered at the predetermined destination. The wireless matching device then receives, compares and correlates information stored on a number of devices to predict a good match.

The wireless matching devices communicate over a wired and/or wireless networks that may be specially installed at the predetermined destination, or which may be part of the telecommunication infrastructure that generally surrounds or encompasses the predetermined destination. The wireless devices may communicate over a local network, a cellular telephone network, a Wi-Fi network, a WiMAX network, an ultra-wideband network, a Voice over Internet Protocol network, or over any other suitable communication system. The wireless matching devices may also communicate using a network that uses signals in the 59-64 GHz band and using a low-power transmitter not requiring Federal Communications Commission Licensing.

In one embodiment, the wireless matching device may be used to transfer a file, such as, but not limited to a file containing music, a photograph or a video clip.

In another embodiment, shown in FIG. 49B, a cruise-ship passenger may receive a MateFinder™ upon boarding the vessel. Personal data are stored in the MateFinder™ as described above for hotel guests.

FIG. 50A and FIG. 50B are simplified front and side views of a Wi-Fi MateFinder having a keyboard 53 and a display. FIG. 51A and FIG. 51B show simplified front and side views of an alternate Wi-Fi MateFinder. FIG. 51C shows a front view of an alternative design having a wheel, arrows or other entry mechanism and a display.

In some alternative embodiments of the invention, the MateFinder systems may be implemented over a wide variety of network topologies. For example, FIG. 52 shows network topology 100a for one or more network access points 104 serving Matefinders 10 and linked to a MateFinder system server 102. A system server 102 is linked 105a to one or more network access points 104, which provide wireless access 51 to one or more MateFinders 10, such as through Wi-Fi links 112. In the topology 100a shown in FIG. 52, the system server 102 is connected 105a to the access points 104 through the Internet 108, typically including a server to Internet link 106 as well as Internet to Access Point links 110.

As seen in FIG. 52, wireless MateFinders 10 are client devices within the system network 100a. The wireless MateFinders 10 in system 100a typically only communicate with the MateFinder Server 102, and never directly with another MateFinder device 10. The MateFinder devices 10 use Wi-Fi links 112 to connect with MateFinder Network Access Points 104, and MateFinder Access Points 104 only accept connections from registered MateFinder devices 10. As well, the MateFinder Network Access Points 104 may preferably connect to the MateFinder Server using the Internet 108. All of the links are preferably encrypted to ensure data privacy. The MateFinder Server 102 matches users based on user provided self characteristics, desired match characteristics, and distance between users.

In a typical MateFinder system 100, MateFinder matching zones are established, whereby a MateFinder Server 102 limits matches to ensure geographic "closeness." Matching zones may be implemented based on location of which Network Access Point 104 a MateFinder 10 is connected through, or using coordinates of MateFinder 10, such as supplied by an optionally embedded GPS. A closeness threshold can be varied by location and/or user setting, such as by clubs, casinos, hotels, cruise ships, etc. that may limit matches to their premises. As well, private labeled MateFinders 10 may limit matches to users of similarly labeled MateFinders 10.

FIG. 53 provides an exemplary flowchart 114 for user operation of one embodiment of a Wi-Fi MateFinders system, such as for an exemplary MateFinders system 100 for Las Vegas. In such a system 100, while the MateFinders system 100 serves as a connector, helping users narrow down the masses of people in Las Vegas, it does not promise to find long-term compatible partners.

In such a system, MateFinders devices 10 can be rented at the airport, at major hotels, and at kiosks around town, such as for $25 per day or $100 for a week. A major credit card is typically required to rent; in addition to rental charges, the credit card is charged a fee, e.g. $300, if the MateFinders 10 is not returned at end of the rental period.

In the exemplary MateFinders system 100, the data entry process is simple and friendly, as MateFinders devices 10 preferably come installed with a short, e.g. 3 minute, tutorial that plays as a video on the device 10. The user can optionally view the tutorial and customize the MateFinders 10 using a laptop, or other PC.

MateFinders 10 only works with proprietary access points located in casinos, clubs, and other hotspots around town. Gamblers add an extra element of fun to their visit by using a MateFinders 10 while sitting at the tables, as potential matches walk by, MateFinders 10 alerts with a beep and message. In some system embodiments for such resorts, MateFinders 10 may also help a user to pick a certain gambling table by enabling him/her to search for a set of potential matches (say, brunettes aged 30 to 40), his screen shows a map of casino and has a red dot in the location of each person in that certain set that is using a MateFinders 10.

In some MateFinders systems 100, private labeled MateFinders 10 may preferably be owned by hotels, clubs, bars, etc., and/or may be labeled with brand of owner, such that a private labeled MateFinders may only operate with the owner's proprietary system access points 104, such as to allow owners to market other services. For example, a private labeled MateFinders 10 for a Hard Rock Hotel location may alert users when 2-for-1 drink specials are being offered at outdoor swim-up bar.

FIG. 54 shows exemplary input and matching 120 of self information and target information in one embodiment of a Wi-Fi MateFinders system.

In some advanced system configurations, users can enter a photo from a kiosk when renting a MateFinders 10, or from a laptop computer. In such a system, users can select to only be matched with other users who have entered photos. If basic matching criteria are met, the MateFinders server 102 exchanges photos between MateFinders 10.

In some system embodiments, users can complete a personality questionnaire at kiosk when renting a MateFinders 10, or through a laptop computer or other terminal. In such a system, users can select to be matched only with other users who have completed a profile. If basic matching criteria are met, the MateFinders server 102 uses profiles for better matches.

In other system embodiments, users can provide a DNA sample at a kiosk when renting a MateFinders 10, whereby users can select to be matched only with other users who have provided DNA samples. If basic matching criteria are met, the MateFinders server 102 excludes potential matches with similar MHC alleles.

While the exemplary system discussed above was related to Las Vegas, the MateFinders system 100 can be implemented for a wide variety of environments, such as but not limited to other destination resorts for singles, gambling resorts, ski resorts, fun-in-the-sun resorts, singles only resorts, and/or cruise ships FIG. 55 shows typical operating distances over which exemplary MateFinders can connect to Wi-Fi access points.

Different embodiments of Wi-Fi or Bluetooth MateFinders system are implemented over a wide variety of network topologies. For example, FIG. 56 shows network topology 100b for a MateFinders network comprising a wired link 132, e.g. copper or fiber optic, between a network access point 104 and a MateFinders server 102, and Wi-Fi links 112 between MateFinders 10 and the network access point 104.

FIG. 57 shows network topology 100c for a MateFinders network comprising a Wi-Max wireless link 134 between a network access point 104 and a MateFinders server 102 and Wi-Fi links 112 between MateFinders 10 and the network access point 104.

FIG. 58 shows network topology 100d for a MateFinders network comprising a point-to-point wireless link 136 between a network access point 104 and a MateFinders server 102 and Wi-Fi links 112 between MateFinders 10 and the network access point 104.

FIG. 59 shows network topology 100e for a MateFinders network comprising an Internet connection 105a between a network access point 104 and a MateFinders server 102 and Wi-Fi links 112 between MateFinders 10 and the network access point 104.

FIG. 60 shows network topology 100f for a MateFinders network comprising a wired link 132, e.g., copper or fiber optic, between a network access point 104 and a MateFinders server 102 and Bluetooth wireless links 140 between MateFinders 10 and the network access point 104.

FIG. 61 shows network topology 100g for a MateFinders network comprising a Wi-Max wireless link 134 between a network access point 104 and a MateFinders server and Bluetooth wireless links 140 between MateFinders 10 and the network access point 104.

FIG. 62 shows network topology 100h for a MateFinders network comprising a point-to-point wireless link 136 between a network access point and a MateFinders server and Bluetooth wireless links 140 between MateFinders 10 and the network access point 104.

FIG. 63 shows network topology 100i for a MateFinders network comprising an Internet connection 105a between a network access point 104 and a MateFinders server 102 and Bluetooth wireless links 140 between MateFinders 10 and the network access point 104.

FIG. 64 shows network topology 100j for a MateFinders network comprising a Wi-Fi wireless link 142 between a network access point 104 and a MateFinders server 102 and Bluetooth wireless links 140 between MateFinders 10 and the network access point 104.

IV. MateFinders System Using VoIP Networks

MateFinders may be connected over a combination of networks, including VoIP networks. In one embodiment, the MateFinders use the Internet to send messages. FIG. 65 depicts the prior art, showing a connection between two telephones, A and B, and a local telephone exchange 210 which is part of the Public Switched Network (PSN), through a connection such as a dedicated private line for a conventional phone call. FIG. 66 shows a connection 220 made using the Internet between two telephones X and Y.

FIG. 67 reveals one implementation 230 of the MateFinders VoIP Invention. A first MateFinders 10a is connected to a first wireless hub, which, in turn, is linked to a first Internet Service Provider (ISP). When the user of the first MateFinders 10a dials a telephone number, the call is routed to the first user's ISP instead of to a local telephone switch. The first ISP then uses the telephone number dialed by the first user to route the call to a second ISP, which resides in a location near the intended call recipient. A server at the second Internet Service Provider then connects the call to a second wireless hub, which relays the call to a second MateFinders 10b.

FIG. 68 reveals some of the internal components 240 of a MateFinders terminal 10, which comprises a conventional cellular telephone circuit, a modem and a signal processing circuit. In some embodiments of the invention, this signal processing circuit can be reduced to a single computer chip called an "Application-Specific Integrated Circuit (ASIC)."

FIG. 69 illustrates the method 250 of one embodiment of the invention. The conventional telephone circuit converts the caller's voice to a time-varying voltage waveform, as shown in FIG. 69. Conventional telephone equipment constricts the audio bandwidth of transmitted analog audio signal to a 3000 Hz band between 400 Hz and 3,400 Hz.

As shown in FIG. 70, the call is first processed in the first MateFinders by an analog-to-digital converter, and converts the analog audio signal to a digital signal. This digital signal comprises a stream of packets, each having a header and a payload. The packets are conveyed to a first Internet Service Provider (ISP) through the modem. The packets are then conveyed across the Internet to a second, remote ISP, based on the telephone number dialed by the caller. A second signal processing circuit is installed at the second ISP. A set of instructions embedded in the header of the packets that originated at the caller tells a server at the second ISP to route these packets through this second signal processing circuit, which re-converts the stream of packets to an analog audio signal that is intelligible to the human ear. The same server at the second ISP transports the analog audio signal which replicates the caller's voice to the intended recipient of the call by placing a call to the recipient's MateFinders.

FIG. 71 shows a man 17a using his MateFinders 10a to place a call to a woman 17b using her MateFinders 10b over a VoIP network.

V. A Signal Distribution Network for MateFinders

The MateFinders may be used in conjunction with the conventional cellular telephone network; a Wi-Fi, Wi-Max, Bluetooth or UWB network; or with any other suitable means for conveying signals over a wired or wireless system.

In another embodiment, MateFinders may communicate using a Network Access Communication System, which is described in U.S. Pat. No. 6,665,296, which was issued on 16 Dec. 2003, and which is hereby incorporated by reference.

The Network Access Communication System provides two-way communications access to a wide area network (WAN) for a very large number of users or MFAPs which send information to and receive information from the network. The invention offers an inexpensive "last-mile" hookup to a very large number of MFAPs. The system is particularly useful where there is not a high data-rate capable telecommunications infrastructure or it is very costly to install one. The installed base of conventional copper wires present inherent limitations and constraints to providing enhanced levels of communications services. Use of copper telephone wires to carry information signals is possible at low data rates, but at high data rates, these wires cannot carry information signals over much distance because of losses. New compression and signal processing techniques enable telephone companies to offer faster speeds and greater bandwidth using new services such as ISDN, DSL and ADSL. But because of the installation costs, these techniques cannot be used everywhere, even in the developed countries. The market demand for more capacity may soon outpace these recent innovations. The use of optical fiber and cable television networks have their own drawbacks and are relatively expensive to install and to maintain. Low loss conductors such as coaxial cable or optical fibers are expensive in themselves, and the cost of stringing or burying these cables in order to bring them to an individual MFAP is usually prohibitively expensive, particularly in densely settled urban communities.

One Preferred Embodiment of the NACS

FIG. 72 shows in perspective view a portion of the Network Access Communication System (NACS) 310 serving urban and suburban communities. Communications access to a WAN 311 is provided by creating a plurality of service areas 314 within which MFAPs are located. MFAPs are connected to an MFAP terminal 315 either directly or through a local area network (LAN). The LAN may be operated by or through a local public switched telephone network (PSTN). In one embodiment, the interface to the LAN operates full duplex on the Ethernet™ 10BaseT standard. The MFAP terminals 315 are coupled to central communication hubs 312 by super high frequency (SHF) radio links 313. Typically, each communication hub 312 is roughly centered in the service area 314. The radio links 313 operate at frequencies in the microwave or millimeter wave bands. A preferred frequency band is 59-64 GHz, but other bands from 3 GHz to 300 GHz can be used. At these frequencies MFAP terminal antennas are very small, about six inches diameter or less. The communication hubs 312 are connected to a WAN 311 such as the Internet. The interface to the WAN 311 from the hub 312 completes a fully symmetric, ten megabits per second (10 Mbps) system 310 which transports information from an MFAP to general-purpose applications, such as a web services business, and return. Such applications generate about equal amounts of upstream (outgoing) traffic and downstream (incoming) traffic.

Service Area

FIG. 73 is a plan view diagram of a service area 314. The service area 314 contains a wide-area-network-access, central communications hub 312 which is capable of two-way radio-frequency communications with the MFAP terminals 315. The service area 314 is divided into sectors 316, within which the MFAPs 317 and MFAP terminals 315 are resident. The number of sectors may vary depending on the density of MFAPs 317. A sector can support efficiently approximately 200 MFAPs 317. One to forty sectors 316 per service area are preferred. One embodiment of the invention as shown in FIG. 73 has a service area 314 with eight sectors 316. An eight sector service area can therefore efficiently support approximately 1,600 MFAPs. One or more MFAPs generally will be connected to the LAN.

A service area 314 typically has a radius 318 of approximately 0.7 to 1.5 kilometers (km), yielding a coverage area of 1.5 to 7 km. These dimensions are selected to take advantage of low energy transmitters which do not require FCC licensing. Atmospheric oxygen absorption of the microwave or millimeter waves used for the radio links 313 is about 15 dB per kilometer. This absorption of signals is such that low-power, MFAP terminal transmitters, while not requiring licenses by the FCC, can operate successfully over a distance of one to two kilometers, the radius 318 of a service area 314.

Service areas 314 may be abutted or overlapped to cover larger included areas. FIG. 74 is a schematic diagram showing a plurality of communications hubs 312 providing service areas 314 which are grouped and partially overlapped to provide a system 320 of wide area network access over large areas. Other arrangements are possible, including overlapping the service areas 314 so that individual MFAPs 317 will be within line-of-sight of a communications hub 312.

FIG. 75 is a schematic diagram of another system 322 having a plurality of wide area network access communications hubs 312, grouped and partially overlapped to provide a large number of MFAP terminals 315 with line-of-sight communications with a hub 312. The arrangement of service areas 314 is readily adapted to the terrain, the existing structure (e.g., PSTN) and the number of MFAPs 317 contemplated.

Distributed routing of the information signals, described below, provides MFAPs 317 with low latency (no-delay) symmetric transmission of information signals at speeds of about ten million bits per second (10 Mbps). The router functions are placed in part in the MFAP terminal 315 and in part in the communications hub 312. Availability of a communication path in this system approximates that of a fiber optic cable, from 99.7 to 99.9% of time. The system has a low bit error rate (approximately one bit in $10^{-8}$ bits) and a high frequency re-use factor. Among the information exchange protocols the system supports is the transmission control protocol, Internet protocol (TCP/IP) suite.

Communications Hub

FIG. 76 presents a schematic diagram of signal flow in a communications hub 312 to and from a plurality of MFAP terminals 315. In one embodiment the hub 312 is accessed by the MFAP terminals 315 through 60 GHz radio links 313. FIG. 77 is a functional block diagram of the communications hub 312 and an MFAP terminal 315. Each MFAP terminal 315 includes a transceiver 342 and a two-port router 344 connected by a serial interface 343. In one preferred embodiment, the MFAPs 317 and the MFAP terminal 315 share a single LAN 339, for example, a 10BaseT Ethernet™. The router 344 is connected to the LAN 339 and then to the MFAPs 317 by an Ethernet interface. The router 344 is further detailed below. The router 344 serves as the MFAPs gateway to his network provider and the WAN 311. There may be as few as one MFAP 317 connected to an MFAP terminal 315, but typically there will be as many as 200 or more.

The communications hub 312 includes a network unit (NU) 333 and a radio unit (RU) 332. The network unit 333 includes a multi-port router 334 having one or more WAN ports 336 and a plurality of Ethernet ports 335. The WAN port 336 is typically T3 or OC3 standard. An off-the-shelf router such as manufactured by Cisco Systems may be used. The radio unit 332 includes a non-blocking multiplex/demultiplex (MUX/DEMUX) unit 337 and a multi-channel transceiver 340.

Packets of information are transported over the LAN from an MFAP 317 to a network service provider connected to the WAN 311. The MUX/DEMUX unit 337 receives and multiplexes MFAP traffic onto the Ethernet ports 335. The traffic is aggregated and forwarded to the router 334 and output to the WAN port 336 for transmission to the network service provider. In one preferred embodiment, the network service provider is an Internet service provider (ISP). Redundancy is available through an alternate port. Return communications from the WAN 311 follow the reverse course. Packets received from the WAN 311 are sorted by sector 316 at the communications hub 312. All of the packets for each sector 316 are then transferred by radio link 313 to the appropriate MFAP terminal 315 in that sector 316. The MFAP terminal router 344 then sends the packets to MFAPs 317 via the Ethernet interface and LAN 339.

The hub antennas 341 are directional and configured to receive signals from each sector 316 on a separate frequency. In one embodiment, the 59 to 64 GHz radio frequency band is divided into twelve sub-bands of 416.7 MHZ each. For communication hubs 312 with from one to twelve sectors 316, each sector 316 is assigned to a different frequency sub-band. For hubs 312 with from twelve to twenty four sectors 316, the sub-bands are used up to two times per hub. For hubs 312 with from 25 to 36 sectors 316, the sub-bands are used up to three times per hub 312, and for 37 to 48 sectors 316, they are used up to four times. Frequency reuse patterns for various numbers of sectors 316 are shown in Table Two below. Frequency sub-band assignments (F1 . . . Fn) are in the order of the sectors 316 around the communications hub 312.

TABLE TWO

Frequency Channel Assignments in Service Area Sectors

| No. Of Sectors | Frequency Assignments (F1-Fn) by Sector |
|---|---|
| 12 | F1, F2, F3, F4, F5, F6, F7, F8, F9, F10, F11, F12 |
| 18 | F1, F2, F3, F4, F5, F6, F7, F8, F9, F1, F2, F3, F4, F5, F6, F10, F11, F12 |
| 24 | F1, F2, F3, F4, F5, F6, F7, F8, F9, F10, F11, F12, F1, F2, F3, F4, F5, F6, F7, F8, F9, F10, F11, F12 |
| 30 | F1, F2, F3, F4, F5, F6, F7, F8, F9, F10, F11, F12, F1, F2, F3, F4, F5, F6, F7, F8, F9, F10, F11, F12 |
| 36 | F1, F2, F3, F4, F5, F6, F7, F8, F9, F1, F2, F3, F4, F5, F6, F10, F11, F12, F1, F2, F3, F4, F5, F6, F7, F8, F9, F1, F2, F3, F4, F5, F6, F10, F11, F12 |
| 48 | F1, F2, F3, F4, F5, F6, F7, F8, F9, F10, F11, F12, F1, F2, F3, F4, F5, F6, F7, F8, F9, F10, F11, F12 F1, F2, F3, F4, F5, F6, F7, F8, F9, F10, F11, F12, F1, F2, F3, F4, F5, F6, F7, F8, F9, F10, F11, F12 |

System Management

Management of all of the elements of the Network Access Communication System 310 uses the standard SNMP protocol and a stand alone network management station. Alternatively, it can operate as a module in a network service provider's management station.

Communication Techniques

To avoid interference between MFAPs 317 and to provide very high speed information transfer to the large number of users contemplated, the radio communication link 313 in one embodiment incorporates time division duplex (TDD), multi-frequency, time division multiple access (MF-TDMA), channel hopping, sixteen-frequency shift keying (16-FSK) modulation and concatenated coding features. Other alternatives to TDD include frequency division duplex (FDD), code division duplex (CDD) and polarization division duplex (PDD). Other usable multiple access techniques include time division (TDMA), frequency division (FDMA), code division (CDMA), polarization division (PDMA), multi-frequency CDMA, multi-frequency PDMA and combinations of these. Modulation techniques include frequency shift keying (FSK), M-ary FSK, where M=2, 3, 4 . . . 100, or more and M-ary versions of phase shift keying (PSK). Other usable modulation techniques include M-ary versions of amplitude shift keying (ASK), quadrature amplitude modulation (QAM), pulse position modulation (PPM), Gaussian minimum shift keying (GMSK), continuous phase frequency shift keying (CPFSK), vestigial sideband (VSB) and continuous phase modulation. As before, M=2, 3, 4 . . . 100, or more. Alternative coding schemes include block codes, convolutional codes, turbo codes, turbo block codes and combinations thereof.

FIG. 78 presents a table of communication link budgets for a 60 GHz radio link 313 used for communications between the communications hub 312 and an MFAP terminal 315.

High quality of service is achieved using less network bandwidth by employing Dynamic Bandwidth Allocation. The MFAP 317 can select the quality of service desired. The MFAP 317 can choose from a wide range of speed options from 1 to 10 Megabits per second.

Distributed Routing

As described above, the routing function is distributed between the communications hub 312 and one or more MFAP terminals 315. One router 334 delivers the packets to and from the communications hub 312 and the WAN 311. Another router 344 delivers the packets to and from a LAN 339 to the appropriate connected MFAP 317. Local MFAP-to-MFAP intranet communication takes place over the LAN 339. An MFAP communication to the WAN 311 proceeds to the MFAP terminal 315. The signals then pass through the router 344, the transceiver 342 and the radio link 313 to the communications hub 312 where they are processed as described above. Other routed or switched LAN structures are possible. In the simplest case, a single MFAP 317 is connected directly to an MFAP terminal Ethernet port. Individual residential MFAPs 317 having a single personal computer are most likely to be connected this way.

MFAPs 317 are always "on" and do not require dial up to establish service or obtain a temporary network service provider address. An MFAP 317 is assigned a block of one or more unique network service provider IP addresses from the provider's own pool. MFAPs 317 can employ a proxy server to facilitate multiple user's sharing of a single network service provider address. In a different embodiment of the invention, the ISP will allocate IP addresses on demand only (dynamically) to conserve addresses.

MFAP Terminal

FIG. 79 is a top level functional block diagram of an MFAP terminal 315. The RF block 356 contains the final transmitter stage and first receiver stage. In one embodiment, described below, these two stages comprise the same components, their function depending only on the switching of the signal path between components. The RF block 356 is coupled to an antenna 358 and to an intermediate frequency (IF) stage 354. The IF stage is further coupled to a digital signal processing (DSP) stage 352. In a preferred embodiment, the DSP stage 352 includes an application specific integrated circuit (ASIC) comprising a modem and a router 344. As described above, in one embodiment, one router port connects to the LAN 339 through an Ethernet interface 359.

In FIG. 80, a more detailed functional block diagram 360 of an MFAP terminal 315 is presented. The principal components of the MFAP terminal 315 are an antenna 358, microwave integrated circuit (MIC) 376, intermediate frequency integrated circuit 368, digital signal processor 352 and Ethernet interface 359.

A signal received from radio link 313 through the antenna 358 is bandpass filtered by an RF filter 378 to remove out-of-band emissions. The RF filter output is applied to the microwave integrated circuit 376. There it is amplified by a low noise amplifier (LNA) to set the system noise figure. The LNA output is bandpass-filtered to reject the image and set the noise bandwidth. The filter output is then down-converted to an intermediate frequency (IF) using a mixer. The incoming RF signal is heterodyned in the mixer with multiple of a first local oscillator signal 374 supplied by the IF integrated circuit 368. The frequency multiplier is shown in the block diagram of FIG. 81 and described below. The mixer output is bandpass-filtered by a ceramic first IF filter 372 to reject spurious mixer frequencies. The filter 372 output is applied to the IF integrated circuit 368 where it is sampled and quantized. The IF integrated circuit is an ASIC in a preferred embodiment. The receive samples 370a are further processed by the digital signal processing (DSP) ASIC 352 to recover the information to be delivered to the MFAP 317. This information is then delivered to the LAN 339 and thence to the MFAP 317 via an Ethernet interface 359. Logic clock signals 370c and control signals 370d are passed between the IF ASIC 368 and the DSP ASIC 352.

MFAP information to be transmitted to the WAN 311 is input to the DSP ASIC 352 through the Ethernet interface 359. This information is processed by the DSP ASIC 352 to form the transmit samples 370b. The transmit samples 370b are then input to the IF integrated circuit 368. The IF integrated circuit 368 converts the transmit samples 370b into an IF signal. The IF signal is bandpass-filtered to reject spurious signals and the output is applied to the MIC 376. The IF signal is upconverted in the MIC 376 using the frequency mixer. A preferred embodiment of the MIC 376 is shown in FIG. 85 and described below. The mixer output is amplified, filtered and then sent to the antenna 358 for transmission to the communications hub 312.

The MIC mixer local oscillator (LO) signal is obtained by repeatedly doubling the frequency of a first local oscillator sub-harmonic signal 374 originated by the IF ASIC crystal 364 and RC phase locked loop filter 362. FIG. 81 is a block diagram of a frequency multiplier 380 used to form the MIC local oscillator signal from the sub-harmonic frequency 374. The frequency multiplier 380 comprises alternate balanced, active frequency doublers 382 and bandpass filters 384. The first LO sub-harmonic signal 374 is input to the frequency multiplier 380 and the emerging signal 388 is the LO signal provided to the MIC mixer.

FIG. 82 presents a schematic diagram 390 of one embodiment of a balanced, active doubler 382. A signal at the frequency of a prior stage $F_{IN}$ is fed to the doubler 382 through a quarter-wave microstrip 392 resonant at $F_{IN}$. That signal is applied to the gate of a first field-effect transistor (FET) 398. The signal is also applied, 180 degrees out of phase, to the gate of a second FET 398, connected in "push-push" with the first FET 398. Microstrip 394 accomplishes the phasing. The combined signal at the drain of the FET's 398 is passed through a microstrip 396, resonant at the frequency $F_{OUT}$ which is twice that of $F_{IN}$.

A portion of the MFAP terminal 315, operating at the intermediate frequency (IF) may be separated into an indoor unit (IDU) 404 and an outdoor unit (ODU) 402, connected by coaxial cable 406. FIG. 83 is a schematic diagram of this approach which would permit the combination of MIC transceiver 356 and antenna 358 in a small weatherproof package.

The ASIC 352 used for digital processing of signals (DSP) which modulate and demodulate the signals on radio frequency link 313 is shown in FIG. 84 as a functional block diagram 410. A preferred embodiment combines the functions of the two-port router 344, modem 416, timing generator 426 and microprocessor 412 with its random access memory (RAM) 414 within the ASIC. The encoder 424 and modulator 422 prepare the outgoing transmit samples 430 from the MFAPs' information signals received through the Ethernet interface 359. The demodulator 418 and decoder 420 convert the receive samples 428 into information signals for the appropriate MFAP 317. As described earlier, the MFAP-destined signals are forwarded to the router 344 for distribution to the LAN 339.

In one embodiment of system, which operates in a TDD mode, a novel radio-frequency module is used in the MIC 376. FIG. 85 is a schematic diagram 440 of this transmit/receive module 442. The transmit/receive module 442 acts in TDD operation as both a first receiver stage and a final transmitter stage for signals communicated both ways over the radio link 313. It acts as a receiver front end or a transmitter final stage depending only on the switching of the signal path between components. It implements a high-speed, symmetric-path, radio signal between an MFAP terminal 315 and a communication-hub 312 connection to the WAN 311. Switching times of about one millisecond permit flow of information in either direction over the SHF radio link 313 between MFAP terminal 315 and communications hub 312. The module 442 comprises an amplifier 456, a filter 454, a frequency mixer 452 and four switches 460a, b, c, d operated by a transmit/receive selector 458. The module 442 can be operated at any frequency band from direct current (DC) to light. In the instant invention, it is operated at SHF and preferably at about 60 GHz When switched in a first position as shown in FIG. 85, the module 442 operates as a receiver front end and performs a low-noise down-conversion from radio frequency (RF) to intermediate frequency (IF). When switched in a second position, opposite to that shown in FIG. 85, the module 442 operates as a transmitter final stage. It performs an up-conversion from IF to RF and a final amplification. The signal 446 from the antenna 358 is applied to the low noise amplifier/power amplifier 456. The signal 446 is amplified, filtered in the image rejection filter 454 and down-converted to IF in the mixer 452. The action of the local oscillator 450 signal derived from the first LO sub-harmonic signal 374 produced in the IF ASIC 368 has been described above. The received IF signal 444 is delivered to the IF ASIC 368 for processing.

The transmit/receive switches 460a, b, c, d and the selector 458 can be mechanical or electronic. Mechanical switches 460a, b, c, d, 458 include coaxial, waveguide, and micromachined switches. Electronic switches include PIN diode and FET switches. These switches can be implemented using silicon, silicon-germanium, gallium-arsenide devices, or by devices using other semiconductor technologies. The switches 460a, b, c, d are moved from receiver to transmitter positions as the information stream alternates from incoming traffic to outgoing traffic. The time the module 442 is in transmit and receive positions may be of the same, different or variable duration. Typical switching times are one millisecond in each direction.

The low noise amplifier/power amplifier 456 is implemented by one of a number of semiconductor technologies, including silicon, silicon-germanium, gallium-arsenide and indium-phosphide. The filter 454 is implemented by waveguide, striping, coaxial or microstrip methods. The mixer 452 can be active or passive and is implemented by the same semiconductor technologies as is the low noise/power amplifier 456.

VI. The AromaMatch™ System

Before a MateFinder is programmed with information regarding the genetic attributes of a user or of other individuals, the genetic attributes must be determined by testing. The AromaMatch™ System provides methods and apparatus for this testing, and for determining a good romantic match based on a collected sample of human body odor or a DNA sample.

FIG. 86 offers a view of a woman 17b in a retail store 512, where she purchases an AromaMatch™ Test Kit 514. As an alternative, the woman 17b may purchase the same AromaMatch™ Test Kit 514 by visiting a website, www.AromaMatch.com, using her personal computer, as shown in FIG. 87. "AromaMatch" is a Trade & Service Mark owned by the Assignee of the Present Patent Application. The website "www.aromamatch.com" is also owned by the Assignee of the Present Patent Application. In this Specification and in the Claims that follow, the term "aroma" encompasses any scent, smell, odor or olfactory component that may or may not be actively or consciously detected, sensed or smelled by a person.

The woman opens the Test Kit 514 and removes the contents in FIG. 88. In one embodiment of the invention, the Test Kit 514 comprises:
  skin cleaner 520;
  a cleaning medium 522;
  a sample patch 524;
  a sealable enclosure 528; and
  a mailing envelope 530.

The skin cleaner 520 may comprise a liquid cleaning solution such as isopropyl alcohol, or any other, gel, solid, spray or substance that cleans and/or sterilizes a portion of the skin. The application of the skin cleaner 520 removes or neutralizes perfumes and other irrelevant smells.

The cleaning medium 522 is generally a small portion of material that is used to apply the skin cleaner 520 to the skin. In one embodiment, the cleaning medium 522 may be a cotton ball, wad, paper, piece of fabric or some other suitable application device.

FIG. 89 furnishes an illustration of the sample patch 524, which comprises a small central area 524C with two outwardly extending strips 524S. The central area 524C is coated with a portion of plaster 525 which, in turn, has been coated with an antibiotic 526 or some other suitable agent that prevents bacterial growth which might modify the aroma. The strips 524S on either side of the plaster 525 are coated with an adhesive 527 that is suitable for adhering to the skin for a short period of time.

In one embodiment, the patch 524 resembles a conventional "Band-Aid® Brand" Adhesive Bandage, such as that manufactured and sold by Johnson & Johnson of New Brunswick, N.J. The patch 524 may be fabricated from plastic, cloth, paper or any other material that will maintain the plaster 525 in generally continuous contact with the skin. The plaster 525 is generally any material that will absorb and then hold an aroma which has been secreted by the skin. The plaster 525 may be composed of any substance that collects and stores an aroma. In one embodiment of the invention, the plaster 525 is manufactured from any material that may be used as an odor-absorbing poultice.

The plaster 525 is designed so that it will collect enough aromas to provide a sample which may be reliably analyzed. The aromas captured by the plaster 525 must be able to survive for a duration of time that is required for the patch 524 to be mailed to a laboratory.

After the Test Kit 514 is opened, the woman 17b cleans a patch of skin on her arm in preparation for applying the sample patch 524, as shown in FIG. 90. In FIG. 91, patch 524 has been attached to her forearm. The patch 524 may be worn on any portion of the body which allows direct and intimate contact with the skin. In some instances, selecting a patch of skin on or near the armpits may be produce optimal results.

The woman wears the patch 524 all day, as shown in FIG. 92. The time that is required for the patch 524 to remain in place varies with the effectiveness of the plaster 525 and the sensitivity of the equipment used to analyze the patch 524. In one embodiment of the invention, the user is instructed to leave the patch 524 in place on the skin for at least eight hours. In some instances, the time that is required to wear to patch to obtain a good sample may take longer. One alternative method that may be used to collect a sample is simply wearing a shirt or some other article of clothing for an extended time, and then analyzing this worn article of clothing.

After wearing the patch 524 all day, the woman 17b removes the patch 524 later that evening, as shown in FIG. 93. After the patch 524 is removed, she then immediately places the patch 524 in the enclosure 528, as illustrated in FIG. 94. The enclosure is sealed 528 to prevent any degradation of the aromas stored in the plaster 525.

She then writes her username, password, code or some other identifying information on the bag 528, as shown in FIG. 95. This enclosure 528 is large enough to hold the sample patch 524, may be easily sealed against the intrusion of outside air by the user, and is generally an impermeable container or barrier that preserves the aromas imparted to the plaster 525 on the patch 524. In one embodiment of the invention, the enclosure 528 is a plastic bag with a compression seal, which is commonly known as a "zip-lock" or "slide-lock" closure. In one implementation, the bag 528 bears a pre-printed authorization code.

The patch 524 which stores the sample S which has been sealed in the bag 528 is then placed in the mailing envelope 530, as shown in FIG. 96.

FIG. 97 portrays the customer posting the pre-addressed mailing envelope 530 which contains the worn patch 524 in the bag 528. This envelope 530 will convey the patch 524 to a laboratory where the plaster 525 will be analyzed. As an alternative, the patch 524 may be shipped to a laboratory using a courier. The patch 524 may also be delivered to a local laboratoty, doctor's office or pharmacy for analysis. In a more advanced embodiment of the invention, the user may analyze the patch 524 using a home analysis kit.

FIG. 98 shows a laboratory technician 532 using an analyzer 534 to determine the genetic attributes of the tissue sample that has been received from the customer 17. In one embodiment, a probe from an analyzer 534 may be inserted into the bag 528, which will convey the aromas to a chamber where a chemical analysis is conducted.

Several devices and systems for analyzing a sample are currently available which may be used to implement the present invention. One device called an "Electronic Nose" has been described by The Lewis Group of The California Institute of Technology, and is based on readily fabricated, chemically sensitive conducting polymer films. According to information presented on their website:

"An array of sensors that individually respond to vapors can produce a distinguishable response pattern for each separate type of analyte or mixture. Pattern recognition algorithms and or neural network hardware are used on the output signals arising from the electronic nose to classify, identify, and where necessary quantify, the vapor or odors of concern. This response is much like the way the mammalian olfactory sense produces diagnostic patterns and then transmits them to the brain for processing and analysis.

This approach does not require development of highly specific recognition chemistries, one for each of the many possible analytes of interest. Instead this approach requires a broadly responsive array of sensors that is trainable to the target signature of interest and then can recognize this signature and deliver it to the sensing electronics in a robust fashion for subsequent processing by pattern recognition algorithms. The Caltech electronic nose functions at atmospheric pressure, functions in a variety of ambients, exhibits near-real time detection, and has already been demonstrated to track vapors in air.

The underlying principle of the Caltech electronic nose is extraordinarily simple. When a polymer film is exposed to a gaseous vapor, some of the vapor partitions into the film and causes the film to swell. In the electronic nose, this swelling is probed electrically because the sensor films each consist of a composite that contains regions of a conductor that have been dispersed into the swellable organic insulator. The vapor-induced film swelling produces an increase in the electrical resistance of the film because the swelling decreases the number of connected pathways of the conducting component of the composite material. The detector films can be formed from conducting polymer composites, in which the electronically conductive phase is a conducting organic polymer and the insulating phase is an organic polymer, or from polymer-conductor composites in which the conductive phase is an inorganic conductor such as carbon black, gold, silver, etc. and the insulating phase is a swellable organic material. The electrical resistance of the device is then read using simple, low power electronics.

Any individual sensor film responds to a variety of vapors, because numerous chemicals will partition into the polymer and cause it to swell to varying degrees. However, an array of sensors, containing different polymers, yields a distinct fingerprint for each odor because the swelling properties over the entire array are different for different vapors. The pattern of resistance changes on the array is diagnostic of the vapor, while the amplitude of the patterns indicates the concentration of the vapor."

See: The Lewis Group, California Institute of Technology, Pasadena, Calif. Webpage: http://nsl.caltech.edu/resnose-.html A second device that may be used to implement the present invention is called the "Cyranose," and is described by Rodney M. Goodman, in his article entitled "The Electronic Nose." According to Goodman:

"Cyranose

The technology uses sensors mixed with carbon black to make them conductive. The polymers swell with an odorant and their resistance changes. An array of different polymers swell to different degrees giving a signature of the odorant. This technology has been commercialized by Cyrano Sciences (http://cyranosciences.com) and a handheld electronic nose has been launched as a product."

See: http://www.rodgoodman.ws/electronic_nose.html

A third device that may be used to implement the present invention is described by Smiths Detection of Danbury, Conn., which produces and sells devices for identifying materials. See: http://www.sensir.com/Smiths/Home.htm.

In FIG. 99, the customer 17b uses her computer 22 to visit a website 518 to obtain the results of the laboratory analysis. In one embodiment, the analysis includes a listing of MHC alleles, MHC-determined peptides, MHC-odors or some other MHC-dependent profile. In an alternative embodiment, the results may be dispatched to the customer by regular mail or by e-mail.

In an alternative embodiment of the invention, the customer pays for the Test Kit 514 and the analysis when he or she obtains the results of the analysis.

In FIG. 100, the website 518 reports the results of a matching process that has been performed using a library of candidates.

FIG. 101 exhibits an alternative embodiment, which collects a sample directly from the air 536 surrounding a customer 17a standing near a kiosk 538 that has been installed in a shopping mall 540. In yet another embodiment, a sample collecting tube may briefly be placed under a portion of a customer's clothing to obtain an air sample.

FIG. 102 reveals yet another alternative embodiment, in which a tissue sample 542 is obtained using a cheek swab. In other embodiments, a tissue sample may be obtained from any suitable bodily material or fluid, including, but not limited to, blood, saliva, exhaled breath, fingerprint, urine, hair, nail, or skin. One device that may be used to implement this portion of the present invention is produced and sold by DNA Genotek of Ottawa, Ontario, Canada, which produces and sells the Oragene™ DNA Self-Collection Kit, for collecting and preserving large amounts of DNA from saliva. See: http://www.dnagenotek.com/

In another embodiment of the invention, DNA may be collected from a customer by obtaining a sample of saliva in a container such as a spit cup 543, as shown in FIG. 103.

In an alternative embodiment of the invention, an automatic machine or device which accepts a DNA sample may be used to obtain an analysis without the intervention of a technician or clerk.

FIG. 104 is a flow-chart that outlines PCR-SSOP processing in some embodiments of the present invention.

FIG. 105 is a flow-chart PCR methodology for received DNA samples.

FIG. 106 shows process steps associated with electrophoresis of PCR samples.

FIG. 107 is a flow-chart that outlines denaturation and fixing of membrane blots.

FIG. 108 shows process steps associated with end labeling of human leucocyte antigen (HLA) oligonucleotides.

FIG. 109 is a flow-chart showing prehybridization, hybridization and SSPE stringency washing of membranes.

FIG. 110 shows procedures associated with chemiluminescence in some embodiments of the present invention.

In FIG. 111, a customer whose tissue sample has already been analyzed receives a custom-formulated perfume 544, "MyAroma™" or "MyCologne™," which contains olfactory reagents that are correlated with his or her genetic attributes, and specifically, which are correlated with his or her MHC-derived peptide profile.

FIG. 112 shows a customer using a MateFinder™ device 10 which has been programmed 548 with his or her genetic attributes, as determined in accordance with the present invention.

FIG. 113 shows a customer 17b visiting a doctor's office to provide a tissue sample, which is then certified by the doctor 550 before it is submitted to the laboratory. In this embodiment, the physician provides the test kit 514, and obtains the tissue sample. The physician then sends the tissue sample to a laboratory for analysis, and also certifies that the sample is from a particular person. In this example, the physician acts as a "notary" who insures the identity of the source of the sample. This implementation of the invention guards against the fraudulent submission of a tissue sample from a person who might attempt to supply a misleading identity.

VII. Custom-Fabricated Perfumes

After the genetic attributes of the user of a MateFinder or other individuals have been determined, a custom perfume may be manufactured based on those genetic attributes.

FIG. 114 depicts a method of manufacturing a customized perfume 544. General methods for manufacturing compositions for dispensing fragrances, aromas and perfumes are well known in the art. According to the Scented Products Education and Information Association of Canada, ingredients in a typical fragrance "recipe" generally include:

"extracts from plants and flowers (naturals), synthetic recreations (synthetic duplications of natural fragrance materials), synthetic innovations (variations of naturally-occurring materials which have unique olfactory properties).

In general, typical fragrance formulae contain 100-350 ingredients, with an average concentration of usually less than 1%.

In a perfume, ethyl alcohol (of the same grade and purity as in alcoholic beverages) composes 50-90% of the product, purified water may constitute 5-20% of the product, with the fragrance component accounting from 10-30% of the finished product. Also present are UV inhibitors (to prevent degradation in the bottle) and any additional colouring agents."

SPEIAC, 20 Britannia Road East, Suite 102, Mississauga, Ontario L4Z 3L5 See: http://www.cctfa.ca/scented/fragmat.htm In one embodiment of the present invention, appropriate combinations of biological agents such as peptides or other substances are added as active ingredients 552 to a base 554 to a mixture, together with and/or any other suitable solvents, stabilizers, agents, preservatives, dispersants, inhibitors or components. In one embodiment, the base is a solvent, such as alcohol or water. These biological agents are selected to match a genetic attribute possessed by a person.

In one implementation, the perfume or cologne 544 made in accordance with the invention contains substances which are complementary to the user's Major Histocompatibility Complex (MHC profile), which will be attractive to the same user. In the same implementation, that person may ask a spouse or mate to wear this perfume or cologne 544, which pleases the person for whom the customized perfume or cologne was made. The present invention includes both perfume or cologne intended to be used during interaction with another, either by applying to the other's body or clothing, or to part of one's one body or clothing, or to another object which the user can smell during the interaction.

The biological agents may be selected to promote the responsivity of the person using the mixture, or may be selected to promote the responsivity of another person using the mixture. The biological agents in the mixture may be used to broadcast or indicate sexual compatibility, interest, awareness or attraction. As an alternative, the biological agents may be selected to promote confidence, self-esteem or the interest or attraction of another. The invention may be used to promote relationships between members of the opposite sex, or between members of the same sex.

In this Specification and in the Claims that follow, the term "perfume" encompasses any composition of matter that conveys, carries or otherwise transmits a scent, an aroma, an odor or any other olfactory or sensory stimulant or signal. This composition includes, but is not limited to, a perfume, a cologne, a salve or balm, a paste, an aerosol or non-aerosol spray, a gas or mixture of gases, a powder or some other dry preparation, or a cosmetic. This composition may or may not be consciously sensible. The cosmetic may include skin cream, lipstick, lip balm, nail polish, hair spray, make-up, gel, liquid, powder, ointment, colorant, or some other preparation that be applied to the body. The mixture is generally intended to be applied to, dispensed on or worn on the skin or hair, but may be applied on or used in conjunction with an article of clothing or some other object, which may be impregnated with the active ingredients. In yet another embodiment, the perfume 544 may be encapsulated or contained in a pill or medication that is taken internally, and which is then secreted through the skin or which causes a biological reaction which produces or mimics an odor. In another embodiment, the composition may be incorporated in a soap, body wash or cleanser, which effectively washes away natural scents, and then covers the body with a new scent. The mixture may also be dispensed using a variety of devices, including, but not limited to air fresheners, aroma-dispensing devices, candles and incense.

This specialized perfume 544 contains a strong preparation of personal peptides, enabling the user to "broadcast" his or her "MHC" over a wide area, and increasing his or her chances of meeting a compatible partner. The perfume 544 provides a much more specific set of aromas than, for instance, not bathing for a long period, since odors thus derived have been bacterially modified and contain many non-MHC-related components.

The MHC is a cluster of genes that determines details of cellular surfaces and thus immune responses, and specifies certain peptides that appear in skin secretions and urine. These peptides are responsible for odors which uniquely identify individuals who are not identical twins. Detailed information concerning the MHC may be found in Leslie A. Knapp's publication entitled *The ABCs of MHC*, published in Evolutionary Anthropology 14:28-37 (2005) Wiley-Inter-Science. MyAroma™, MyPerfume™, MyEssence™ are Trade & Service Marks owned by the Assignee of the Present Patent Application.

Two alternative methods for preparing custom perfumes from genetic information are shown in FIGS. 114A and 114B. FIG. 114A depicts an arrangement which may be used to prepare a custom perfume automatically at a retail point of sale. The customer provides a saliva or buccal swab or other DNA-containing sample to the sales clerk, who inserts the into a small, commercially-available DNA analysis device with digital interface 556. The device 556 analyzes the sample and provides a digital output to the microprocessor 558. Using information stored in read-only memory 560, microprocessor 558 calculates the appropriate amounts of various scents or peptides to fit the customer's DNA profile. Microprocessor 558 then actuates valves 564 for the corresponding length of time to release the calculated amounts of scents or peptides contained in scent reservoirs 562 into the mixing chamber 566. After allowing time for the scents from scent reservoirs 562 to mix, the microprocessor 558 actuates dispensing valve 572. The custom perfume then flows through dispensing tube 568 into the perfume bottle 570, which is then sold to the customer. When the sale is complete, the sales clerk presses rinse button 576, which causes the microprocessor 558 to open rinse valve 574 and dispensing valve 572 briefly, allowing the rinse solution in rinse reservoir 578 to flow through the mixing chamber 566, the dispensing valve 572 and the dispensing tube 568, thus preparing the system for the next customer.

The embodiment shown in FIG. 114B operates in the same manner as the embodiment in FIG. 114 A, except that the customer's genetic profile is entered manually by the sales clerk using a keyboard or other entry device 580.

VIII. Alternative Perfume & Matching Service Embodiments

Custom Perfume Including Standard Perfume Ingredients

In another embodiment of the invention, standard ingredients are used to compose a perfume. Individuals with similar MHC genes have similar preferences for standard perfume scents such as rose, vanilla, and musk. According to this implementation of the invention, one member of a couple sends his partner's MHC information for laboratory analysis, the manufacturer can design a perfume for him to give to her (or vice versa). More information concerning preferences for standard scents may be found in "Evidence for MHC-correlated Perfume Preferences in Humans" by Milinski, M. & Wedekind, C., Behavioral Ecology, 12, p. 140-149 (2001).

EssenceSniffer

In yet another embodiment, a user may receive several scent samples, based on common identified MHC-advertising scents. These samples are be placed on a single card (SnifferCard or EssenceCard), or on a series of cards sent in individual wrappers that preserve the scents and prevent cross-contamination. The customer would then rates these scents, sends her or his ratings to the laboratory, and then the MHC type to which she or he is attracted is determined. The customer is then matched based on this MHC type. A perfume including these characteristics made also be produced for her or his current partner to wear.

Service Provided to Parties Involved in Arranged Marriages

In many parts of the world, marriages are arranged by parents, elders, or other parties. These marriages are sometimes very unhappy, fail to produce children, or are dissolved completely. One source of failure is likely to be MHC mismatching, particularly in populations with some degree of inbreeding (leading to more MHC similarity than would otherwise occur). In another implementation of the invention, the parties involved in arranging marriages (e.g., parents or matchmakers) submit samples from marriage candidates to determine whether they are biochemically compatible, thus increasing the chances that the pair will be well-matched and will produce viable offspring.

Service Provided to Individuals with the ABCC11 Gene

New evidence suggests that 80-95% of East Asians have an allele of the ABCC11 gene which may inhibit axillary secretions, making scent discrimination more difficult. In this embodiment of the invention, the presence of this gene is determined. A customer is then alerted that their MHC advertising may be suppressed, and they may wish to use the stronger formulations of MHC-advertising perfume to attract reproductively compatible mates. More information concerning the ABCC11 Gene may be found in "The Dimorphism in Human Normal Cerumen" by Matsunaga, E., published in Annual Review of Human Genetics, 25, 273-286 (1962) and in "A SNP in the ABCC11 Gene is the Determinant of Human Earwax Type" by Yoshiura, K. et al., published in Nature Genetics, 29 January, doi: 10.1038/ng1733 (2006).

IX. A General Description of Sample Analysis, DNA Identification & Perfume Formulation After a sample is received at the laboratory, it is processed to extract DNA. DNA is the chemical inside the nucleus of a cell that carries the genetic instructions for making living organisms. A cell, which is shown in FIG. 115, is the basic unit of any living organism. It is a small, watery, compartment filled with chemicals and a complete copy of the organism's genome. Each cell contains a nucleus, which is portrayed in FIG. 116. The nucleus is the central cell structure that houses the chromosomes. Chromosomes are one of the threadlike "packages" of genes and other DNA in the nucleus of a cell. Chromosomes are shown enclosed within the nucleus, which is, in turn, enclosed in the center of the cell, as illustrated in FIG. 117.

Different kinds of organisms have different numbers of chromosomes. Humans have 23 pairs of chromosomes, 46 in all: 44 autosomes and two sex chromosomes. Each parent contributes one chromosome to each pair, so children get half of their chromosomes from their mothers and half from their fathers.

Part of the chromosome is called a gene, as depicted in FIG. 118. The gene is the functional and physical unit of heredity passed from parent to offspring. Genes are pieces of DNA, and most genes contain the information for making a specific protein. FIG. 118 shows how a length or strand of DNA forms a gene.

FIGS. 119 and 120 furnish views of a strand of DNA, which comprises a pair of helical ribbons attached by bases that resemble the rungs of a ladder. These bases are named adenine, thymine, guanine and cytosine. Sometime uracil is substituted for thymine. A section of one of the spiral sides of the DNA together with one of the bases comprises a nucleotide, which is shown in FIG. 120. Nucleotides are one of the structural components, or building blocks, of DNA and ribonucleic acid (RNA). A nucleotide consists of a base (one of four chemicals: adenine, thymine, guanine, and cytosine) plus a molecule of sugar and one of phosphoric acid.

Another set of chemicals that are important building blocks in humans are amino acids. Amino acids are the "building blocks" of proteins, and are shown in FIG. 121. There are twenty different kinds of amino acids in the human body. When two or more amino acids are bonded together, they form a peptide, which is shown in FIG. 122.

An allele is one of the forms of a gene at a particular location or "locus" on a chromosome. Alleles are specific sequences of base pairs that can be present at a given locus. For example, at the HLA-A locus in a particular individual, alleles in the A*01 and A*02 groups may be found. The "*" in the allele group name indicates that it was determined by DNA typing, as opposed to serological methods.

Different alleles produce variation in inherited characteristics such as hair color or blood type. In an individual, one form of the allele (the dominant one) may be expressed more than another form (the recessive one). A set of different alleles that reside on the chromosomes of a common fly are illustrated in FIG. 123. Genes may also be co-dominant, in which case both are expressed, as opposed to dominant/recessive genes, in which case only the dominant one is expressed.

In accordance with the present invention, small amounts of DNA are obtained from the sample submitted to a laboratory by a user who has submitted a saliva sample or skin scraping. In one embodiment of the invention, personnel at the lab cut the sample using a punch to make three separate disc-shaped pieces, as shown in FIG. 124. These pieces are each placed in a different test tube as shown in FIG. 125. All the pieces are washed several times with chemicals that purify the sample on each piece. After washing, each piece is dried in its tube.

In an alternative embodiment, if a saliva sample is obtained from the customer, the saliva is poured directly into three separate test tubes, washed and then the DNA analysis is performed.

When DNA is analyzed, a laboratory technician looks at particular places or "loci," (which are the positions in a chromosome in which specific genes are known to occur) to determine the particular allele (variation of the gene). Previous research has determined that every person has a characteristic sequence of genetic material (allele) that resides at each of his or her genetic loci.

The laboratory technician basically examines particular sets of alleles that are found at a particular group of loci on a particular chromosome. Specifically, the technician "takes an inventory" of the genetic material in the MHC region on Chromosome 6. Parts of the MHC are broken down into smaller groups of genetic material, and are given names. The parts of the MHC that need to be inventoried are named "HLA-A," "HLA-B" and "HLA-DRbeta1." These parts of the MHC are correlated with particular regions of a particular chromosome. All these relationships are illustrated in FIG. 126.

The term "allele groups" are also known as "2-digit alleles" and "2 alleles." "High resolution alleles" are also known as "4-digit alleles" and "4 alleles."

FIG. 128 describes a Human Leukocyte Antigen. FIG. 129 describes Diploid Haplotypes.

There are 21 HLA-A allele groups, 37 HLA-B allele groups, and 13 HLA-DRbeta1 allele groups. FIG. 127 is a schematic representation of the results of an analysis of one of the disc-shaped samples. The analysis provides a listing of allele groups. The various MHC Allele Groups, such as "A*01," "A*02" and "A*03" are presented in FIG. 130. FIG. 131 describes a Sirmilarity Metric.

The sequence-specific oligonucleotide probe (SSOP) method is used. The basis of this method is HLA locus-specific amplification by polymerase chain reaction (PCR), and the subsequent probing of the resulting product by SSOP. A battery of probes is required. The pattern of reaction to these probes distinguishes the HLA alleles.

For each sample, the laboratory uses PCR for HLA locus-specific amplification at HLA-A, HLA-B, and HLA-DRbeta1. Each of the three PCR amplifications results in a product. Each of the three products is then tested with a battery of probes. The HLA-A amplified product is tested with 12 probes at exon 2 and 16 probes at exon 3. The HLA-B amplified product is tested with 18 probes at exon 2 and 18 probes at exon 3. The HLA-DRbeta1 amplified product is tested with 25 probes at exon 2. These are sufficient numbers of probes so that the reaction patterns will distinguish the HLA allele groups (2-digit alleles), for example, A*02.

After all the genetic codes that are contained on a sample piece is identified, this information is entered into a database along with the personal information and match preferences of the customer who submitted the sample.

Previous scientific research has determined that a woman's sexual response is based on the correlation between the alleles in the woman's MHC, and in a man's MHC. Specifically, a woman and a man who have different MHC genetic codes are more sexually compatible than a man and a woman who have similar MHC genetic codes.

So, when the lab technician takes an inventory of all the different allele groups (2-digit alleles) in a user's DNA sample, the technician is creating an identification or map of the person who submitted the sample. By comparing this identification or map with that of a different person, a technician can predict which other people will be attractive and sexually responsive to the customer, all based on the genetic code of each individual. In addition to the HLA-A, HLA-B and HLA-DRbeta1 loci specified above, genetic information from other loci on Chromosome 6 or any other chromosome may be used to enhance a match.

In alternative embodiment of the invention, genetic attributes are determined by analyzing serologically typed HLA antigens. While "allele groups" are determined by genetic testing, such as PCR-SSOP, HLA antigens are determined by serological, or blood reaction, testing. Serological typing provides approximately the same resolution as "2-digit alleles." It cannot provide the higher resolution comparable to "4-digit alleles."

More detailed information concerning this analysis may be found in *Methods in Molecular Biology, Vol.* 210: *MHC Protocols*, edited by S. H Powis and Robert W. Vaughan, Humana Press Inc., Totowa, N.J., 2003. (See Chapter 5, "PCR-Sequence-Specific Oligonucleotide Probe Typing for HLA-A, -B, and -DR, by Derik Middleton and F. Williams). Another useful publication is *Histocompatibility Testing*, edited by Jeffrey L. Bidwell and Cristina Navarrete, Imperial College Press, 2000. (See Chapter 6, "PCR-SSOP Typing" by D. Middleton.) These publications explain how to type the MHC loci of interest using a two-tier system. The first level of resolution determines the allele group (2-digit alleles), and the second level uses this knowledge to determine the allele subgroup (4-digit alleles).

HLA typing can be performed by the complement dependent lymphocytotoxicity reaction (serology). Live peripheral blood mononuclear cells are required for this assay (CD8+T-cells and/or CD19+). B-cells are purified from whole blood, and incubated against a panel of antibodies with specificity against polymorphic epitopes expressed on HLA-A and -B proteins. In the presence of complement cells expressing HLA proteins which react with a particular antibody are lysed, allowing these damaged cells to uptake a stain which is detected by fluorescent microscopy. The pattern of negative and positive reactions is scored and interpreted to give an HLA serological type.

Additional information concerning this analysis may be found in *Histocompatibility Testing*, edited by Jeffrey L. Bidwell and Cristina Navarrete, Imperial College Press, 2000. (See Chapter 1, "HLA Typing by Alloantibodies and Monoclonal Antibodies" by G. M. Th. Schreuder; and Chapter 2, "Screening for HLA-Specific Antibodies" by C. Brown and C. Navarrete.) These publications explain how to type the MHC loci of interest using antibody reactions.

X. A Detailed Description of a Specific Embodiment of the Invention

In one particular embodiment of the invention, DNA samples are collected from a number of human individuals. A set of genetic attributes are determined for each of the individuals in this group. These genetic attributes may be entered and/or stored in a database. Based on the analysis of genetic attributes, a first and a second individual from the group are matched based on a compatible correlation of their genetic attributes. This matching promotes the sexual responsivity between the first and second individuals. A set of filtering rules may be employed to customize the matches by either restricting or promoting particular matches, based on criteria delineated by individuals in the group.

In addition, a perfume may be manufactured based on the analysis of the genetic attributes. The perfume may be used to promote the romantic self-confidence of the individual who wears the perfume, may be used to broadcast genetic attributes to another individual, or may be used promote the romantic interest of another human individual.

In one implementation of the invention, only a single attribute in the set of genetic attributes that is analyzed. In another embodiment, more than one attribute is analyzed.

The first and the second individuals may be humans, and may be members of the opposite sex, or may be members of the same sex. In an alternative embodiment of the invention, this method may be used in the veterinary field to enhance the selective breeding of livestock, pets or other animals.

In one specific embodiment of the invention, the set of genetic attributes are determined by analyzing a gene in the Major Histocompatibility Complex Region of Chromosome 6.

In a first case, a set of genetic attributes of the individuals in the group is determined by an analysis of alleles at the HLA-A locus. The alleles at the HLA-A locus may be measured to the resolution of an allele group, or to the resolution of an allele sub-group.

In a second case, a set of genetic attributes of the individuals in the group is determined by an analysis of alleles at the HLA-B locus. The alleles at the HLA-B locus may be measured to the resolution of an allele group, or to the resolution of an allele sub-group.

In a third case, a set of genetic attributes of the individuals in the group is determined by an analysis of alleles at the HLA-DRbeta1 locus. The alleles at the HLA-DRbeta1 locus may be measured to the resolution of an allele group, or to the resolution of an allele sub-group.

In one implementation, the set of genetic attributes is determined by an analysis of alleles at the HLA-A loci, the HLA-B loci and the HLA-DRbeta1 loci. The alleles at the HLA-A, HLA-B and HLA-DRbeta1 loci may be measured to the resolution of an allele group (2-digit allele), or to the resolution of an allele sub-group (4-digit allele).

The analysis is used to calculate a matching score between the first and second individuals. In one specific situation, this matching score is computed as a number of HLA-A alleles that the first individual has in common with the second individual; plus a number of HLA-B alleles that the first individual has in common with the second individual; plus a number of HLA-DRbeta1 alleles that the first individual has in common with the second individual. Note that there are two alleles per person per locus, creating the need for a zero-to-six scoring matrix.

In one case, the first and second individuals are matched based on a low matching score. In another case, the first and second individuals are matched based on a high matching score. The matching score ranges from zero, corresponding to no alleles in common, to six, corresponding to all alleles in common.

One specific method of computing a matching score employs the following steps:

initializing a score to zero;

then, for each locus, adding 2 if two alleles from said first individual match two alleles from said second individual at subgroup resolution;

adding 1.5 if one allele from said first individual matches one allele from said second individual at subgroup resolution and the other alleles match only at the group resolution;

adding 1 if one allele from the first person matches one allele from the second person at the subgroup resolution and the other alleles do not match;

adding 1 if the two alleles from the first person match the two alleles from the second person at the group resolution only;

adding 0.5 if one allele from the first person matches one allele from the second person at the group resolution only and the other alleles do not match;

adding 0 otherwise; and repeating for each of the three loci.

In another embodiment, analysis and comparison of alleles of the DRD4 locus on Chromosome 11 can be used to determine relative desire, arousal and sexual function. See Ben Zion, I. Z. et al., "Polymorphisms in the dopamine D4 receptor gene (DRD4) contribute to individual differences in human sexual behavior, desire arousal and sexual function," *Molecular Psychiatry* 1-5 (2006). Matches obtained through the matching method described above may be further screened for compatibility through this additional test.

In yet another embodiment, analysis and comparison of the ER-alpha locus can be used to predict sexual behavior in women. See Westberg et al., "Association between a dinucleotide repeat dimorphism of the estrogen receptor alpha gene and personality traits in women," *Molecular Psychiatry* 8, pp. 118-122 (2003). More recent work has shown that mice lacking the ER-alpha gene are uninterested in sex and exhibit hostility to males. See Musatov et al., "RNAi-mediated silencing of estrogen receptor in the ventromedial nucleus of hypothalamus abolishes female sexual behaviors," *Proceedings of the National Academy of Sciences of the United States of America,* Vol. 103 No. 27, pp. 10456-10460 (Jul. 5, 2006). As in the embodiment next above, analysis of this locus may also allow more precise estimates of compatibility.

The genetic attributes which are analyzed may be related to one, or more, characteristics of physical appearance. In one specific instance, the genetic attributes may be related to eye color. In particular, the genetic attributes which are analyzed may be the two alleles at the EYCL1 locus on Chromosome 19, the two alleles at the EYCL2 locus located on Chromosome 15, and the two alleles at the EYCL3 locus on Chromosome 15.

In another specific instance, the genetic attributes are related to hair color. In particular, the genetic attributes of each individual are the two alleles at the HCL1 locus on Chromosome 19, the two alleles at the HCL2, locus on Chromosome 4, and the two alleles at the HCL3 locus on Chromosome 15.

In another specific instance, the genetic attributes are related to genetic diseases.

In one embodiment of the invention, the DNA sample is obtained using a self collected sample of biological material. In one specific implementation, the biological material is saliva. A sample of saliva may be obtained having a customer spit into a sample collection container. The container is then sealed, and is submitted to a laboratory by mail or by some other form of delivery.

As an alternative, saliva and/or cheek cells are collected from the mouth using a swab. The saliva is transferred to a sample card by rubbing the swab on said card. The card is then sealed in an envelop with a desiccant, and then submitted to a laboratory.

XI. Security of DNA Samples

Business-to-Business Embodiment

FIGS. 132, 133, 134 and 135 illustrate an embodiment of the invention in which a subscriber to a dating service pays for and receives a Sample Test Kit from the dating service in the mail or from a retail outlet or other source. The manufacturer of the Sample Test Kit packages together a collection device and a Remailing Package that has a business-reply mailing label pre-addressed to the laboratory attached, along with a Personal Data card and an Envelope addressed to the dating service and marked with a unique bar code. The collection device is labeled with a bar code that is identical to the bar code on the Personal Data Card. One example of the collection device is the Oragene™ DNA Self-Collection Kit, which is manufactured by DNA Genotek. See http://biocompare.com. The user collects the sample, inserts it into the Remailing Package, fills out the Personal Data Card, inserts it in the Envelope, and mails the sample and the Envelope containing the Personal Data Card separately to the laboratory and dating service respectively.

When the laboratory receives the sample, which is identified only with the barcode, it performs an analysis. Results of the analysis are stored in a database. Results are not provided to the dating service, the user, or anyone else. The barcode on the collection device is then obliterated or destroyed, and the collection device is then destroyed or recycled.

When the dating service receives the card, it scans the barcode and stores its number with its user's personal information.

When it chooses, the dating service sends the laboratory the user's barcode number along with those of prospective matches. The laboratory compares the profiles of the various samples, stored in its database, and returns a report to the dating service with the degree of match of each requested sample to the user's sample. The dating service then recommends partners to the user based on the degree of match.

In this way, neither the laboratory nor the dating service can associate a particular genetic profile with a particular person, no matter how many times the data are compared.

Business-to-Consumer Embodiment

In this embodiment, the customer mails the sample and card as above, except that the card is mailed to a national audit firm, such as Ernst & Young. It includes a section in which the user states that he/she is using the information for mate selection purposes only, and that the sample really is his/hers. Users wishing to compare samples contact the audit firm, which in turn supplies the barcode numbers to the laboratory or to some other business entity, which informs the audit firm, which informs the informs the user of the results of the analysis, or alternatively informs the user of the degree of correspondence between the submitted sample and a second sample submitted by another user for analysis. It should be noted that such a second sample may already be in the laboratory's database or in a database held by another party.

In an alternative embodiment, the customer mails both the card and the sample to the laboratory or to some other business entity, but to separate post office boxes. Different people at the laboratory open the mail from each post office box, and the data remain sequestered forever.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Matching System that have been disclosed above are intended to educate the reader about preferred embodiments of the invention, and are not intended to constrain the limits of the invention or the scope of Claims.

LIST OF REFERENCE CHARACTERS

| | |
|---|---|
| 10 | MateFinder ™ |
| 10a | First user's MateFinder |
| 10b | Second user's MateFinder |
| 11 | Interrogation or seeking signal |
| 11a | First interrogation signal |
| 11b | Second interrogation signal |
| 12 | Housing |
| 14 | Power switch |
| 15 | "Seeking" indicator light |
| 16 | "Match Found" indicator light |
| 16a | First match indicator |
| 16b | Second match indicator |
| 17a | Man |
| 17b | Woman |
| 18 | LCD message screen |
| 19 | Website |
| 20 | USB port |
| 22 | Personal computer |
| 24 | USB cable |
| 26 | Battery |
| 28 | Radio/Processor assembly |
| 30 | Antenna |
| 32 | Memory |
| 32a | First memory |
| 32b | Second memory |

-continued

LIST OF REFERENCE CHARACTERS

| | |
|---|---|
| 33 | Attribute |
| 33a | First set of attributes |
| 33b | Second set of attributes |
| 34 | Mask switch |
| 35 | Correlation thumbwheel |
| 36 | Microprocessor |
| 37 | Local wireless network |
| 38 | Receiver Assembly |
| 39 | Transmit/Receive Switch |
| 44 | Transmitter Assembly |
| 48 | Bandpass filter |
| 49 | MateFinder with Cellular or VoIP Telephone Combination |
| 50 | Wireless network |
| 51 | Wireless signals to and from network |
| 52 | Network radio |
| 53 | Keyboard, keypad or input device |
| 70 | Wi-Fi Transceiver |
| 72 | Battery Pack |
| 100a | Network Topology |
| 100b | First Alternate Network Topology |
| 100c | Second Alternate Network Topology |
| 100d | Third Alternate Network Topology |
| 100e | Fourth Alternate Network Topology |
| 100f | Fifth Alternate Network Topology |
| 100g | Sixth Alternate Network Topology |
| 100h | Seventh Alternate Network Topology |
| 100i | Eighth Alternate Network Topology |
| 100j | Ninth Alternate Network Topology |
| 102 | System Server |
| 104 | Network Access Point |
| 105 | Server to Access Point Link |
| 105a | Server to Access Point Internet Link |
| 105b | Server to Access Point Cable Link |
| 105c | Server to Access Point Wi-Max Link |
| 105d | Server to Access Point-to-Point Microwave or Millimeter Wave Link |
| 105e | Server to Access Point Wi-Fi Link |
| 106 | Server to Internet Link |
| 108 | Internet |
| 110 | Access Point to Internet Link |
| 112 | Terminal to Access Point Wi-Fi Link |
| 114 | Exemplary MateFinder Wi-Fi Process |
| 120 | Exemplary Matefinder Set Comparison between Information Sets |
| 132 | Server to Access Point Cable Connection |
| 134 | Server to Access Point Wi-Max Connection |
| 136 | Point-to-Point Wireless Link |
| 140 | Terminal to Access Point Bluetooth Link |
| 142 | Terminal-to-Access Point Wi-Fi Link |
| 210 | Schematic Diagram of a Conventional Telephone Connection |
| 220 | Voice Communication Topology over the Internet using conventional telephones |
| 230 | Voice Communication Topology over the Internet Using Wireless Links between MateFinders and Network Access Points |
| 240 | Exemplary MateFinder terminal for VoIP communications |
| 250 | Exemplary Signal processing for VoIP Communications using MateFinder Terminals |
| 260 | Alternative Embodiment of VoIP Communication Between Two Ordinary Telephones |
| 270 | Alternative Embodiment of VoIP Communication Between MateFinder Terminals |
| 310 | Network Access Communication System |
| 311 | Wide-Area Network (WAN) |
| 312 | Central Communications Hub |
| 313 | Super-High-Frequency (SHF) Link |
| 314 | Subscriber |
| 315 | MFAP Terminal |
| 316 | Service Area Sector |
| 317 | MFAP |
| 318 | Service Area Radius |
| 320 | Schematic Diagram of Wide Area Network Service Area |
| 322 | Variant Service Area |
| 330 | Schematic of Signal Flow in MFAP |
| 332 | Multi-Port Router |
| 335 | Ethernet Port |
| 336 | WAN Port |
| 337 | Multiplex-Demultiplex (MUX/DEMUX) Unit |
| 338 | Block Diagram of Network Communications from Hub |

-continued

LIST OF REFERENCE CHARACTERS

| | |
|---|---|
| 339 | Local Area Network (LAN) |
| 340 | Multi-Channel Transceiver |
| 341 | Block Diagram of Router Functions |
| 342 | Transceiver |
| 343 | Serial Interface |
| 344 | Two-Port Router |
| 346 | Top-Level Functional Block Diagram of MFAP |
| 352 | Digital Signal Processing (DSP) Stage |
| 354 | Intermediate-Frequency (IF) Stage |
| 356 | Radio-Frequency (RF) Block |
| 358 | Antenna |
| 359 | Ethernet Interface |
| 360 | Detailed Functional Block Diagram of an MFAP Terminal |
| 362 | Phased-Lock-Loop Filter |
| 364 | IF ASIC Crystal |
| 366 | Second Intermediate-Frequency (IF) Filter |
| 368 | Intermediate-Frequency (IF) Integrated Circuit |
| 370a | Receive Stripline |
| 370b | Transmit Stripline |
| 370c | Logic Clock Signal |
| 370d | Control Signals |
| 372 | Ceramic IF Filter |
| 374 | First Local Oscillator Subharmonic Signal |
| 376 | Microwave Integrated Circuit |
| 378 | Radio-Frequency (RF) Filter |
| 380 | Frequency Multiplier |
| 382 | Active Frequency Doubler |
| 384 | Bandpass Filter |
| 388 | Local Oscillator Signal |
| 390 | Diagram of Balanced Active Doubler |
| 400 | Schematic Diagram of MFAP Terminal Approach |
| 410 | Functional Block Diagram of Digital Signal Processor (DSP) ASIC |
| 412 | Microprocessor |
| 414 | Random-Access Memory |
| 416 | Modem |
| 418 | Demodulator |
| 420 | Decoder |
| 422 | Encoder |
| 426 | Timing Generator |
| 428 | Receive Samples |
| 430 | Outgoing Transmit Samples |
| 434 | Read-Only Memory (ROM) Interface |
| 440 | Schematic Diagram of Transmit-Receive Module |
| 442 | Transmit-Receive Module |
| 444 | Received Intermediate-Frequency (IF) Signal |
| 446 | Signal from Antenna |
| 447 | Signal to Antenna |
| 448 | First Local Oscillator (LO) Subharmonic |
| 450 | Local Oscillator (LO) |
| 452 | Frequency Mixer |
| 454 | Image-Rejection Filter |
| 456 | Amplifier |
| 458 | Transmit-Receive Selector |
| 460a | Transmit-Receive Switch |
| 460b | Transmit-Receive Switch |
| 460c | Transmit-Receive Switch |
| 460d | Transmit-Receive Switch |
| 462 | Local Oscillator (LO) Signal |
| 512 | Retail store |
| 514 | AromaMatch ™ Test Kit |
| 518 | Website: AromaMatch.com |
| 520 | Bottle of cleaning solution |
| 522 | Cotton ball |
| 524 | Sample patch |
| 524C | Central area of patch |
| 524S | Strips extending away from central area |
| 525 | Plaster |
| 526 | Antibiotic |
| 527 | Adhesive |
| 528 | Sealable plastic bag |
| 530 | Mailing envelope |
| 532 | Laboratory technician |
| 534 | Sample analyzer |
| 536 | Aroma in the air |
| 538 | Aroma-sampling kiosk |
| 540 | Shopping mall |
| 542 | Tissue sample from cheek swab |

-continued

LIST OF REFERENCE CHARACTERS

| | |
|---|---|
| 543 | Spit cup |
| 544 | Custom-formulated perfume |
| 548 | Genetic attributes stored in MateFinder |
| 550 | Medical doctor or independent laboratory technician |
| 552 | Active ingredient |
| 554 | Base |
| 556 | DNA Analysis Device |
| 558 | Microprocessor |
| 560 | Read-Only Memory |
| 562 | Scent Reservoirs |
| 564 | Electrically-Operated Valves |
| 566 | Mixing Chamber |
| 568 | Dispensing Tube |
| 570 | Perfume Bottle |
| 572 | Dispensing Valve |
| 574 | Rinse Valve |
| 576 | Rinse Button |
| 578 | Rinse Reservoir |
| 580 | Keyboard or Other Manual Entry Device |

What is claimed is:

1. A method comprising the steps of:
providing a plurality of wireless matching devices to a plurality of individuals;
said plurality of individuals being generally present at a predetermined destination;
obtaining a plurality of samples from said plurality of individuals;
testing said plurality of samples to determine a set of genetic attributes for each of said plurality of individuals;
recording a plurality of self-describing characteristics of said plurality of individuals;
recording a plurality of desired attributes of another person as perceived by one of said plurality of individuals;
storing said set of genetic attributes, said plurality of self-describing characteristics and said plurality of desired attributes on said plurality of wireless matching devices; and
using said plurality of wireless matching devices to detect a match based on a correlation of a pair of said genetic attributes.

2. A method as recited in claim 1, in which said predetermined destination is a hotel.

3. A method as recited in claim 2, in which said plurality of wireless matching devices are distributed to guests of said hotel.

4. A method as recited in claim 2, in which said guests of said hotel record their plurality of self-describing characteristics and said plurality of desired attributes.

5. A method as recited in claim 2, in which said guests of said hotel record their plurality of self-describing characteristics and said plurality of desired attributes on an information appliance.

6. A method as recited in claim 2, in which said guests of said hotel record their plurality of self-describing characteristics and said plurality of desired attributes on a touch screen in said hotel.

7. A method as recited in claim 2, in which said guests of said hotel record their plurality of self-describing characteristics and said plurality of desired attributes on a paper form.

8. A method as recited in claim 2, in which said guests of said hotel record their plurality of self-describing characteristics and said plurality of desired attributes using a telephone.

9. A method as recited in claim 2, in which said guests of said hotel record their plurality of self-describing characteristics and said plurality of desired attributes using a television.

10. A method as recited in claim 2, in which said guests of said hotel record their plurality of self-describing characteristics and said plurality of desired attributes on a personal computer.

11. A method as recited in claim 2, in which said sample is obtained in said hotel.

12. A method as recited in claim 1, including the step of: producing a plurality of custom perfumes and colognes based on the results of said testing of said plurality of samples.

13. A method as recited in claim 1, in which said wireless device includes a cellular telephone.

14. A method as recited in claim 1, in which one of said plurality of wireless devices communicates with a local network.

15. A method as recited in claim 14, in which said local network is a cellular telephone network.

16. A method as recited in claim 14, in which said local network is a Wi-Fi network.

17. A method as recited in claim 14, in which said local network is a WiMAX network.

18. A method as recited in claim 14, in which said local network is an ultra-wideband network.

19. A method as recited in claim 14, in which said local network is a Voice over Internet Protocol network.

20. A method as recited in claim 1, in which said sample is a saliva sample.

21. A method as recited in claim 1, in which said sample is a cheek tissue sample.

22. A method as recited in claim 1, in which said sample is an odor sample.

23. A method as recited in claim 1, in which said sample is a blood sample.

24. A method as recited in claim 1, in which said plurality of genetic attributes pertain to the Major Histocompatibility Complex.

25. A method as recited in claim 1, in which said good match is based on a correlation of two sets of genetic attributes which are the most diverse.

26. A method as recited in claim 1, in which said good match is based on a correlation of two sets of genetic attributes which are similar.

27. A method as recited in claim 1, in which said wireless device is used in conjunction with an Internet dating website.

28. A method as recited in claim 1, in which said predetermined destination is a cruise ship.

29. A method as recited in claim 1, in which said predetermined destination is a convention.

30. A method as recited in claim 1, in which said predetermined destination is a singles event.

31. A method as recited in claim 1, in which said predetermined destination is a restaurant.

32. A method as recited in claim 1, in which said predetermined destination is a bar.

33. A method as recited in claim 1, in which said predetermined destination is a sporting event.

34. A method as recited in claim 1, in which said predetermined destination is a concert.

35. A method as recited in claim 1, in which said predetermined destination is a shopping center.

36. A method as recited in claim 1, further comprising the steps of:

connecting one of said plurality of wireless matching devices to a Voice-over-Internet-Protocol network by initiating a voice communication by dialing a telephone number;

connecting one of said plurality of wireless matching devices to a local Internet Service Provider using a modem and a local telephone network;

converting an analog audio signal to a digital signal using a first signal processing circuit;

routing said digital signal from said local Internet Service Provider to a remote Internet Service Provider based on said telephone number;

connecting said remote Internet Service Provider to a voice communication recipient via a local call.

37. A method as recited in claim 36, in which said digital signal is encrypted.

38. A method as recited in claim 1, further comprising the step of:

connecting one of said plurality of wireless matching devices to a wireless network that uses radio frequencies that exceed 50 GHz.

39. A method as recited in claim 1, further comprising the step of:

connecting one of said plurality of wireless matching devices to a wireless network that uses radio frequencies in the 59-64 GHz band.

40. A method as recited in claim 1, further comprising the step of:

connecting one of said plurality of wireless matching devices to a wireless network using a low-power transmitter not requiring Federal Communications Commission Licensing.

41. A method as recited in claim 1, in which two of said plurality of wireless matching devices communicate using said wireless network.

42. A method as recited in claim 1, in which two of said plurality of wireless matching devices communicate using said wired network.

43. A method as recited in claim 1, in which one of said plurality of wireless matching devices is used to transfer a file.

44. A method as recited in claim 43, in which said file is a music file.

45. A method as recited in claim 43, in which said file is a photograph.

46. A method as recited in claim 43, in which said file is a video clip.

47. A method as recited in claim 1, in which one of said plurality of wireless devices specifies a unique device address to another of said plurality of wireless devices after determining a match.

48. A method as recited in claim 1, in which one of said plurality of wireless devices enables a user to contact another person using a toll free telephone call.

49. A method as recited in claim 1, in which one of said plurality of wireless devices enables a user to contact another person using a cellular telephone call.

50. A method as recited in claim 1, in which one of said plurality of wireless devices enables a user to contact another person using a Voice over Internet Protocol call.

51. A method as recited in claim 1, in which one of said plurality of wireless devices enables a user to contact another person using a "900" number telephone call.

52. A method as recited in claim 1, in which one of said plurality of wireless devices determines location using a distance measurement.

53. A method as recited in claim 1, in which one of said plurality of wireless devices is used to gain access to a restricted area.

54. A method as recited in claim 1, in which one of said plurality of wireless devices is used to gain access to a restricted service.

55. A method as recited in claim 1, in which one of said plurality of wireless devices is used to verify the identity of a user.

56. A method as recited in claim 1, in which one of said plurality of wireless devices is rented to one of said plurality of individuals.

57. A method as recited in claim 1, in which one of said plurality of wireless devices is rented to one of said plurality of individuals at said predetermined destination.

58. A method as recited in claim 1, further comprising the steps of:

connecting one of said plurality of wireless matching devices to a wireless network.

59. A method as recited in claim 1, further comprising the step of:

connecting one of said plurality of wireless matching devices to a wired network.

60. A method comprising the steps of:

collecting a sample from each of a plurality of human individuals;

said plurality of human individuals including a first and a second human individual;

determining a set of attributes for each of said human individuals;

selecting said first individual and said second individual based on a correlation of each individuals' own said set of attributes to predict the compatibility between said first and said second human individuals; and producing a perfume for one of said human individuals based on said set of attributes to promote romantic self-confidence and compatibility between said first individual and said second individual.

61. A method as recited in claim 60, in which said sample contains genetic information.

62. A method as recited in claim 60, in which said sample contains biological information.

63. A method as recited in claim 60, in which the prediction of compatibility includes a prediction of sexual responsivity.

64. A method as recited in claim 60, in which the prediction of compatibility includes a prediction of sexual compatibility.

65. A method as recited in claim 60, in which the prediction of compatibility includes a prediction of non-sexual compatibility.

66. A method as recited in claim 60, further comprising the step of:

using said genetic information to design a custom perfume which is a good esthetic fit to a wearer's natural body scent.

67. A method as recited in claim 60, further comprising the step of:

using an analyzer and a DNA sample to determine said set of genetic attributes.

68. A method as recited in claim 60, further comprising the step of:

automatically manufacturing a customized perfume based on a genetic profile of a customer which is obtained from a point-of-sale analysis of said customer's DNA sample.

69. A method as recited in claim 60, in which said customized perfume is selected from among a range of commercially-available perfumes.

70. A method as recited in claim 60, further comprising the step of:
    protecting the anonymity of said sample using a double-blind privacy protection security safeguard.

71. A method as recited in claim 60, further comprising the step of:
    preventing a laboratory from associating said sample with the identity of one of said plurality of human individuals.

72. A method as recited in claim 60, further comprising the step of:
    preventing a dating service from associating said sample with the identity of one of said plurality of human individuals.

73. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;
    storing said set of genetic attributes, said plurality of self-describing characteristics and said plurality of desired attributes on said plurality of wireless matching devices; and
    using said plurality of wireless matching devices to detect a match based on a correlation of said plurality of self-describing characteristics.

74. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;
    storing said set of genetic attributes, said plurality of self-describing characteristics and said plurality of desired attributes on said plurality of wireless matching devices; and
    using said plurality of wireless matching devices to detect a match based upon a correlation of said plurality of desired attributes of another person.

75. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;
    storing said set of genetic attributes, said plurality of self-describing characteristics and said plurality of desired attributes on said plurality of wireless matching devices; and
    using said plurality of wireless matching devices to detect a match based upon a woman's predetermined description of a suitable man.

76. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;
    storing said set of genetic attributes, said plurality of self-describing characteristics and said plurality of desired attributes on said plurality of wireless matching devices; and
    using said plurality of wireless matching devices to detect a match based upon the analysis of a collected sample of human body odor.

77. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;
    storing said set of genetic attributes, said plurality of self-describing characteristics and said plurality of desired attributes on said plurality of wireless matching devices; and
    using said plurality of wireless matching devices to detect a match based upon the analysis of a collected sample of DNA.

78. A method comprising the steps of:
    providing a plurality of wireless matching devices to a plurality of individuals;
    said plurality of individuals being generally present at a predetermined destination;
    obtaining a plurality of samples from said plurality of individuals;
    testing said plurality of samples to determine a set of genetic attributes for each of said plurality of individuals;
    recording a plurality of self-describing characteristics of said plurality of individuals;
    recording a plurality of desired attributes of another person as perceived by one of said plurality of individuals;

storing said set of genetic attributes, said plurality of self-describing characteristics and said plurality of desired attributes on said plurality of wireless matching devices; and using said plurality of wireless matching devices to detect a match based upon the analysis of an MHC type.

79. A method comprising the steps of:

providing a plurality of wireless matching devices to a plurality of individuals;

said plurality of individuals being generally present at a predetermined destination;

obtaining a plurality of samples from said plurality of individuals;

testing said plurality of samples to determine a set of genetic attributes for each of said plurality of individuals;

recording a plurality of self-describing characteristics of said plurality of individuals;

recording a plurality of desired attributes of another person as perceived by one of said plurality of individuals;

storing said set of genetic attributes, said plurality of self-describing characteristics and said plurality of desired attributes on said plurality of wireless matching devices; and using said plurality of wireless matching devices to detect a match based upon a woman's increased sexual responsivity.

80. A method comprising the steps of:

providing a plurality of wireless matching devices to a plurality of individuals;

said plurality of individuals being generally present at a predetermined destination;

obtaining a plurality of samples from said plurality of individuals;

testing said plurality of samples to determine a set of genetic attributes for each of said plurality of individuals;

recording a plurality of self-describing characteristics of said plurality of individuals;

recording a plurality of desired attributes of another person as perceived by one of said plurality of individuals;

storing said set of genetic attributes, said plurality of self-describing characteristics and said plurality of desired attributes on said plurality of wireless matching devices; and using said plurality of wireless matching devices to detect a match based upon a calculation of a matching score which compares alleles in common between two individuals.

81. A method comprising the steps of:

providing a plurality of matching devices to a plurality of individuals;

said plurality of individuals being generally present at a predetermined destination;

obtaining a plurality of samples from said plurality of individuals;

testing said plurality of samples to determine a set of genetic attributes for each of said plurality of individuals;

recording a plurality of self-describing characteristics of said plurality of individuals;

recording a plurality of desired attributes of another person as perceived by one of said plurality of individuals;

storing said set of genetic attributes, said plurality of self-describing characteristics and said plurality of desired attributes on said plurality of wireless matching devices; and using said plurality of matching devices to detect a match based on a correlation of a pair of said genetic attributes.

* * * * *